US009218708B2

(12) United States Patent
Fujisawa et al.

(10) Patent No.: US 9,218,708 B2
(45) **Date of Patent: *Dec. 22, 2015**

(54) GAMING MACHINE

(71) Applicants: Universal Entertainment Corporation, Koto-ku, Tokyo (JP); Aruze Gaming America, Inc., Las Vegas, NV (US)

(72) Inventors: Masumi Fujisawa, Tokyo (JP); Kenta Kitamura, Tokyo (JP); Susumu Mio, Tokyo (JP); Makoto Miyawaki, Tokyo (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/294,446

(22) Filed: Jun. 3, 2014

(65) Prior Publication Data

US 2014/0274300 A1 Sep. 18, 2014

Related U.S. Application Data

(63) Continuation of application No. 13/769,205, filed on Feb. 15, 2013, now Pat. No. 8,777,734.

(30) Foreign Application Priority Data

Feb. 16, 2012 (JP) ................................ 2012-032208

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.
CPC ............ *G07F 17/3211* (2013.01); *G07F 17/32* (2013.01); *G07F 17/3267* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 6,142,875 | A * | 11/2000 | Kodachi et al. | 463/20 |
| 8,366,535 | B2 * | 2/2013 | Watkins et al. | 463/20 |
| 2003/0114218 | A1 * | 6/2003 | McClintic | G07F 17/32 463/25 |
| 2005/0266910 | A1 * | 12/2005 | Nagano et al. | 463/16 |
| 2005/0277461 | A1 | 12/2005 | Inamura et al. | |
| 2006/0199642 | A1 | 9/2006 | Okada | |
| 2007/0054732 | A1 | 3/2007 | Baerlocher | |
| 2009/0124345 | A1 * | 5/2009 | Gilmore et al. | 463/20 |
| 2011/0250947 | A1 * | 10/2011 | Okamoto | 463/20 |
| 2012/0009994 | A1 | 1/2012 | Cannon et al. | |

* cited by examiner

*Primary Examiner* — Jason Yen
(74) *Attorney, Agent, or Firm* — KMF Patent Services, PLLC; S. Peter Konzel; Kenneth M. Fagin

(57) ABSTRACT

On a lower image display panel 141, a game result of rearranged of symbols 501 is randomly determined. When the result is winning of a bonus game, individual indication data and common indication data associated with the type of the bonus game are specified. After an indication effect starts based on the common indication data, an indication effect is executed based on the individual indication data.

8 Claims, 168 Drawing Sheets

FIG.17

BONUS RELATED MATTERS

| INDICATION NUMBER | EFFECT | DAT NAME | BONUS | RELIABILITY |
|---|---|---|---|---|
| INDICATION 0 | WITHOUT EFFECT | | — | 0.57% |
| INDICATION 1 | 1 GHOST PASSES | | 4 OPTIONS | 33% |
| INDICATION 2 | 3 GHOSTS PASS | | 4 OPTIONS | 49% |
| INDICATION 3 | GHOST GROUP PASSES | | 4 OPTIONS | 100% |
| INDICATION 4 | THUNDER | | 4 OPTIONS | 33% |
| INDICATION 5 | THUNDER + CASTLE | | 4 OPTIONS | 100% |
| INDICATION 6 | MUM | | 4 OPTIONS | 100% |

FIG.18

RANDOM DETERMINATION CONDITION

| TABLE | CONDITION | | | STOP RESULT | | | CONDITION OCCURRENCE PROBABILITY |
|---|---|---|---|---|---|---|---|
| | SYMBOL | NUMBER OF STOPPED SYMBOLS | | REEL 1 | REEL 3 | REEL 5 | |
| TABLE_1 | BONUS | 2 | BONUS TENPAI AND LOSE | TRIGGER_B | TRIGGER_B | — | 5.813% |
| TABLE_2 | BONUS | 3 | WINNING THREE FANS BONUS | TRIGGER_B | TRIGGER_B | TRIGGER_B | 1.688% |

FIG.19

RANDOM EFFECT DETERMINATION TABLE NORMAL BET

| TABLE | INDICATION | | | | | | | TOTAL |
|---|---|---|---|---|---|---|---|---|
| | INDICATION 0 | INDICATION 1 | INDICATION 2 | INDICATION 3 | INDICATION 4 | INDICATION 5 | INDICATION 6 | |
| TABLE-1 | 85 | 6 | 3 | 0 | 6 | 0 | 0 | 100 |
| TABLE-2 | 33 | 10 | 10 | 4 | 10 | 13 | 20 | 100 |

FIG.20

INCIDENCE AND RELIABILITY OF EACH EFFECT

| INDICATION NUMBER | INDICATION 0 | INDICATION 1 | INDICATION 2 | INDICATION 3 | INDICATION 4 | INDICATION 5 | INDICATION 6 | TOTAL |
|---|---|---|---|---|---|---|---|---|
| FREQUENCY OF EACH EFFECT (%) | 98.00% | 0.52% | 0.34% | 0.07% | 0.52% | 0.22% | 0.34% | 100.00% |
| FREQUENCY OF EACH EFFECT(1/N) | 1.02 | 193.24 | 291.44 | 1481.48 | 193.24 | 455.84 | 296.30 | 1.0 |
| RELIABILITY OF EACH EFFECT | 0.75% | 32.61% | 49.18% | 100% | 33% | 100.00% | 100.00% | – |
| PROPORTION IN RELATION TO THE WHOLE | 33.00% | 10.00% | 10.00% | 4% | 10% | 13.00% | 20.00% | – |

OCCURRENCE OF EFFECT : 2.00% 49.84 | 67.00%

FIG.24

TABLE 3 OCCURRENCE OF INDICATION TABLE

| CHARACTER | INDICATION | | TOTAL | BONUS | OCCURRENCE OF INDICATION |
|---|---|---|---|---|---|
| | EXECUTE | DO NOT EXECUTE | | | |
| MUMMY | 16 | 84 | 100 | 1% | 0.10% |
| WOLFMAN | 16 | 84 | 100 | 1% | 0.10% |
| DAD | 50 | 50 | 100 | 1% | 0.32% |
| MUM | 50 | 50 | 100 | 0% | 0.17% |

FIG.25

| EFFECT | MUMMY | WOLF | DAD | MUM | PERCENTAGE | | | | | | PERCENTAGE | |
|---|---|---|---|---|---|---|---|---|---|---|---|---|
| | | | | | MUMMY | WOLF | DAD | MUM | DARK CHANGE | DOOR | DARK CHANGE | DOOR |
| TOMB | 0.05% | 0.05% | 0.11% | 0.06% | 18.64% | 18.87% | 40.90% | 21.59% | 0.10% | 0.16% | 37.51% | 62.49% |
| RED WINDOW | 0.03% | 0.03% | 0.11% | 0.06% | 14.73% | 14.91% | 46.05% | 24.31% | 0.07% | 0.16% | 29.65% | 70.35% |
| SILHOUETTE | 0.02% | 0.02% | 0.11% | 0.06% | 9.87% | 9.99% | 52.45% | 27.69% | 0.04% | 0.17% | 19.86% | 80.14% |

FIG.26A

MUMMY EXPAND INDICATION TO DARK CHANGE SYSTEM

| INDICATION NUMBER | EFFECT | DAT NAME | BONUS | FREQUENCY |
|---|---|---|---|---|
| INDICATION 0 | TOMB | | MUMMY | 0.05% |
| INDICATION 1 | RED WINDOW | | MUMMY | 0.03% |
| INDICATION 2 | SILHOUETTE | | MUMMY | 0.02% |

FIG.26B

RANDOM DETERMINATION CONDITION

| TABLE | CONDITION | CONDITION OCCURRENCE FREQUENCY |
|---|---|---|
| TABLE_4 | MUMMY | 0.102% |

FIG.26C

RANDOM EFFECT DETERMINATION TABLE NORMAL BET

| TABLE | INDICATION | | | TOTAL |
|---|---|---|---|---|
| | INDICATION 0 | INDICATION 1 | INDICATION 2 | |
| TABLE_4 | 47 | 33 | 20 | 100 |

FIG.27

INCIDENCE AND RELIABILITY OF EACH EFFECT

| INDICATION NUMBER | INDICATION 0 | INDICATION 1 | INDICATION 2 | TOTAL |
|---|---|---|---|---|
| FREQUENCY OF EACH EFFECT (%) | 0.05% | 0.03% | 0.02% | 0.10% |
| FREQUENCY OF EACH EFFECT (1/N) | 2079.92 | 2962.32 | 4887.82 | 977.6 |
| PROPORTION IN RELATION TO THE WHOLE | 47.00% | 33.00% | 20.00% | – |
| | | | | 100.00% |

OCCURRENCE OF EFFECT : 0.05% 1.844.46

FIG.28A

SCATTERING AFTER WOLFMAN INDICATION TO DARK CHANGE SYSTEM

| INDICATION NUMBER | EFFECT | BONUS | FREQUENCY |
|---|---|---|---|
| INDICATION 0 | TOMB | MUMMY | 0.05% |
| INDICATION 1 | RED WINDOW | MUMMY | 0.03% |
| INDICATION 2 | SILHOUETTE | MUMMY | 0.02% |

FIG.28B

RANDOM DETERMINATION CONDITION

| TABLE | CONDITION | CONDITION OCCURRENCE FREQUENCY |
|---|---|---|
| TABLE_6 | WOLFMAN | 0.104% |

FIG.28C

RANDOM EFFECT DETERMINATION TABLE NORMAL BET

| TABLE | INDICATION | | | TOTAL |
|---|---|---|---|---|
| | INDICATION 0 | INDICATION 1 | INDICATION 2 | |
| TABLE_6 | 47 | 33 | 20 | 100 |

FIG.29

INCIDENCE AND RELIABILITY OF EACH EFFECT

| INDICATION NUMBER | INDICATION 0 | INDICATION 1 | INDICATION 2 | TOTAL |
|---|---|---|---|---|
| FREQUENCY OF EACH EFFECT (%) | 0.05% | 0.03% | 0.02% | 0.10% |
| FREQUENCY OF EACH EFFECT (1/N) | 2055.11 | 2926.97 | 4829.50 | 965.9 |
| PROPORTION IN RELATION TO THE WHOLE | 47.00% | 33.00% | 20.00% | – |
| | | | | 100.00% |

OCCURRENCE OF EFFECT : 0.05% 1.822.45

FIG.30A

SCATTERING BEFORE VAMPIRE DAD
INDICATION TO DOOR

| INDICATION NUMBER | EFFECT | BONUS | FREQUENCY |
|---|---|---|---|
| INDICATION 0 | TOMB | DAD | 0.11% |
| INDICATION 1 | RED WINDOW | DAD | 0.11% |
| INDICATION 2 | SILHOUETTE | DAD | 0.11% |

FIG.30B

RANDOM DETERMINATION CONDITION

| TABLE | CONDITION | CONDITION OCCURRENCE FREQUENCY |
|---|---|---|
| TABLE_B | DAD | 0.320% |

FIG.30C

RANDOM EFFECT DETERMINATION TABLE NORMAL BET

| TABLE | INDICATION | | | TOTAL |
|---|---|---|---|---|
| | INDICATION 0 | INDICATION 1 | INDICATION 2 | |
| TABLE_8 | 33 | 33 | 34 | 100 |

FIG.31

INCIDENCE AND RELIABILITY OF EACH EFFECT

| INDICATION NUMBER | INDICATION 0 | INDICATION 1 | INDICATION 2 | TOTAL |
|---|---|---|---|---|
| FREQUENCY OF EACH EFFECT (%) | 0.11% | 0.11% | 0.11% | 0.32% |
| FREQUENCY OF EACH EFFECT (1/N) | 947.94 | 947.94 | 920.06 | 312.8 |
| PROPORTION IN RELATION TO THE WHOLE | 33.00% | 33.00% | 34.00% | – |
| | | | | 100.00% |

OCCURRENCE OF EFFECT : 0.21% 466.90

FIG.32A

MUM INDICATION TO DOOR

| INDICATION NUMBER | EFFECT | BONUS | FREQUENCY |
|---|---|---|---|
| INDICATION 0 | TOMB | 4 OPTIONS | 0.06% |
| INDICATION 1 | RED WINDOW | 4 OPTIONS | 0.06% |
| INDICATION 2 | SILHOUETTE | 4 OPTIONS | 0.06% |

FIG.32B

RANDOM DETERMINATION CONDITION

| TABLE | CONDITION | CONDITION OCCURRENCE FREQUENCY |
|---|---|---|
| TABLE-10 | MUM | 0.169% |

FIG.32C

RANDOM EFFECT DETERMINATION TABLE NORMAL BET

| TABLE | INDICATION | | | TOTAL |
|---|---|---|---|---|
| | INDICATION 0 | INDICATION 1 | INDICATION 2 | |
| TABLE-10 | 33 | 33 | 34 | 100 |

FIG.33

INCIDENCE AND RELIABILITY OF EACH EFFECT

| INDICATION NUMBER | INDICATION 0 | INDICATION 1 | INDICATION 2 | TOTAL |
|---|---|---|---|---|
| FREQUENCY OF EACH EFFECT (%) | 0.06% | 0.06% | 0.06% | 0.17% |
| FREQUENCY OF EACH EFFECT (1/N) | 1795.74 | 1795.74 | 1742.92 | 592.6 |
| PROPORTION IN RELATION TO THE WHOLE | 33.00% | 33.00% | 34.00% | – |
| | | | | 100.00% |

OCCURRENCE OF EFFECT : 0.11% 884.47

FIG.40

NORMAL GAME SYMBOL TABLE

| | | FIRST COLUMN | SECOND COLUMN | THIRD COLUMN | FOURTH COLUMN | FIFTH COLUMN |
|---|---|---|---|---|---|---|
| CODE NUMBER | RANDOM NUMBER | SYMBOL | SYMBOL | SYMBOL | SYMBOL | SYMBOL |
| 0 | 0-3277 | CANDLE | CANDLE | GHOST | WATERMELON | CANDLE |
| 1 | 3278-6555 | WATERMELON | BAT | CANDLE | CANDLE | GHOST |
| 2 | 6556-9833 | BAT | CHANDELIER | GHOST | VAMPIRE | BAT |
| 3 | 9834-13111 | CANDLE | WATERMELON | CHANDELIER | WATERMELON | CHANDELIER |
| 4 | 13112-16389 | WATERMELON | BONUS | CANDLE | SKULL | VAMPIRE |
| 5 | 16390-19667 | CANDLE | CHANDELIER | BAT | BAT | CAT |
| 6 | 19668-22945 | GHOST | CAT | CHANDELIER | GHOST | CANDLE |
| 7 | 22946-26223 | VAMPIRE | VAMPIRE | SKULL | SKULL | WATERMELON |
| 8 | 26224-29501 | CHANDELIER | SKULL | FRANKEN | FRANKEN | SKULL |
| 9 | 29502-32779 | FRANKEN | CANDLE | CANDLE | WATERMELON | FRANKEN |
| 10 | 32780-36057 | GHOST | CAT | GHOST | VAMPIRE | WATERMELON |
| 11 | 36058-39335 | WATERMELON | GHOST | WATERMELON | CHANDELIER | BAT |
| 12 | 39336-42613 | BONUS | FRANKEN | FRANKEN | FRANKEN | SKULL |
| 13 | 42614-45891 | SKULL | VAMPIRE | SKULL | SKULL | GHOST |
| 14 | 45892-49169 | CHANDELIER | CANDLE | CAT | CHANDELIER | CANDLE |
| 15 | 49170-52447 | GHOST | CHANDELIER | WATERMELON | BAT | CANDLE |
| 16 | 52448-55725 | FRANKEN | CHANDELIER | VAMPIRE | GHOST | GHOST |
| 17 | 55726-59003 | CANDLE | BAT | GHOST | FRANKEN | FRANKEN |
| 18 | 59004-62281 | WATERMELON | CAT | FRANKEN | CAT | CHANDELIER |
| 19 | 62282-65535 | CAT | VAMPIRE | CHANDELIER | CANDLE | WATERMELON |

RANGE OF RANDOM NUMBERS : 0-65535

FIG.41

GAMING TERMINAL MANAGEMENT TABLE

| GAMING TERMINAL | GAME TYPE | GAME STATE | ACCUMULATIVE NUMBER OF GAMES |
|---|---|---|---|
| 001 | NORMAL GAME | EXECUTION | 35 |
| 002 | NORMAL GAME | STOP | 60 |
| 003 | NORMAL GAME | EXECUTION | 21 |
| 004 | BONUS GAME | EXECUTION | 18 |
| 005 | BONUS GAME | STOP | 51 |

FIG.46

| | REEL1 | REEL2 | REEL3 | REEL4 | REEL5 | |
|---|---|---|---|---|---|---|
| 1 | ANIMATION CONTINUING | ANIMATION CONTINUING | ANIMATION CONTINUING | | | 3 OF A KIND |
| 2 | ANIMATION CONTINUING | ANIMATION CONTINUING | ANIMATION CONTINUING | ANIMATION CONTINUING | ANIMATION CONTINUING | 5 OF A KIND |
| 3 | | | | | | |

FIG.47

| | REEL1 | REEL2 | REEL3 | REEL4 | REEL5 | |
|---|---|---|---|---|---|---|
| 1 | ANIMATION CONTINUING | ANIMATION CONTINUING | ANIMATION CONTINUING | | | 3 OF A KIND |
| 2 | ANIMATION CONTINUING | ANIMATION CONTINUING | ANIMATION CONTINUING | ANIMATION CONTINUING | ANIMATION CONTINUING | 5 OF A KIND |
| 3 | | | | | | |

FIG.52

| REMAINING COUNT NUMBER | SECOND BY WHICH INCREMENT FOR ONE COUNT IS CARRIED OUT |
|---|---|
| 1～2 | ABOUT 2.10 SECONDS |
| 3 | ABOUT 1.70 SECONDS |
| 4 | ABOUT 1.30 SECONDS |
| 5 | ABOUT 1.20 SECONDS |
| 6～7 | ABOUT 1.00 SECONDS |
| 8～9 | ABOUT 0.80 SECONDS |
| 10～11 | ABOUT 0.70 SECONDS |
| 12 | ABOUT 0.60 SECONDS |
| 13～17 | ABOUT 0.50 SECONDS |
| 18～23 | ABOUT 0.40 SECONDS |
| 24～30 | ABOUT 0.30 SECONDS |
| 31～45 | ABOUT 0.24 SECONDS |
| 46～50 | ABOUT 0.18 SECONDS |
| 51～80 | ABOUT 0.16 SECONDS |
| 81～100 | ABOUT 0.13 SECONDS |
| 101 OR HIGHER | REWRITE |

FIG.53

| THRESHOLD | SECONDS |
| --- | --- |
| DECIMAL ODDS OF 1 OR LOWER | 0.5 SECOND |
| DECIMAL ODDS OF 1 TO LESS THAN 1.5 | 1 SECOND |
| DECIMAL ODDS OF 1.5 TO LESS THAN 2.5 | 2 SECONDS |
| DECIMAL ODDS OF 2.5 TO LESS THAN 3.5 | 3 SECONDS |
| DECIMAL ODDS OF 3.5 TO LESS THAN 4.5 | 4 SECONDS |
| DECIMAL ODDS OF 4.5 TO LESS THAN 5.5 | 5 SECONDS |
| DECIMAL ODDS OF 5.5 TO LESS THAN 6.5 | 6 SECONDS |
| DECIMAL ODDS OF 6.5 TO LESS THAN 7.5 | 7 SECONDS |
| DECIMAL ODDS OF 7.5 TO LESS THAN 8.5 | 8 SECONDS |
| DECIMAL ODDS OF 8.5 TO LESS THAN 9.5 | 9 SECONDS |
| DECIMAL ODDS OF 9.5 TO LESS THAN 10.5 | 10 SECONDS |
| DECIMAL ODDS OF 10.5 TO LESS THAN 11.5 | 11 SECONDS |
| DECIMAL ODDS OF 11.5 TO LESS THAN 12.5 | 12 SECONDS |
| DECIMAL ODDS OF 12.5 TO LESS THAN 13.5 | 13 SECONDS |
| DECIMAL ODDS OF 13.5 TO LESS THAN 14.5 | 14 SECONDS |
| DECIMAL ODDS OF 14.5 TO LESS THAN 15.5 | 15 SECONDS |
| DECIMAL ODDS OF 15.5 TO LESS THAN 16.5 | 16 SECONDS |
| DECIMAL ODDS OF 16.5 TO LESS THAN 17.5 | 17 SECONDS |
| DECIMAL ODDS OF 17.5 TO LESS THAN 18.5 | 18 SECONDS |
| DECIMAL ODDS OF 18.5 TO LESS THAN 19.5 | 19 SECONDS |
| DECIMAL ODDS OF 19.5 TO LESS THAN 20.5 | 20 SECONDS |
| DECIMAL ODDS OF 20.5 TO LESS THAN 21.5 | 21 SECONDS |
| DECIMAL ODDS OF 21.5 TO LESS THAN 22.5 | 22 SECONDS |
| DECIMAL ODDS OF 22.5 TO LESS THAN 23.5 | 23 SECONDS |
| DECIMAL ODDS OF 23.5 TO LESS THAN 24.5 | 24 SECONDS |
| DECIMAL ODDS OF 24.5 TO LESS THAN 25 | 25 SECONDS |
| DECIMAL ODDS OF 25 TO LESS THAN 50 | 30 SECONDS |
| DECIMAL ODDS OF 50 OR HIGHER | 35 SECONDS |

FIG.56

| TYPE OF BUTTON | IDLE STATE | DURING GAME | DURING ERROR | DURING AUDIT | TAKE WIN OR GAMBLE |
|---|---|---|---|---|---|
| HELP | ON | OFF | OFF | OFF | ON |
| LANGUAGE SWITCH | ON | OFF | OFF | OFF | OFF |
| VOLUME | ON | ON | OFF | OFF | ON |
| NUMBER OF LINES | ON (WHEN SELECTABLE) | OFF | OFF | OFF | OFF |
| BET AMOUNT | ON | OFF | OFF | OFF | OFF |
| PAY TABLE | ON | OFF | OFF | OFF | ON |

FIG.57
| AREA | DISPLAYED NATIONAL FLAG | DISPLAYED LANGUAGE | DISPLAYED BUTTON | DAT/TGA NAME |
|---|---|---|---|---|
| U.S.A. | U.S.A. OR CHINA | ENGLISH (USA) | 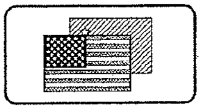 | BTN_FLAG_U_CHAM |
| | | CHINESE (CHN) | 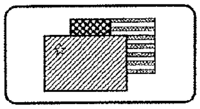 | BTN_FLAG_U_AMCH |
| OTHERS | UNITED KINGDOM OR CHINA | ENGLISH (UK) | 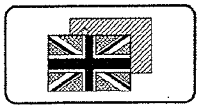 | BTN_FLAG_U_CHAM |
| | | CHINESE (CHN) | 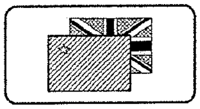 | BTN_FLAG_U_EGCH |
| LANGUAGE SWITCH INVALID | – | – | PAY TABLE | – |

| SCREEN | CONTROL PANEL | OPERATION |
|---|---|---|
| EXIT | HELP | SHIFT TO NORMAL SCREEN |
| PREV. | BET ×1 | SHIFT TO PREVIOUS PAGE |
| NEXT | BET ×2 | SHIFT TO NEXT PAGE |

FIG.69

| AREA | DISPLAYED LANGUAGE | NATIONAL FLAG | FUNCTION/ TOUCH BUTTON |
|---|---|---|---|
| NORTH AMERICA | ENGLISH | U.S.A./CHINA | U.S. FLAG IS ON THE TOP |
| MACAU | ENGLISH | U.S.A./CHINA | U.S. FLAG IS ON THE TOP |
| OTHERS | ENGLISH | U.S.A./CHINA | U.S. FLAG IS ON THE TOP |

BUTTON LAYOUT (GAME PLAY WHILE KEEP PRESSING SPIN BUTTON)

(DURING HELP SCREEN)

(DURING REEL SPIN (AND DURING FG))

(AT WIN INCREMENT - DURING FREE GAME)

(TRIGGER PAYOUT INCREMENT AFTER WINNING FREE GAME)

(WAITING FOR SELECTION,
DIRECT SELECTION ON CONTROL PANEL)

IN CASE OF PLURAL REEELS

EFFECT

EFFECT (F31)

FIG.126A

EFFECT GENERATION TABLE WITH DEVELOPMENT

| NO. | | WEIGHT | PROB |
|---|---|---|---|
| 0 | WITHOUT EFFECT | 1 | 50.00% |
| 1 | WITH EFFECT | 1 | 50.00% |
| | TOTAL | 2 | 100.00% |

FIG.126B

EFFECT GENERATION TABLE WITHOUT DEVELOPMENT

| NO. | | WEIGHT | PROB |
|---|---|---|---|
| 0 | WITHOUT EFFECT | 7 | 87.50% |
| 1 | WITH EFFECT | 1 | 12.50% |
| | TOTAL | 8 | 100.00% |

FIG.126C

ONLY WHEN "WITH EFFECT" IS SELECTED IN EFFECT GENERATION TABLE
EFFECT GENERATION NUMBER-OF-GAMES TABLE

| NO. | | WEIGHT | PROB |
|---|---|---|---|
| 0 | FIRST AND SIXTH GAMES | 2 | 20.00% |
| 1 | SECOND AND SEVENTH GAMES | 1 | 10.00% |
| 2 | THIRD AND EIGHTH GAMES | 1 | 10.00% |
| 3 | FOURTH AND NINTH GAMES | 2 | 20.00% |
| 4 | FIFTH AND TENTH GAMES | 4 | 40.00% |
| | TOTAL | 10 | 100.00% |

*SIXTH TO TENTH GAMES ARE GENERATED AT THE TIME OF RETRIGGERING (F111)

(F112)

FIG.140
WHEN DOOR 2 OPTIONS(1 OPTION) IS SELECTED (F123)
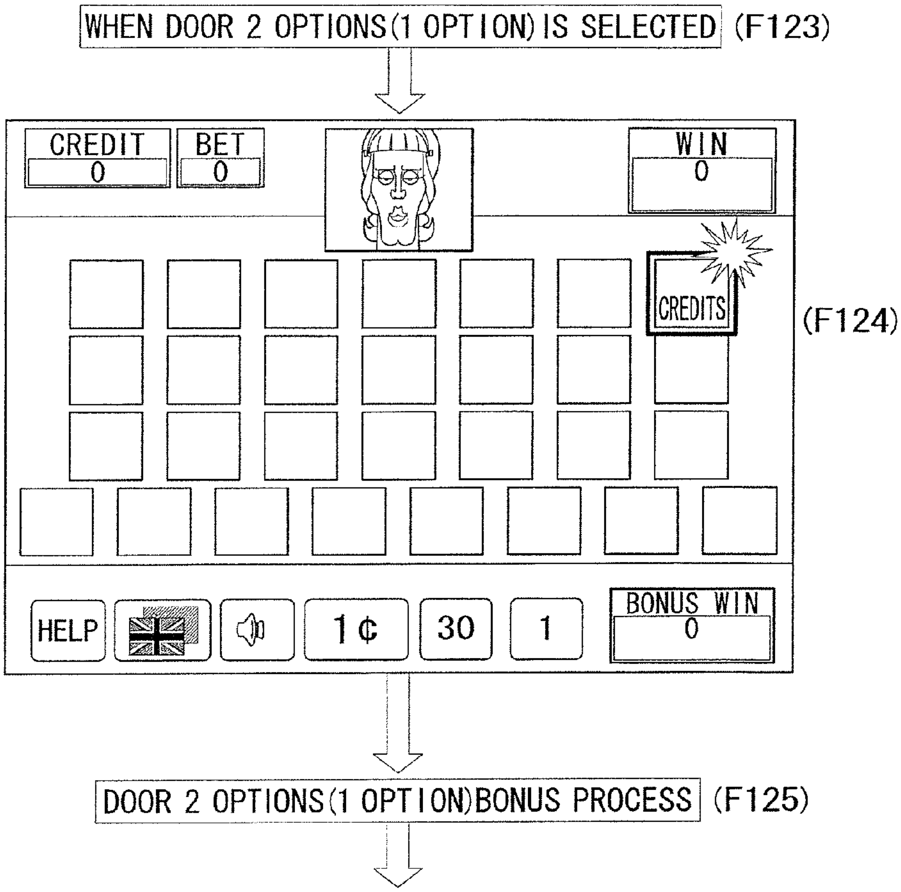
(F124)
DOOR 2 OPTIONS(1 OPTION)BONUS PROCESS (F125)
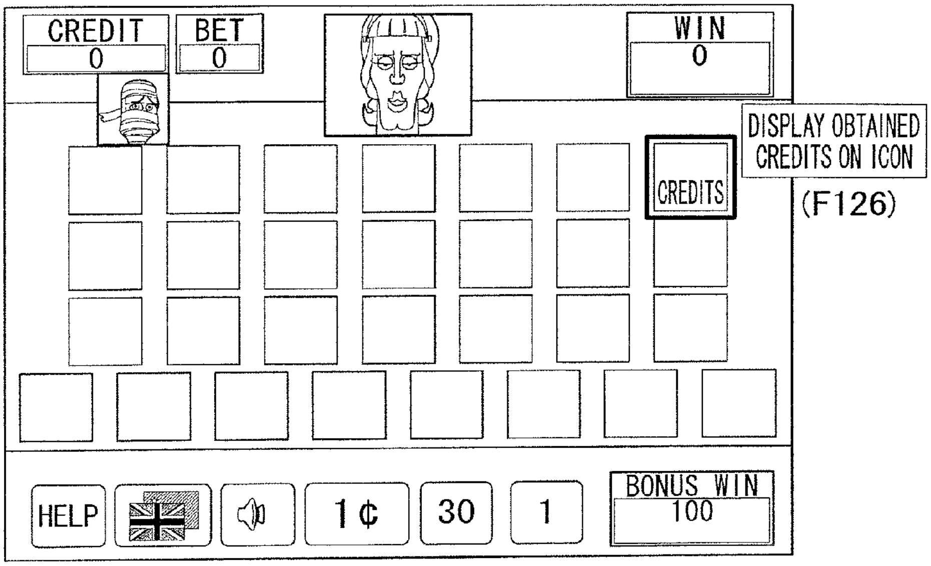
(F126)

FIG.145
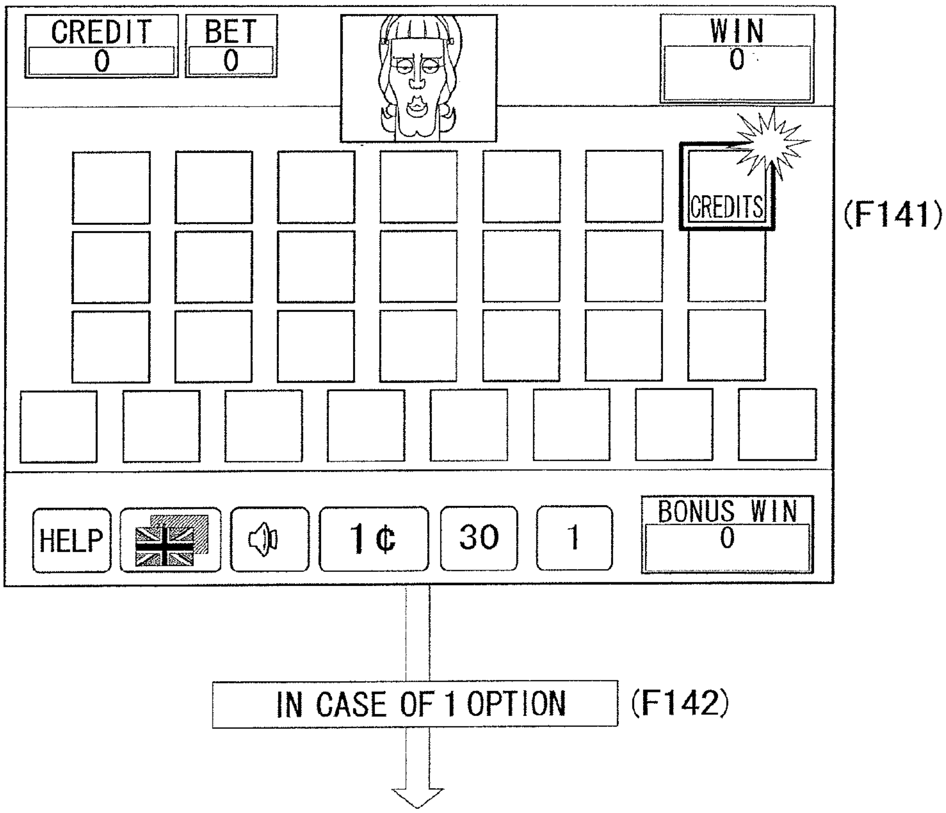
(F141)
IN CASE OF 1 OPTION (F142)
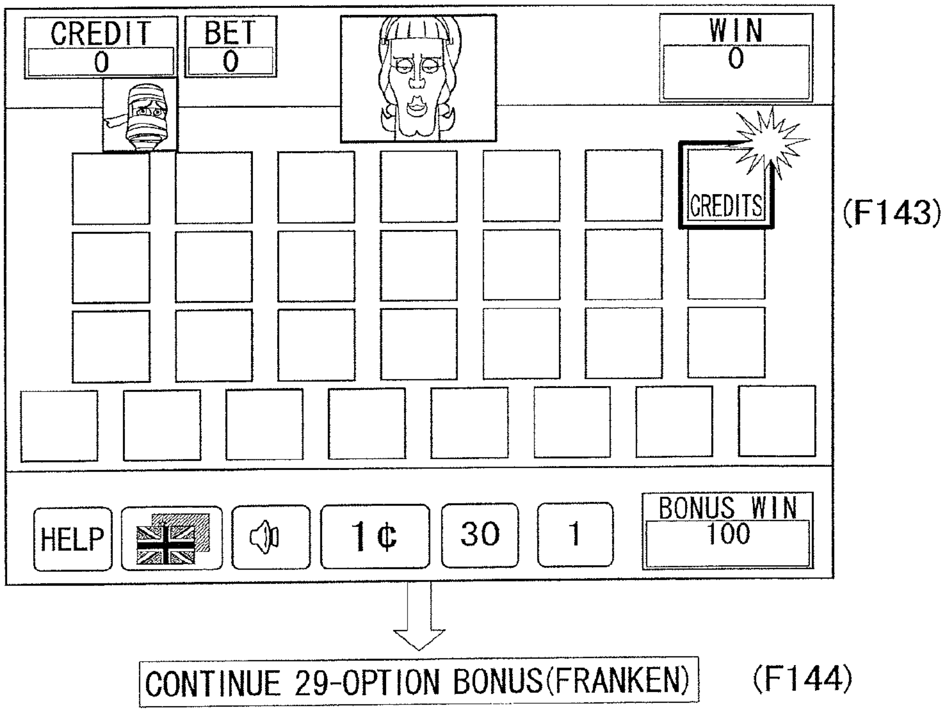
(F143)
CONTINUE 29-OPTION BONUS(FRANKEN) (F144)

FIG.150
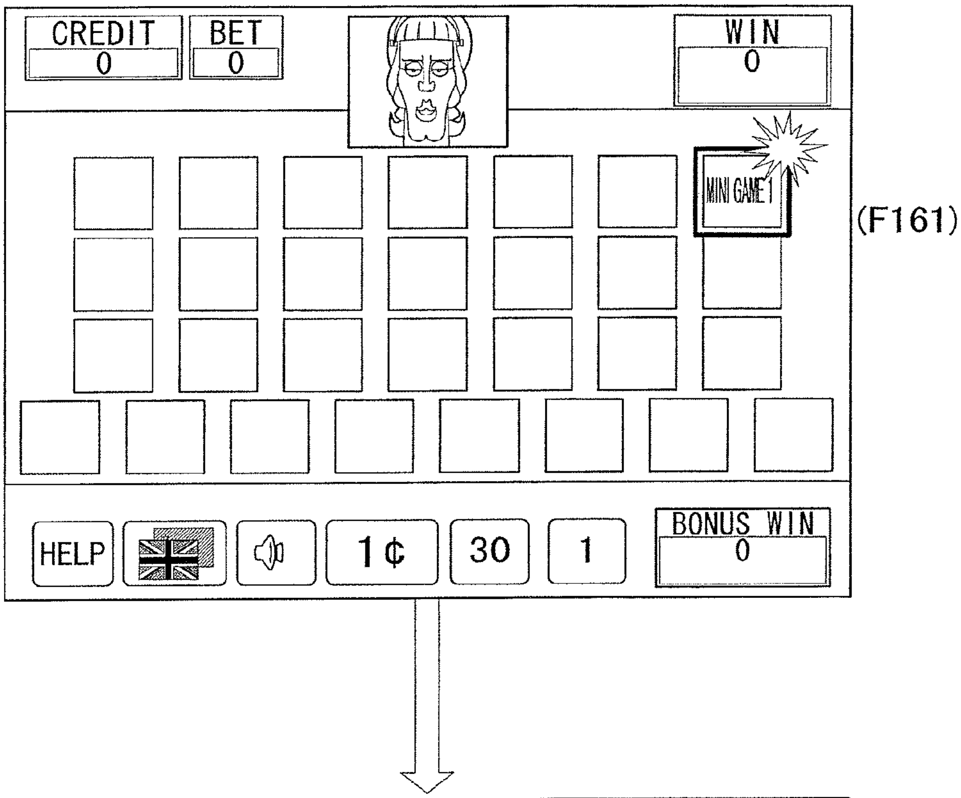
(F161)
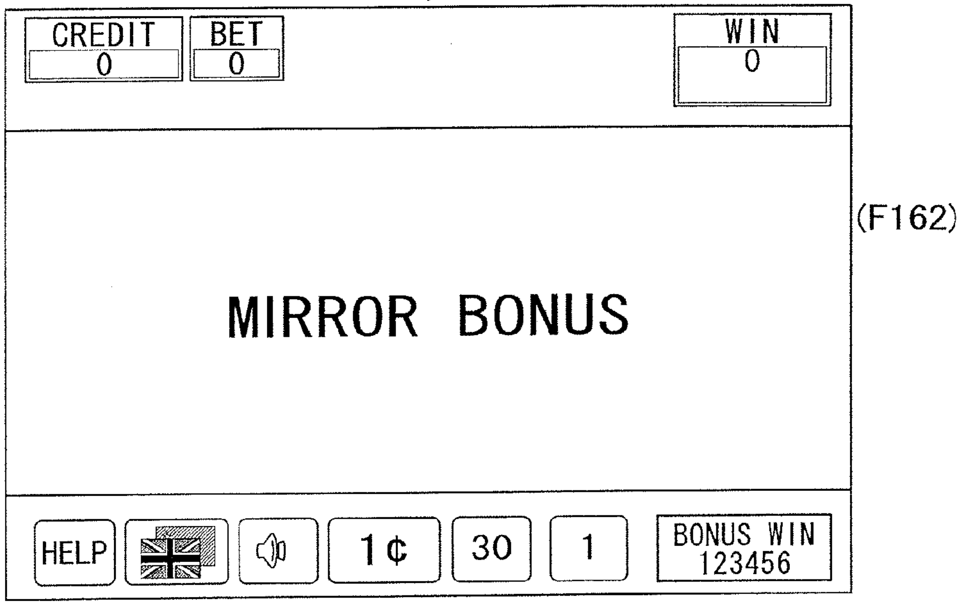
(F162)

FIG.152
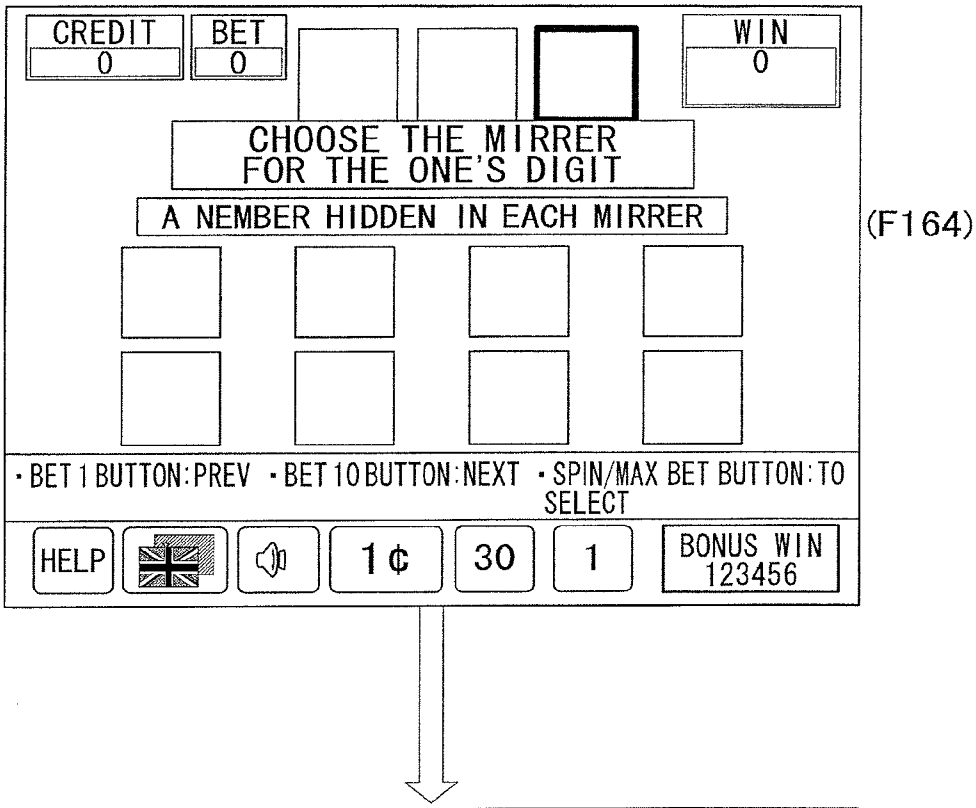
(F164)
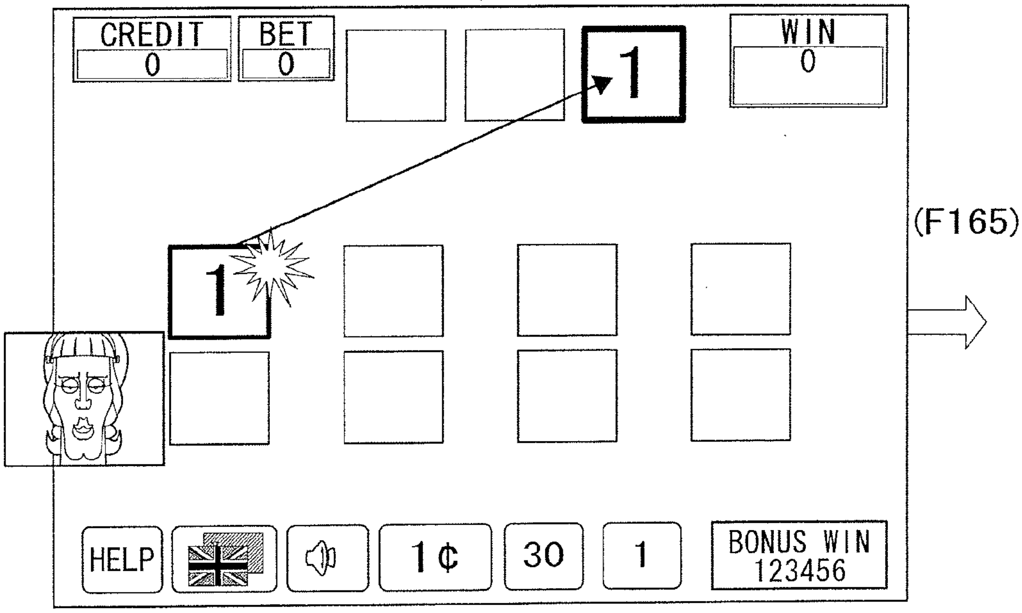
(F165)

FIG.155
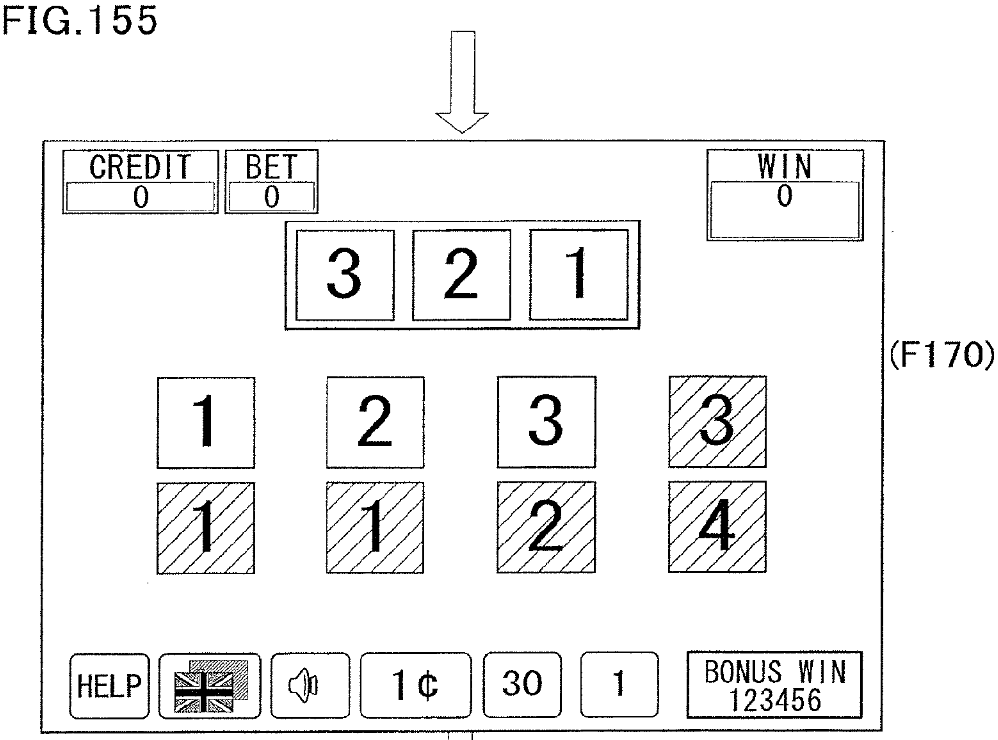
(F170)
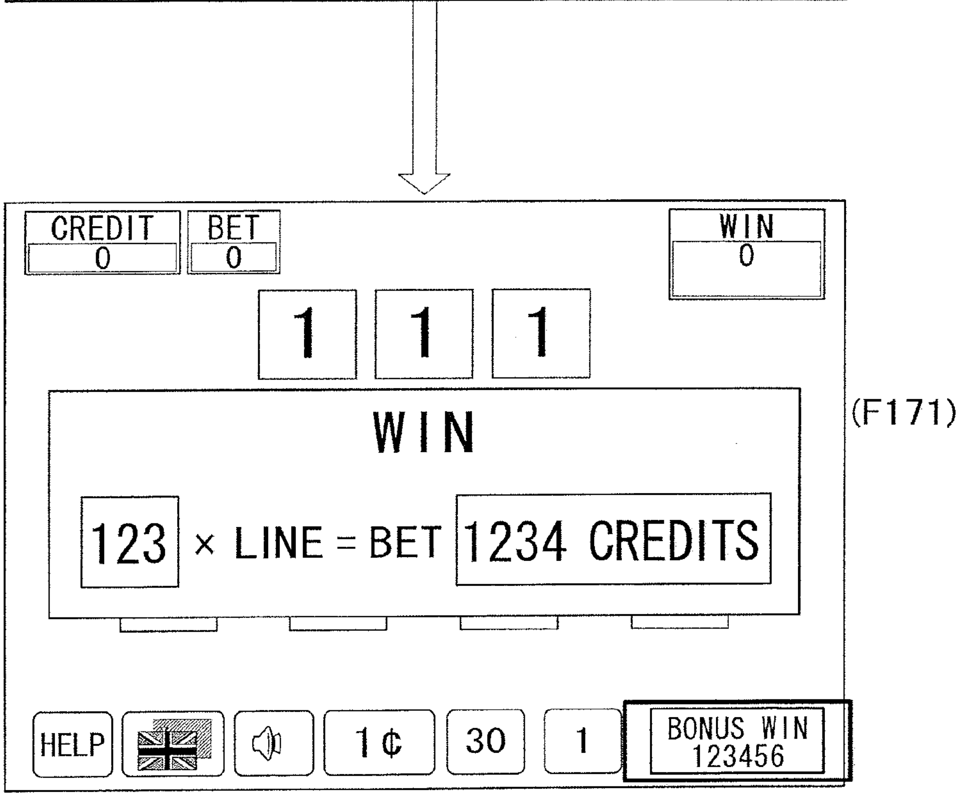
(F171)

FIG.157
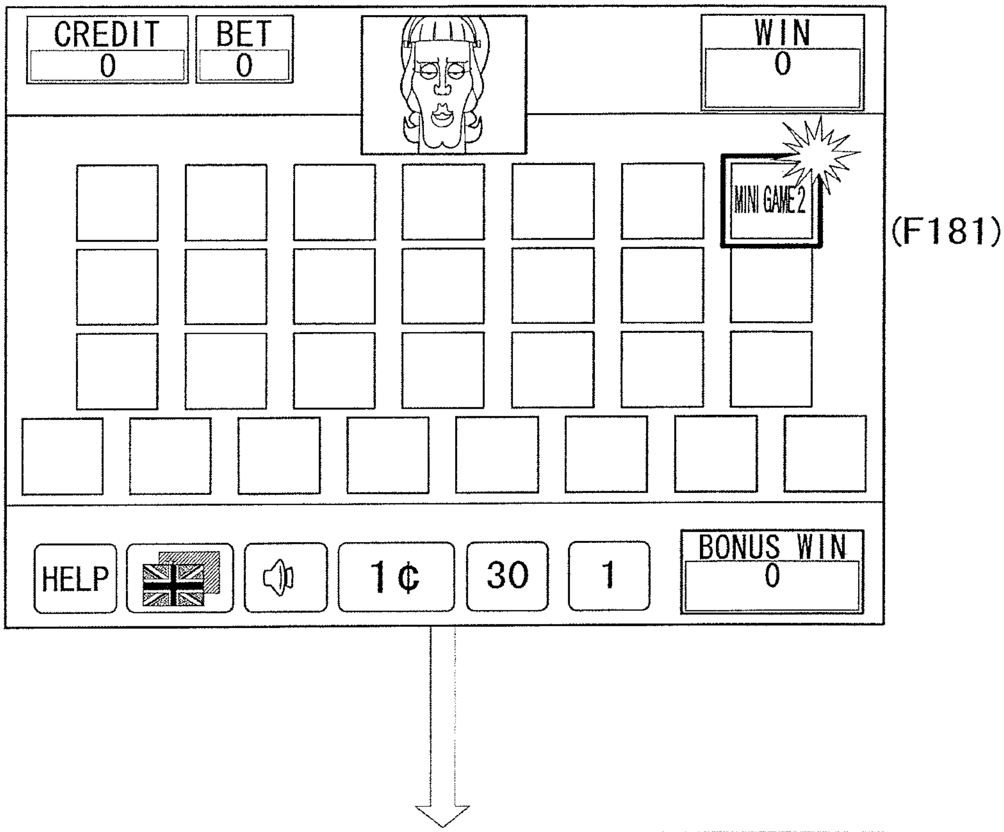
(F181)
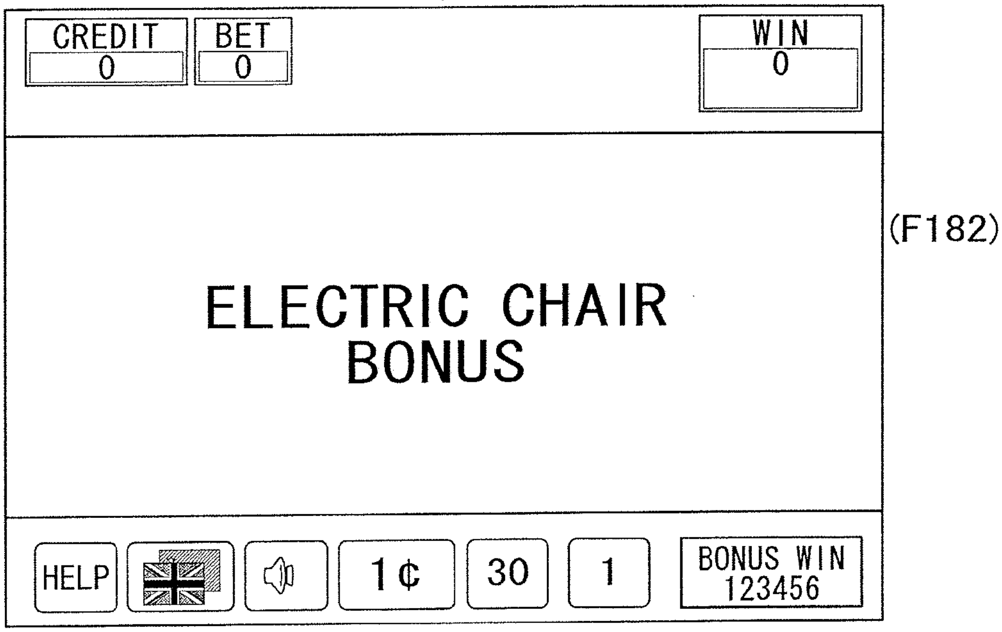
(F182)

(F183)

(F184)

(F185)

(F191)

FIG.172
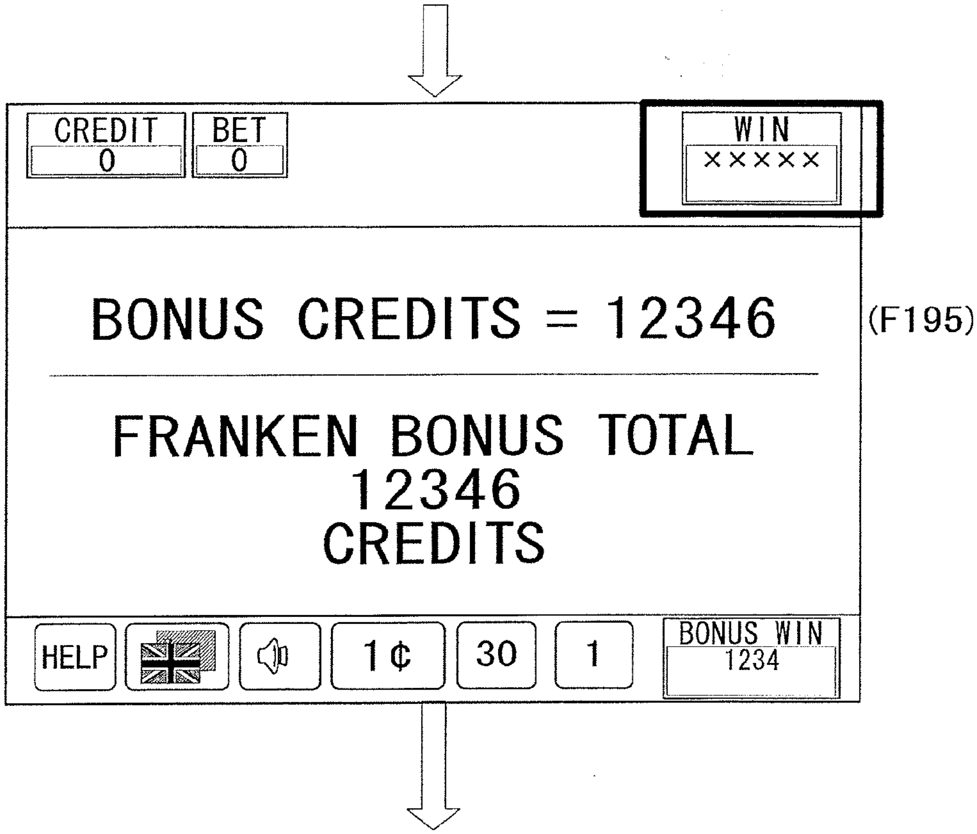
(F195)
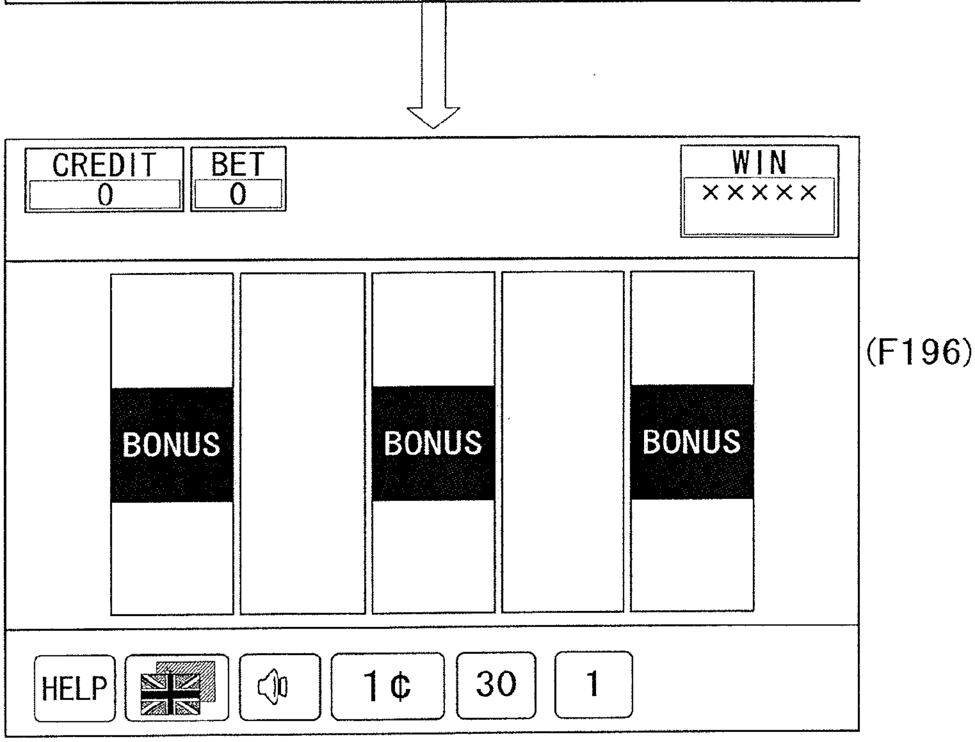
(F196)

FIG.188

PICK UP FEATURE TOP BOX (FRANKEN MAMA BONUS)

CHARACTER CONDITION TABLE

| NO. | CHARA_A | CHARA_B | CHARA_C | WEIGHT |
|---|---|---|---|---|
| 1 | 0 | 0 | 0 | 31 |
| 2 | 1 | 0 | 0 | 5 |
| 3 | 0 | 1 | 0 | 5 |
| 4 | 0 | 0 | 1 | 5 |
| 5 | 1 | 1 | 0 | 1 |
| 6 | 1 | 0 | 1 | 1 |
| 7 | 0 | 1 | 1 | 1 |
| 8 | 1 | 1 | 1 | 1 |
| TOTAL | 0 | 0 | 0 | 50 |

FIG.193
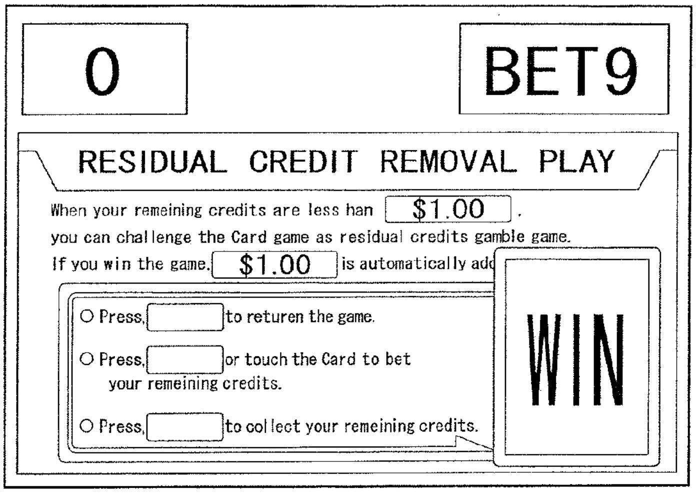
(F256)
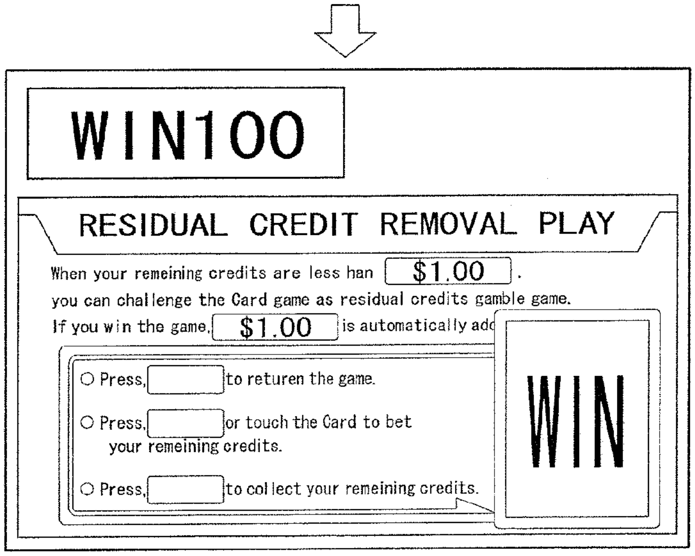
(F257)
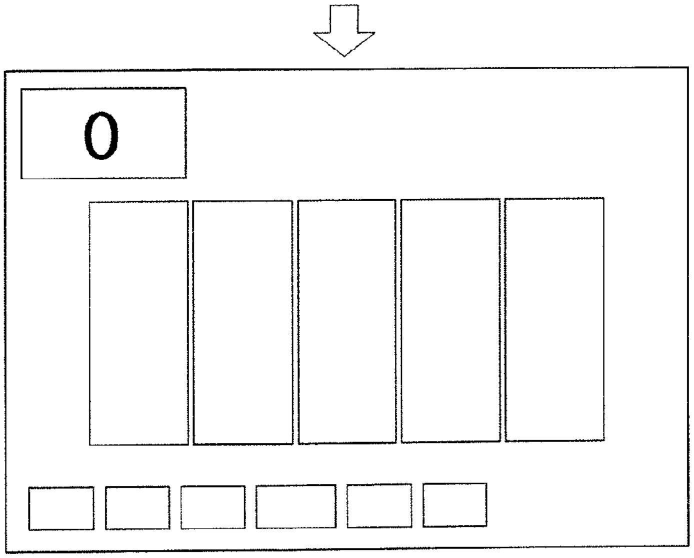
(F258)

GAMING MACHINE

CROSS REFERENCE TO RELATED APPLICATIONS

The present application claims is a Continuation of U.S. patent application Ser. No. 13/769,205, filed Feb. 15, 2013, which application claims priority to Japanese application No. 2012-032208, filed on Feb. 16, 2012, the entire disclosures of which are incorporated herein by reference.

BACKGROUND OF THE INVENTION

1. Field of the Invention

The present invention relates to a gaming machine configured to rearrange symbols after variable-display of the symbols.

2. Description of Related Art

An example of a known slot machine is disclosed by U.S. Laid-Open Patent Application No. 2011/0250947. This slot machine operates in such a way that, when a player inserts a coin, bill or the like into an insertion slot of a slot machine and presses a spin button, symbols are scroll-displayed on a symbol display area provided on the front surface of a cabinet, and then the symbols are automatically stopped. Based on the state of the stopped symbols, various prizes such as a bonus are established.

In a gaming machine represented by the known slot machine above, an indication effect indicating that a bonus will be achieved may be executed before the bonus is achieved. Such an indication effect plays an important role in enhancing the excitement of the gaming machine, because the effect allows the player in advance to understand that a bonus will be achieved as a game result.

An object of the present invention is therefore to provide a gaming machine which is capable of executing an indication effect that enhances the excitement of games.

SUMMARY OF THE INVENTION

According to the present invention, a gaming machine includes: a symbol display device configured to variably display symbols and then rearrange the symbols; an indication data storage device configured to store individual indication data associated with a type of a bonus game and common indication data associated with a plurality of types of the bonus game; an indication effect device configured to execute an indication effect based on the individual indication data and the common indication data; and a controller.

The controller is programmed to execute the steps of:

(a1) randomly determining a game result of rearrangement of the symbols on the symbol display device;

(a2) when the game result is winning of the bonus game, specifying the individual indication data and the common indication data associated with the type of the bonus game; and (a3) while the symbols are variably displayed on the symbol display device, executing an indication effect based on the individual indication data after the execution of an indication effect starts based on the common indication data specified in the step (a2).

According to this arrangement, the player is notified in advance of which type of the bonus game among a plurality of types is won as a result of the execution of the common indication effect, and also the player is notified in advance of winning a specific bonus game as a result of the individual indication effect executed after the common indication effect.

In other words, an indication of the individual indication effect is executed as the common indication effect. With this, the pleasure of assuming which bonus game is to be won is provided in multiple stages during the variably display of the symbols.

In the step (a2), the controller of the present invention may specify the individual indication data not associated with the type of the bonus game, at a predetermined probability.

This provides the player with amazement of not winning an assumed bonus game, in addition to the pleasure of assuming which bonus game is to be won.

A gaming machine of the present invention includes: a symbol display device configured to variably display symbols and then rearrange the symbols; an indication data storage device configured to store individual indication data associated with a type of a bonus game and common indication data associated with a plurality of types of the bonus game; an indication effect device configured to execute an indication effect based on the individual indication data and the common indication data; and a controller.

The controller is programmed to execute the steps of:

(a1) randomly determining a game result of rearrangement of the symbols on the symbol display device;

(a1-1) randomly determining whether to execute the indication effect or not;

(a2) when the game result is winning of the bonus game and the random determination results in the execution of the indication effect, specifying the individual indication data and the common indication data associated with the type of the bonus game; and (a3) while the symbols are variably displayed on the symbol display device, executing an indication effect based on the individual indication data after the execution of an indication effect starts based on the common indication data specified in the step (a2).

In the arrangement above, the indication effect is executed or not executed as a result of the random determination as to whether the indication effect is to be executed, there is a case where a bonus game is obtained as a result of the rearrangement of the symbols with no indication. This makes it possible to suddenly provide the player with pleasure of winning a bonus game.

In the step (a2), the controller of the present invention may specify the individual indication data not associated with the type of the bonus game, at a predetermined probability.

This provides the player with amazement of not winning an assumed bonus game, in addition to the pleasure of assuming which bonus game is to be won.

A gaming machine of the present invention includes: a symbol display device configured to variably display symbols and then rearrange the symbols; an indication data storage device configured to store individual indication data associated with a type of a bonus game and common indication data associated with a plurality of types of the bonus game; an indication effect device configured to execute an indication effect based on the individual indication data and the common indication data; and a controller.

The controller is programmed to execute the steps of:

(a1) randomly determining a game result of rearrangement of the symbols on the symbol display device;

(a1-1) randomly determining whether to execute the indication effect or not;

(a2) when the game result is winning of the bonus game and the indication effect is to be executed as a result of random determination, specifying the individual indication data and the common indication data associated with the type of the bonus game;

(a3) while the symbols are variably displayed on the symbol display device, executing an indication effect based on the individual indication data after the execution of an indication effect starts based on the common indication data specified in the step (a2);

(a4) when the game result is winning of the bonus game and the random determination results in the execution of the indication effect, specifying the individual indication data and the common indication data associated with the type of the bonus game; and (a5) while the symbols are variably displayed on the symbol display device, executing an indication effect based on the individual indication data after an indication effect starts based on the common indication data specified in the step (a4).

In the arrangement above, as the individual indication effect is executed, the player is allowed to assume that the bonus game of the type associated with the individual indication effect is to be obtained. This provides the player with the indication effect which is different from the indication effect executed in multiple stages.

In the step (a2), the controller of the present invention may specify the individual indication data not associated with the type of the bonus game, at a predetermined probability.

This provides the player with amazement of not winning an assumed bonus game, in addition to the pleasure of assuming which bonus game is to be won.

According to the present invention, the indication effect device includes the symbol display device and an output mechanism of a top box provided above the symbol display device, and the controller executes an indication effect by outputting an image on the symbol display device and an indication effect by an output from the output mechanism.

The present invention provides a function of executing an indication effect that enhances the excitement in games.

BRIEF DESCRIPTIONS OF THE DRAWINGS

FIG. 17 illustrates a BONUS-related table.

FIG. 18 illustrates a random determination condition table.

FIG. 19 illustrates a random effect determination table.

FIG. 20 shows a table of the incidence and the reliability of each effect.

FIG. 24 illustrates an indication occurrence table.

FIG. 25 illustrates the indication occurrence table.

FIG. 26A illustrates an indication to dark change system table.

FIG. 26B illustrates a random determination condition table.

FIG. 26C illustrates the random effect determination table.

FIG. 27 is a table of the incidences and the reliabilities of various effects.

FIG. 28A illustrates an indication to dark change system table.

FIG. 28B illustrates a random determination condition table.

FIG. 28C illustrates a random effect determination table.

FIG. 29 is a table of the incidences and the reliabilities of various effects.

FIG. 30A shows a to door indication system table.

FIG. 30B illustrates a random determination condition table.

FIG. 30C illustrates a random effect determination table.

FIG. 31 a table of the incidences and the reliabilities of various effects.

FIG. 32A illustrates a to door indication system table.

FIG. 32B illustrates a random determination condition table.

FIG. 32C illustrates a random effect determination table.

FIG. 33 a table of the incidences and the reliabilities of various effects.

Figure 34:
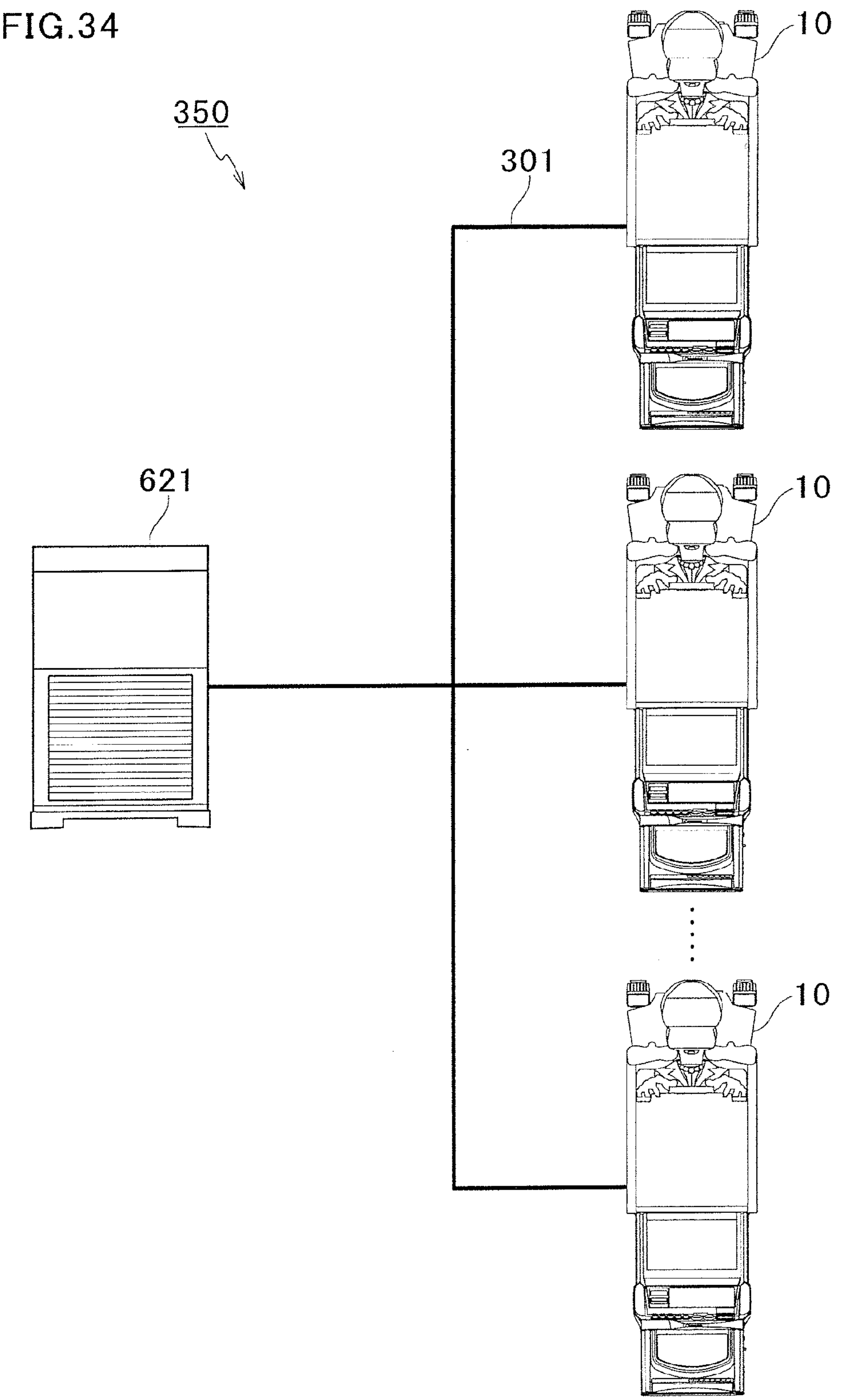

FIG. 34 is a block diagram of a gaming system.

Figure 35:
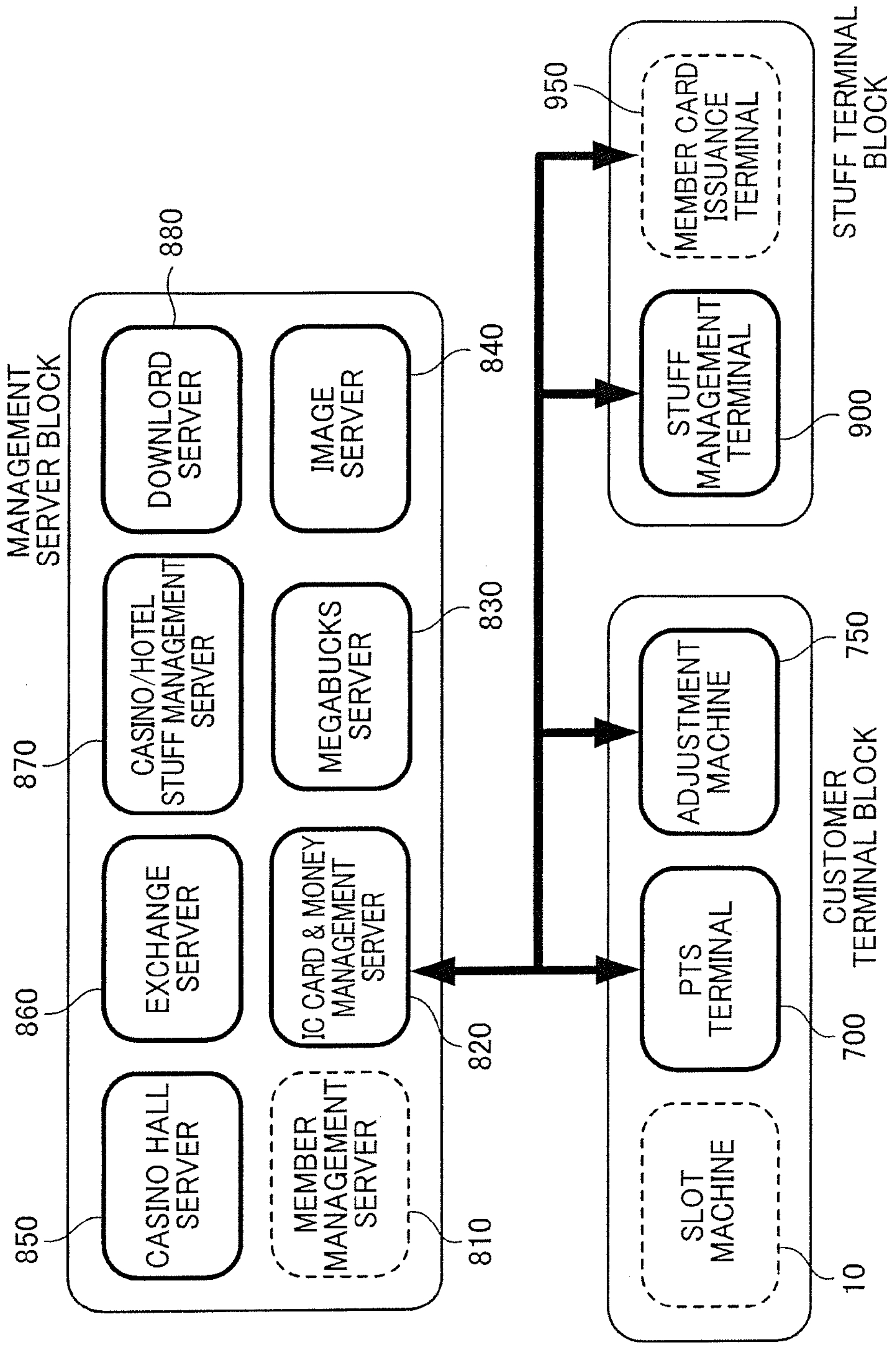

FIG. 35 is a block diagram of a PTS system.

Figure 36:
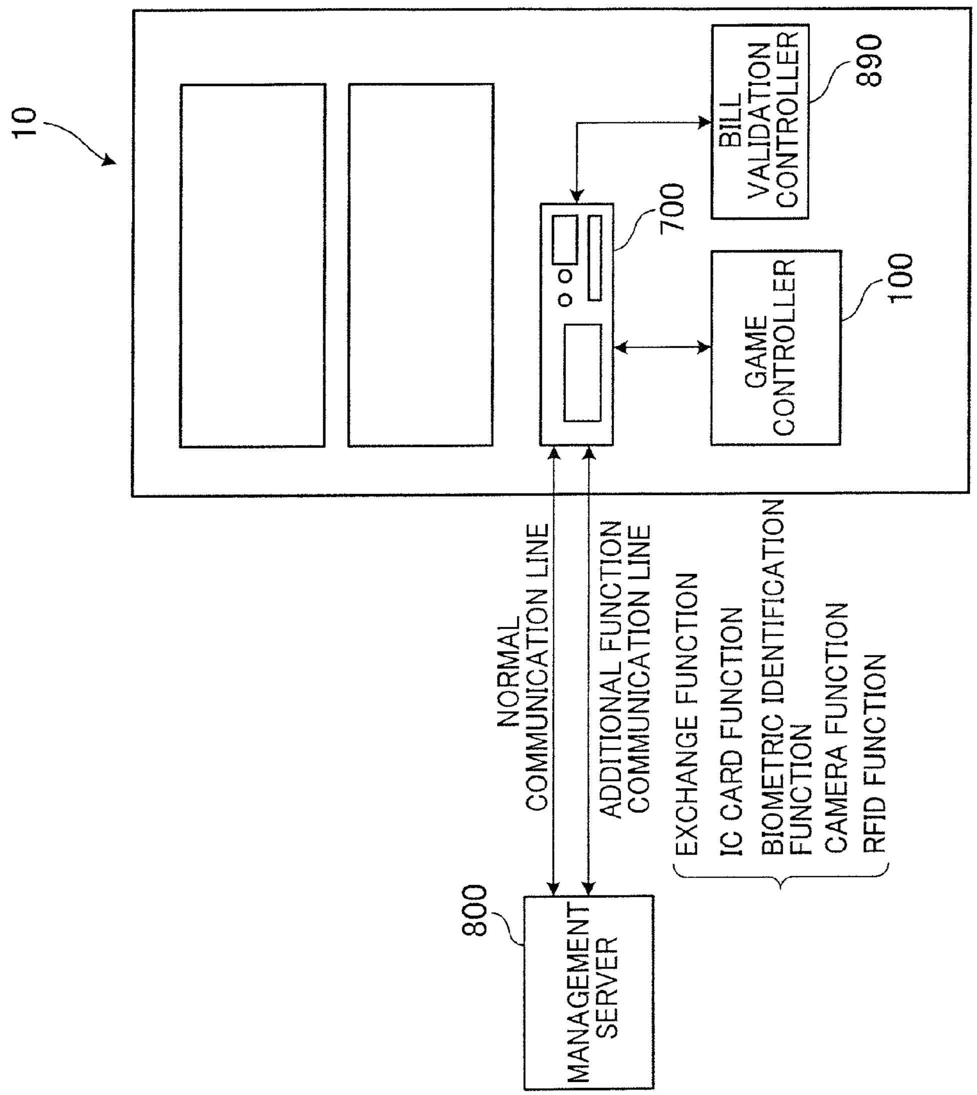

FIG. 36 is a block diagram of a PTS system.

Figure 37:
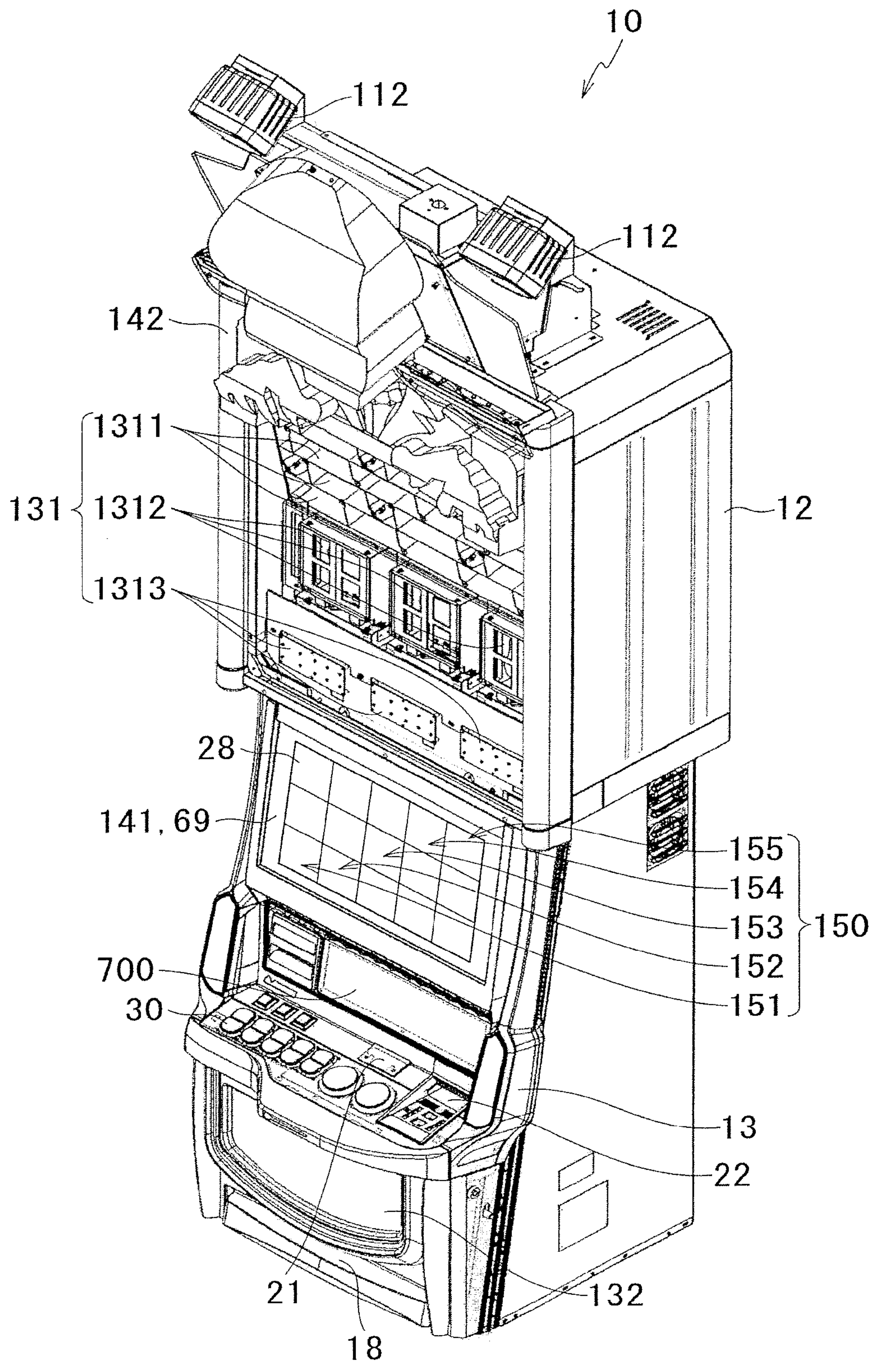

FIG. 37 is a perspective view of a slot machine in the gaming machine.

Figure 38:
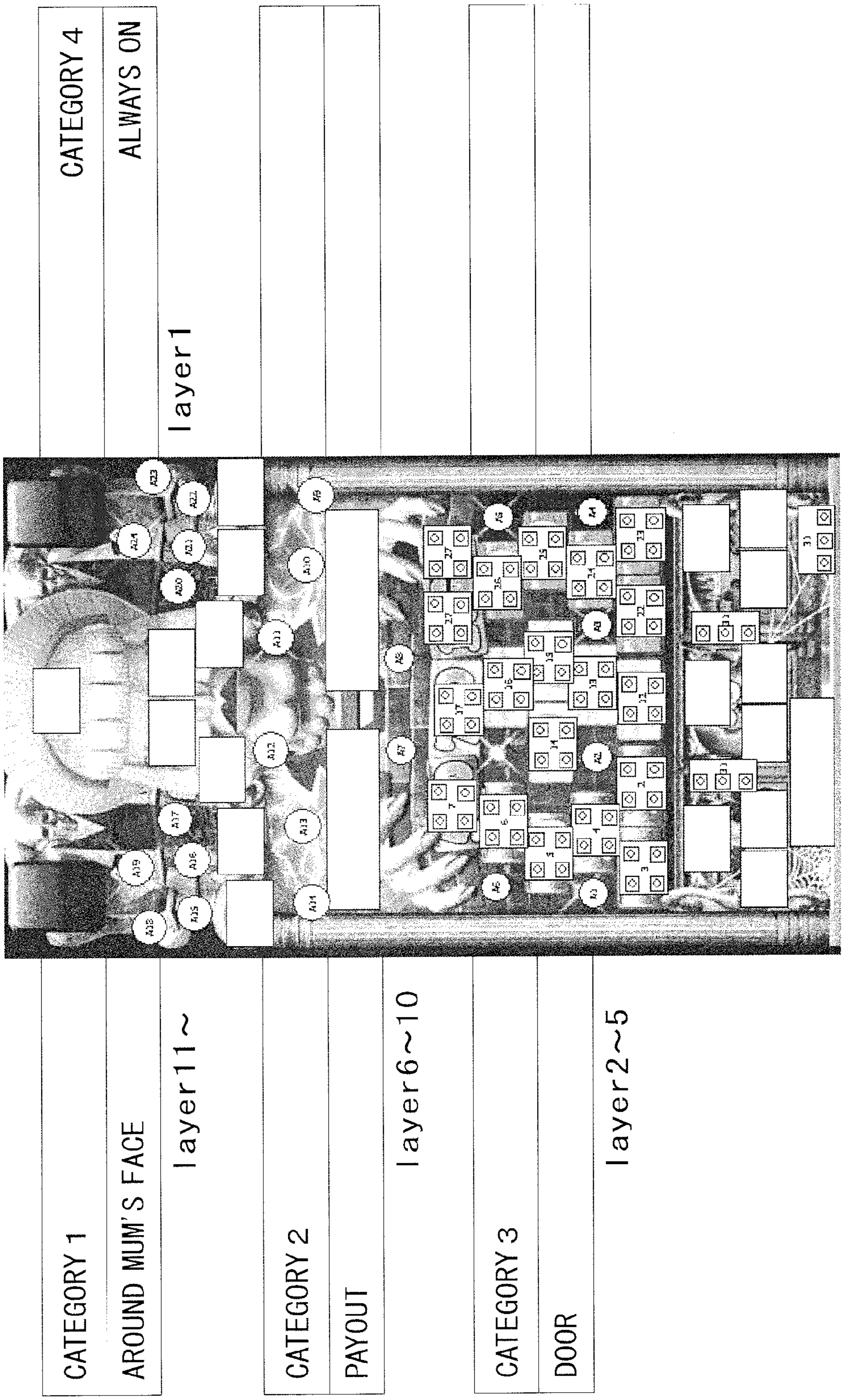

FIG. 38 illustrates a control layer in the gaming machine.

Figure 39:
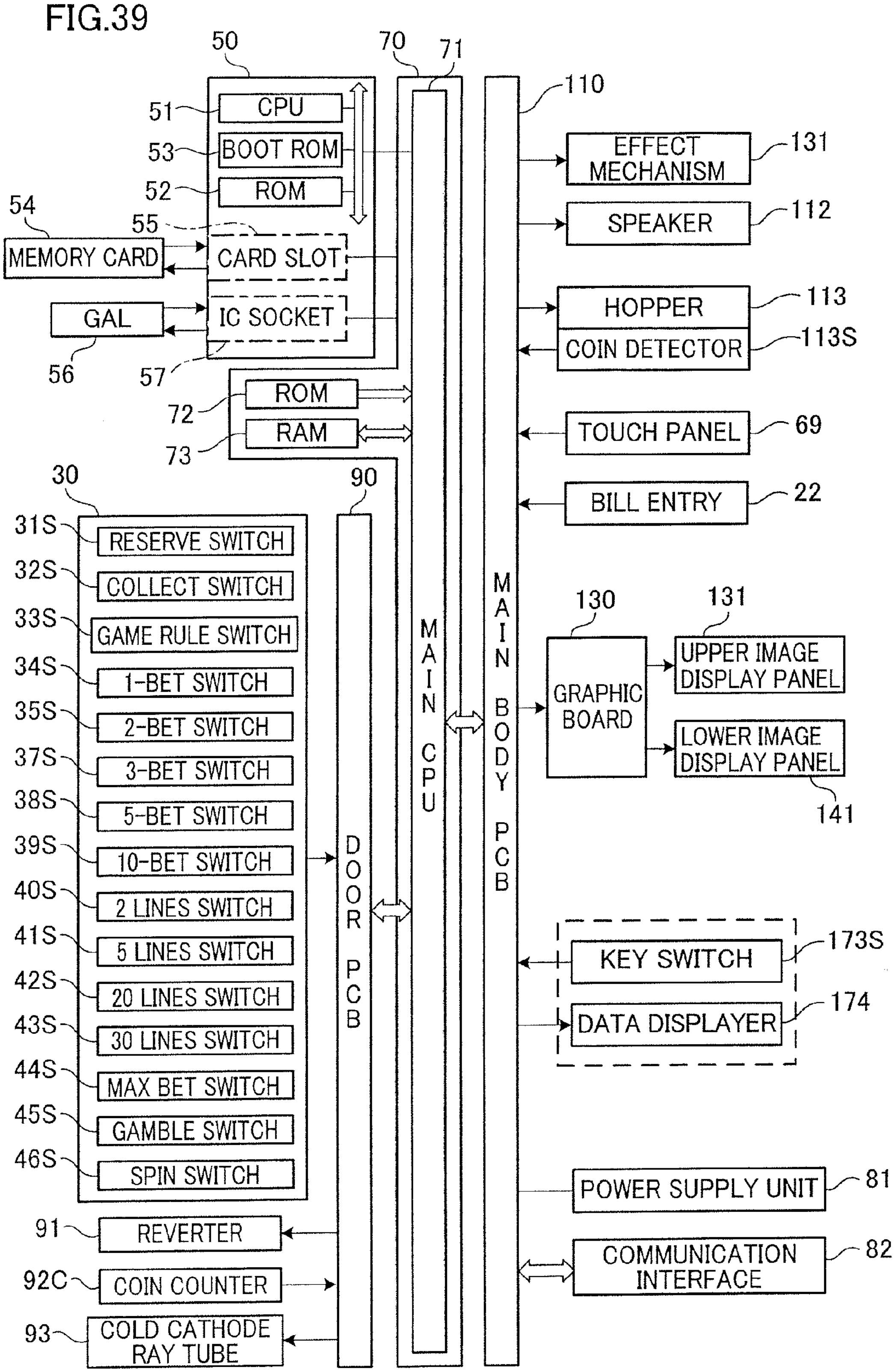

FIG. 39 is an electrical block diagram of the gaming machine.

FIG. 40 illustrates a normal game symbol table.

FIG. 41 illustrates a gaming terminal management table.

Figure 42:
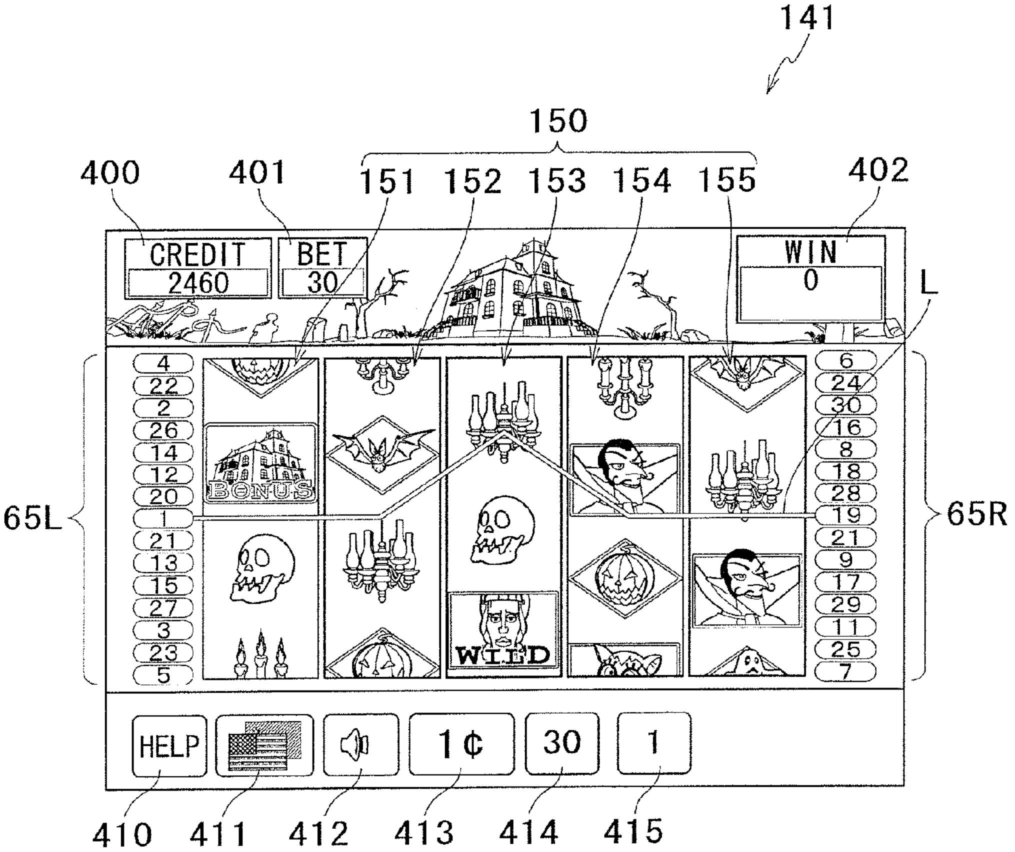

FIG. 42 illustrates a game screen.

Figure 43:
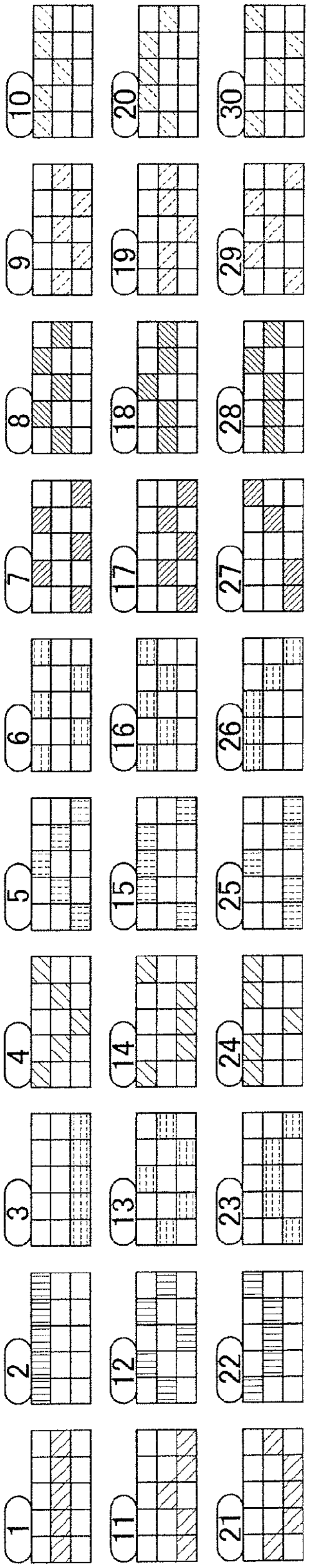

FIG. 43 illustrates bet lines.

Figure 44:
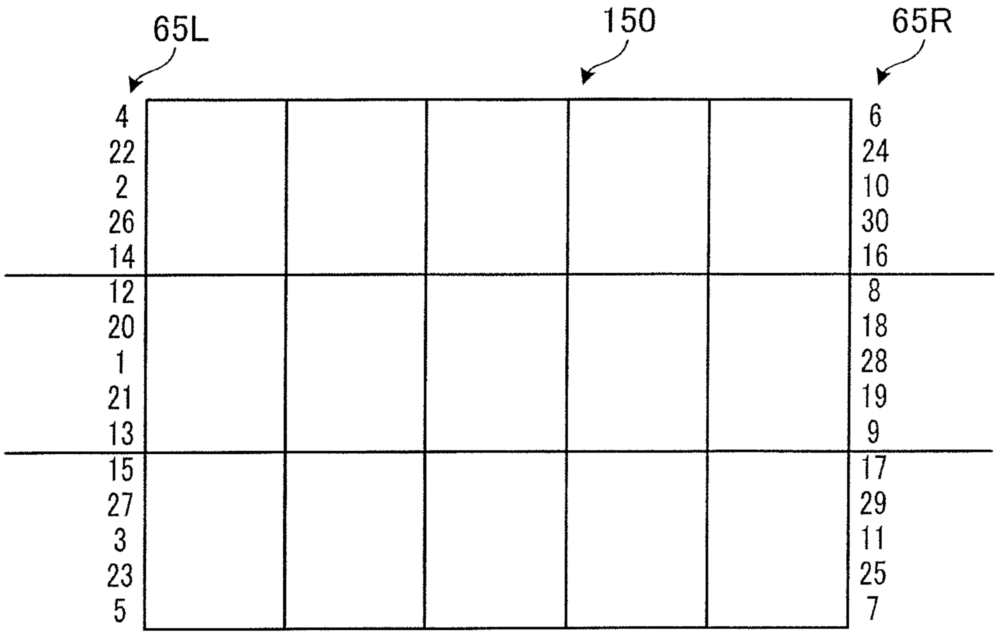

FIG. 44 illustrates a game screen.

Figure 45:
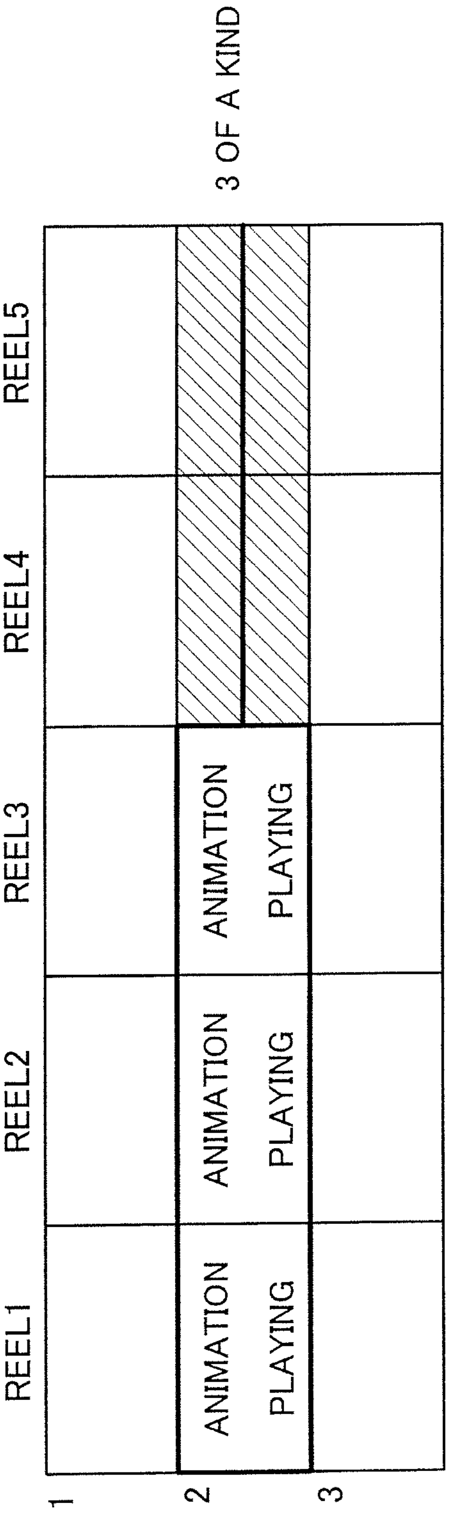

FIG. 45 illustrates reels on the game screen.

FIG. 46 illustrates reels on the game screen.

FIG. 47 illustrates reels on the game screen.

Figure 48:
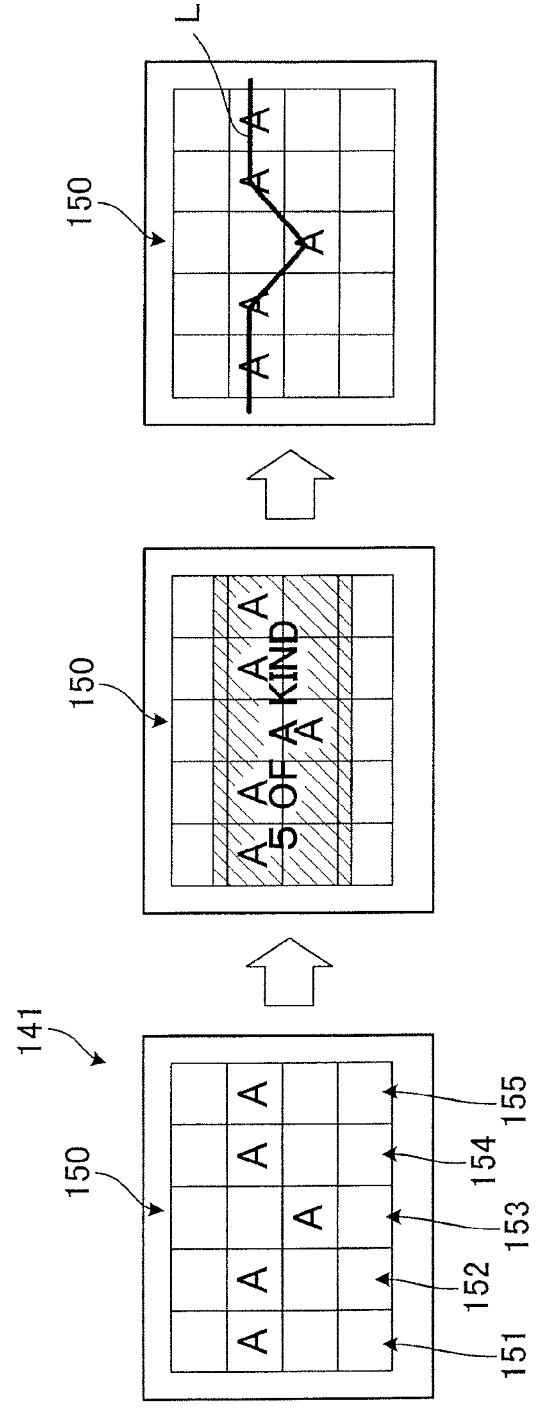

FIG. 48 illustrates a game screen.

Figure 49:
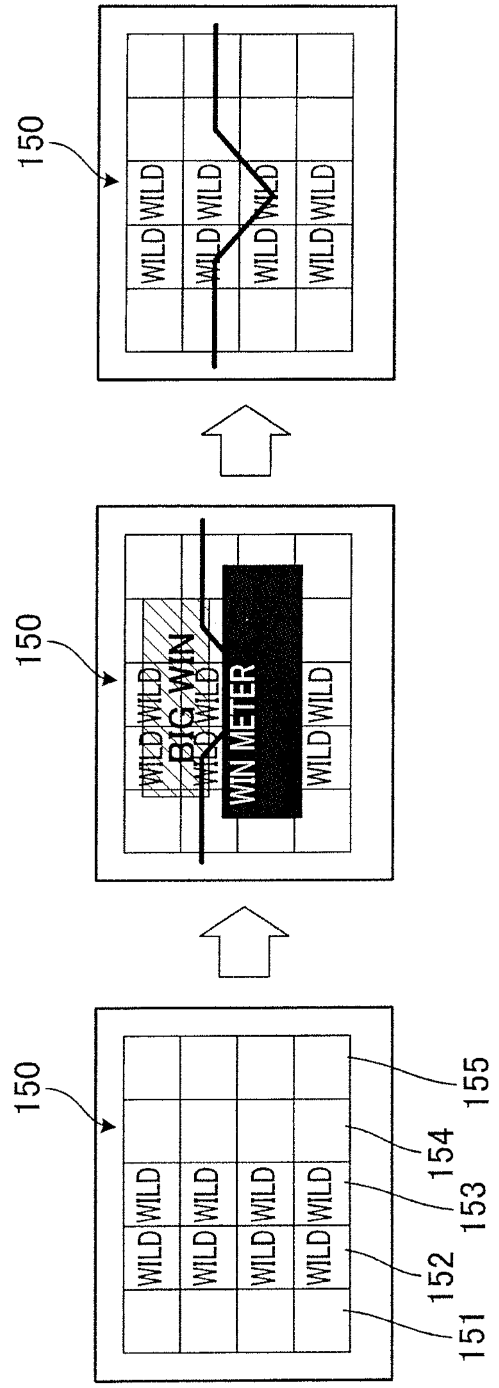

FIG. 49 illustrates a game screen.

Figure 50:
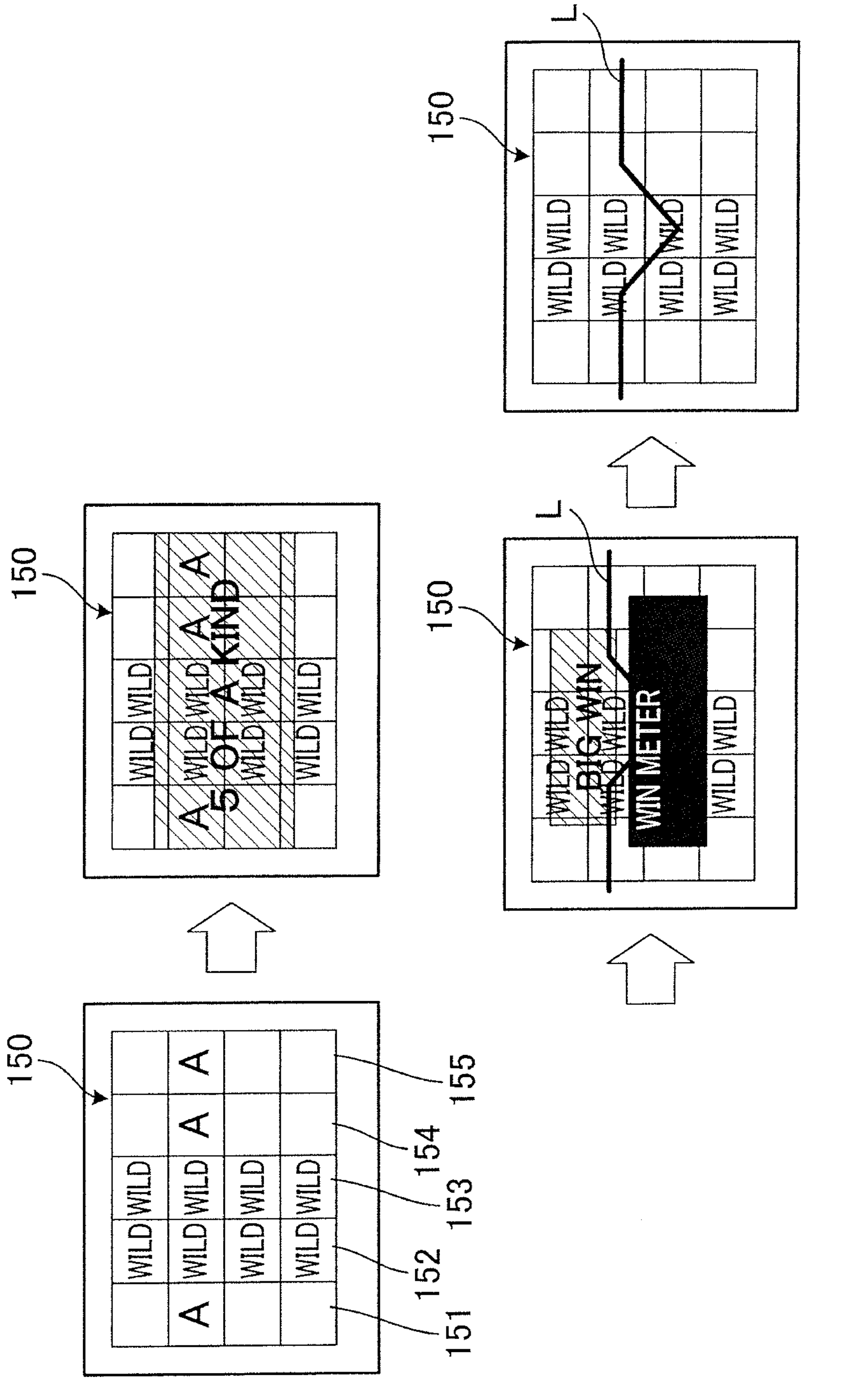

FIG. 50 illustrates a game screen.

Figure 51:
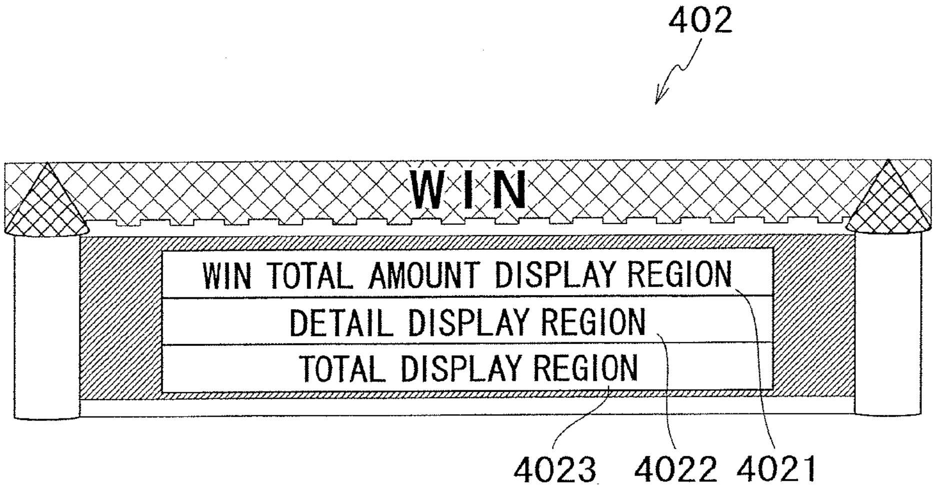

FIG. 51 illustrates a WIN meter.

FIG. 52 shows a table indicating the relationship between remaining count numbers and seconds.

FIG. 53 shows a table indicating the relationship between bet payout rates and seconds.

Figure 54:
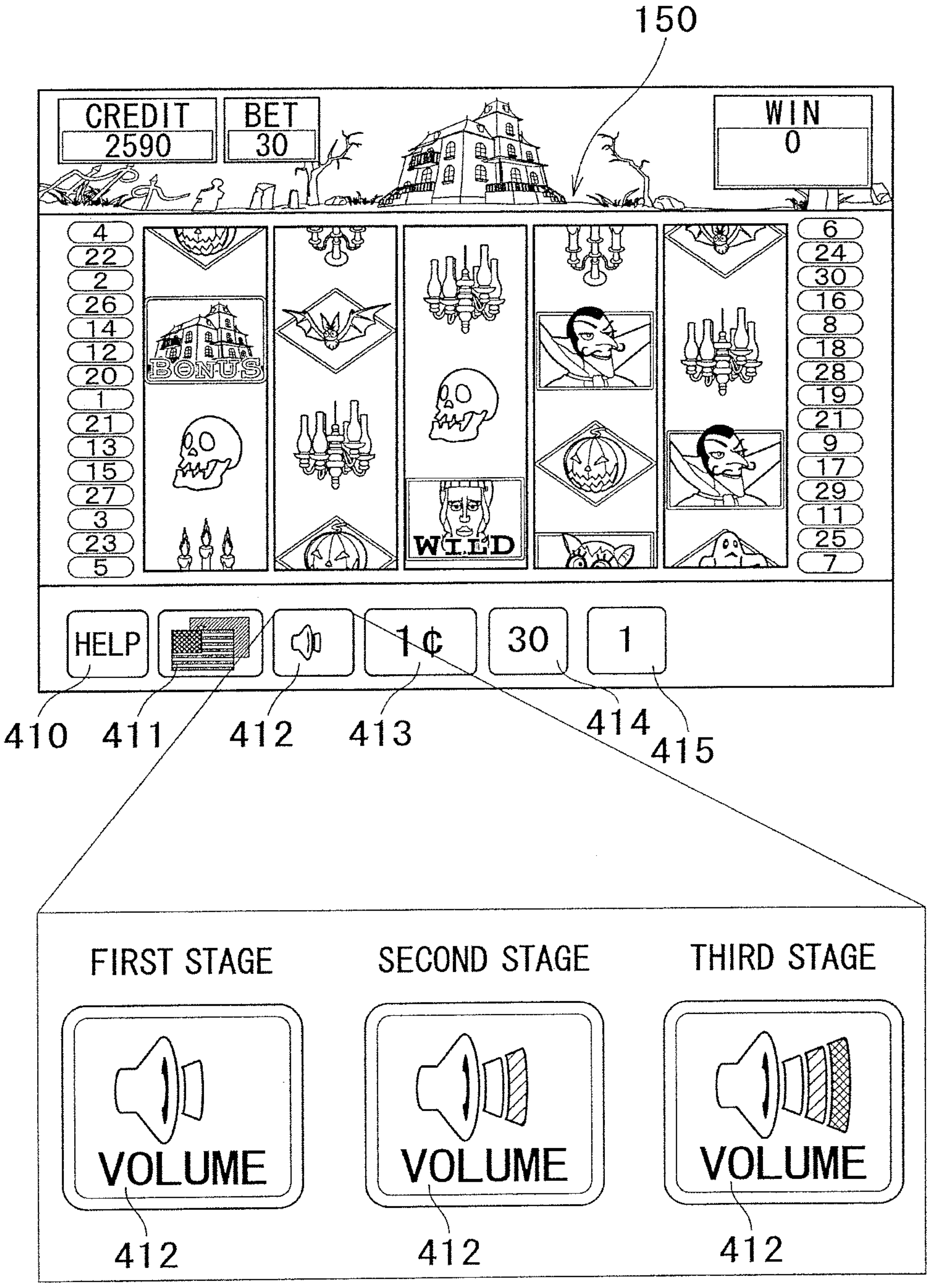

FIG. 54 illustrates a sound volume switching touch button.

Figure 55A:
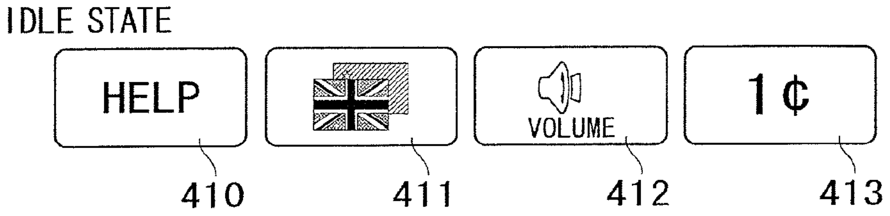

FIG. 55A shows a language switching touch button.

Figure 55B:
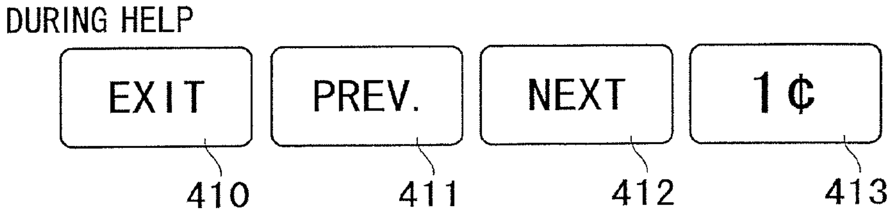

FIG. 55B shows the language switching touch button.

Figure 55C:
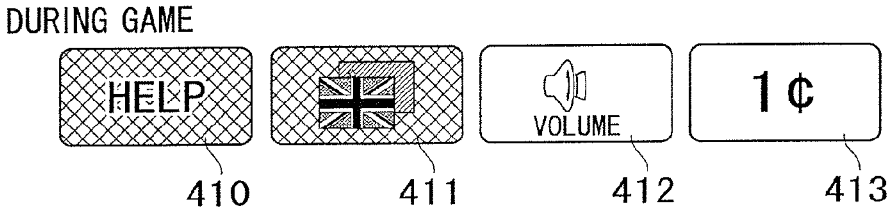

FIG. 55C shows the language switching touch button.

Figure 55D:
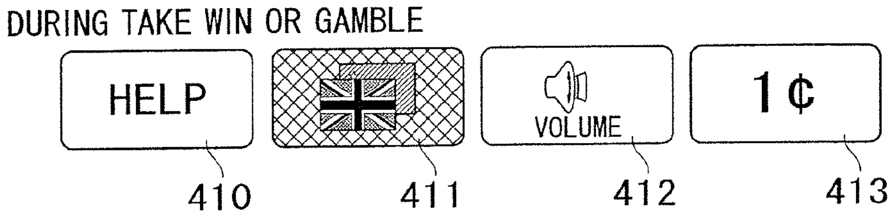

FIG. 55D shows the language switching touch button.

Figure 55E:
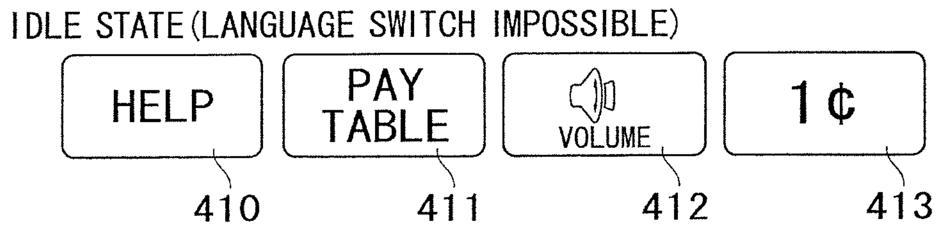

FIG. 55E shows the language switching touch button.

Figure 55F:
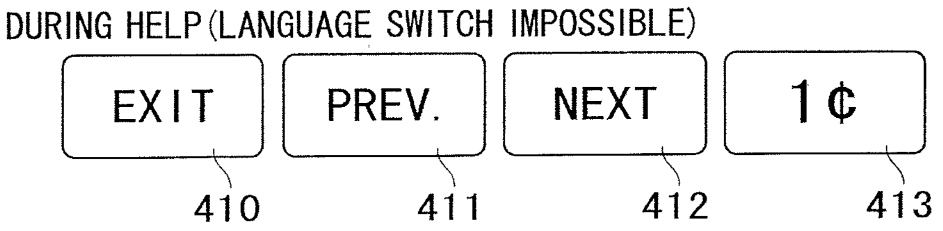

FIG. 55F shows the language switching touch button.

Figure 55G:
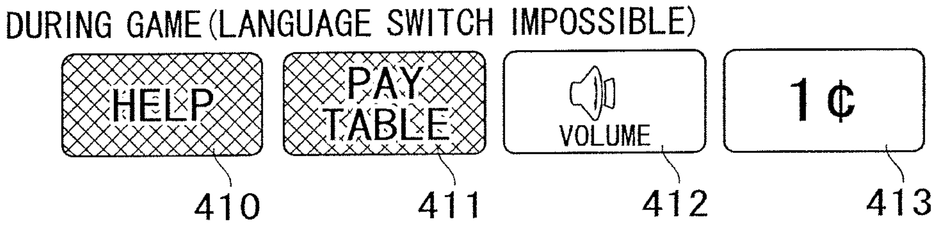

FIG. 55G shows the language switching touch button.

Figure 55H:
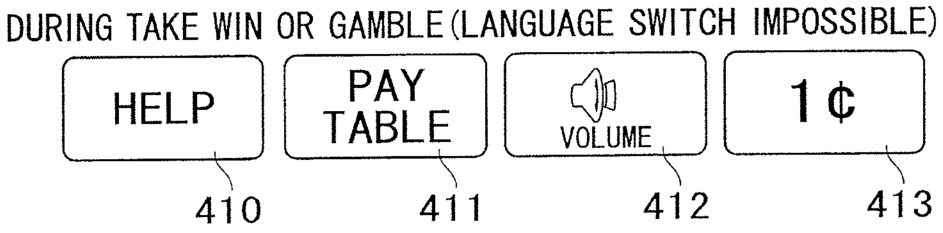

FIG. 55H shows the language switching touch button.

FIG. 56 shows the lighting state of the language switching touch button.

FIG. 57 shows the language switching touch button.

Figure 58:
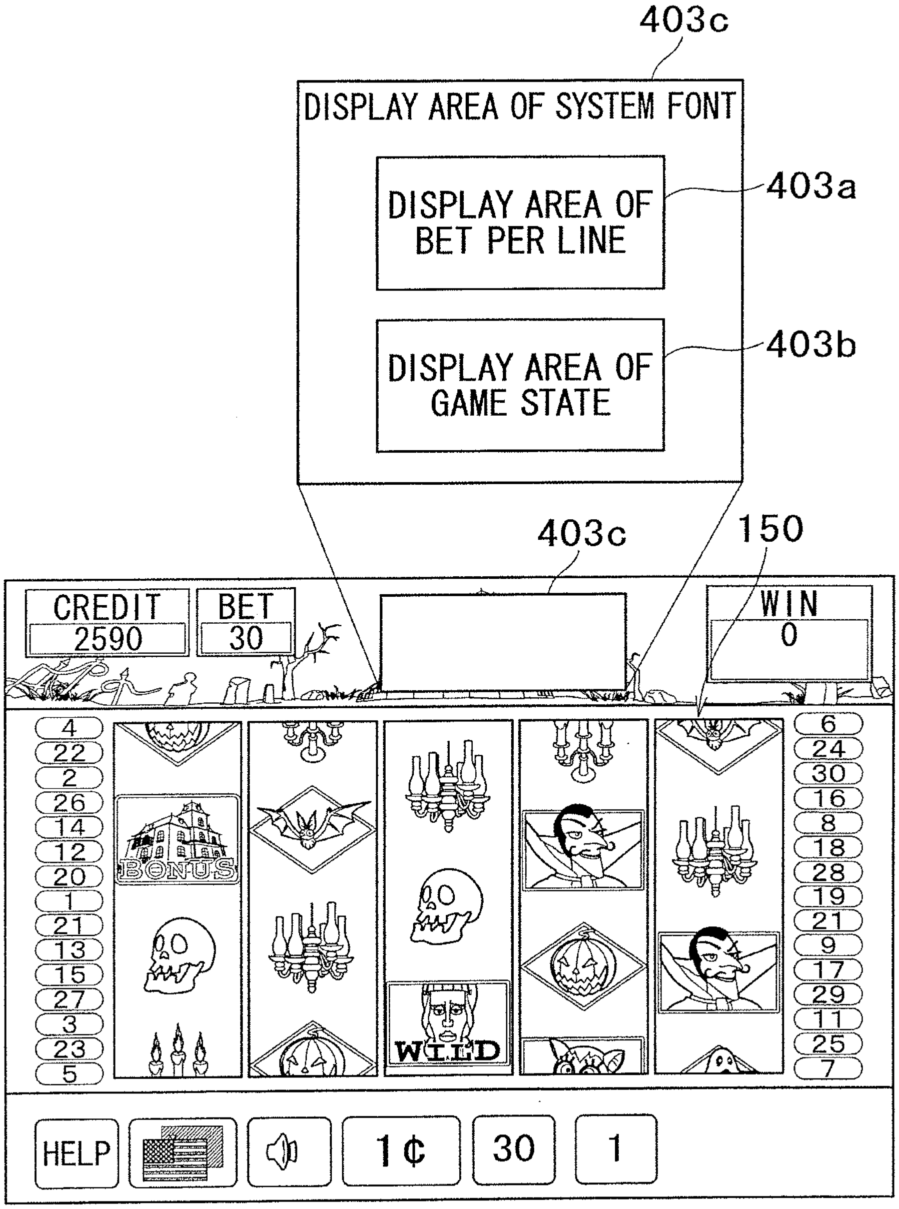

FIG. 58 illustrates a system font area.

Figures 59, 60:
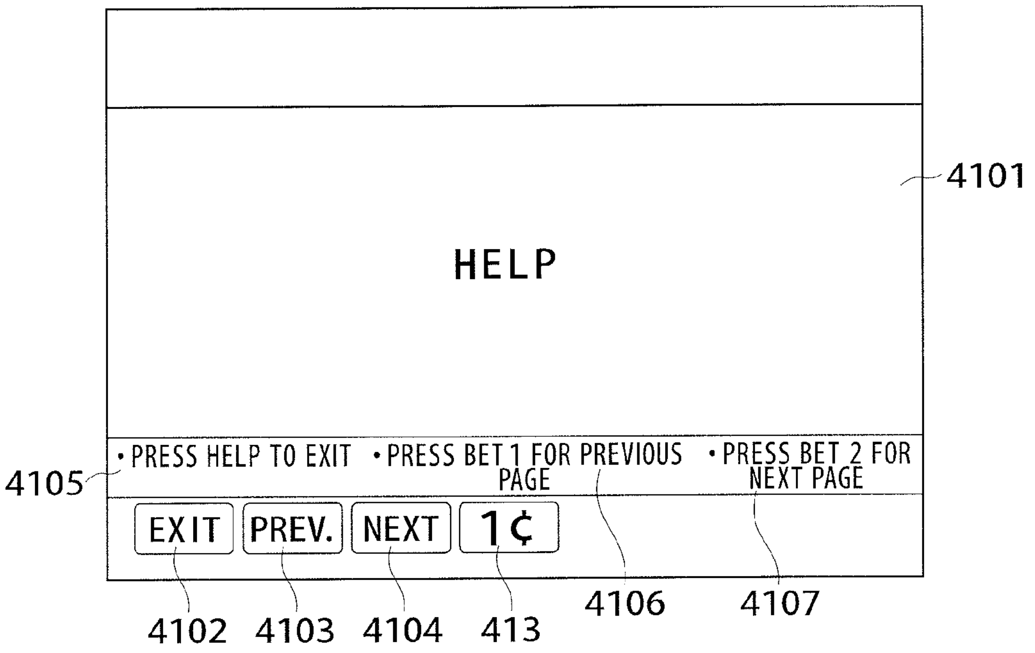

FIG. 59 illustrates a help screen.

FIG. 60 illustrates a help button.

Figure 61:
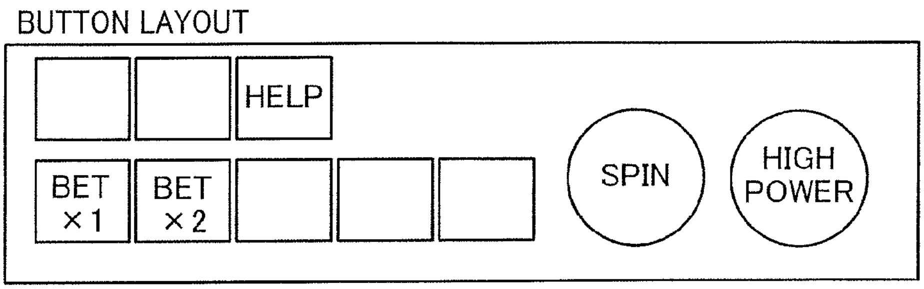

FIG. 61 shows operation states of the control panel.

Figure 62:
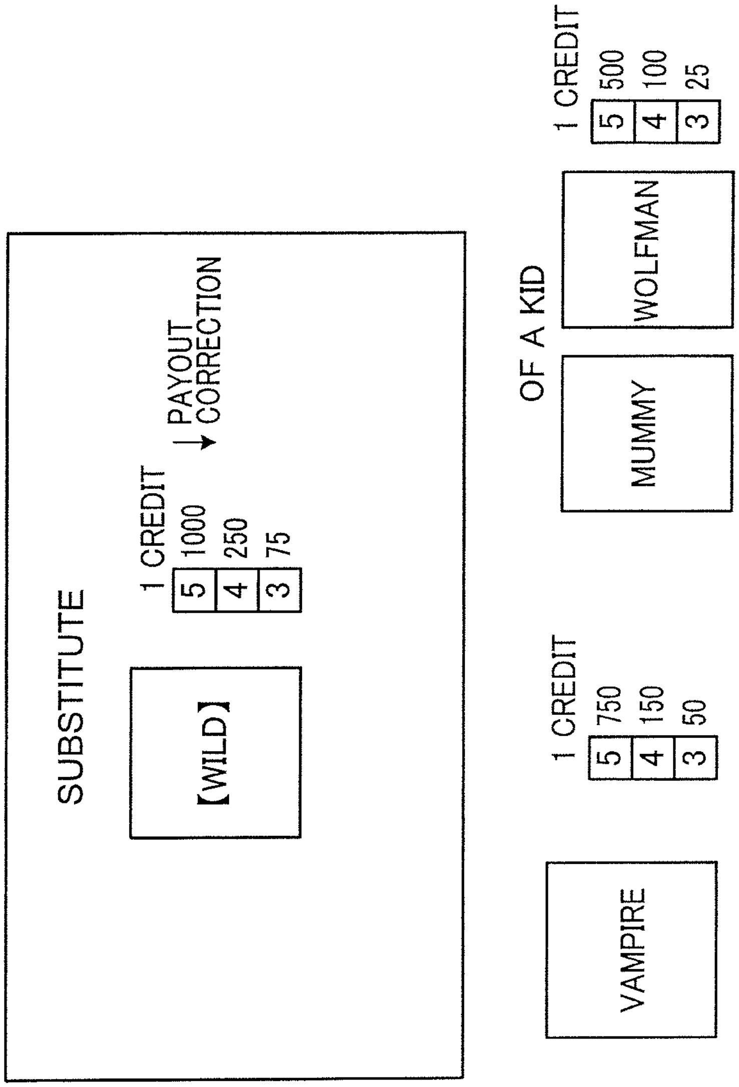

FIG. 62 illustrates displayed items.

Figure 63:
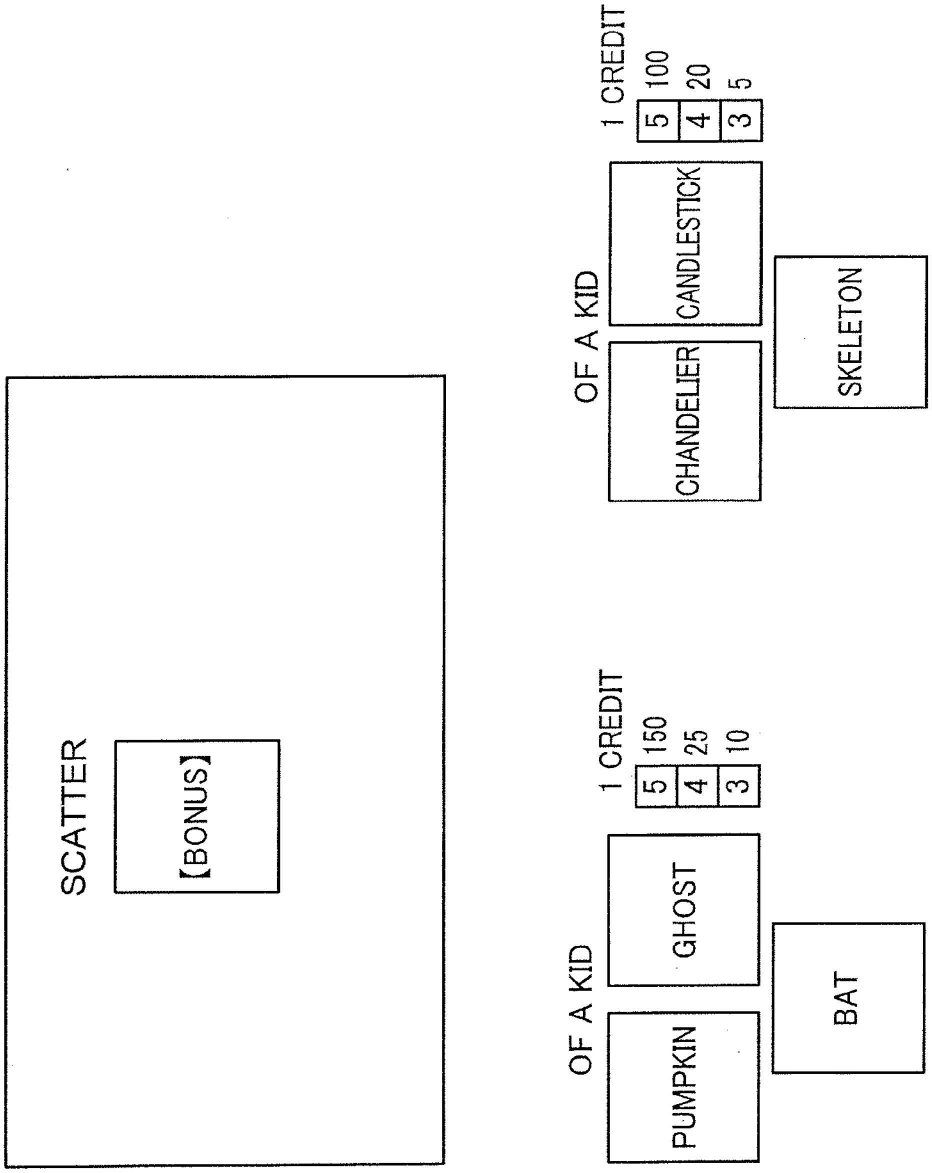

FIG. 63 illustrates displayed items.

Figure 64:
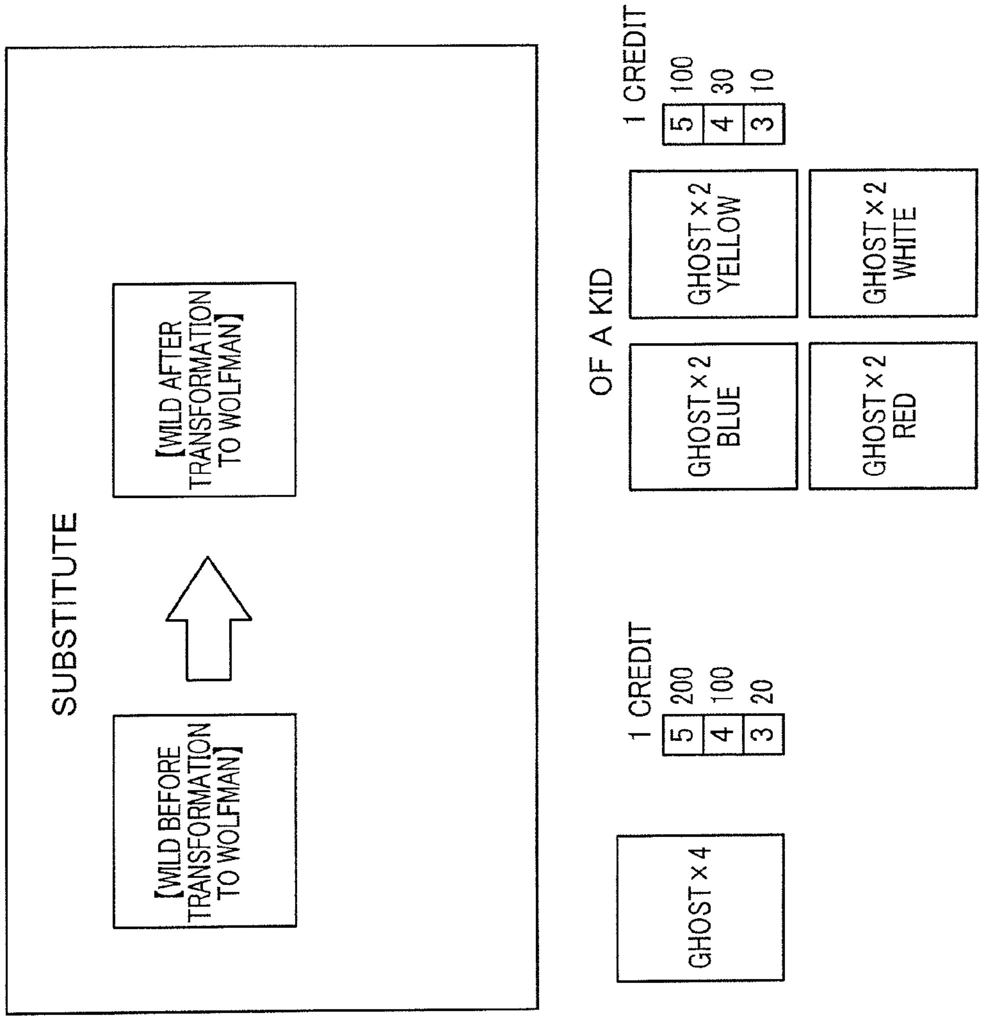

FIG. 64 illustrates displayed items.

Figure 65:
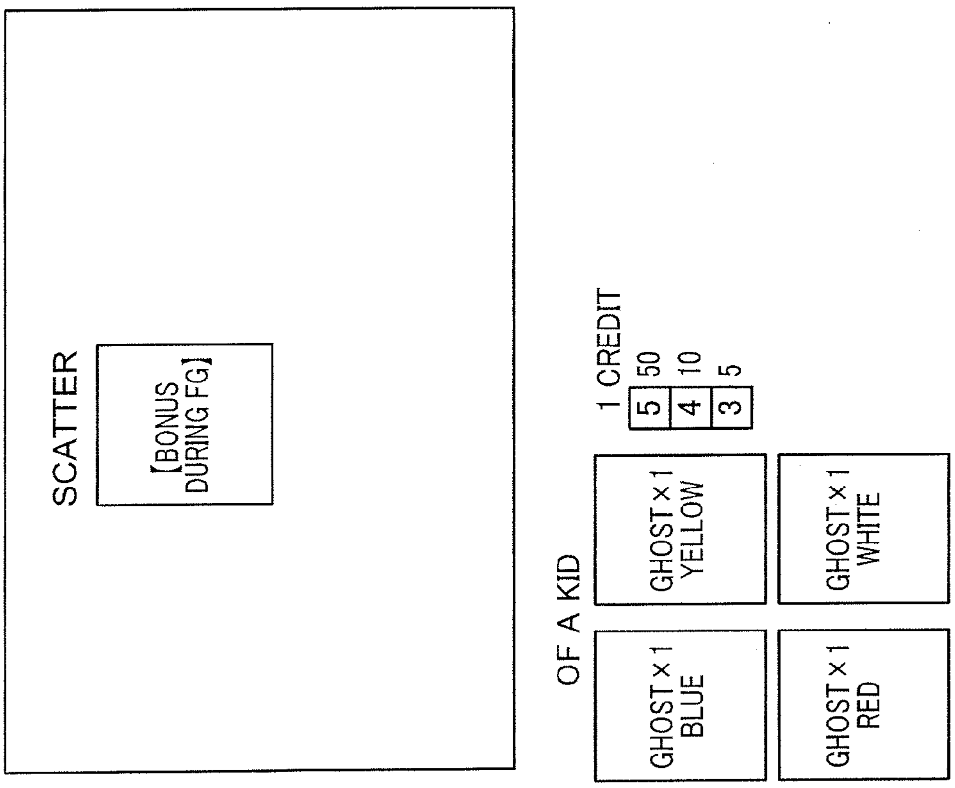

FIG. 65 illustrates displayed items.

Figure 66:
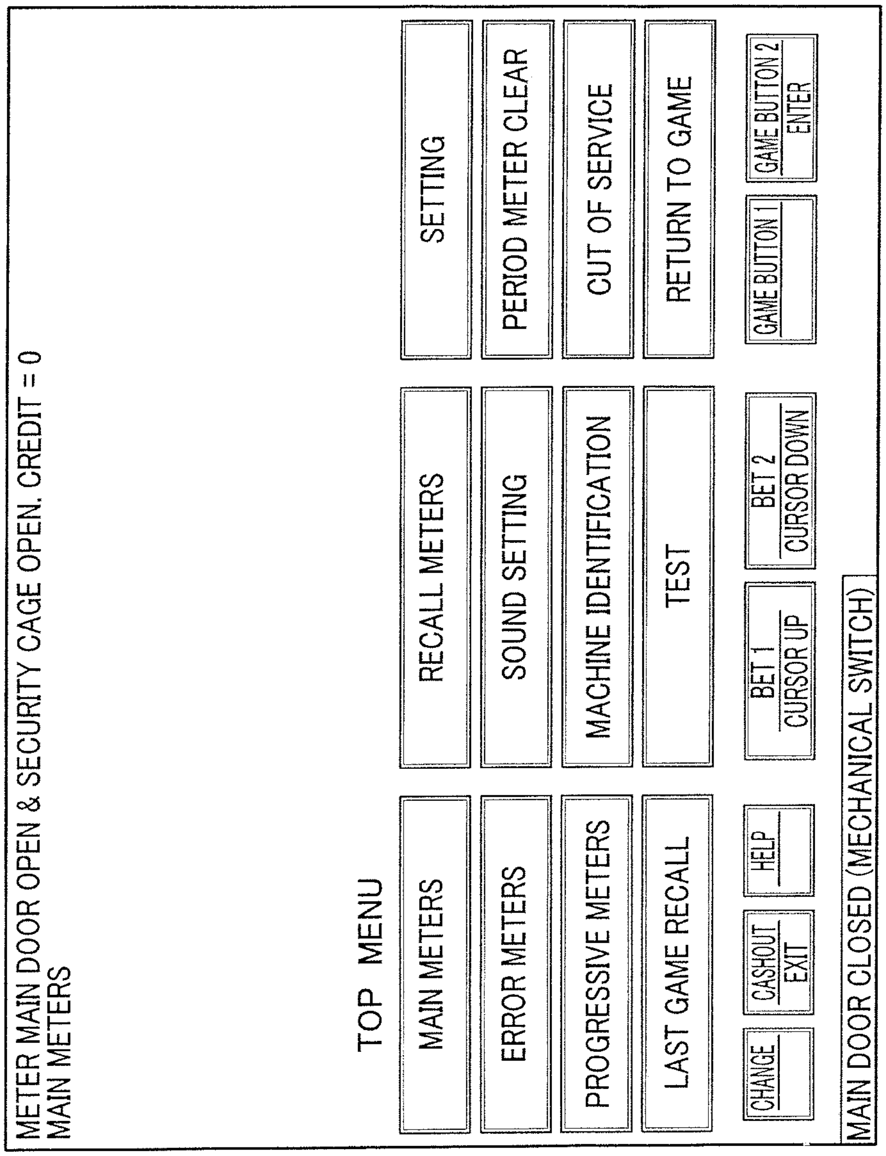

FIG. 66 shows an AUDIT screen.

Figure 67:
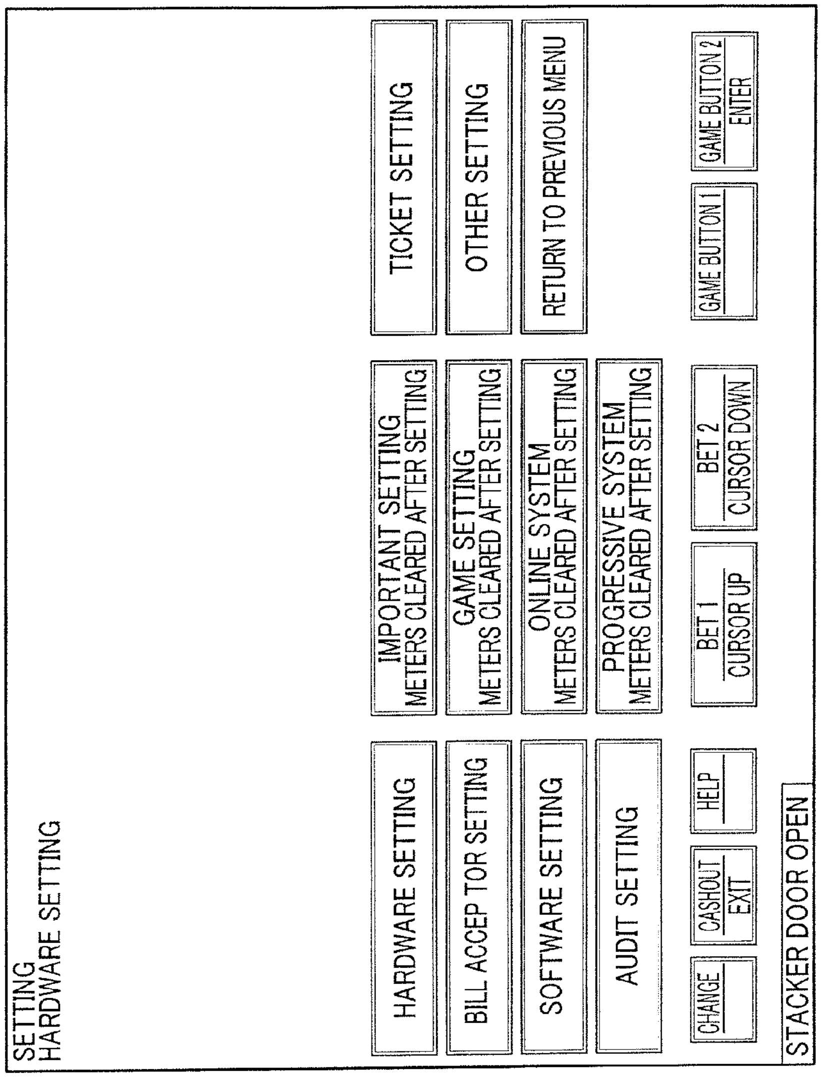

FIG. 67 shows an AUDIT screen.

Figure 68:
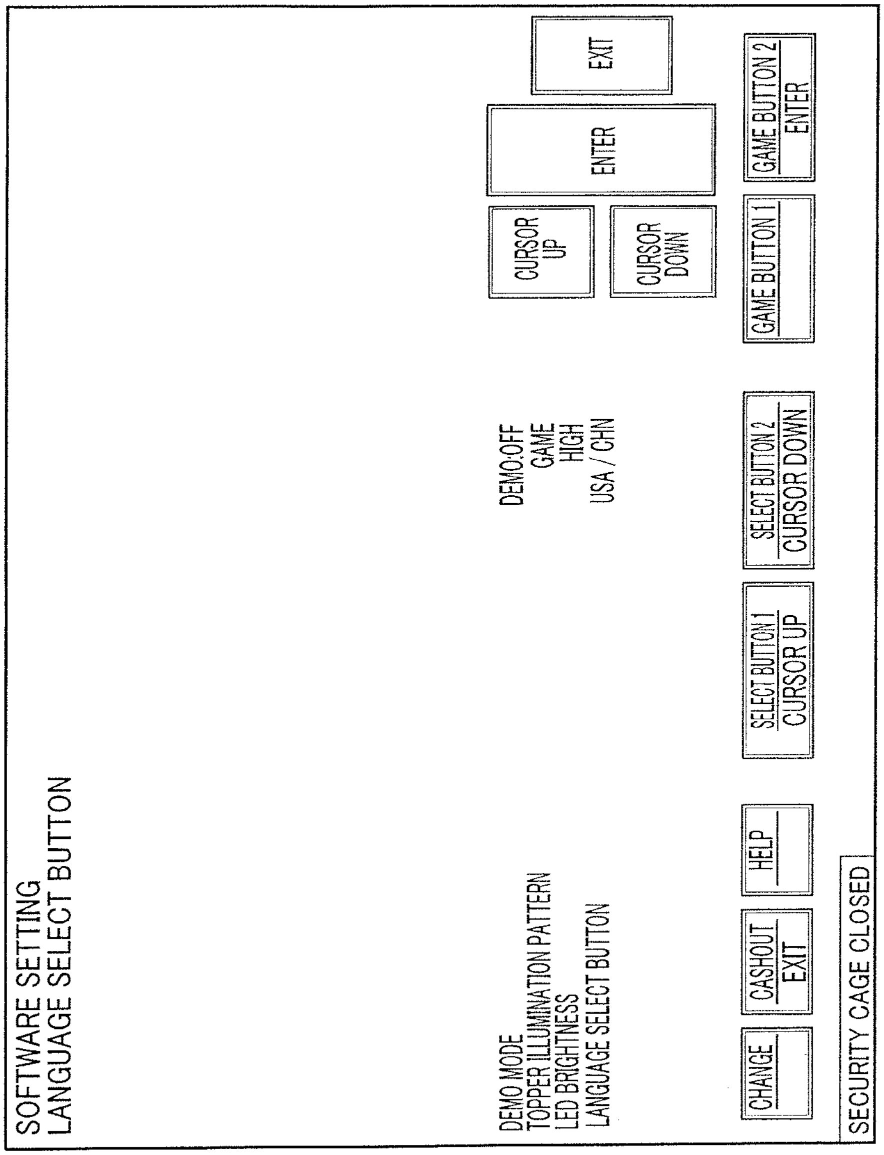

FIG. 68 shows an AUDIT screen.

FIG. 69 illustrates display languages.

Figure 70:
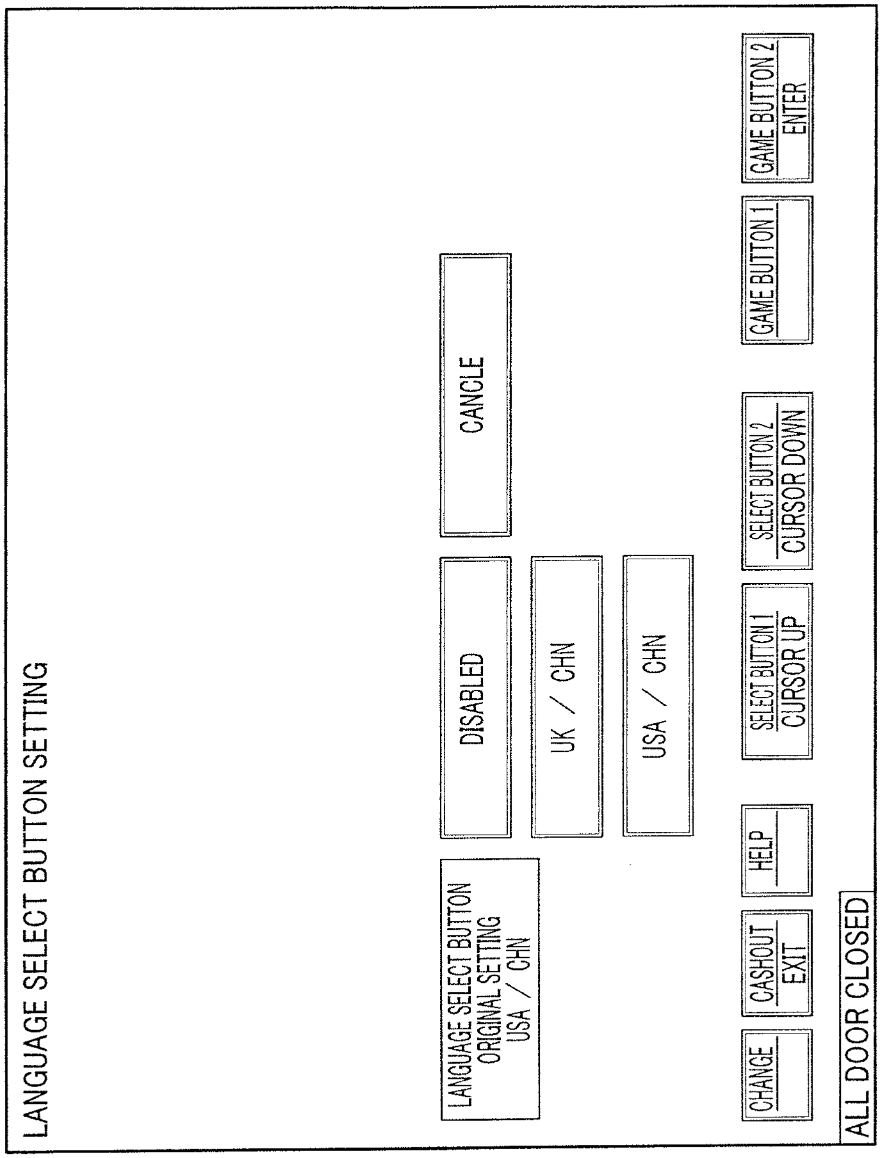

FIG. 70 shows an AUDIT screen.

Figure 71:
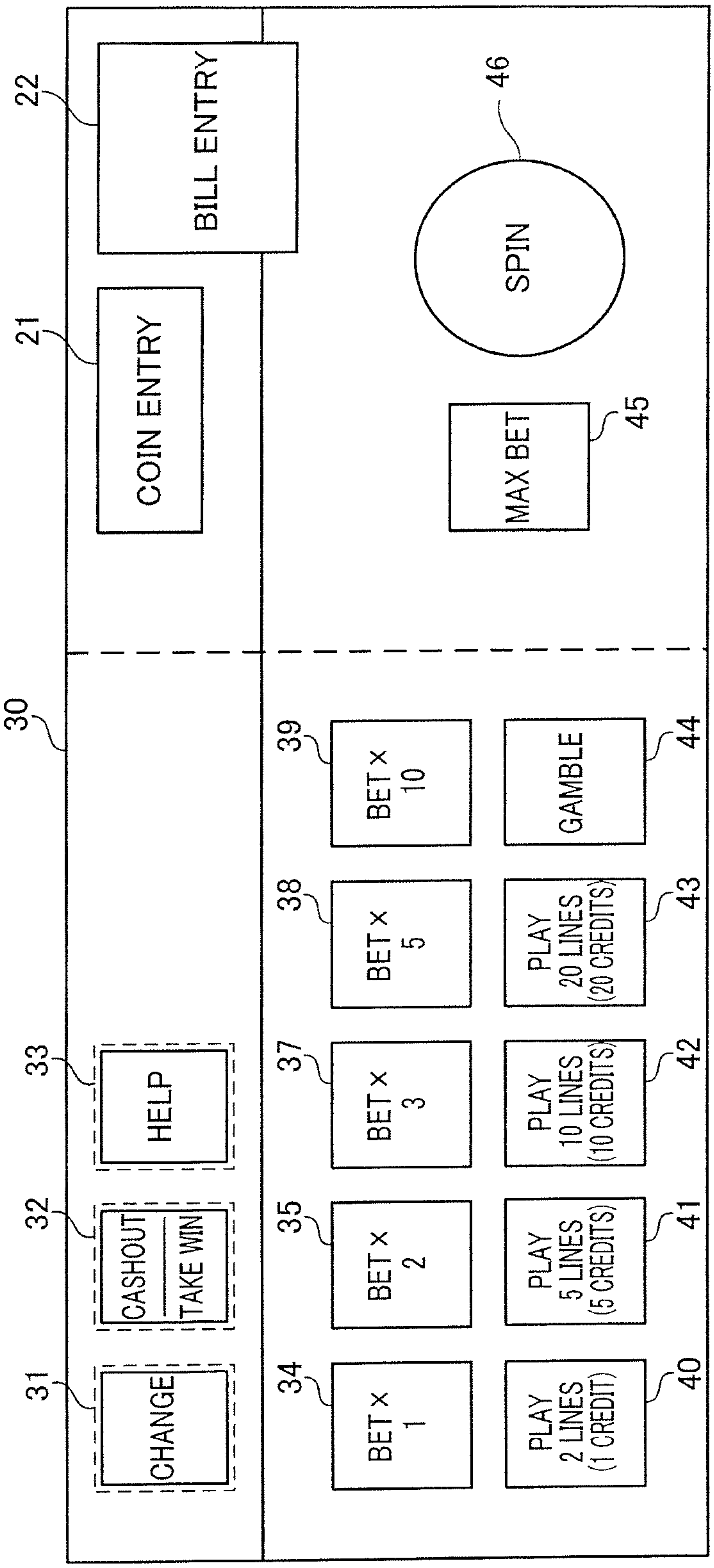

FIG. 71 is a frontal view of the control panel.

Figure 72:
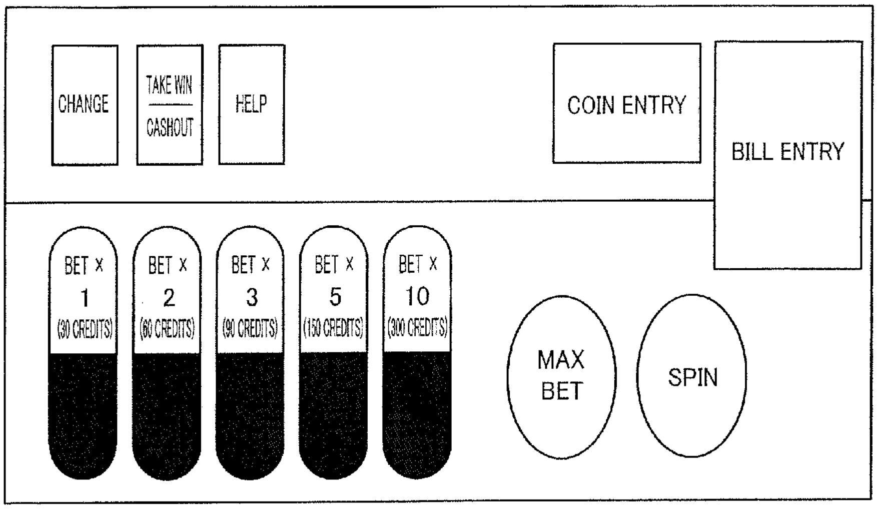

FIG. 72 is a frontal view of the control panel.

Figure 73:
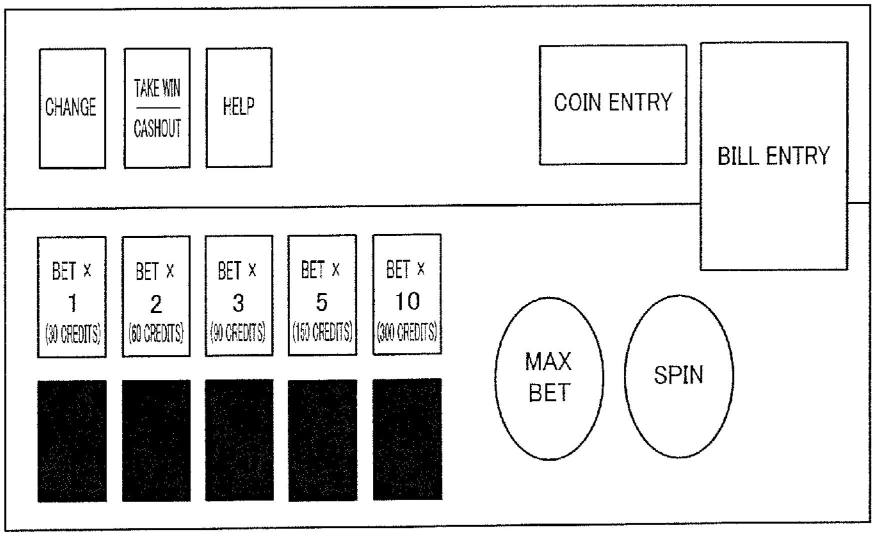

FIG. 73 is a frontal view of the control panel.

Figure 74:
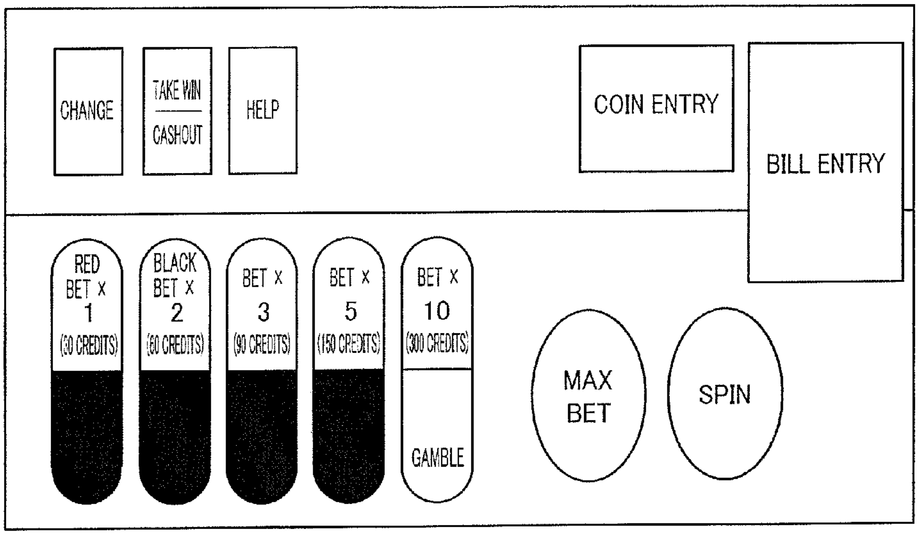

FIG. 74 is a frontal view of the control panel.

Figure 75:
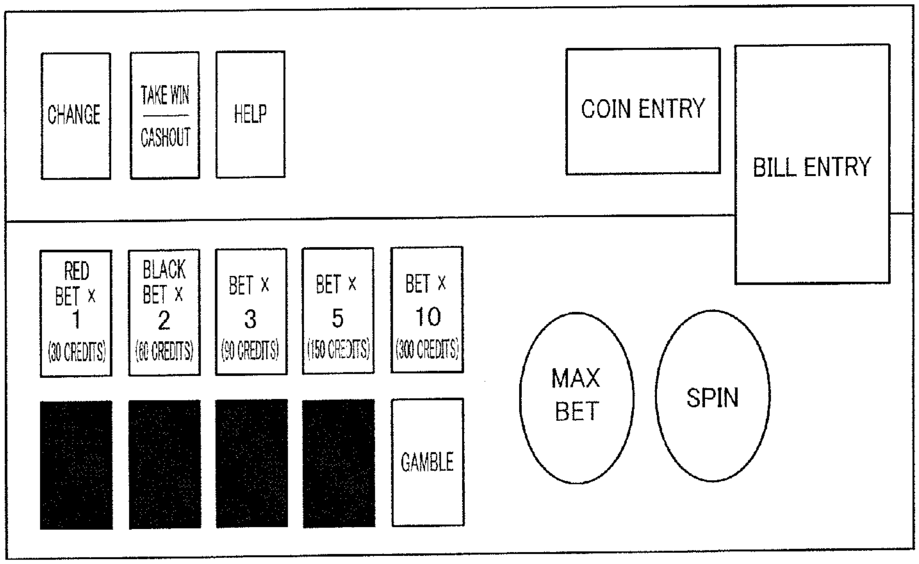

FIG. 75 is a frontal view of the control panel.

Figure 76:
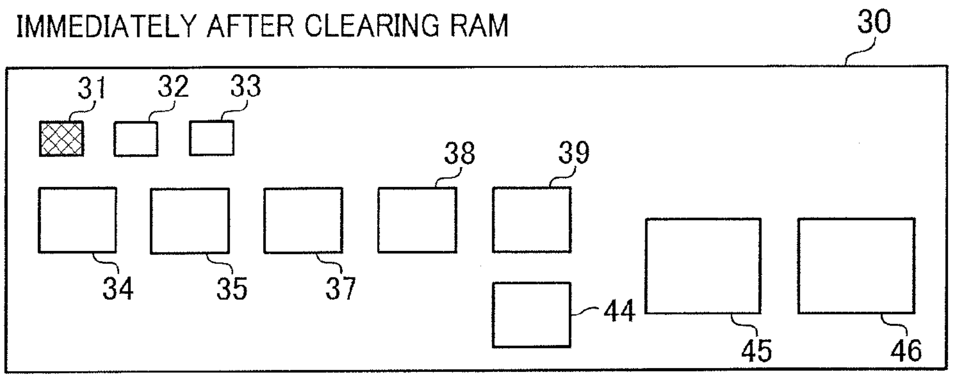

FIG. 76 shows operation states of the control panel.

Figure 77:
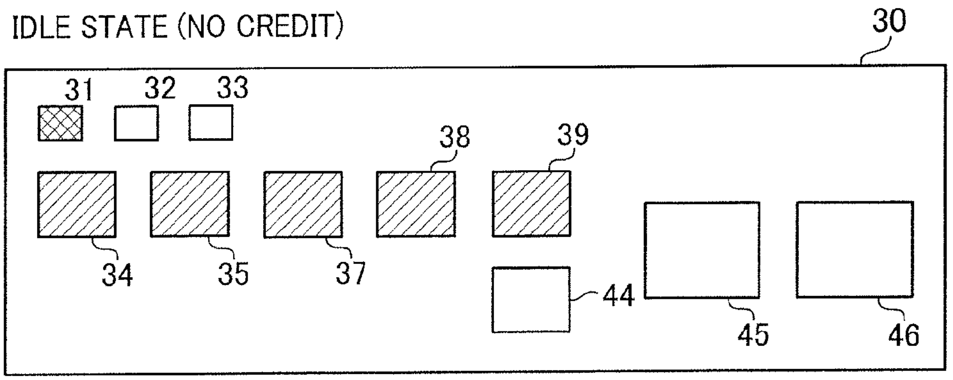

FIG. 77 shows operation states of the control panel.

Figure 78:
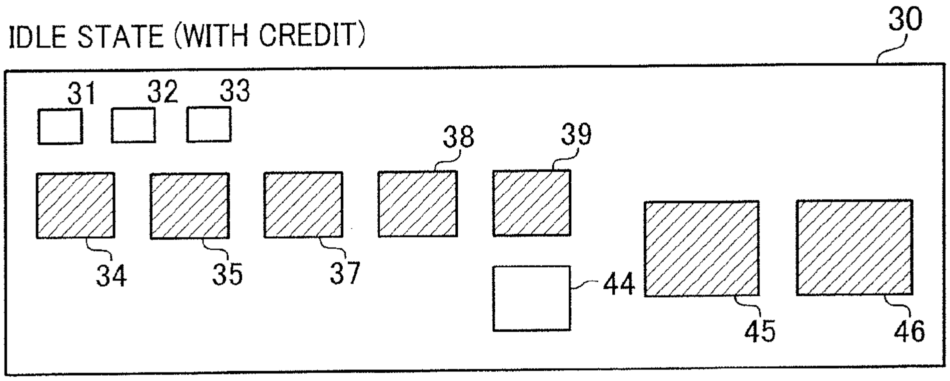

FIG. 78 shows operation states of the control panel.

Figure 79:
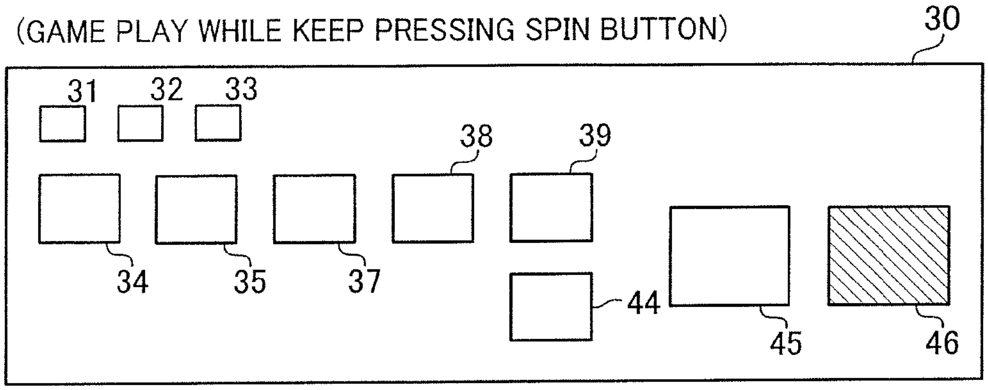

FIG. 79 shows operation states of the control panel.

Figure 80:
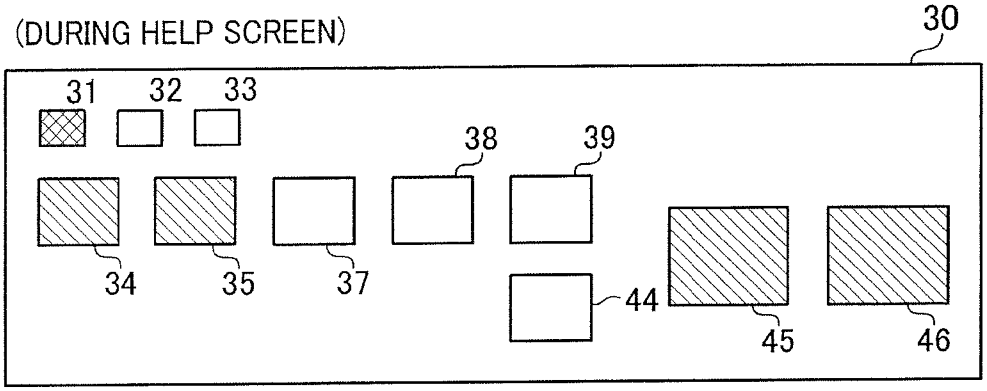

FIG. 80 shows operation states of the control panel.

Figure 81:
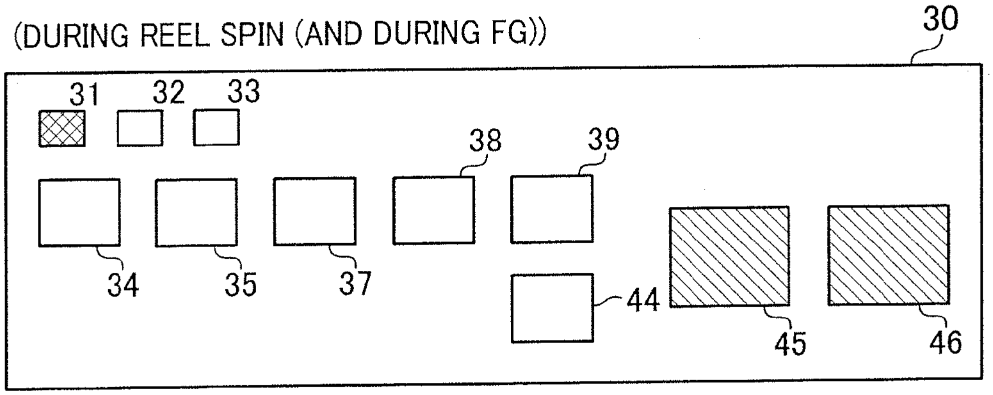

FIG. 81 shows operation states of the control panel.

Figure 82:
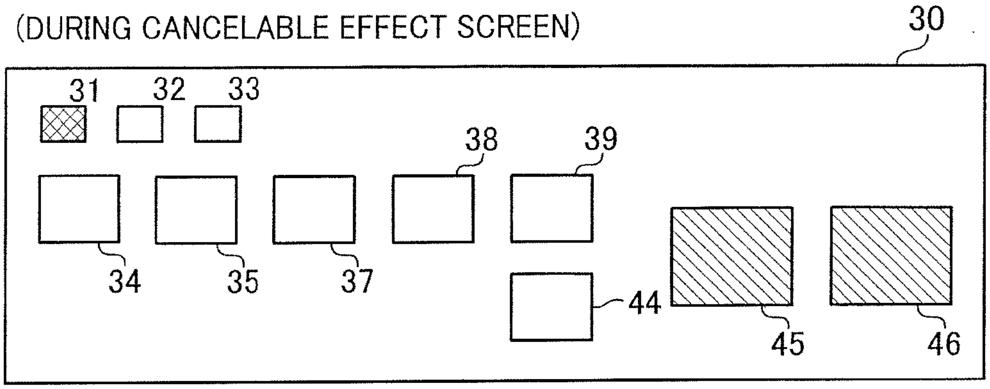

FIG. 82 shows operation states of the control panel.

Figure 83:
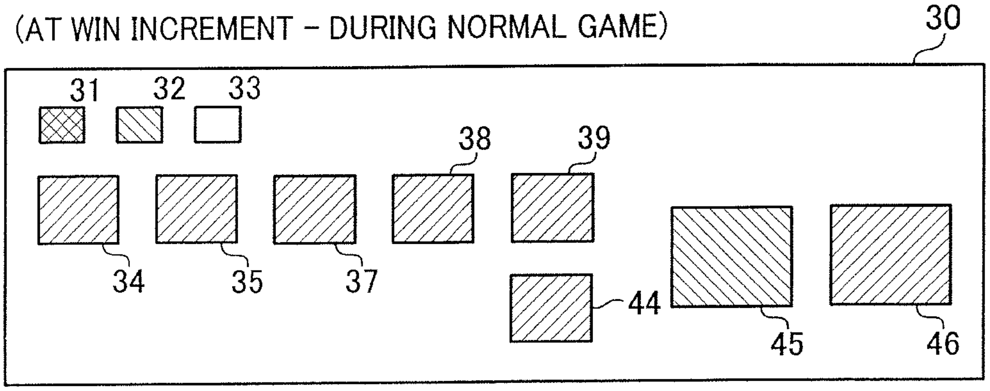

FIG. 83 shows operation states of the control panel.

Figure 84:
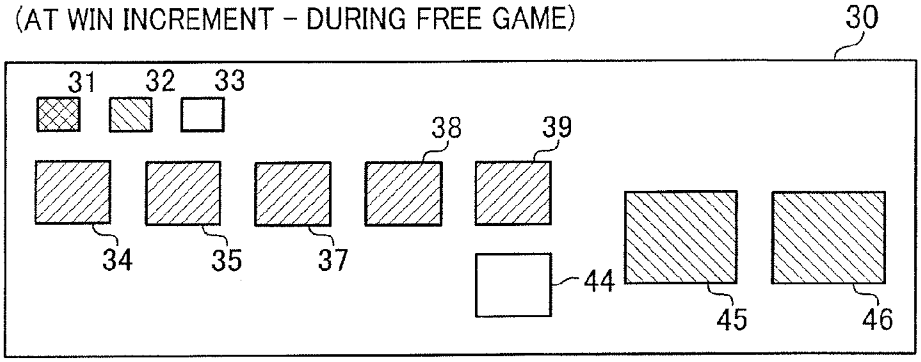

FIG. 84 shows operation states of the control panel.

Figure 85:
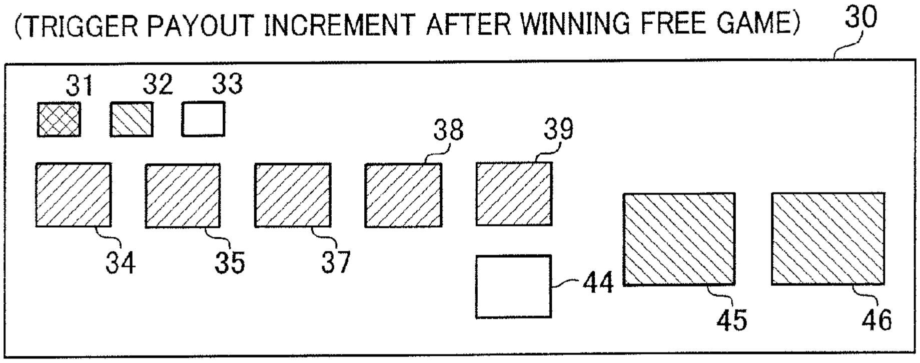

FIG. 85 shows operation states of the control panel.

Figure 86:
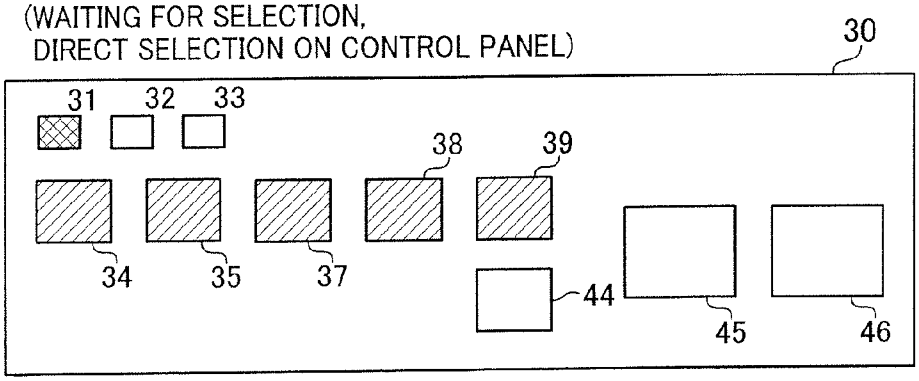

FIG. 86 shows operation states of the control panel.

Figure 87:
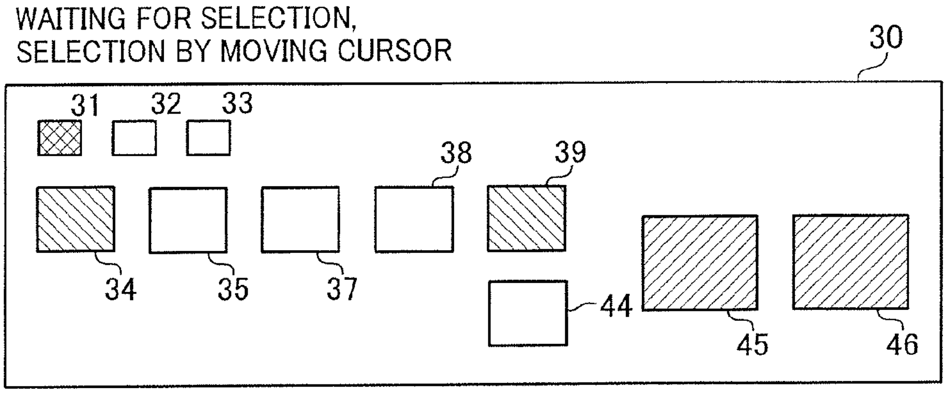

FIG. 87 shows operation states of the control panel.

Figure 88:
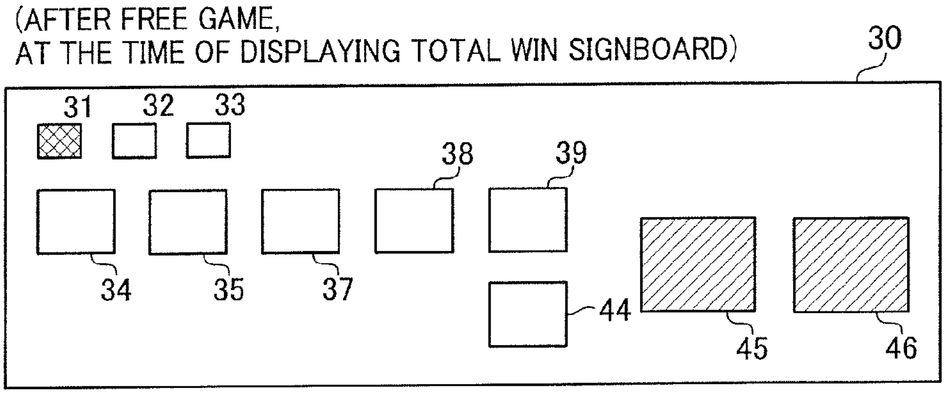

FIG. 88 shows operation states of the control panel.

Figure 89:
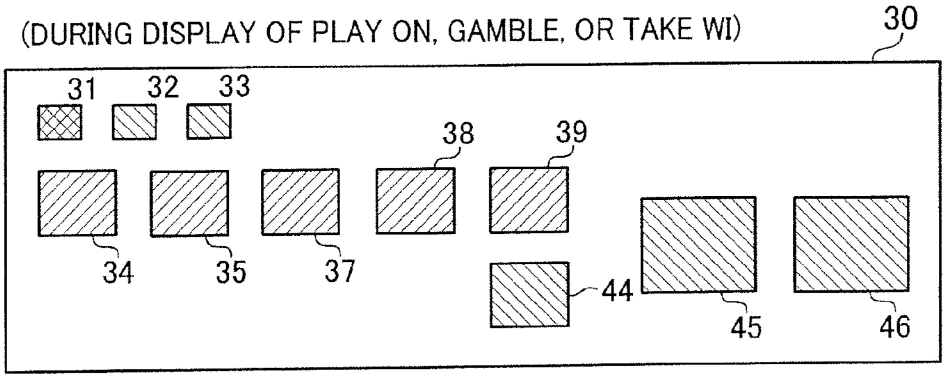

FIG. 89 shows operation states of the control panel.

Figure 90:
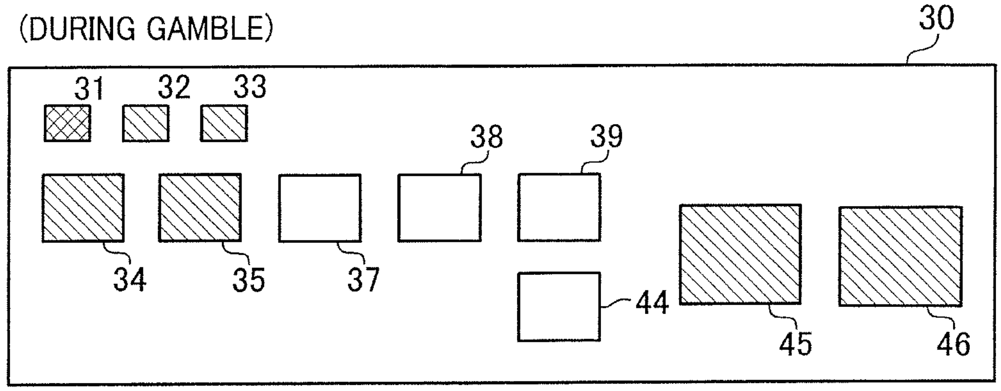

FIG. 90 shows operation states of the control panel.

Figure 91:
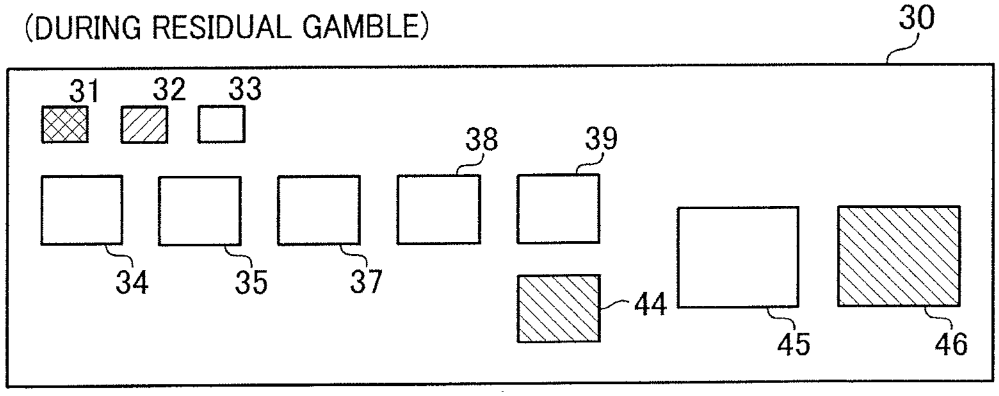

FIG. 91 shows operation states of the control panel.

Figure 92:
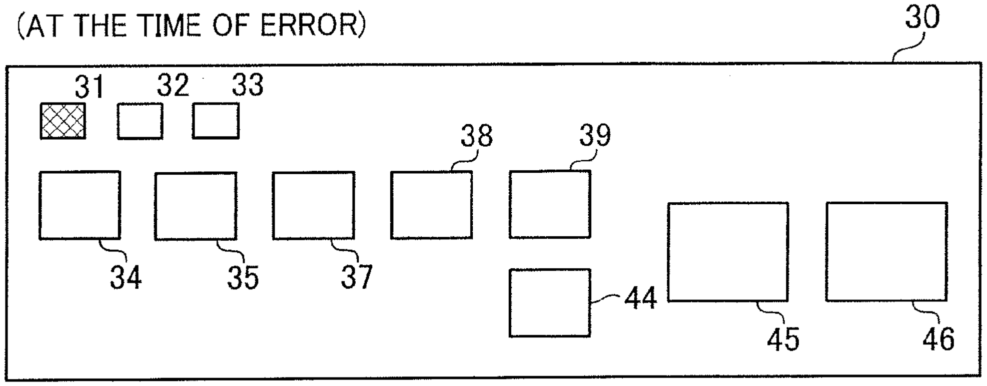

FIG. 92 shows operation states of the control panel.

Figure 93:
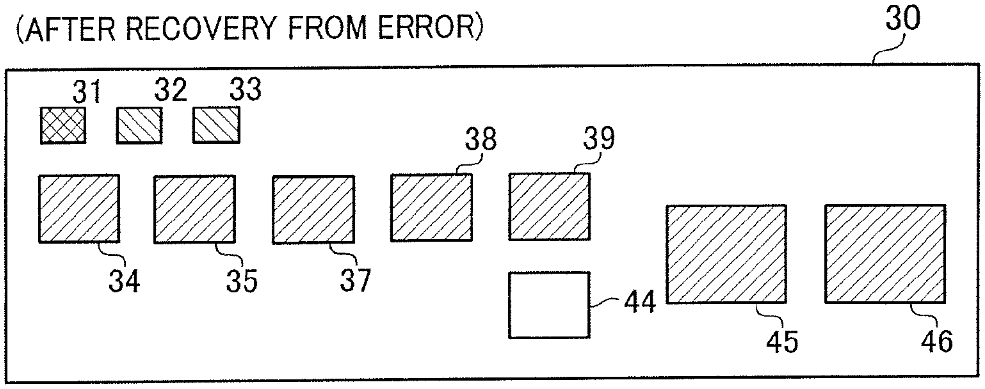

FIG. 93 shows operation states of the control panel.

Figure 94:
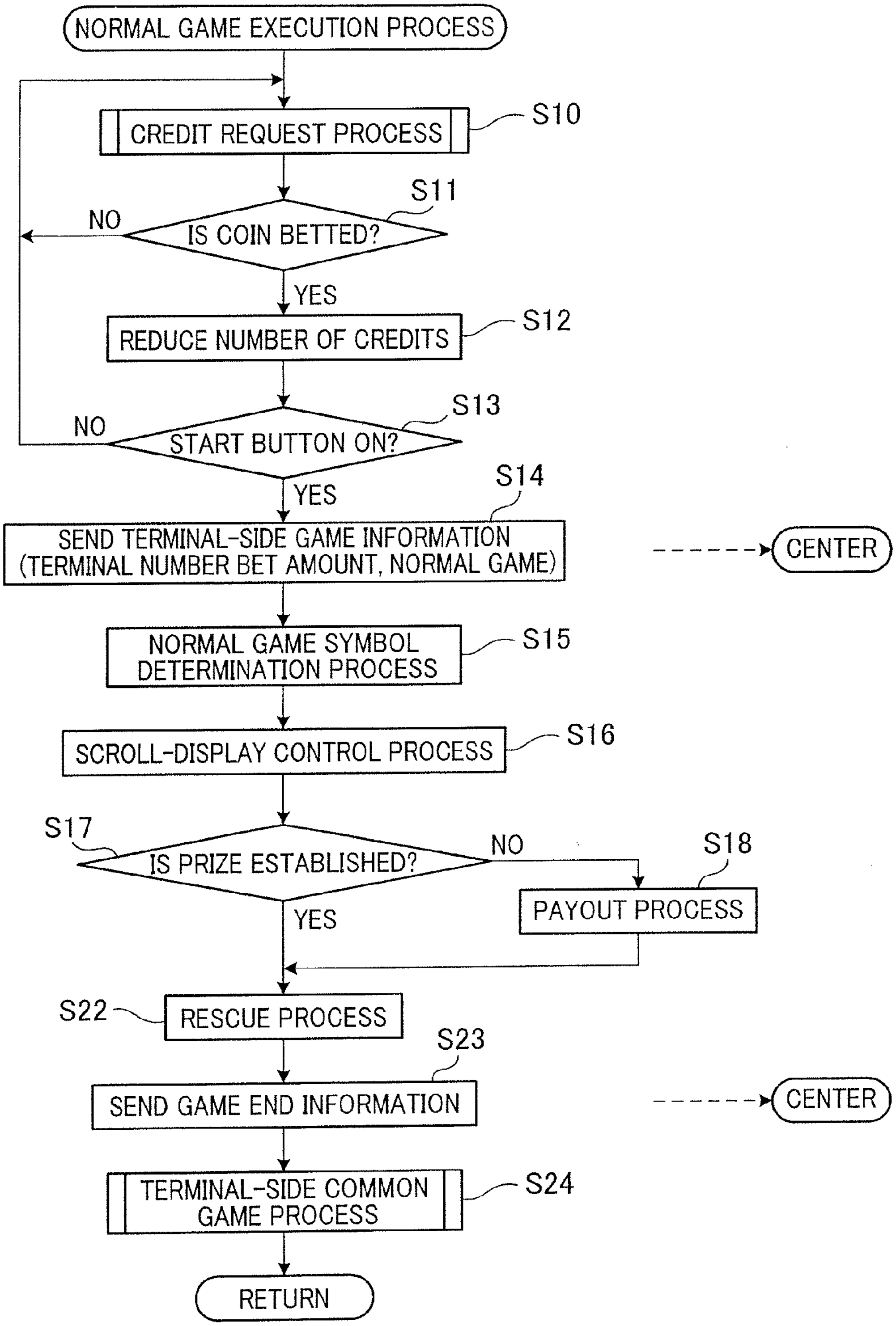

FIG. 94 is a flowchart of a normal game execution process.

Figure 95:
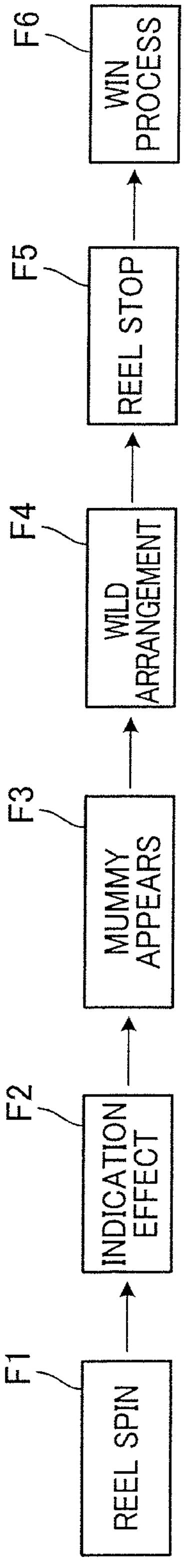

FIG. 95 is an operation flowchart of a mummy wild feature.

Figure 96:
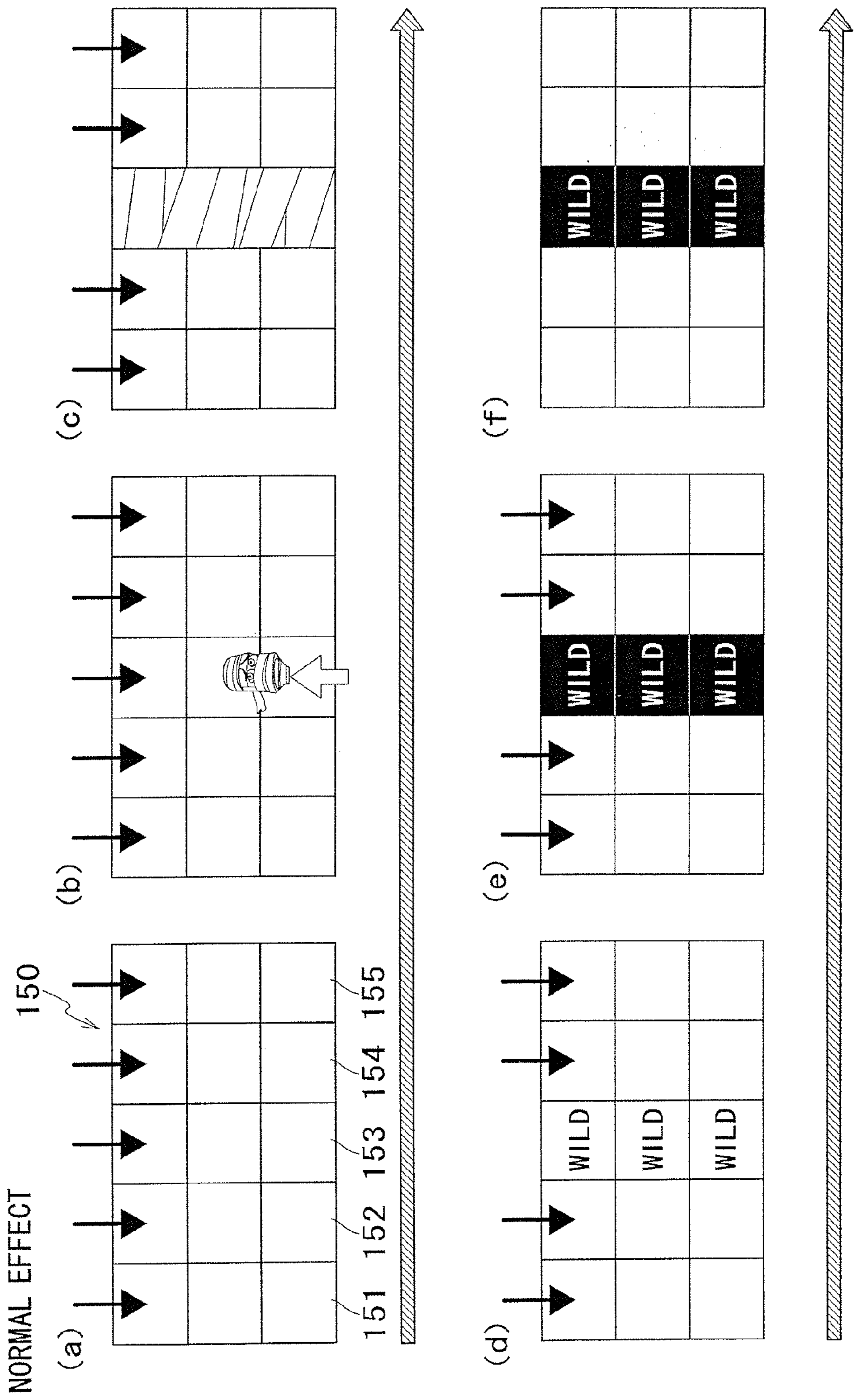

FIG. 96 illustrates an effect of the mummy wild feature.

Figure 97:
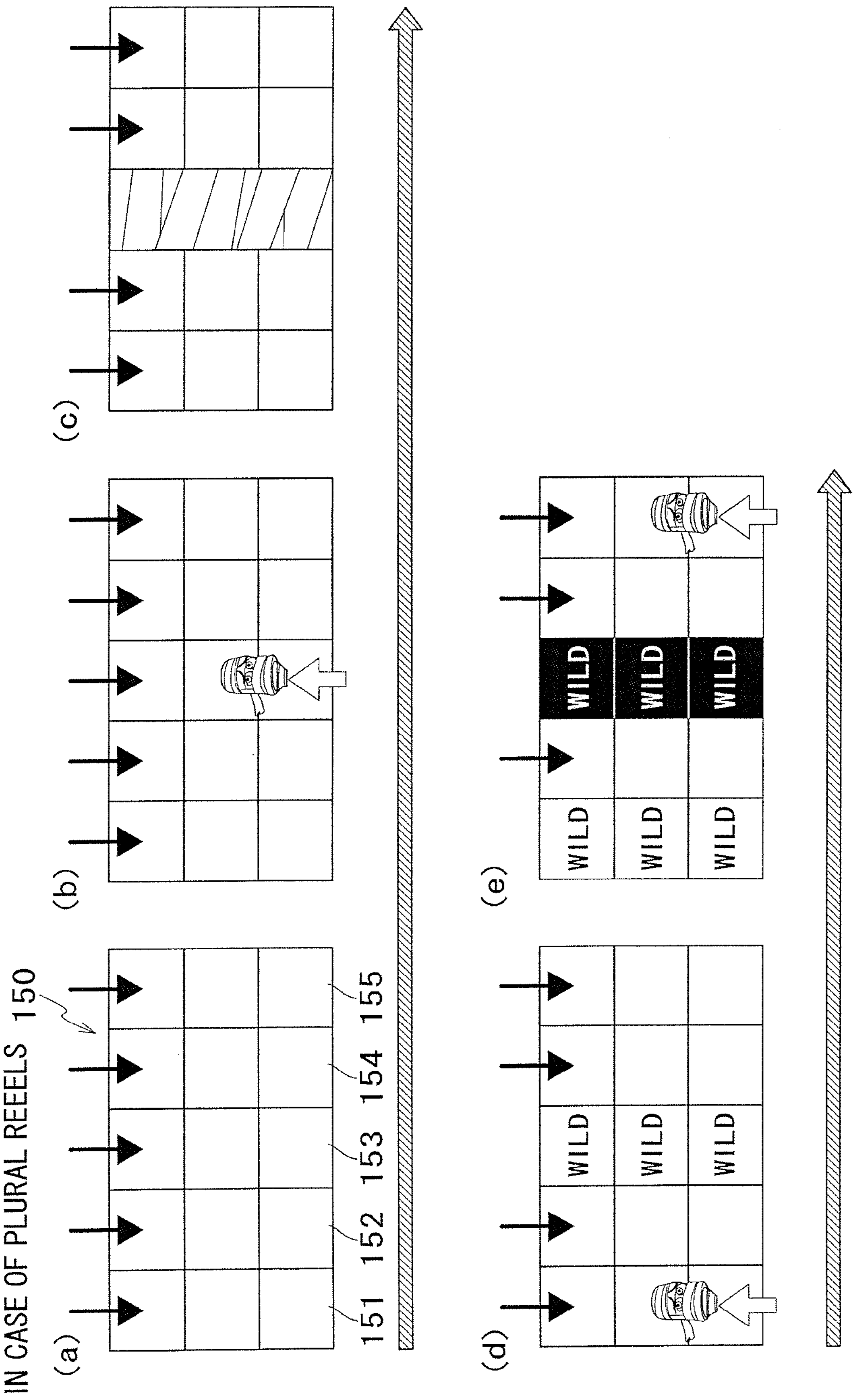

FIG. 97 illustrates an effect of the mummy wild feature.

Figure 98:
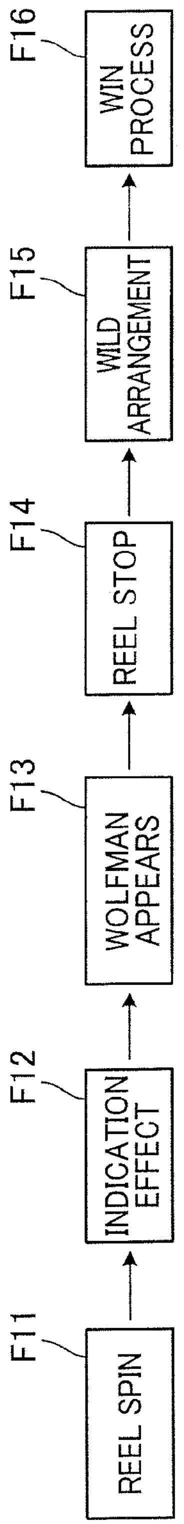

FIG. 98 is an operation flowchart of a wolfman wild feature.

Figure 99:
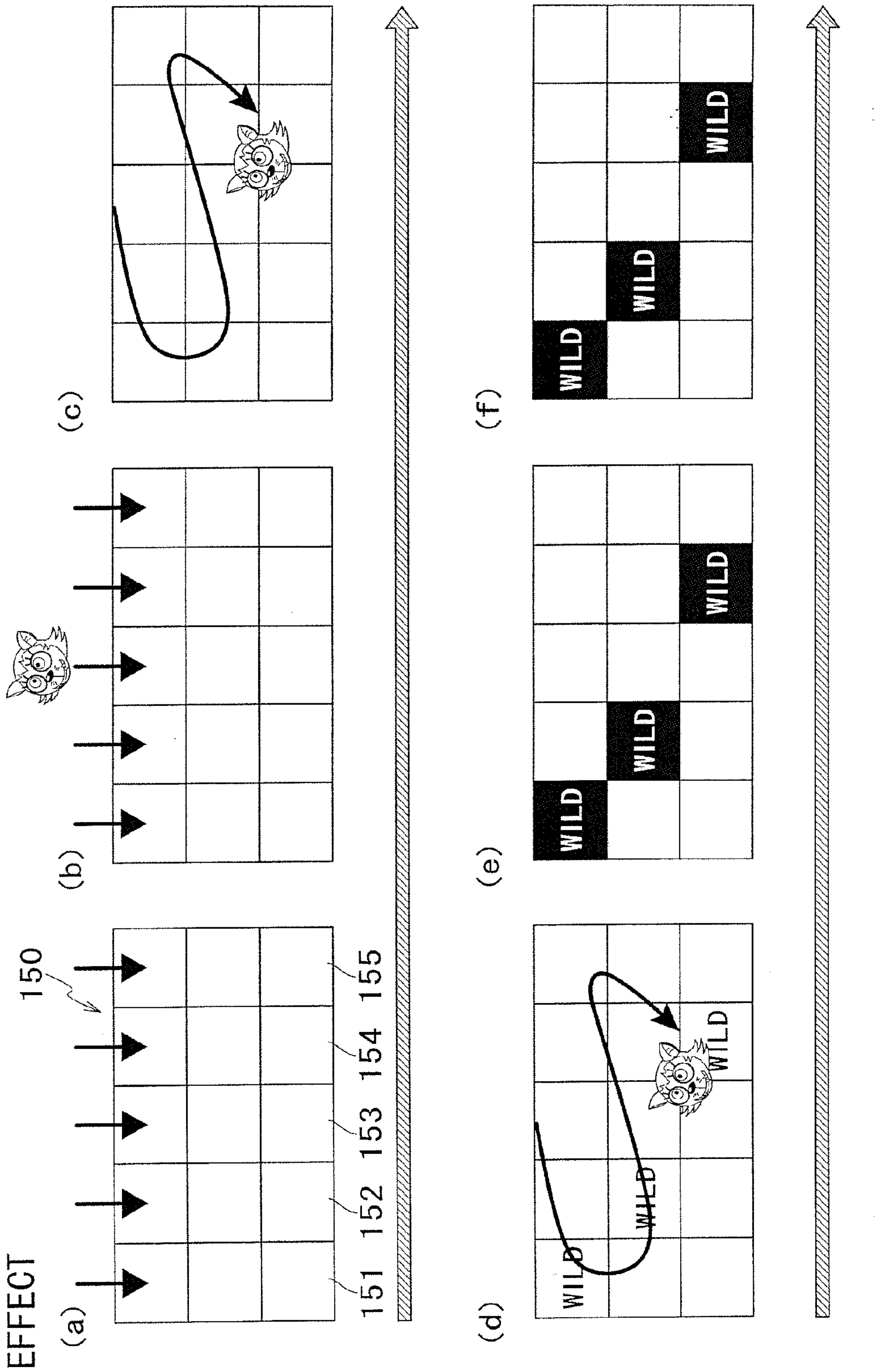

FIG. 99 illustrates an effect of the wolfman wild feature.

Figure 100:
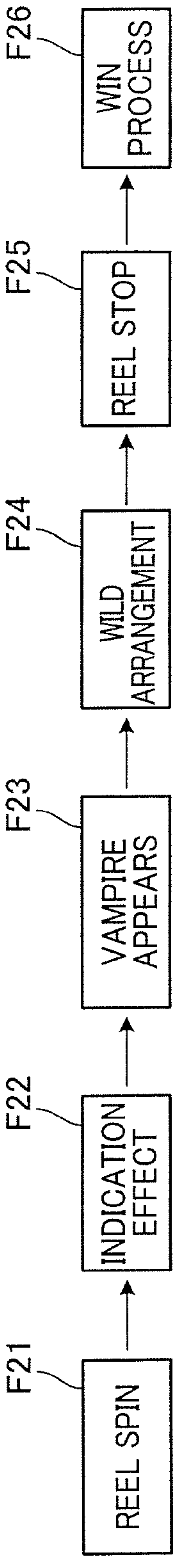

FIG. 100 is an operation flowchart of a vampire wild feature.

Figure 101:
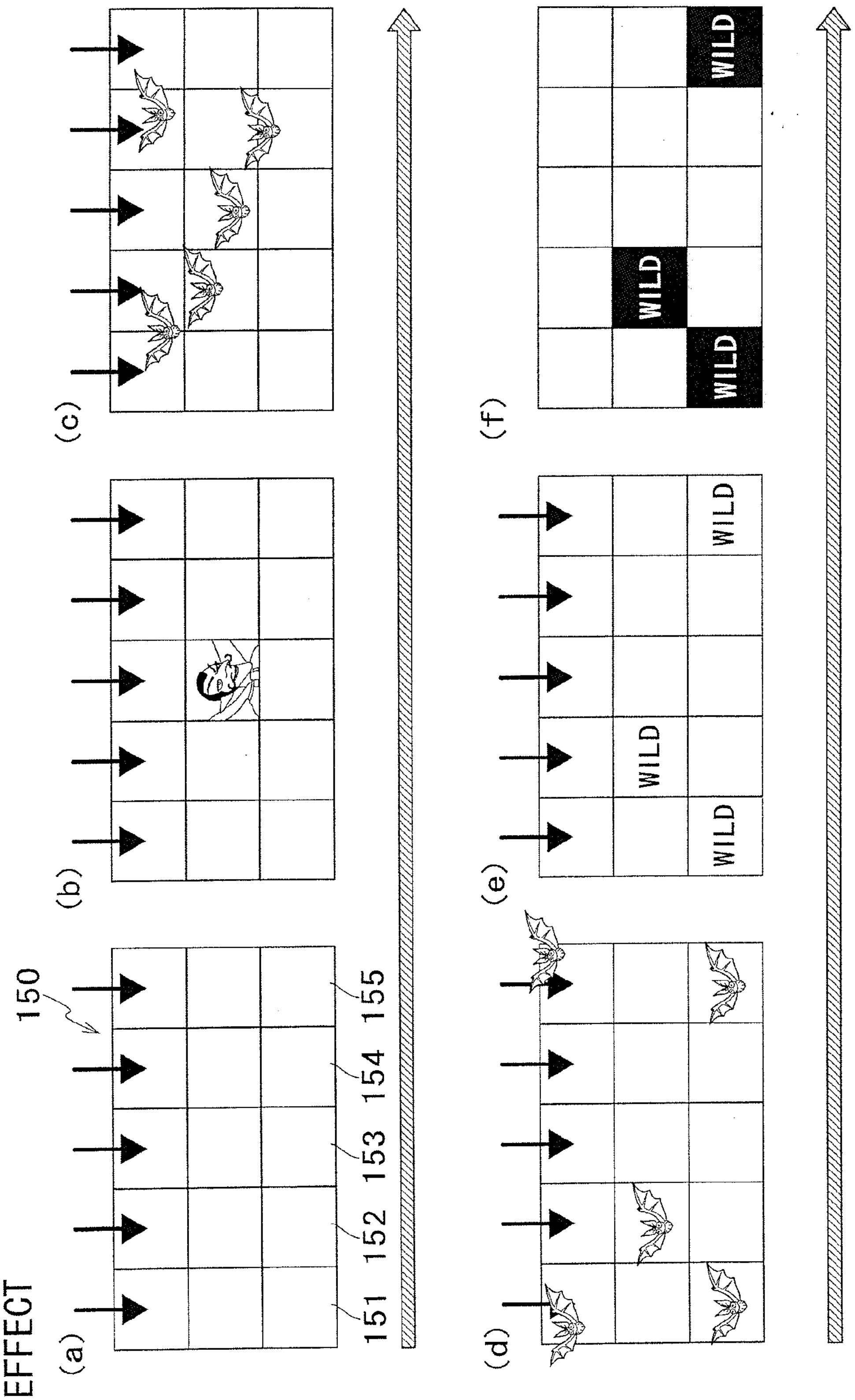

FIG. 101 illustrates an effect of the vampire wild feature.

Figure 102:
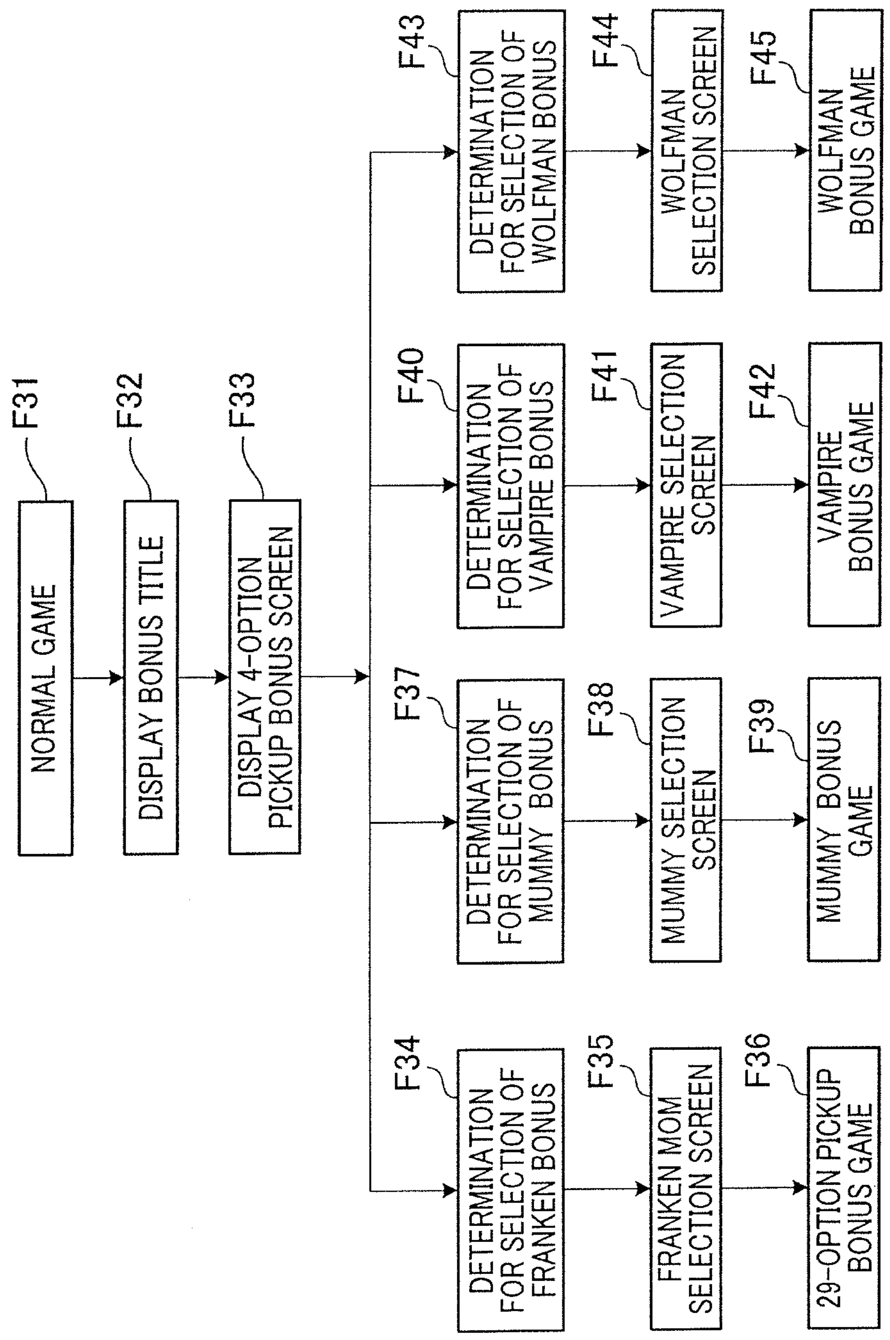

FIG. 102 is a flowchart of a 4-option pickup bonus game.

Figure 103:
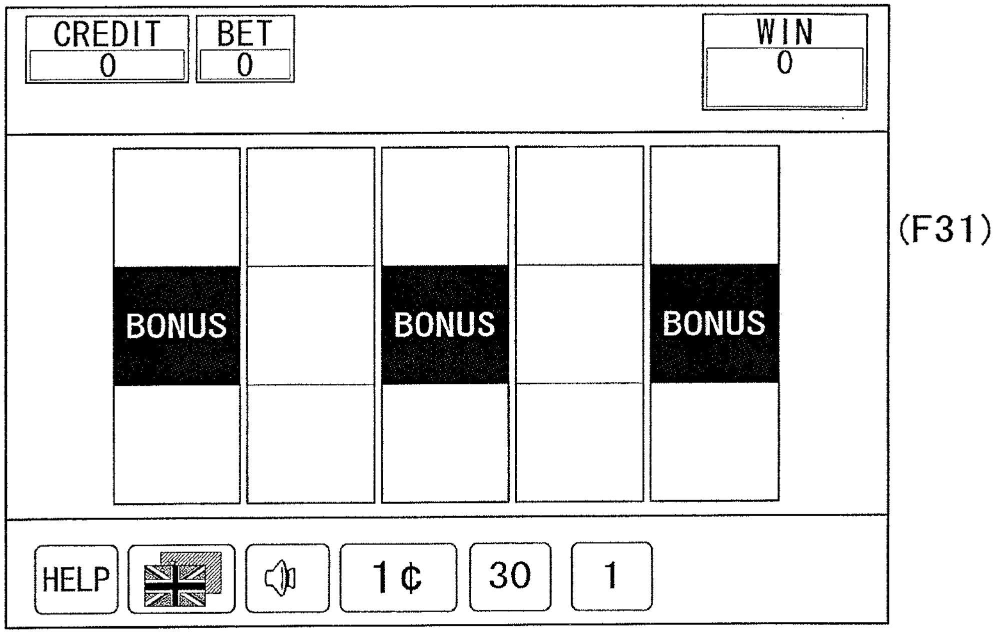

FIG. 103 illustrates operation steps of the 4-option pickup bonus game.

Figure 104:
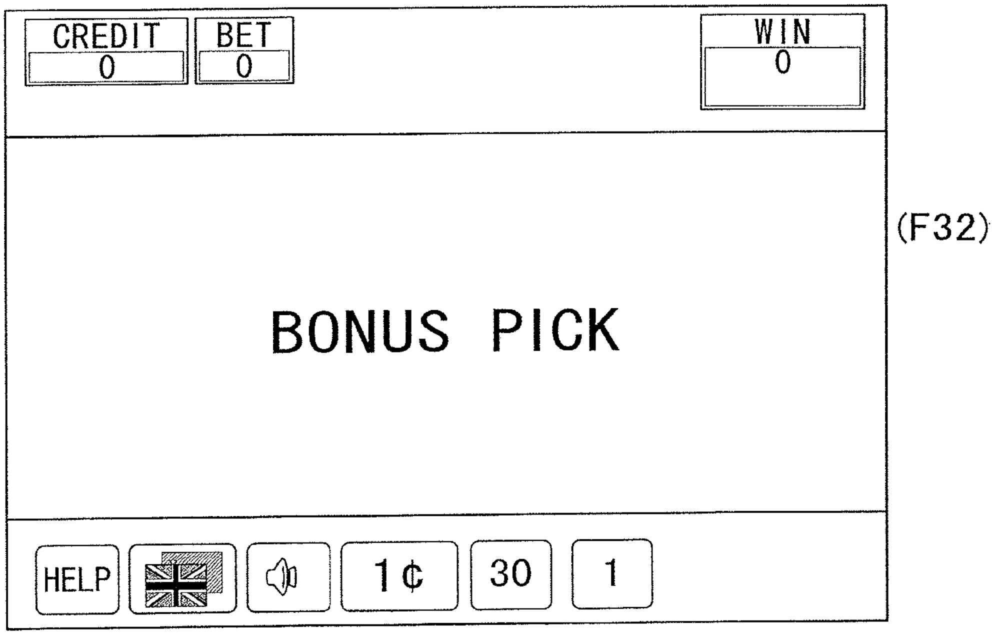

FIG. 104 illustrates operation steps of the 4-option pickup bonus game.

Figure 105:
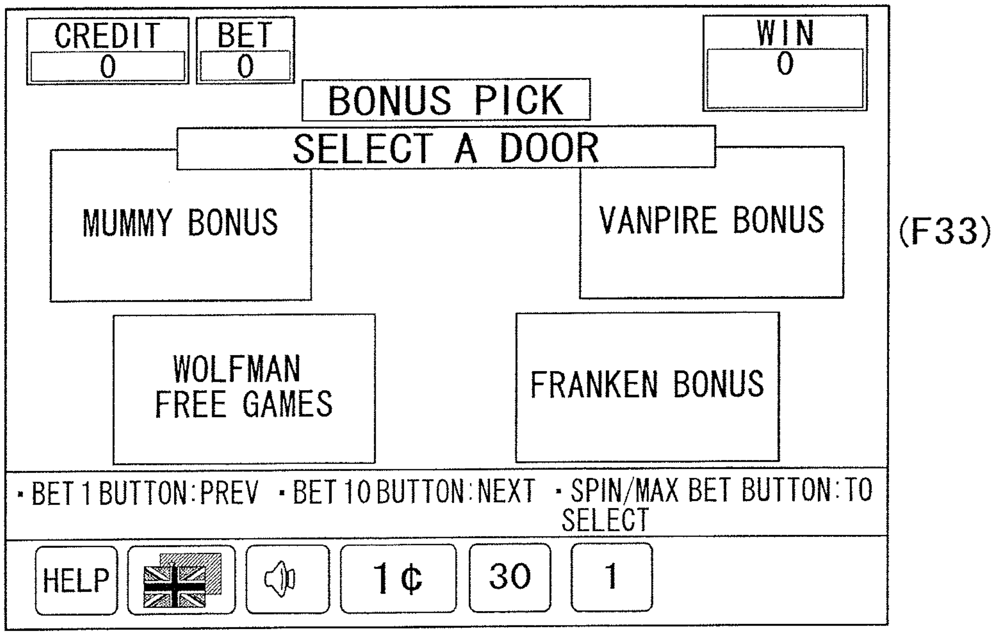

FIG. 105 illustrates operation steps of the 4-option pickup bonus game.

Figure 106:
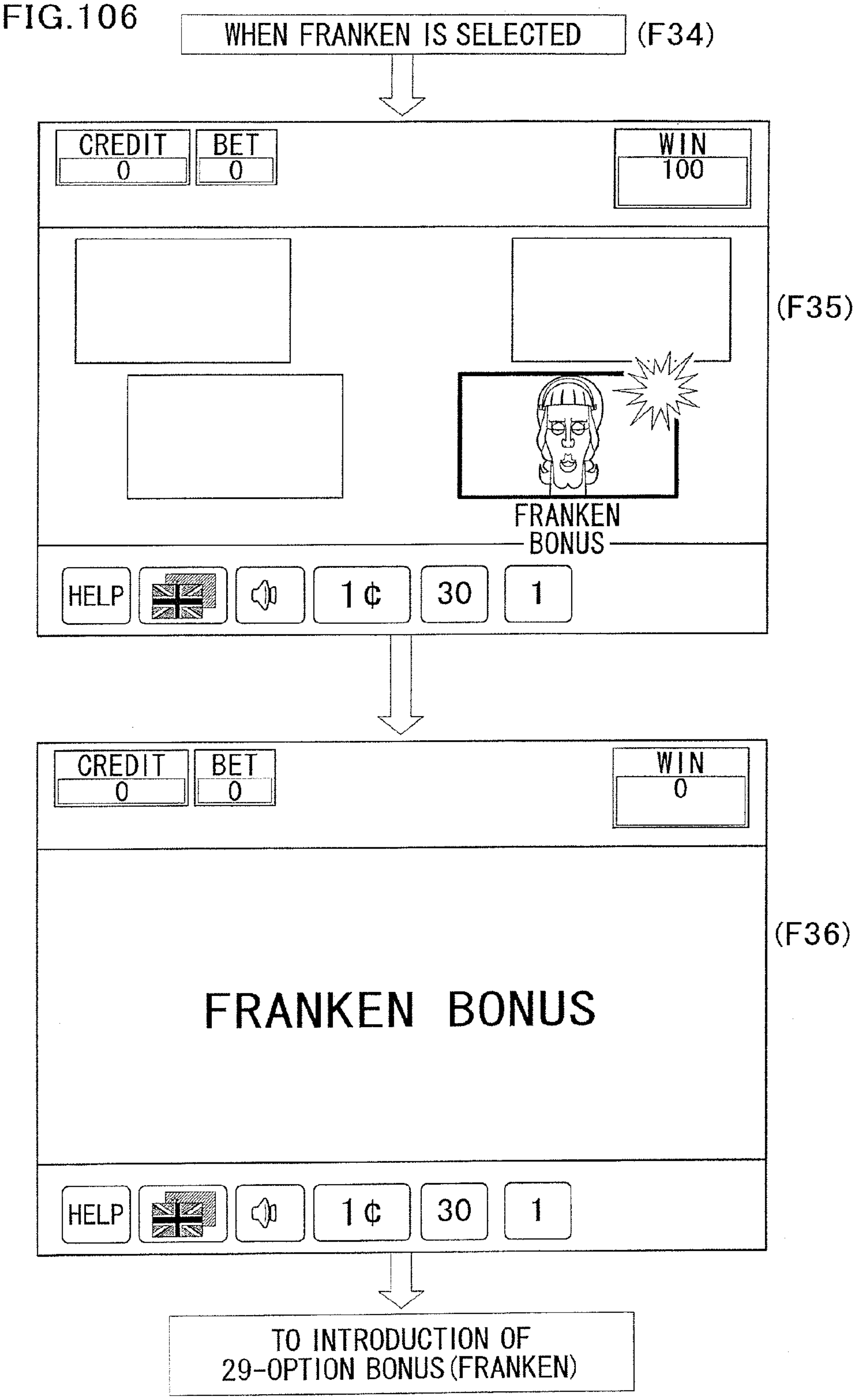

FIG. 106 illustrates operation steps of the 4-option pickup bonus game.

Figure 107:
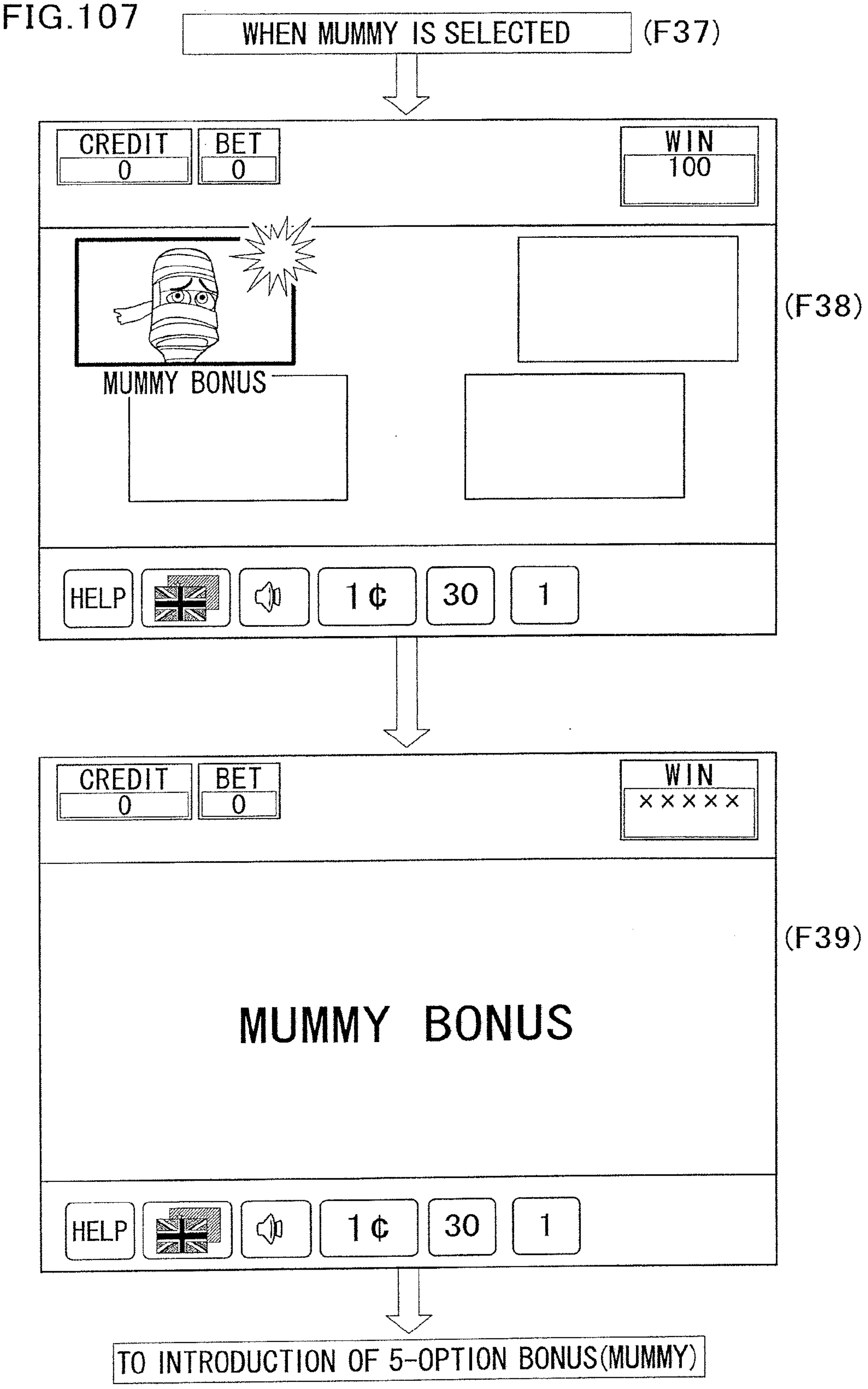

FIG. 107 illustrates operation steps of the 4-option pickup bonus game.

Figure 108:
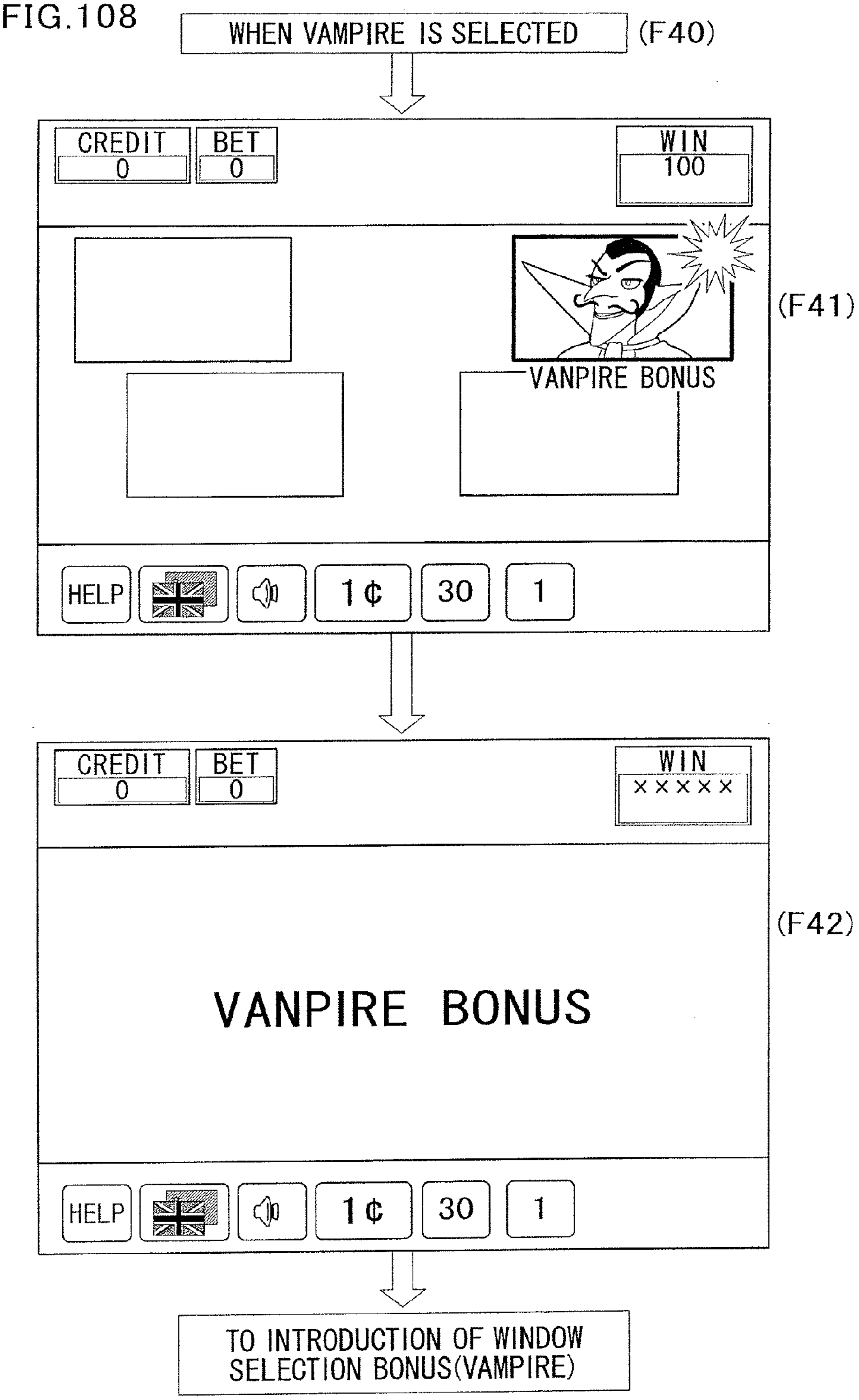

FIG. 108 illustrates operation steps of the 4-option pickup bonus game.

Figure 109:
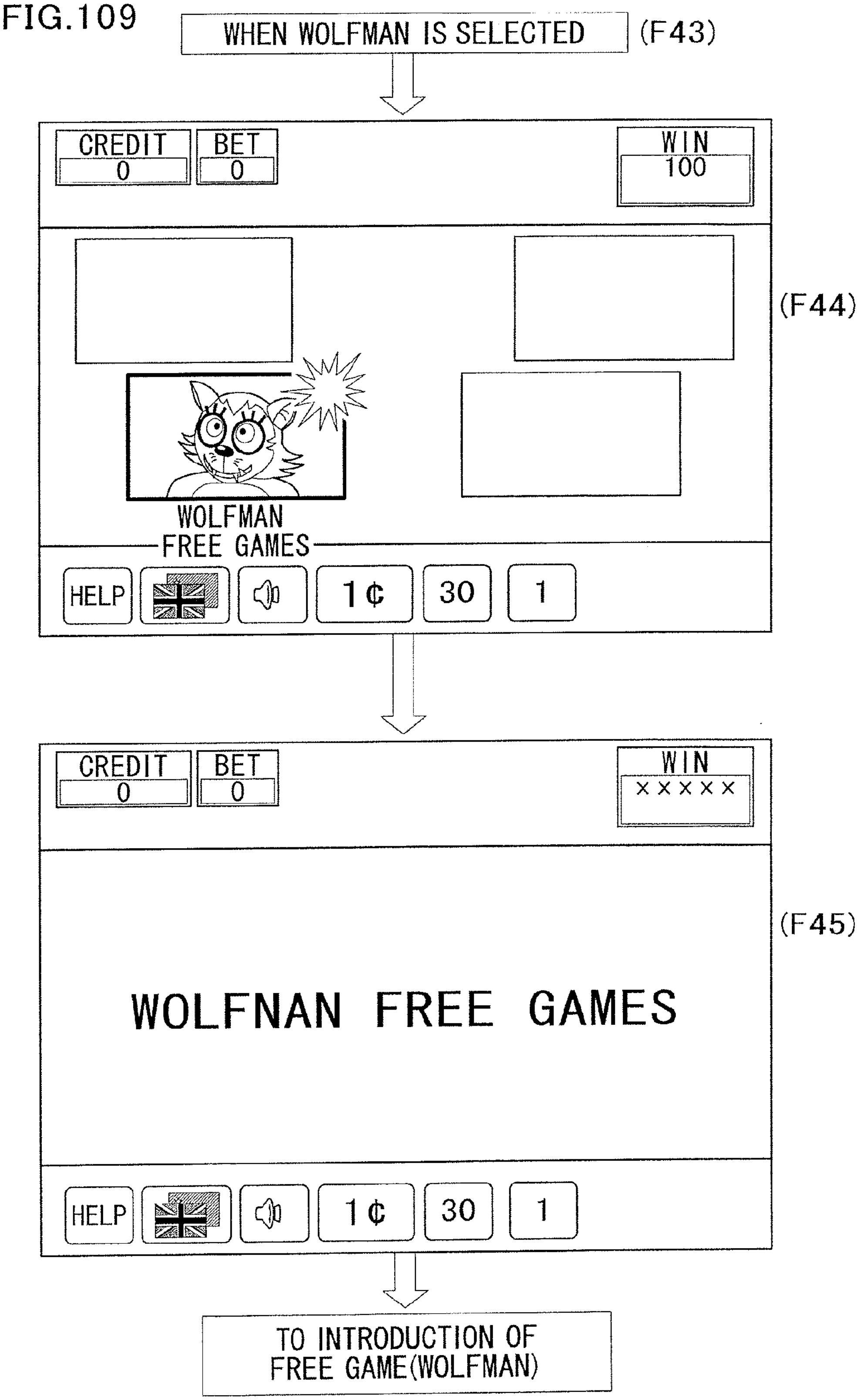

FIG. 109 illustrates operation steps of the 4-option pickup bonus game.

Figure 110:
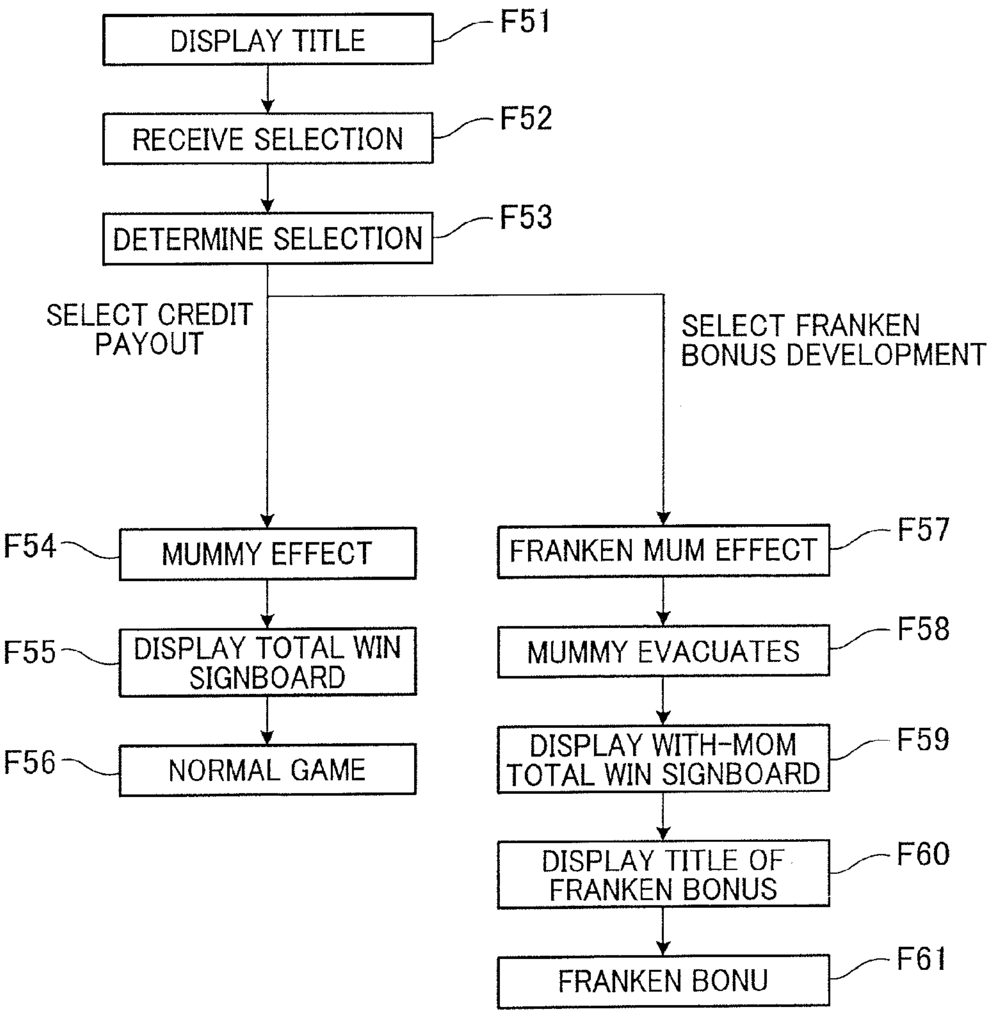

FIG. 110 is a flowchart of the Mummy BONUS game.

Figure 111:
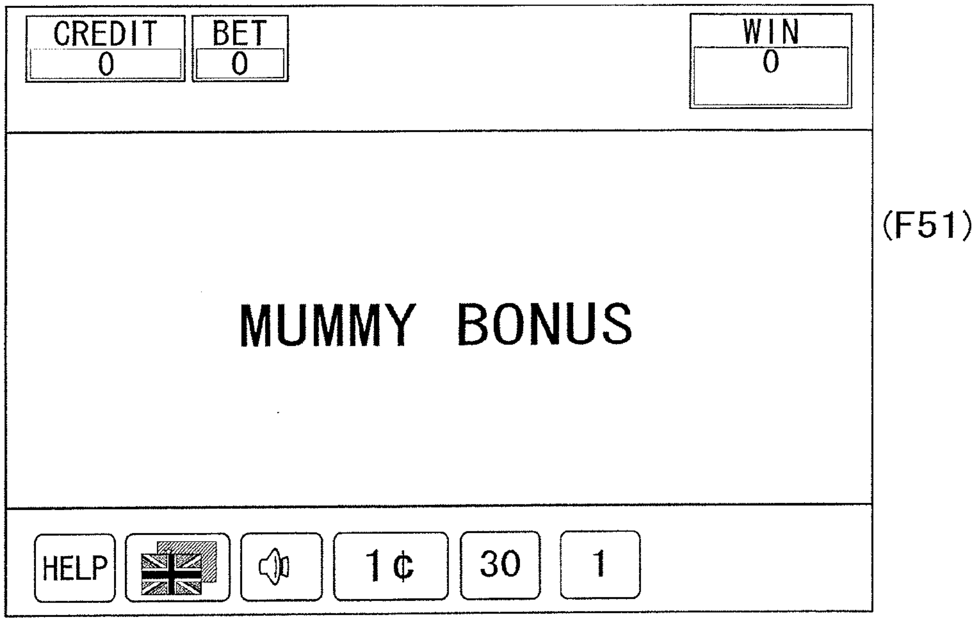

FIG. 111 illustrates operation steps of the Mummy BONUS game.

Figure 112:
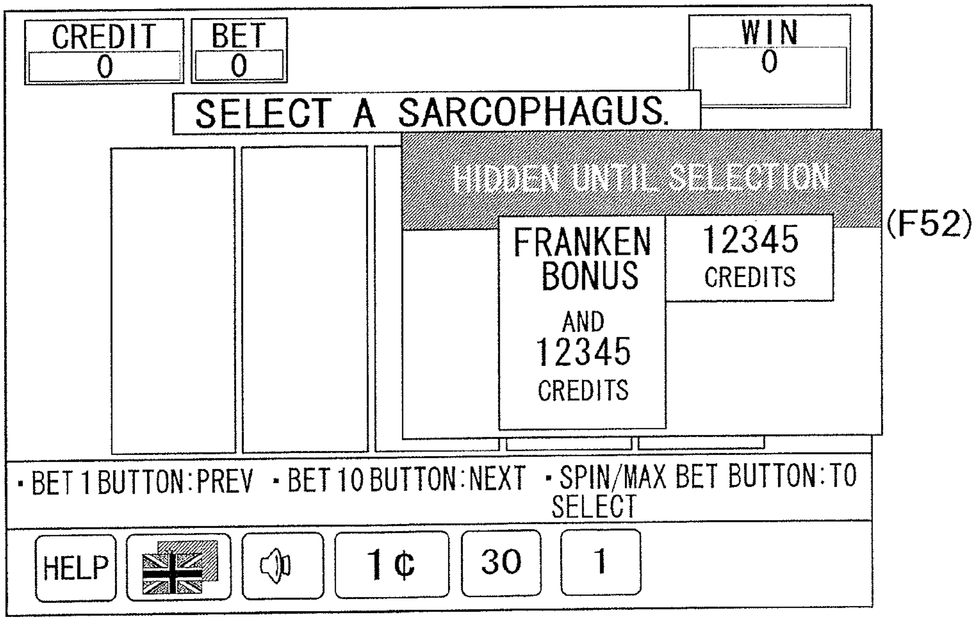

FIG. 112 illustrates operation steps of the Mummy BONUS game.

Figure 113:
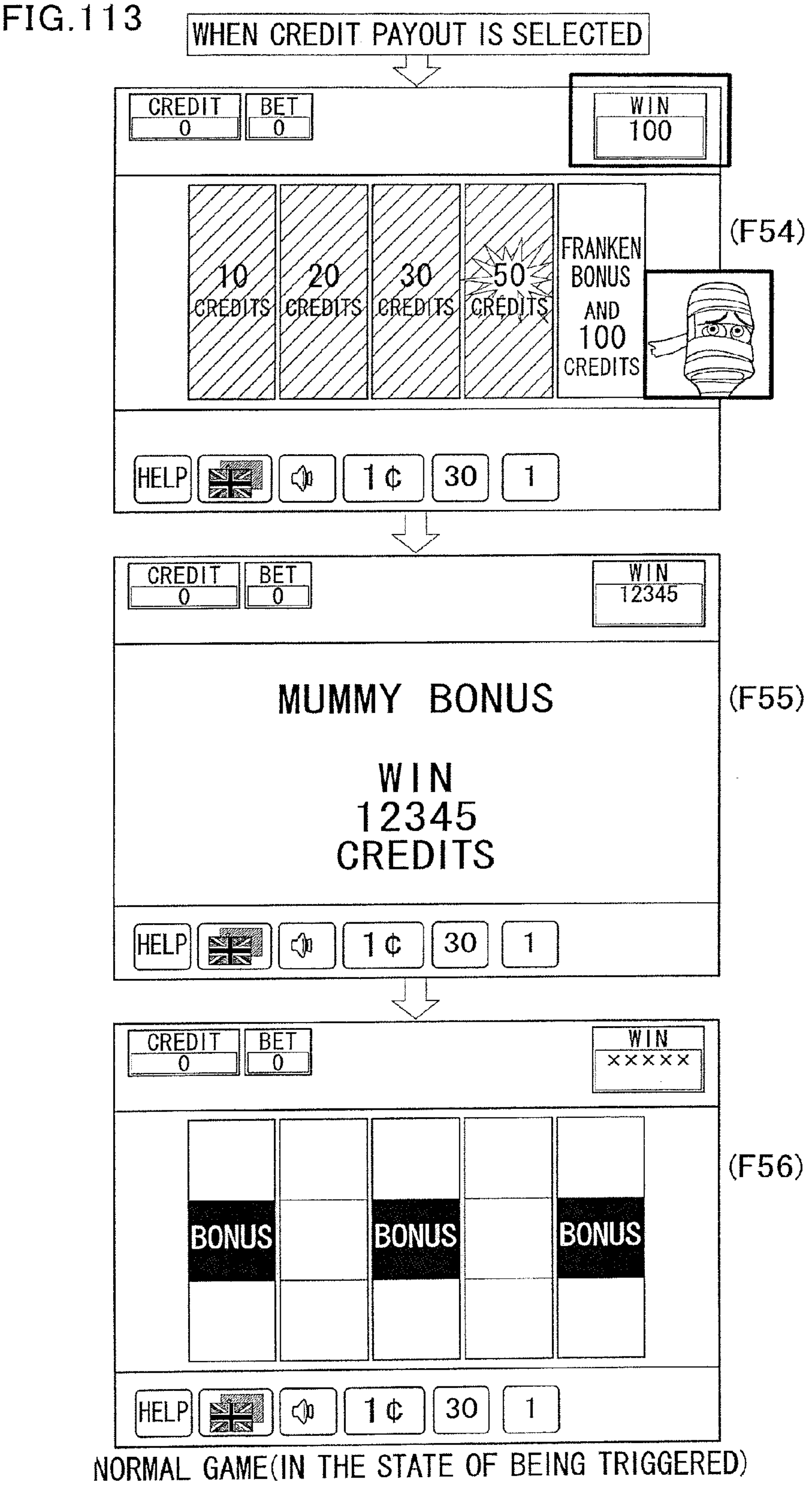

FIG. 113 illustrates operation steps of the Mummy BONUS game.

Figure 114:
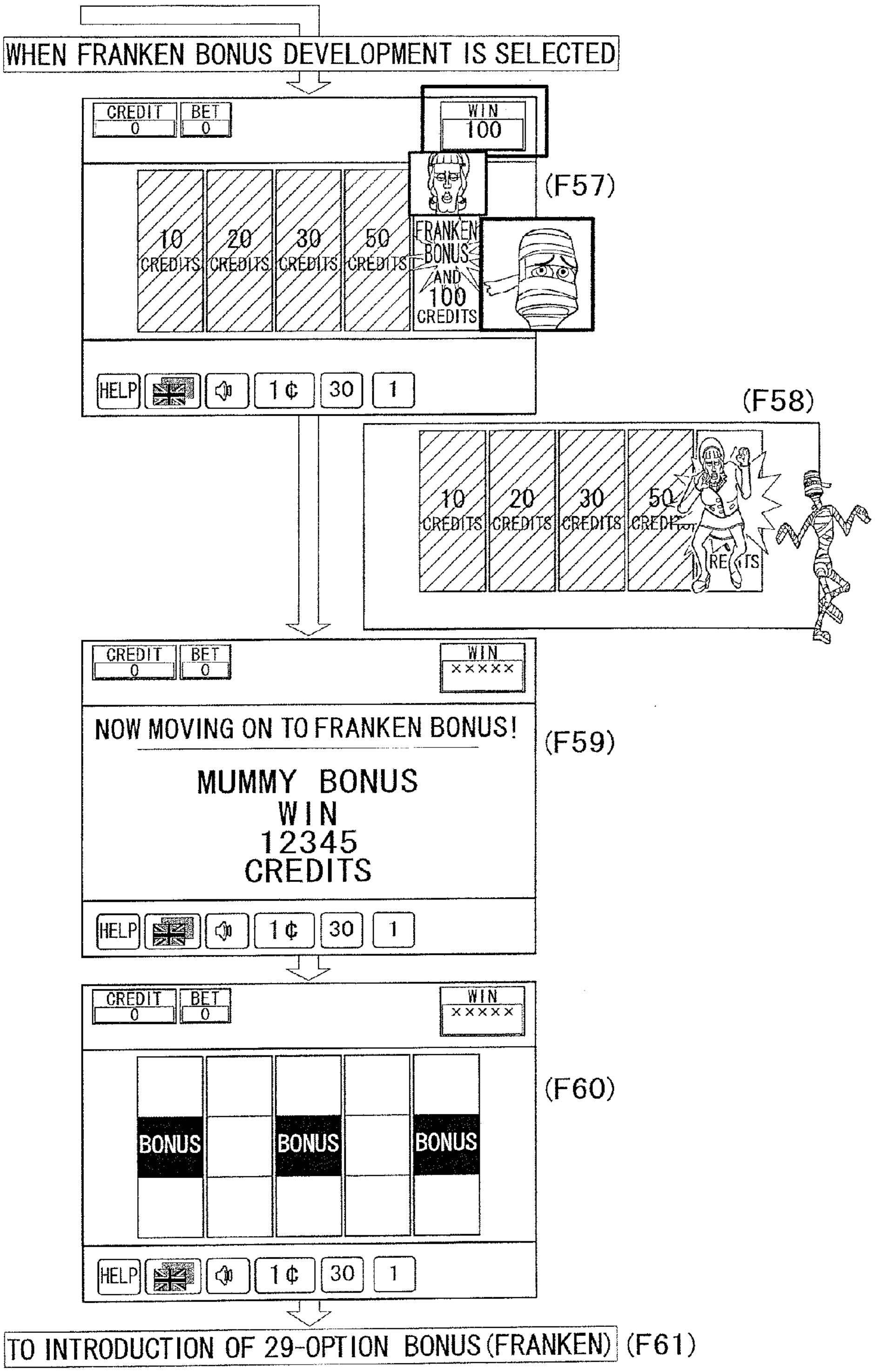

FIG. 114 illustrates operation steps of the Mummy BONUS game.

Figure 115:
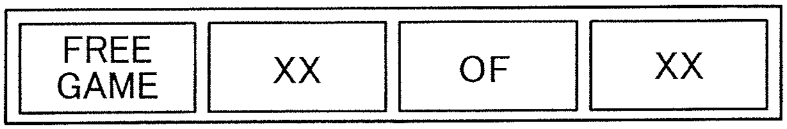

FIG. 115 illustrates a free game counter.

Figure 116:
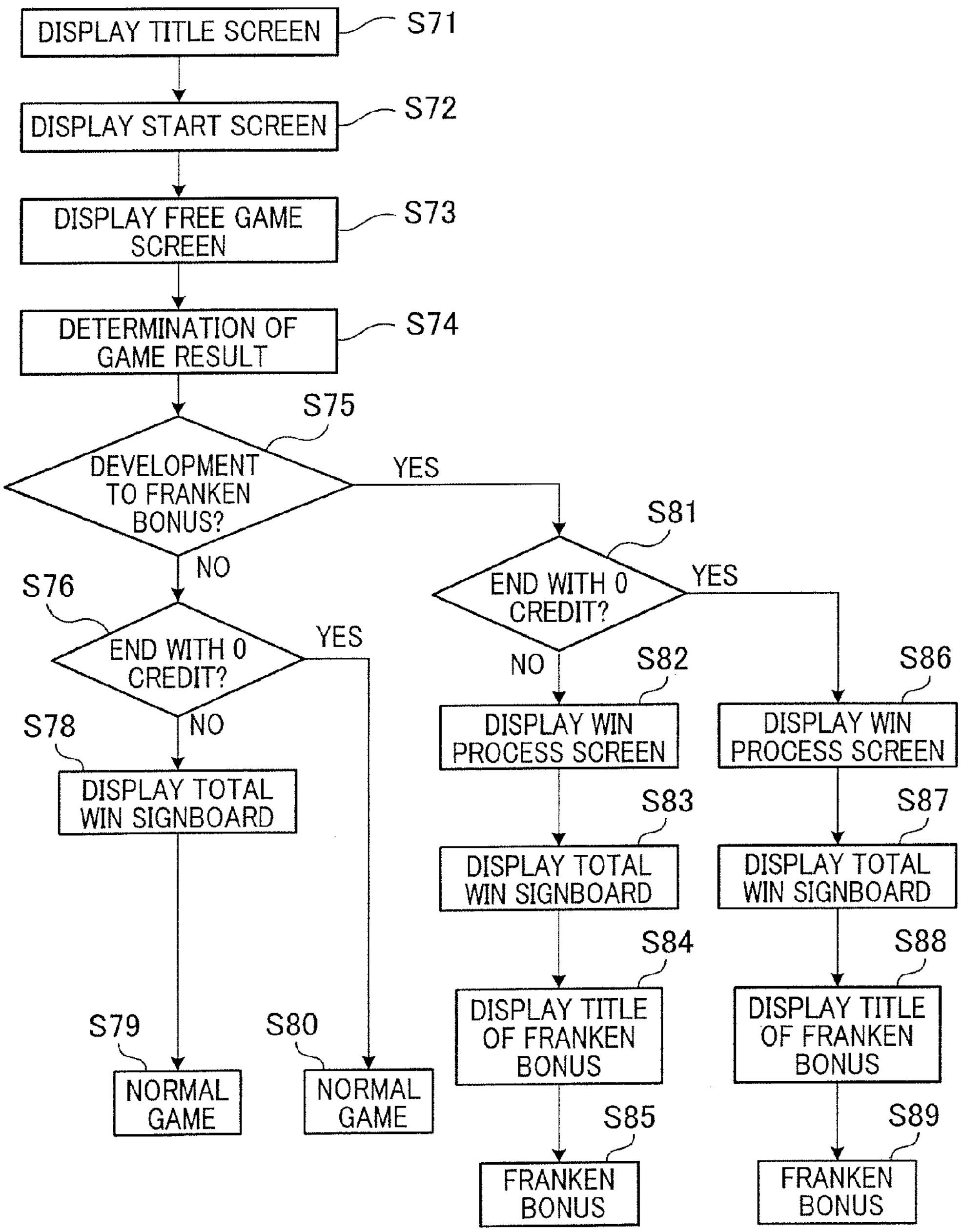

FIG. 116 is a flowchart of a Wolfman BONUS game.

Figure 117:
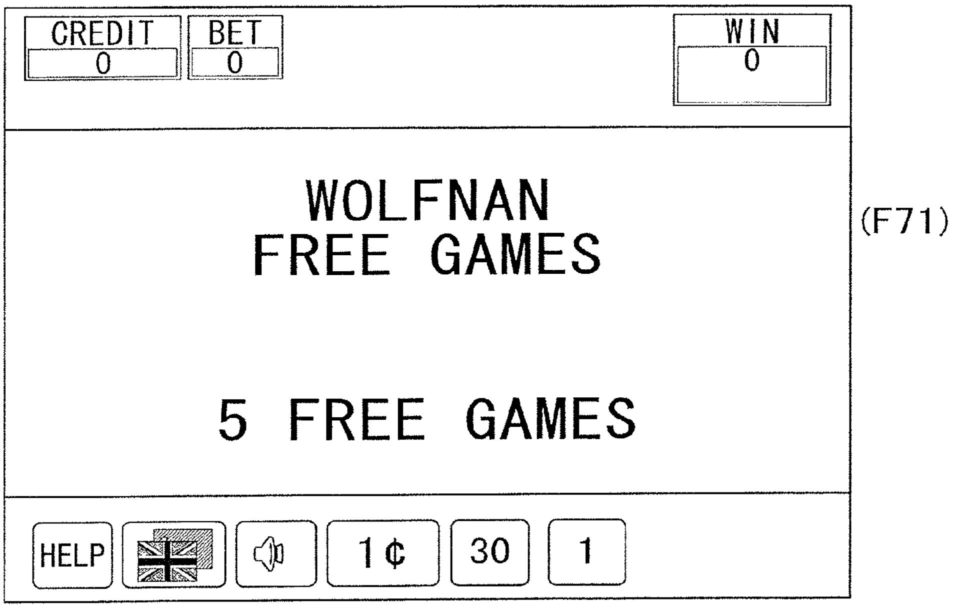

FIG. 117 illustrates operation steps of the Wolfman BONUS.

Figure 118:

FIG. 118 illustrates operation steps of the Wolfman BONUS.

Figure 119:
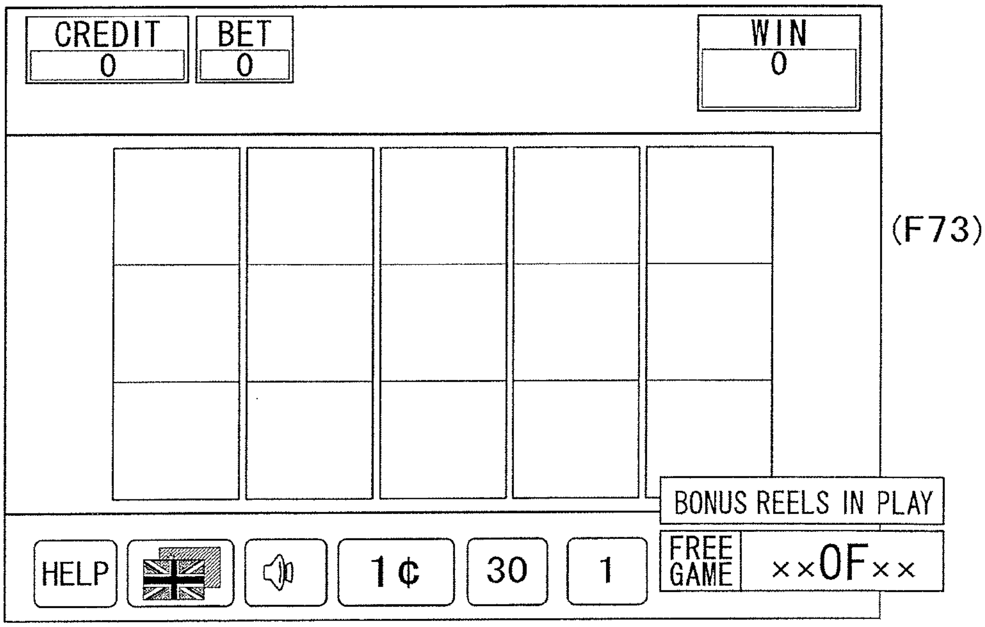

FIG. 119 illustrates operation steps of the Wolfman BONUS.

Figure 120:
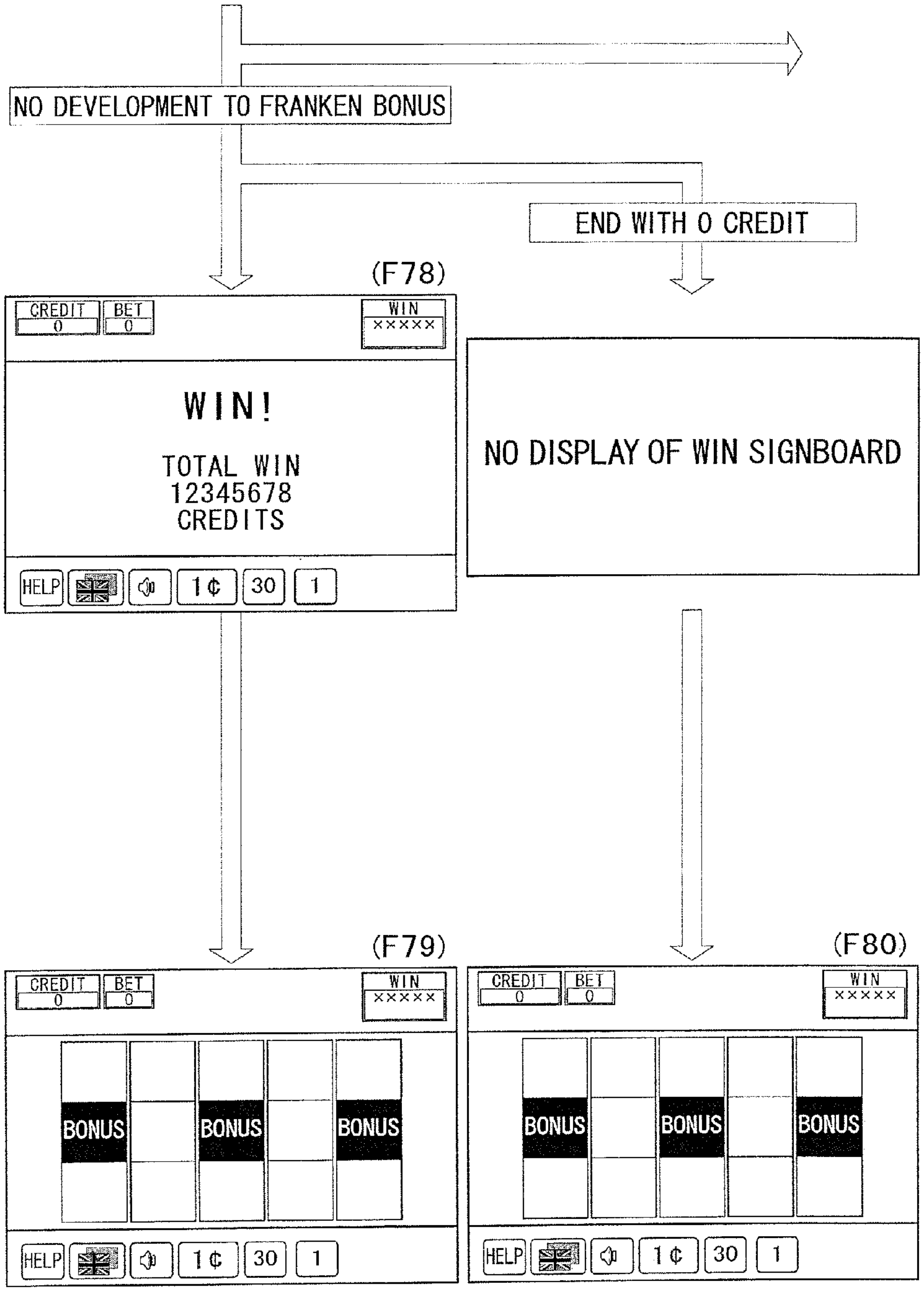

FIG. 120 illustrates operation steps of the Wolfman BONUS.

Figure 121:
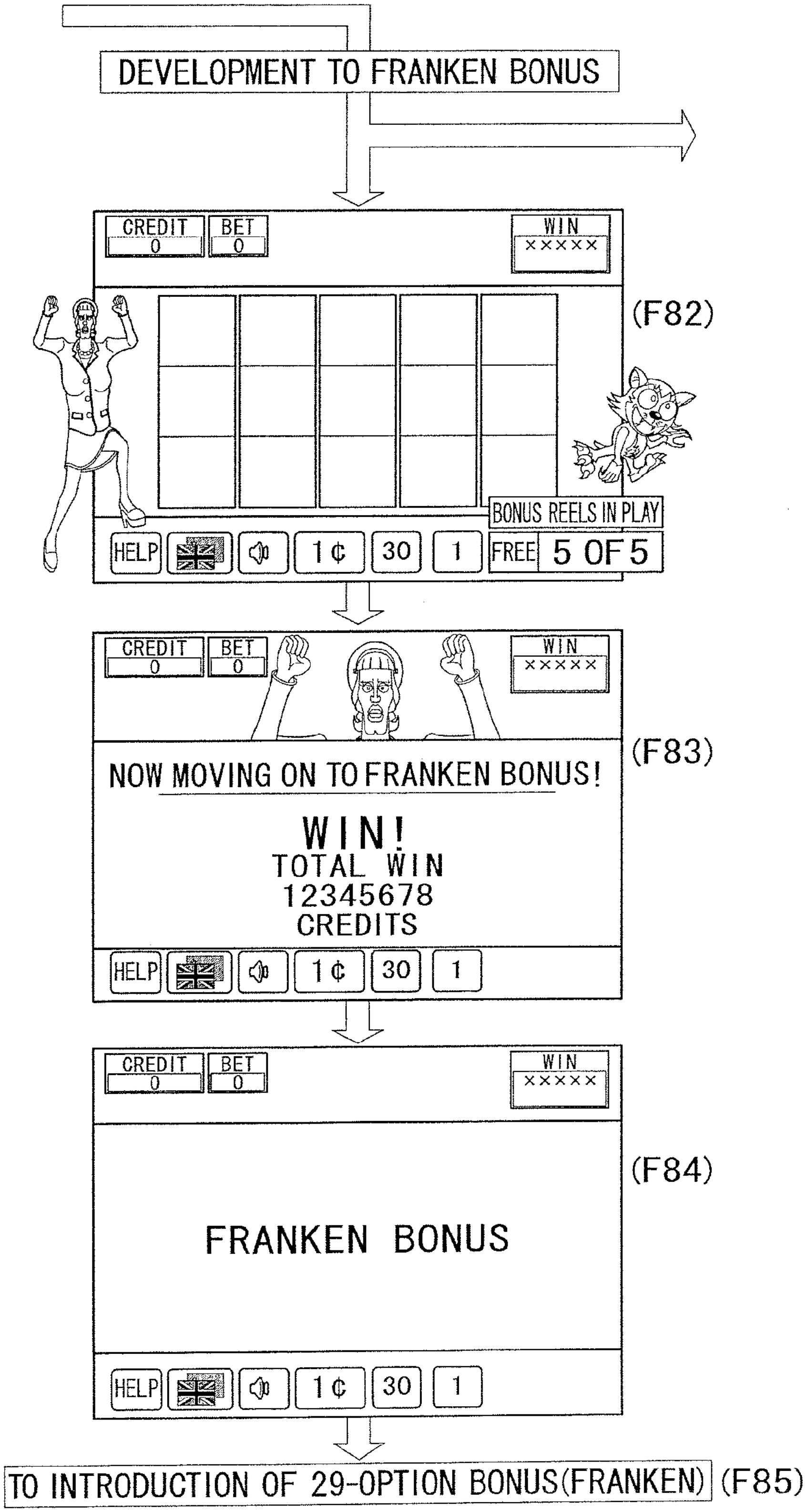

FIG. 121 illustrates operation steps of the Wolfman BONUS.

Figure 122:
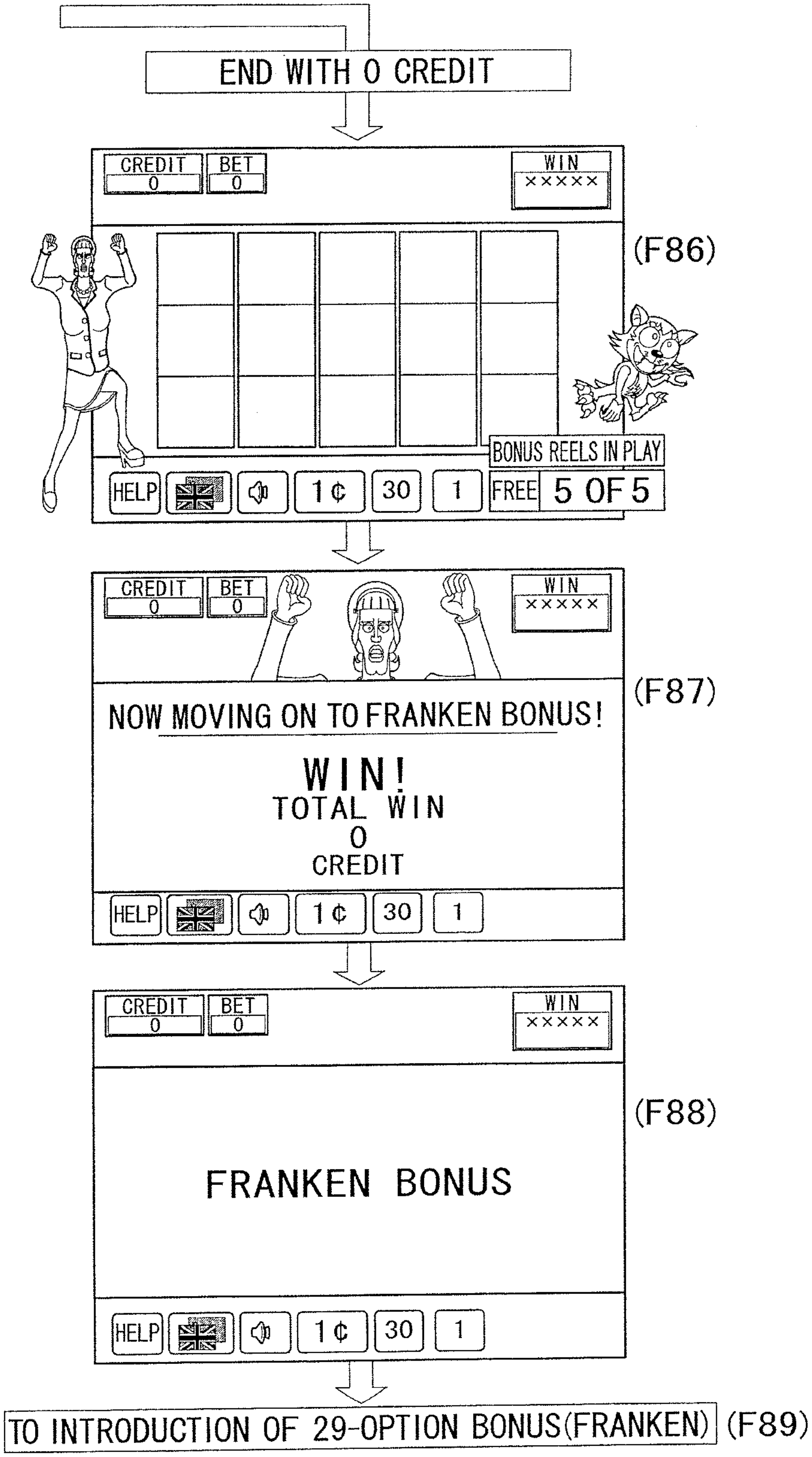

FIG. 122 illustrates operation steps of the Wolfman BONUS.

Figure 123:
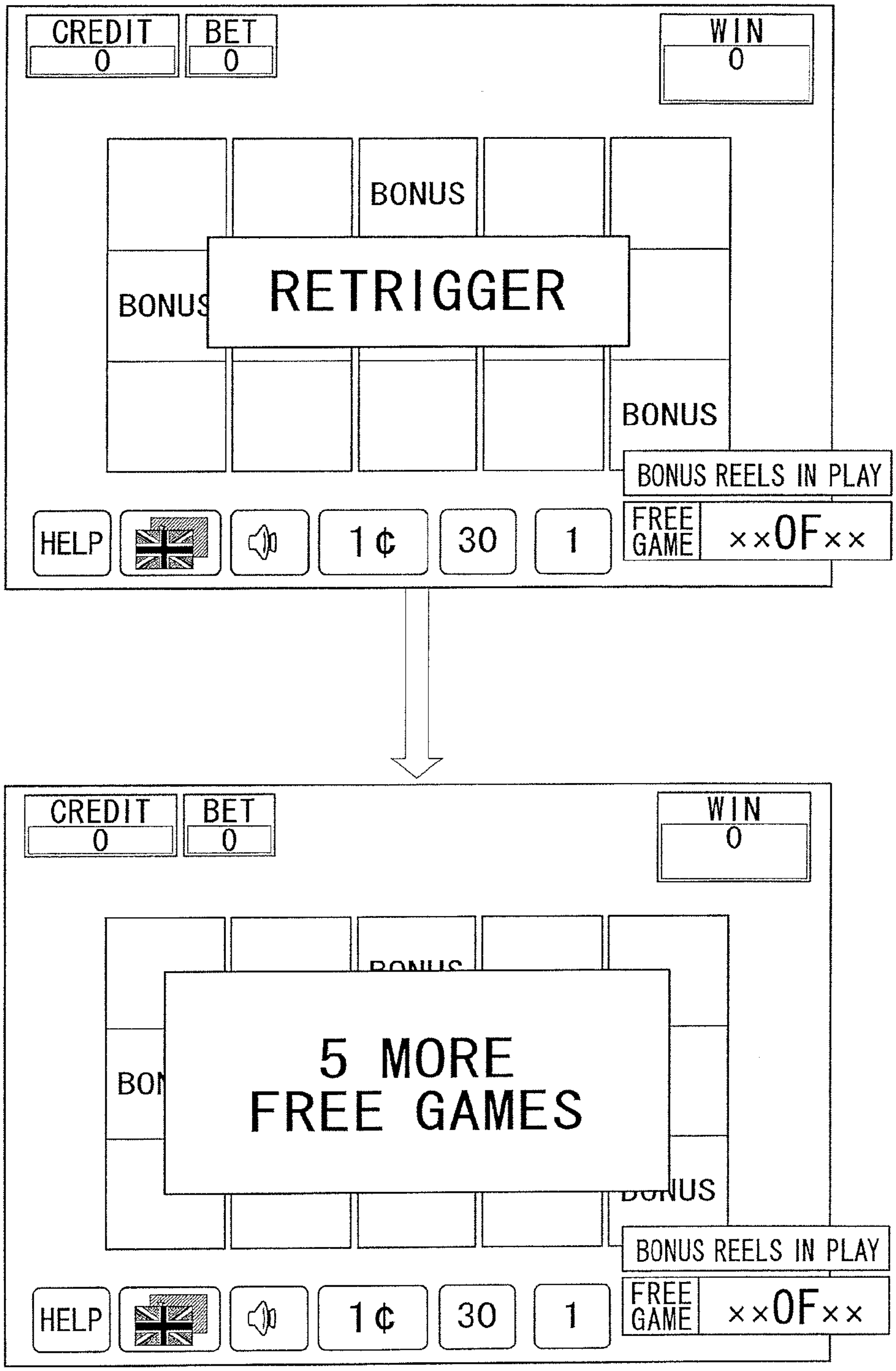

FIG. 123 illustrates operation steps of the Wolfman BONUS.

Figure 124:
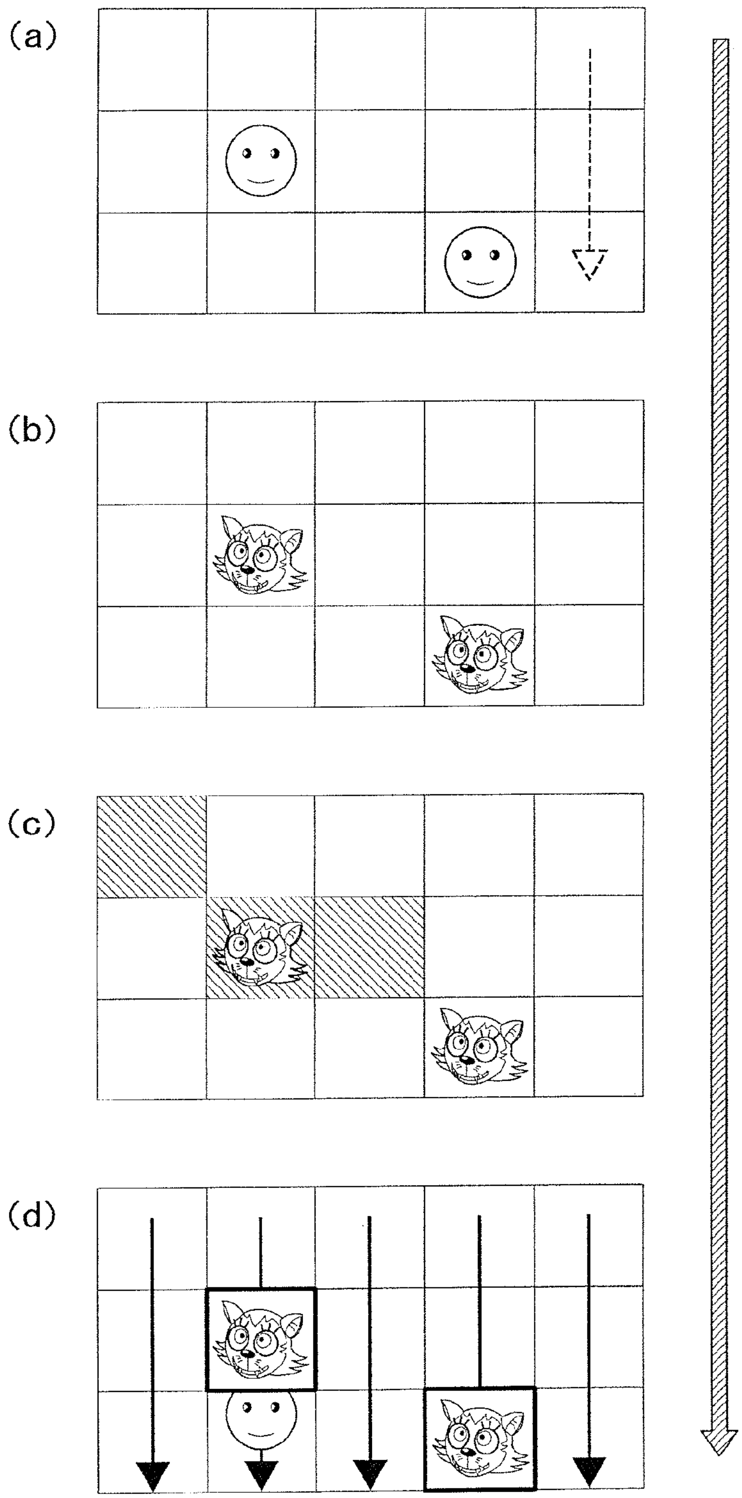

FIG. 124 illustrates fixed wild and related processes.

Figure 125:
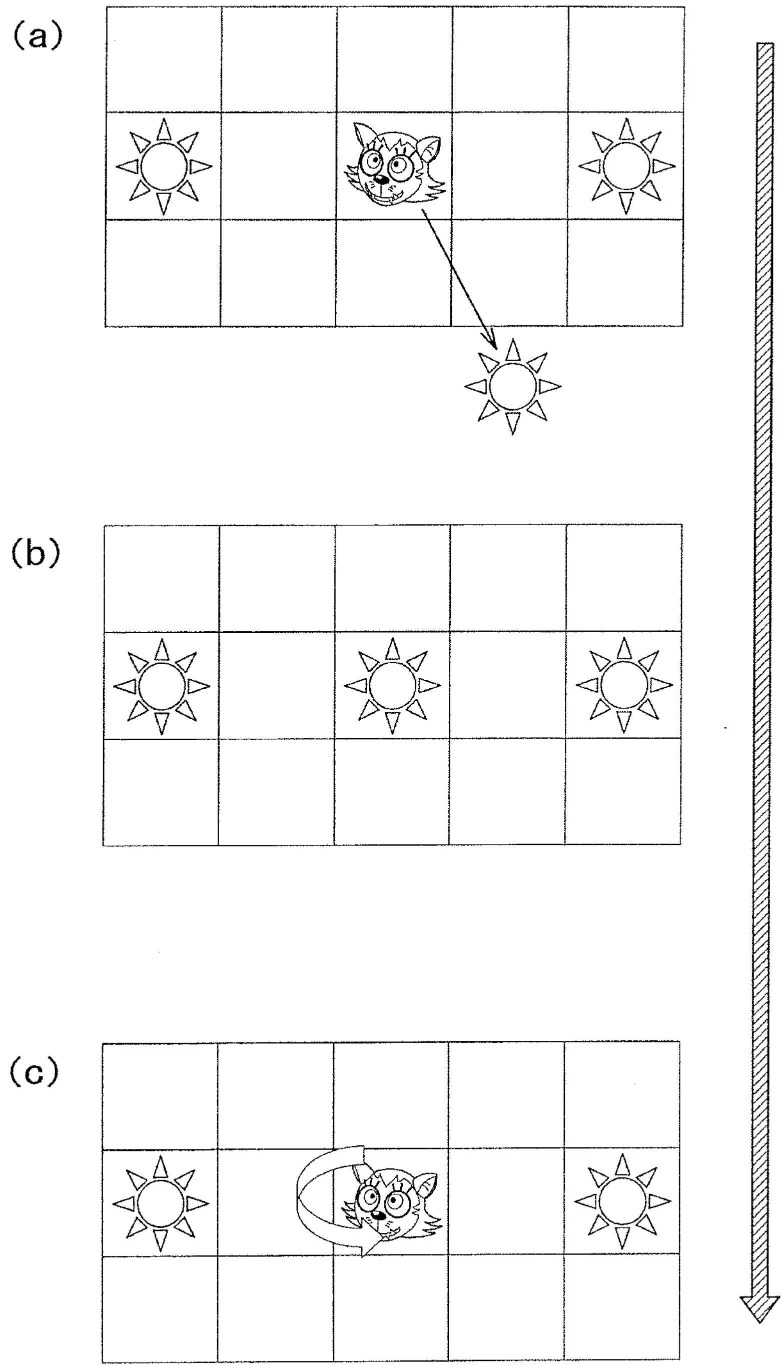

FIG. 125 illustrates fixed wild and related processes.

FIG. 126A shows a free game development indication effect table.

FIG. 126B shows the free game development indication effect table.

FIG. 126C shows the free game development indication effect table.

Figure 127:
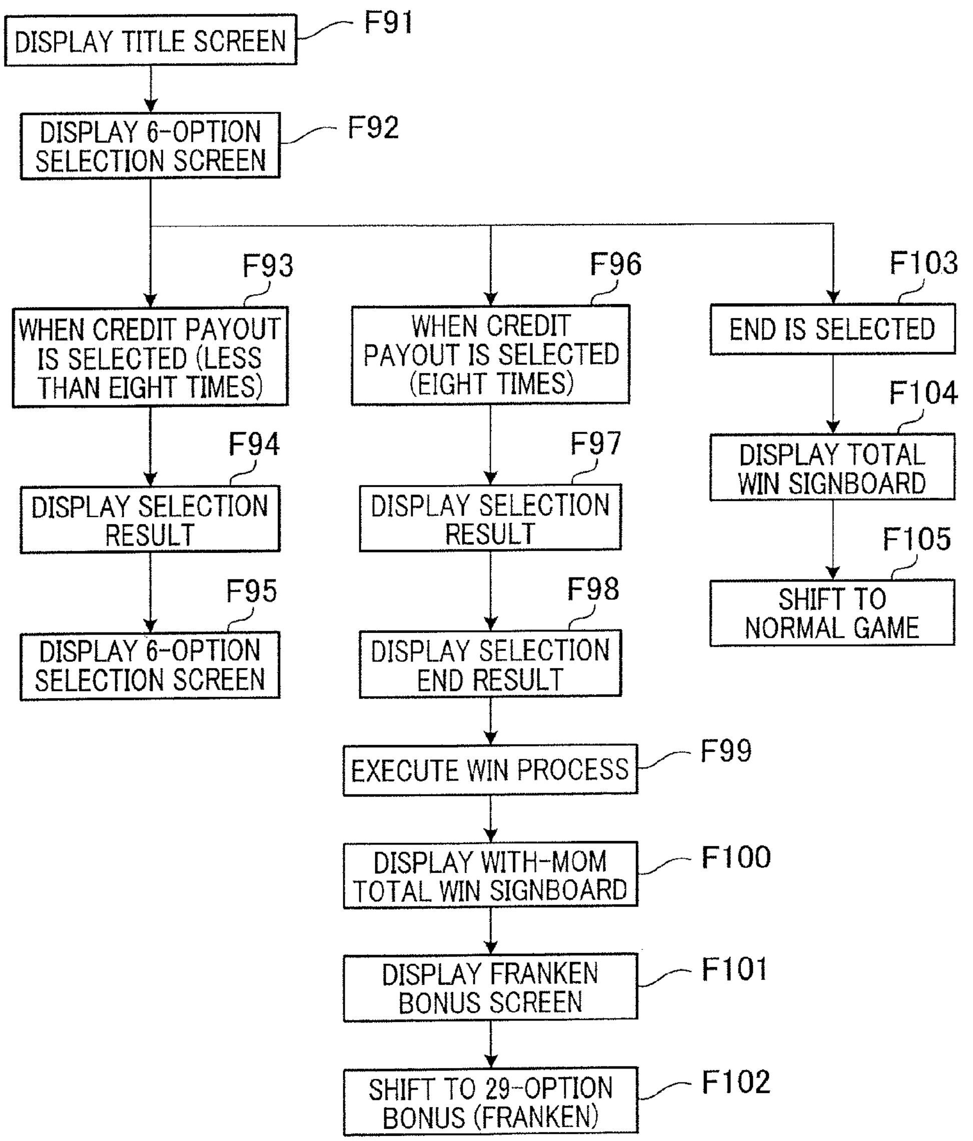

FIG. 127 is a flowchart of a Vampire BONUS game.

Figure 128:
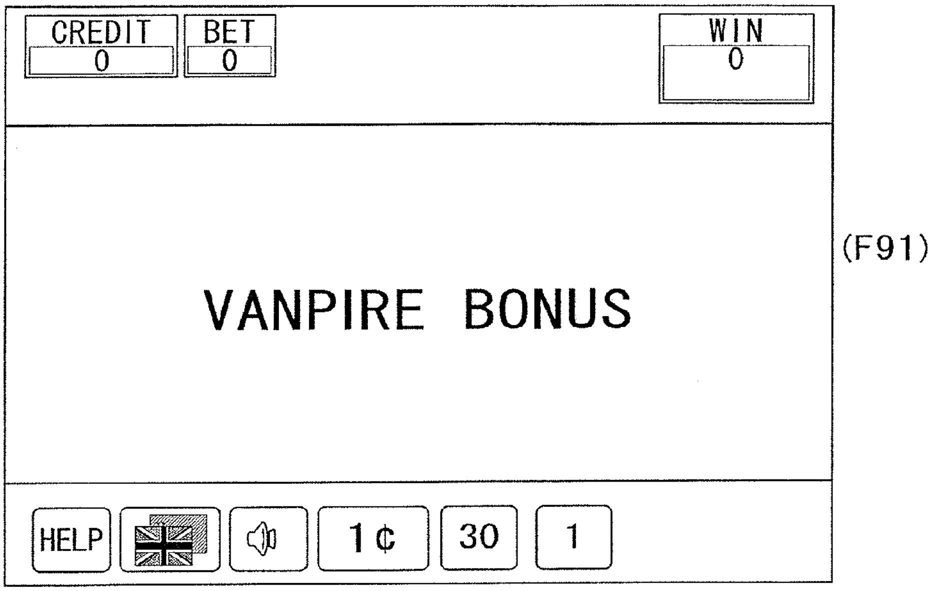

FIG. 128 illustrates operation steps of the Vampire BONUS.

Figure 129:
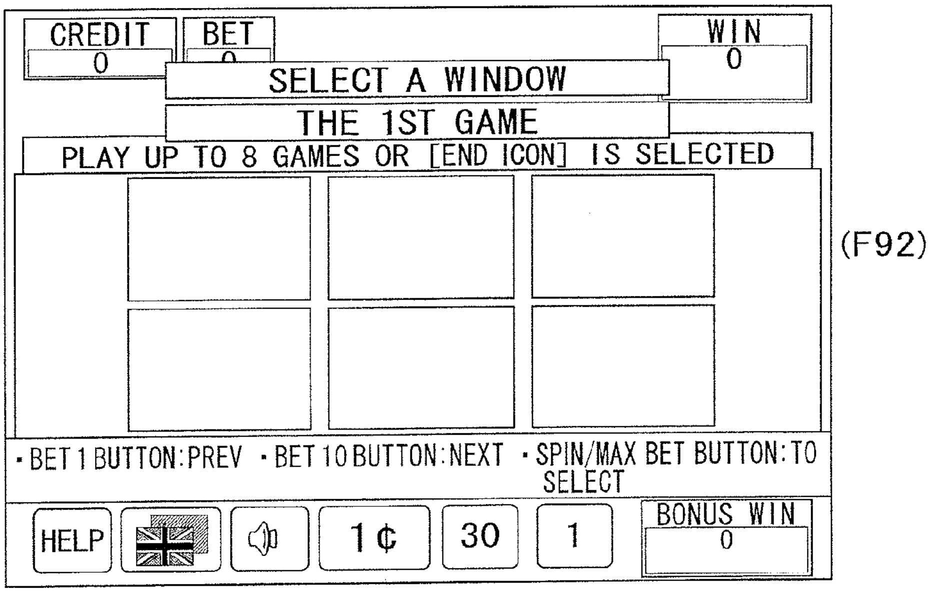

FIG. 129 illustrates operation steps of the Vampire BONUS.

Figure 130:
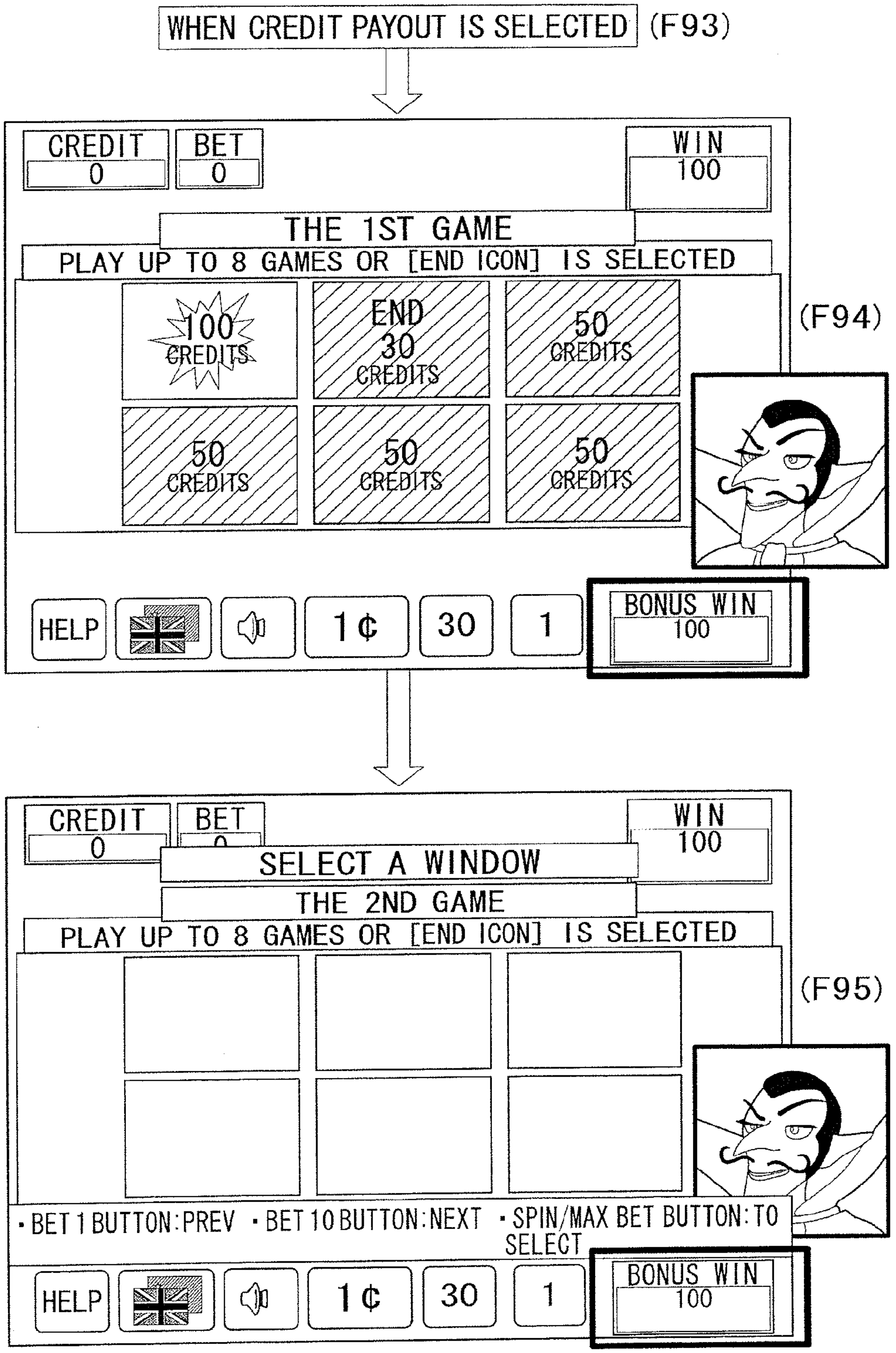

FIG. 130 illustrates operation steps of the Vampire BONUS.

Figure 131:
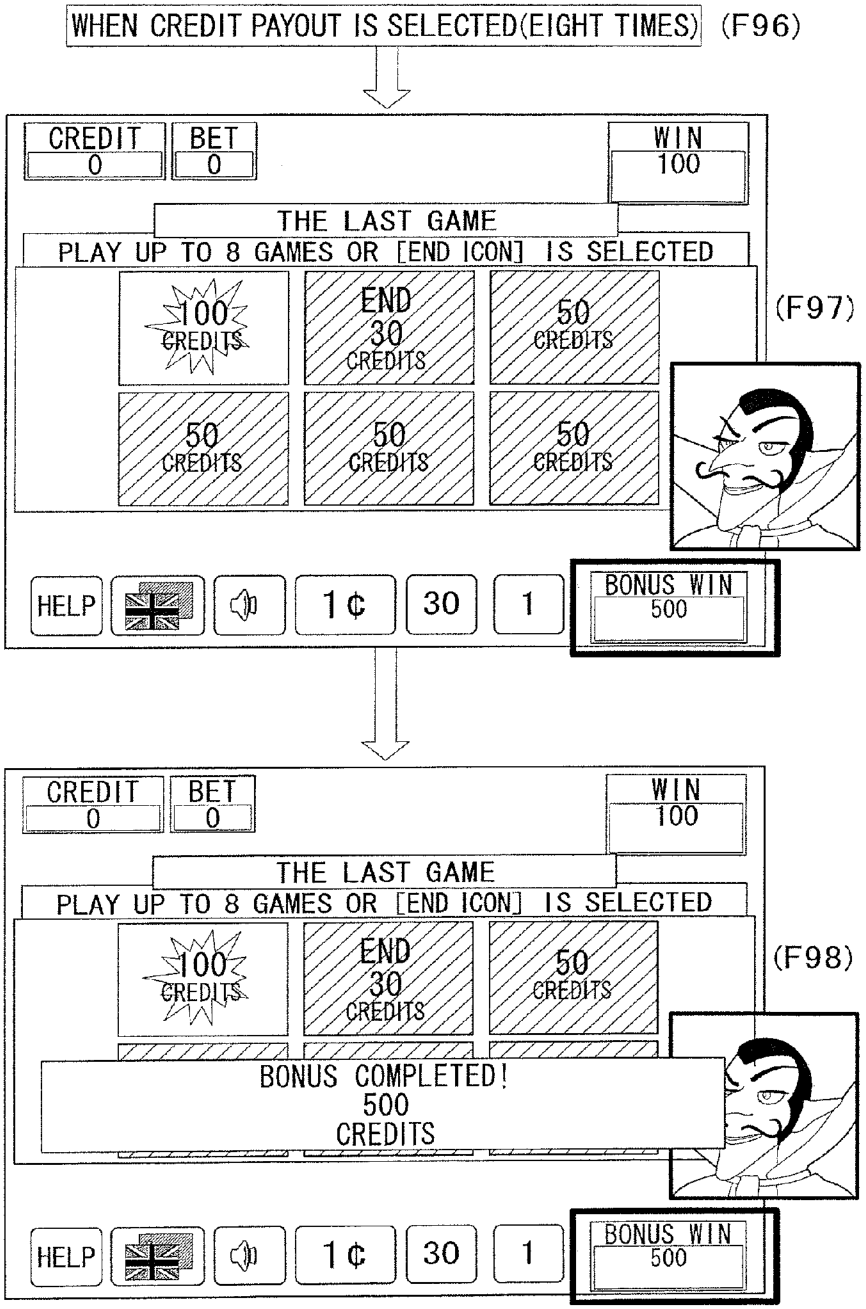

FIG. 131 illustrates operation steps of the Vampire BONUS.

Figure 132:
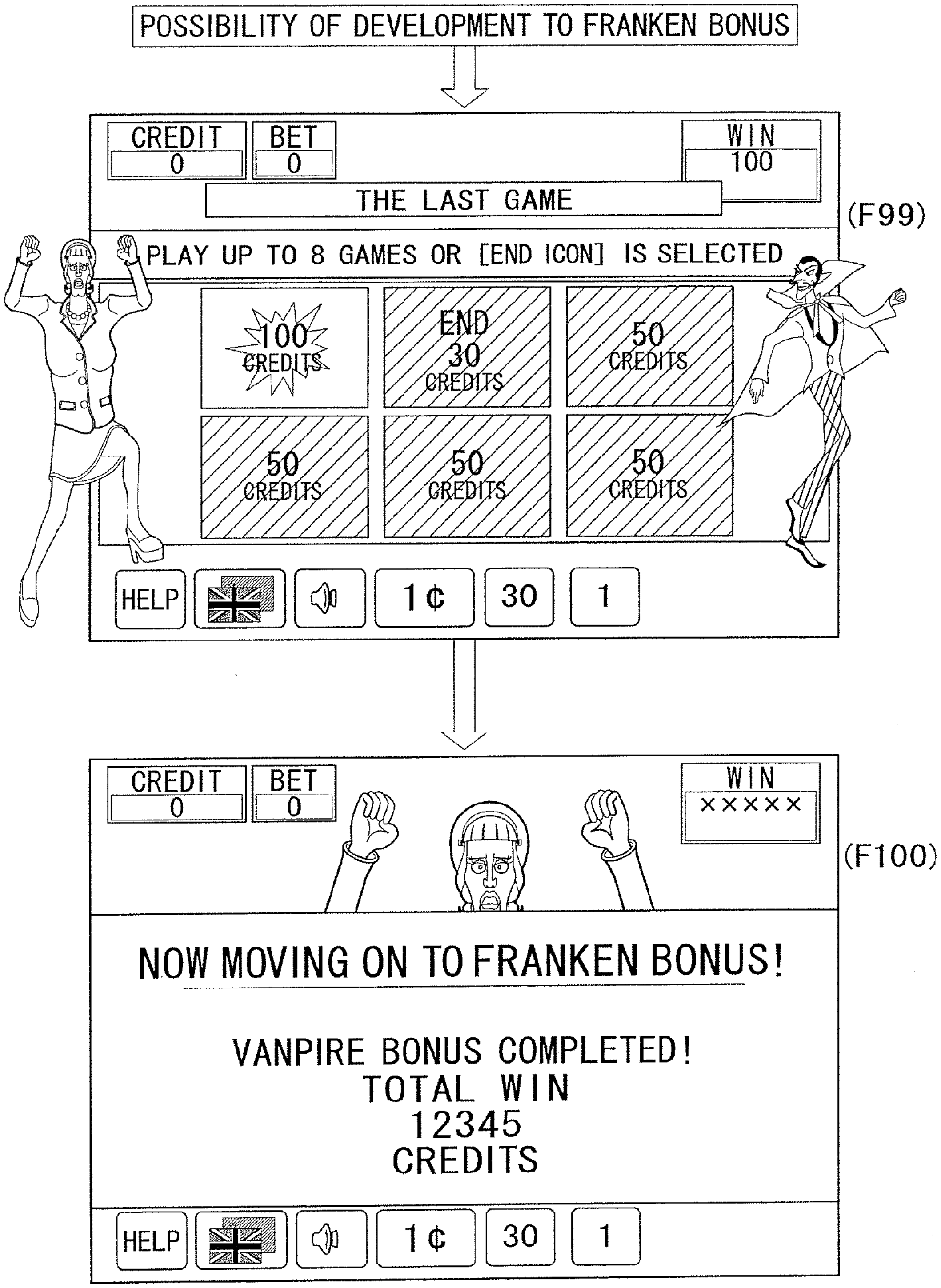

FIG. 132 illustrates operation steps of the Vampire BONUS.

Figure 133:
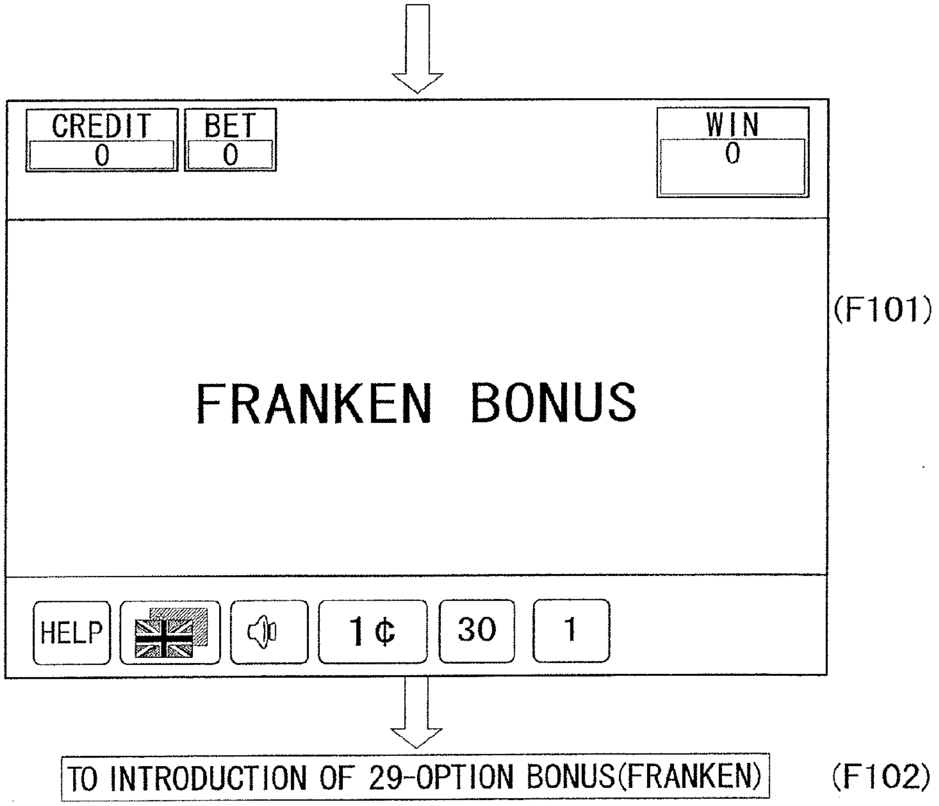

FIG. 133 illustrates operation steps of the Vampire BONUS.

Figure 134:
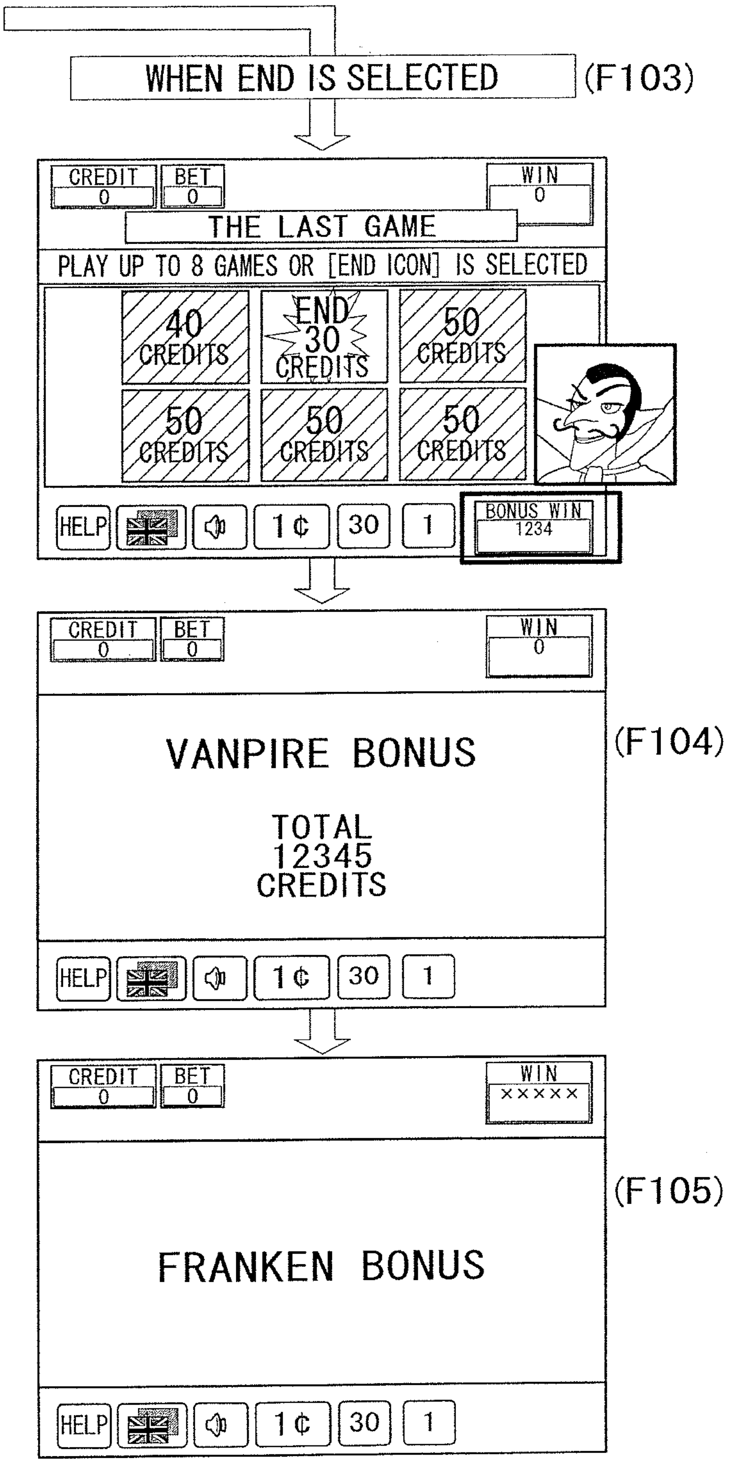

FIG. 134 illustrates operation steps of the Vampire BONUS.

Figure 135:
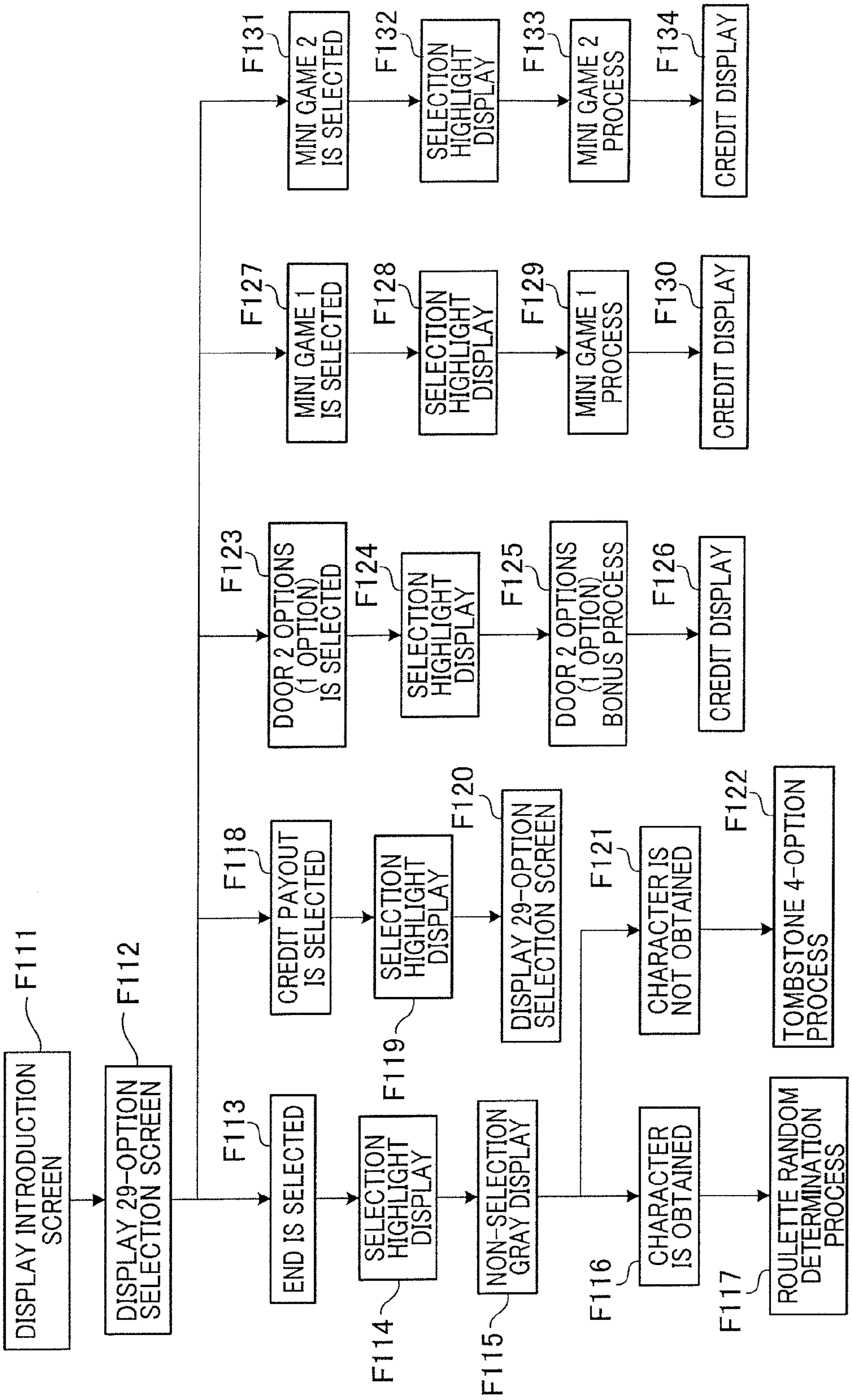

FIG. 135 is a flowchart of a 29-option game.

Figure 136:
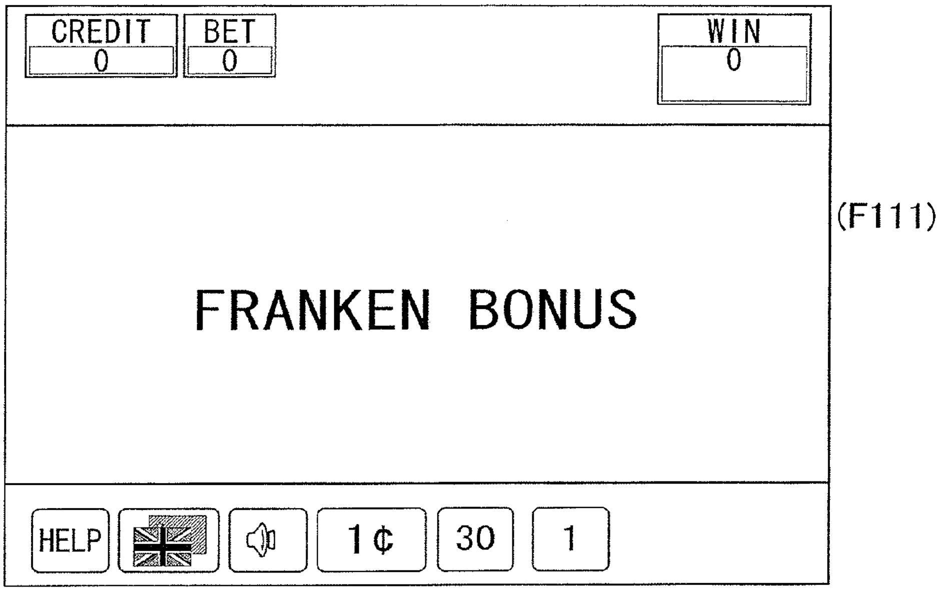

FIG. 136 illustrates operation steps of the 29-option game.

Figure 137:
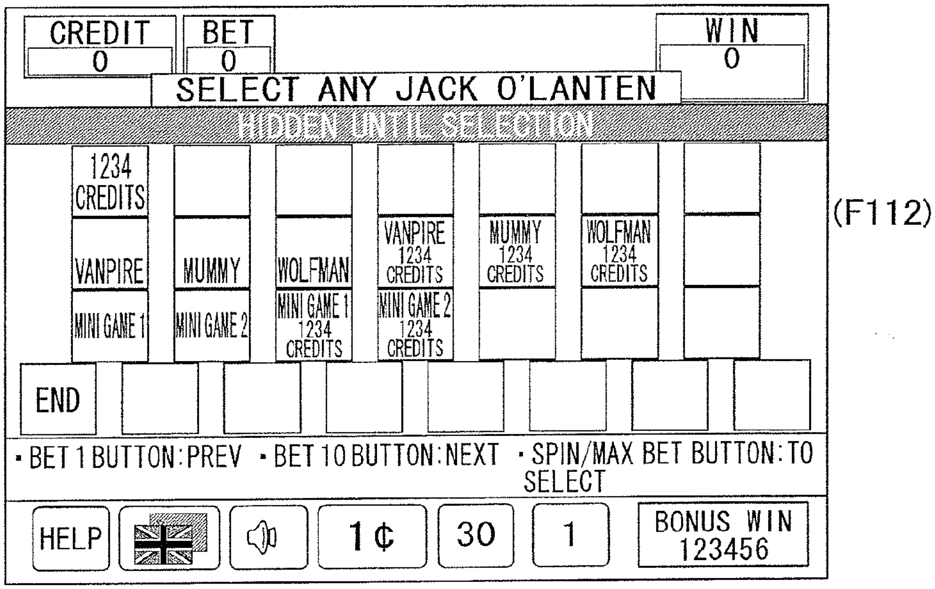

FIG. 137 illustrates operation steps of the 29-option game.

Figure 138:
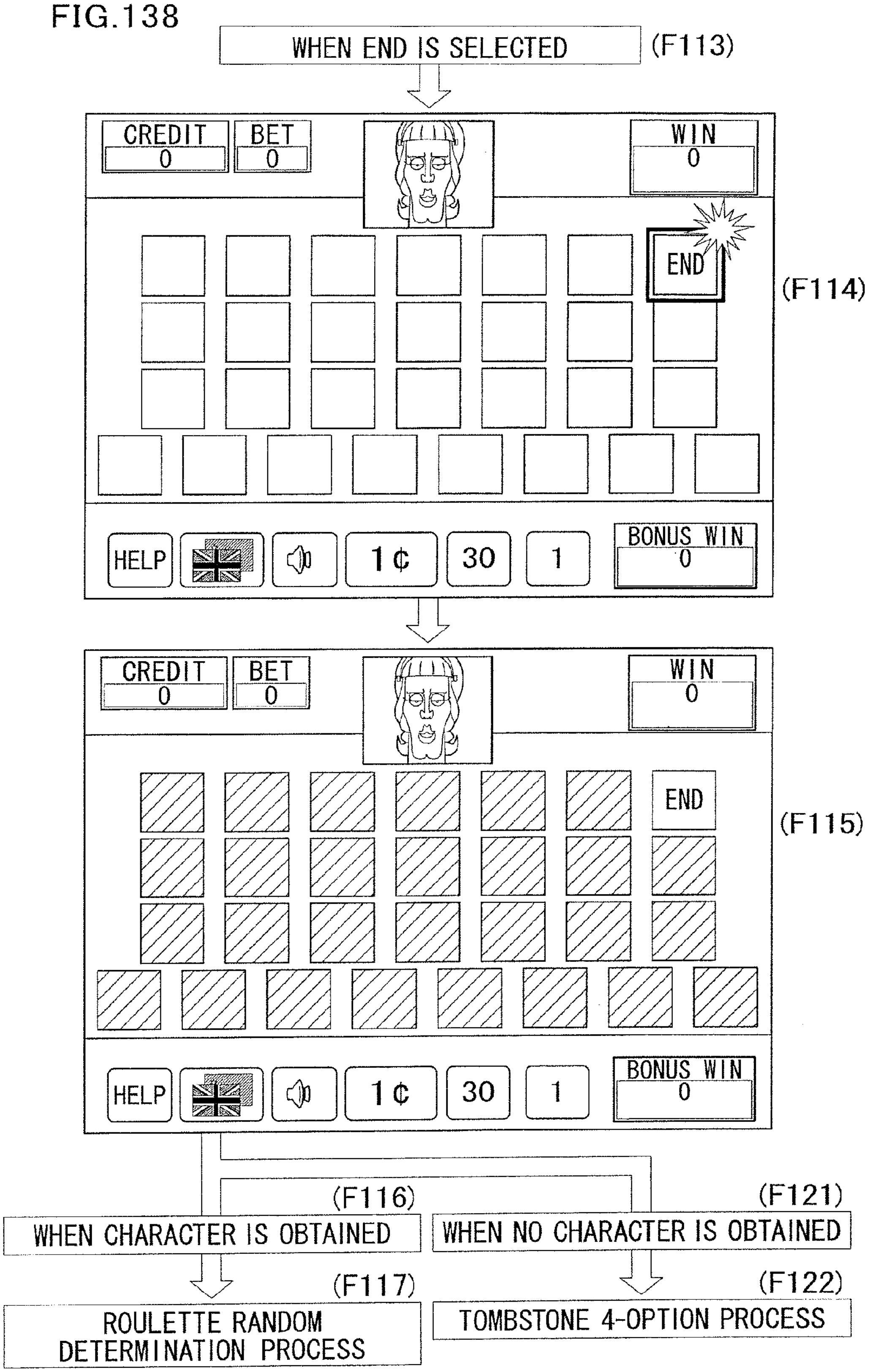

FIG. 138 illustrates operation steps of the 29-option game.

Figure 139:
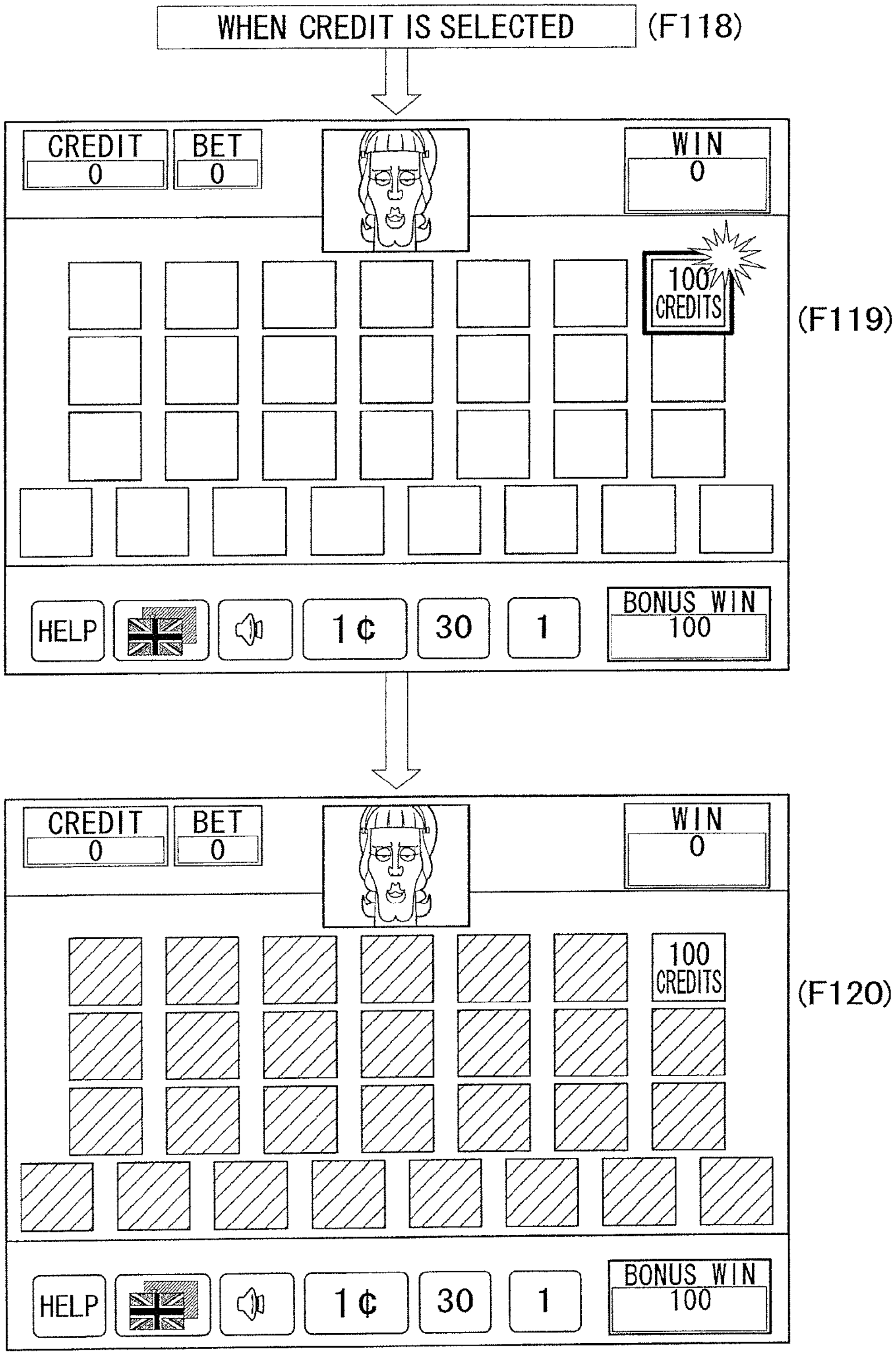

FIG. 139 illustrates operation steps of the 29-option game.

FIG. 140 illustrates operation steps of the 29-option game.

Figure 141:
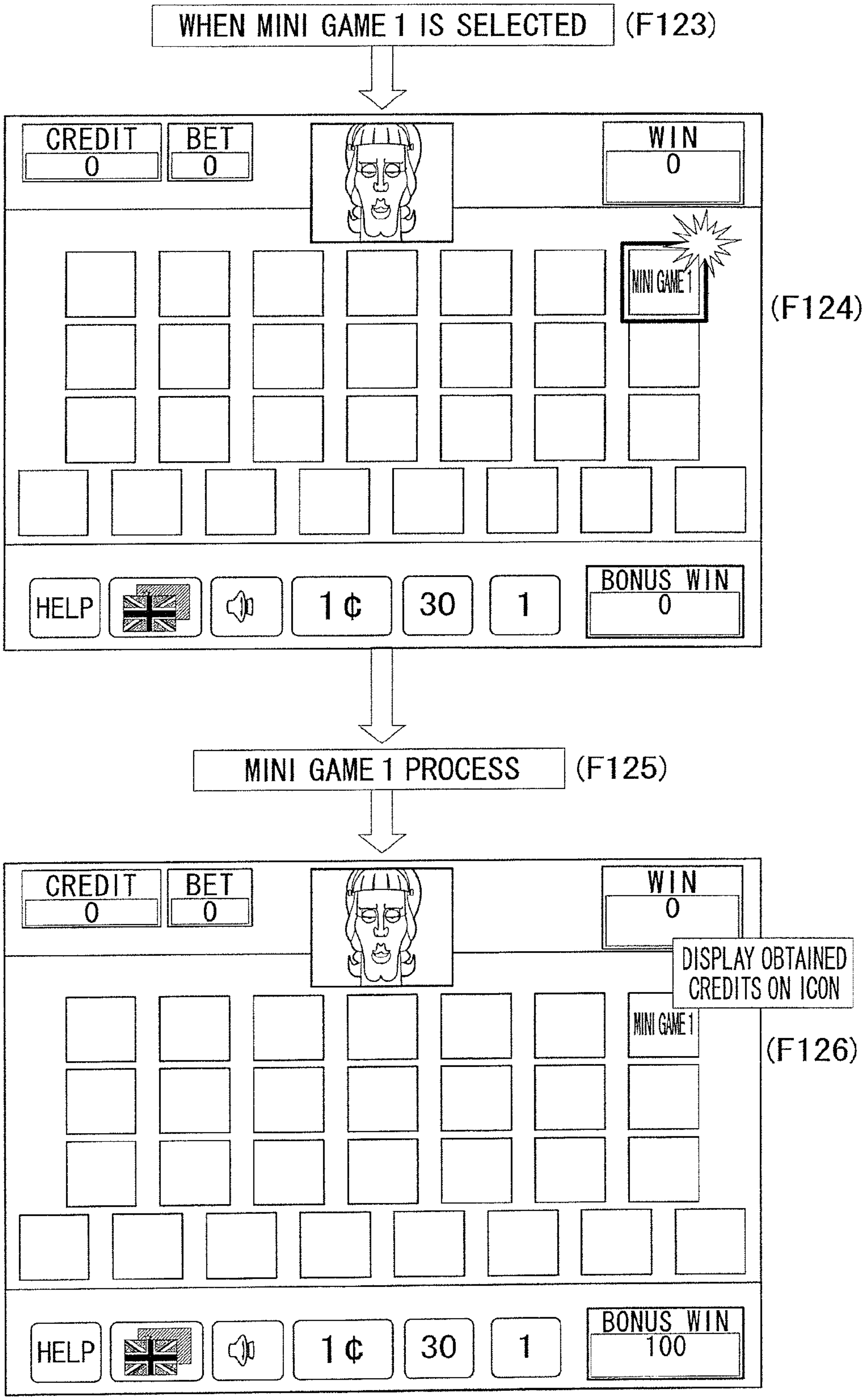

FIG. 141 illustrates operation steps of the 29-option game.

Figure 142:
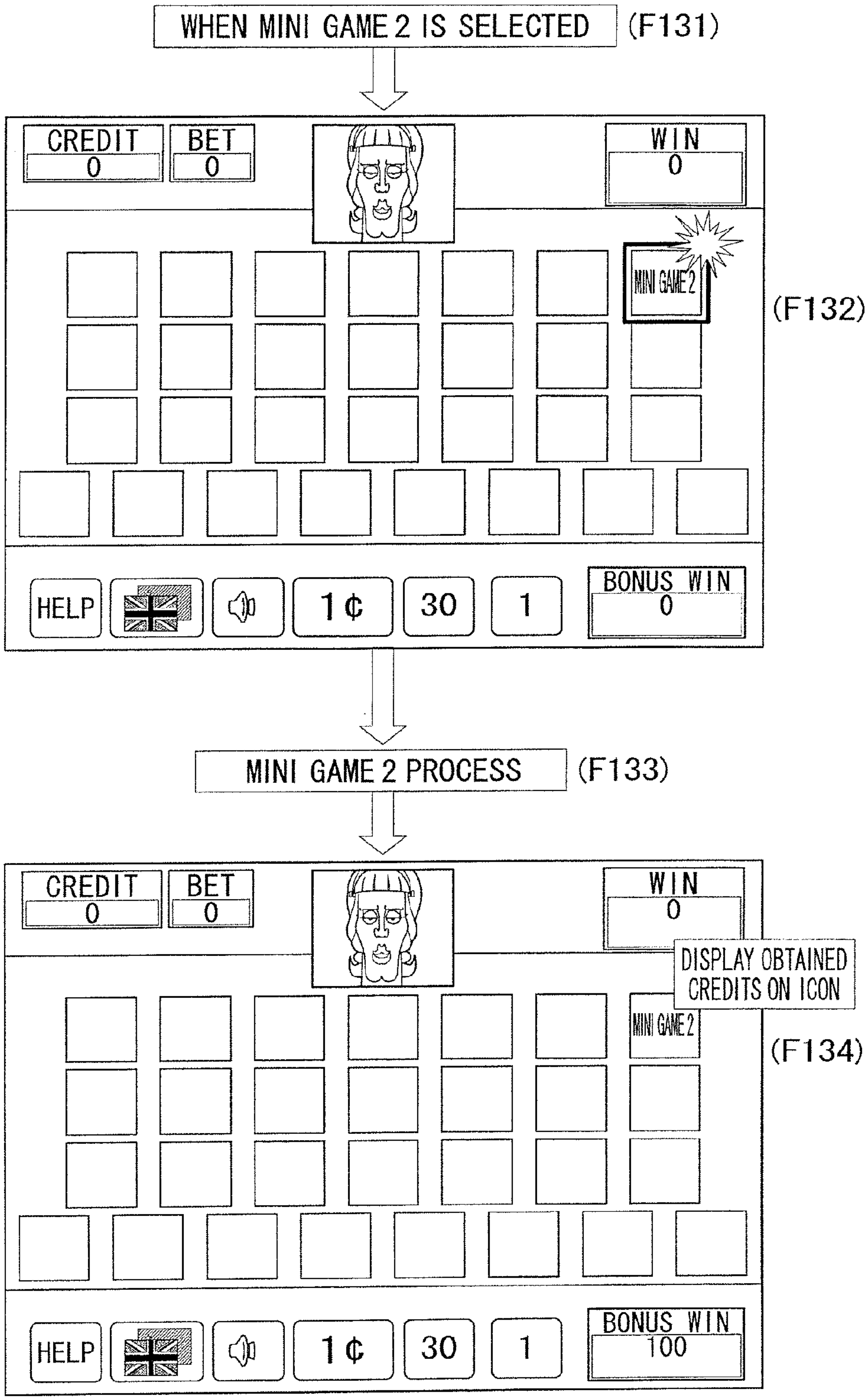

FIG. 142 illustrates operation steps of the 29-option game.

Figure 143:
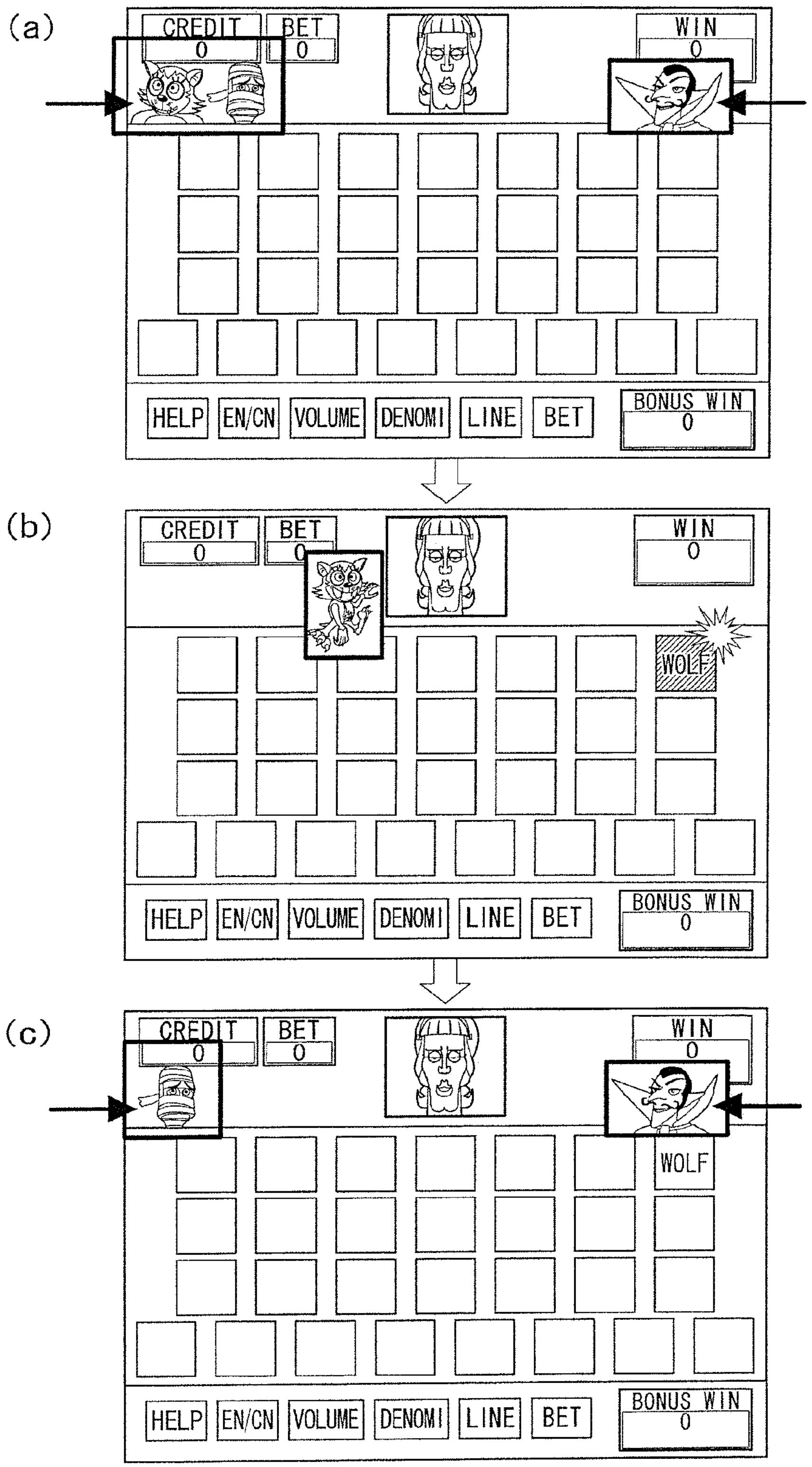

FIG. 143 illustrates operation steps of the 29-option game.

Figure 144:
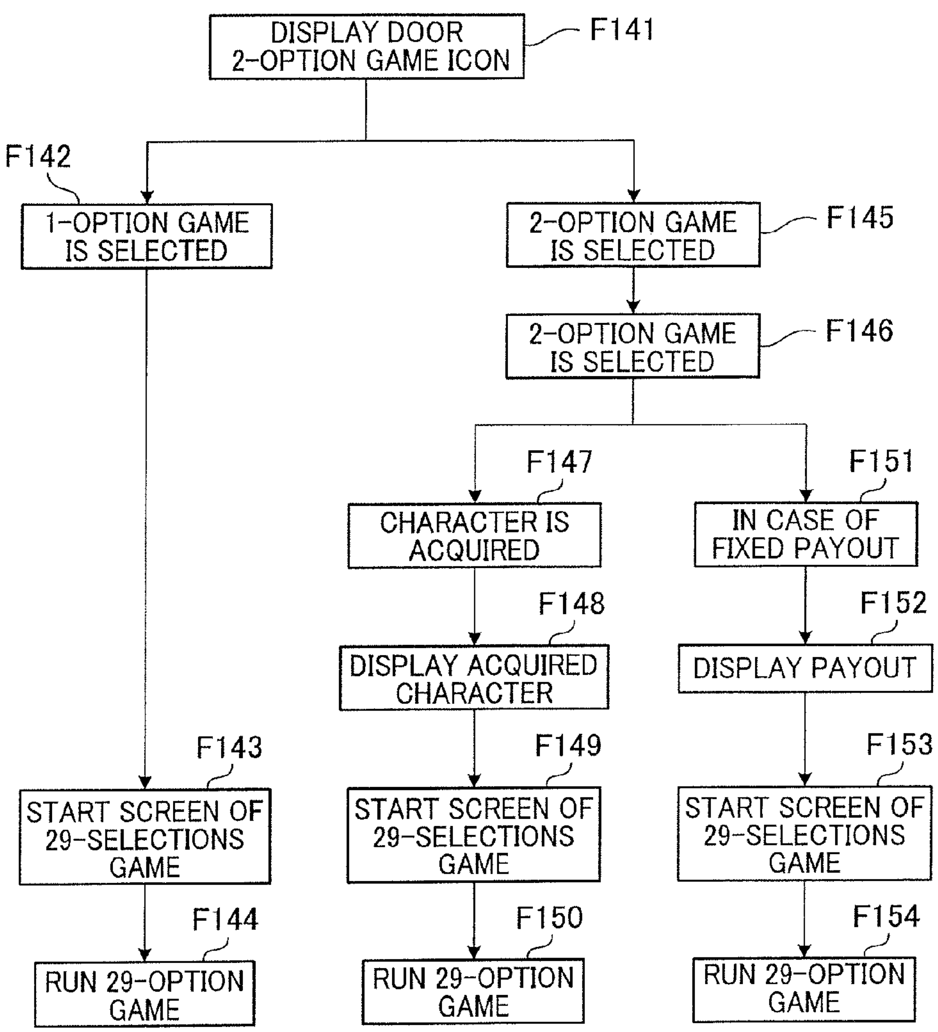

FIG. 144 is a flowchart of a door 2 options bonus.

FIG. 145 illustrates operation steps of the door 2 options bonus.

Figure 146:
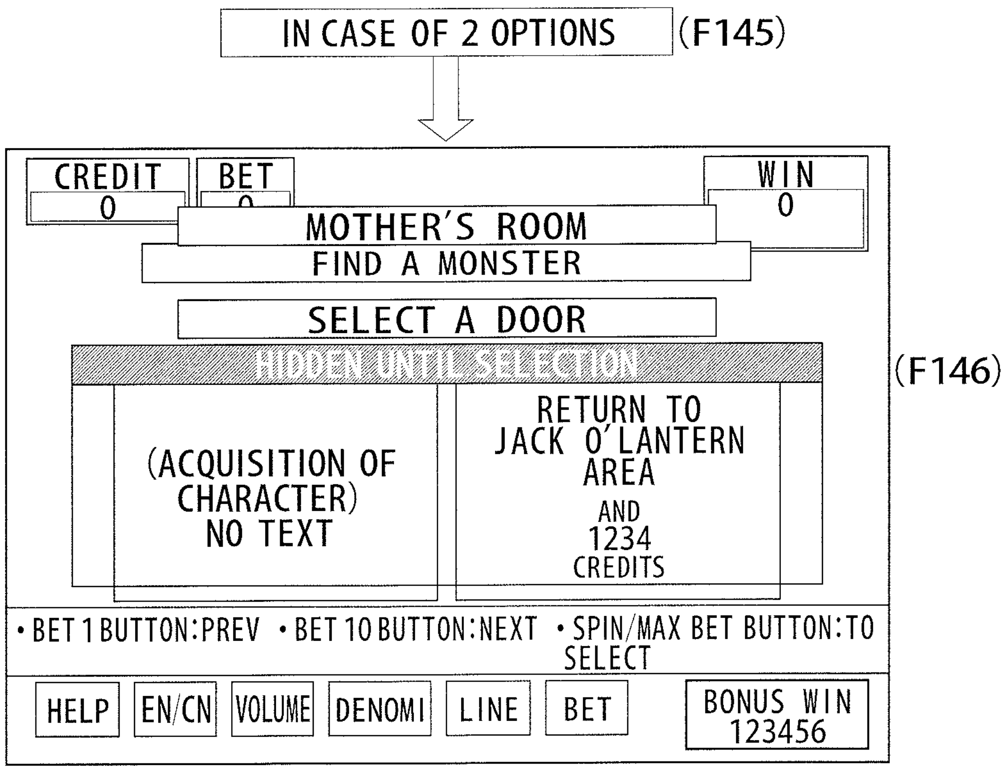

FIG. 146 illustrates operation steps of the door 2 options bonus.

Figure 147:
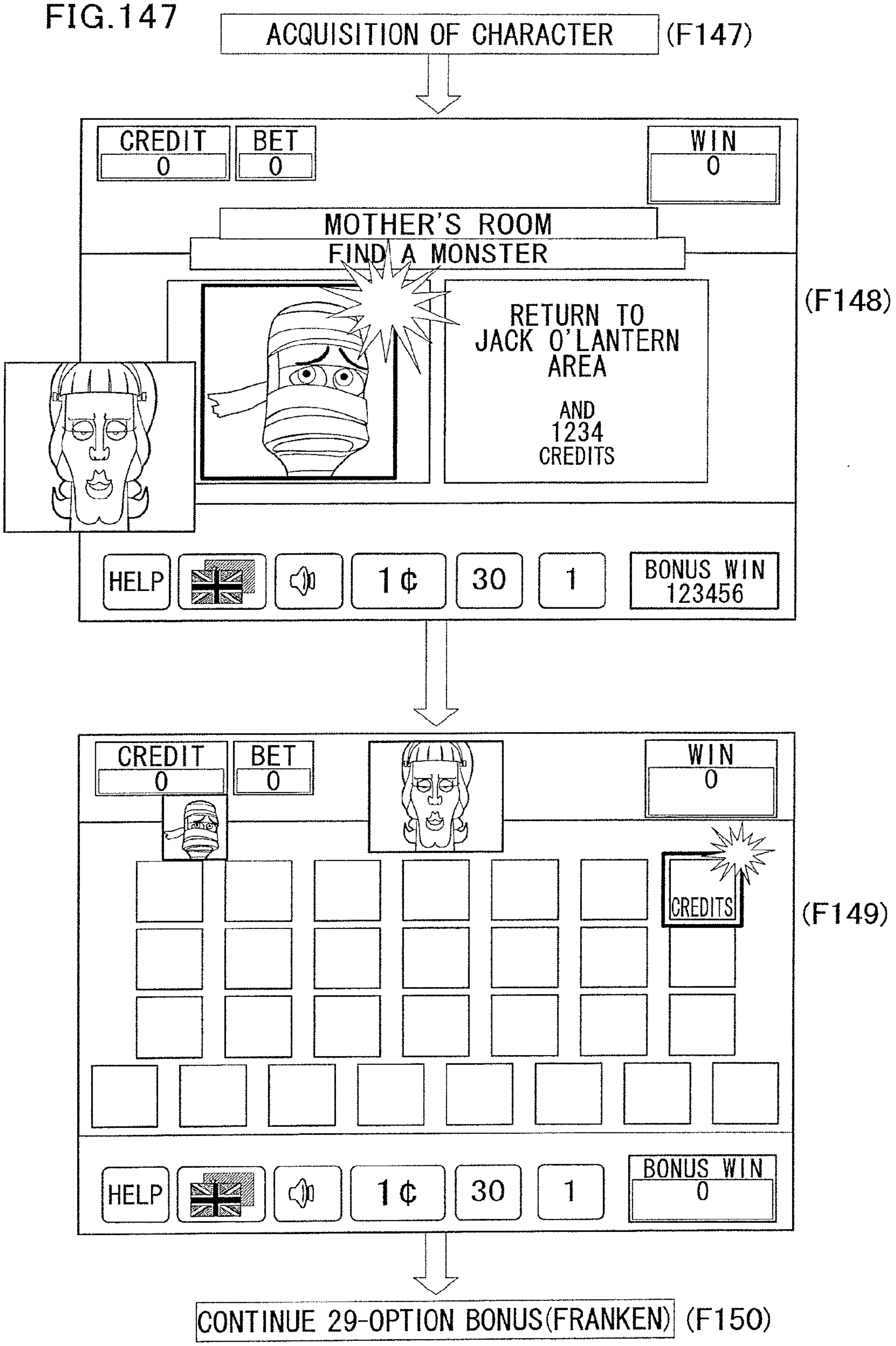

FIG. 147 illustrates operation steps of the door 2 options bonus.

Figure 148:
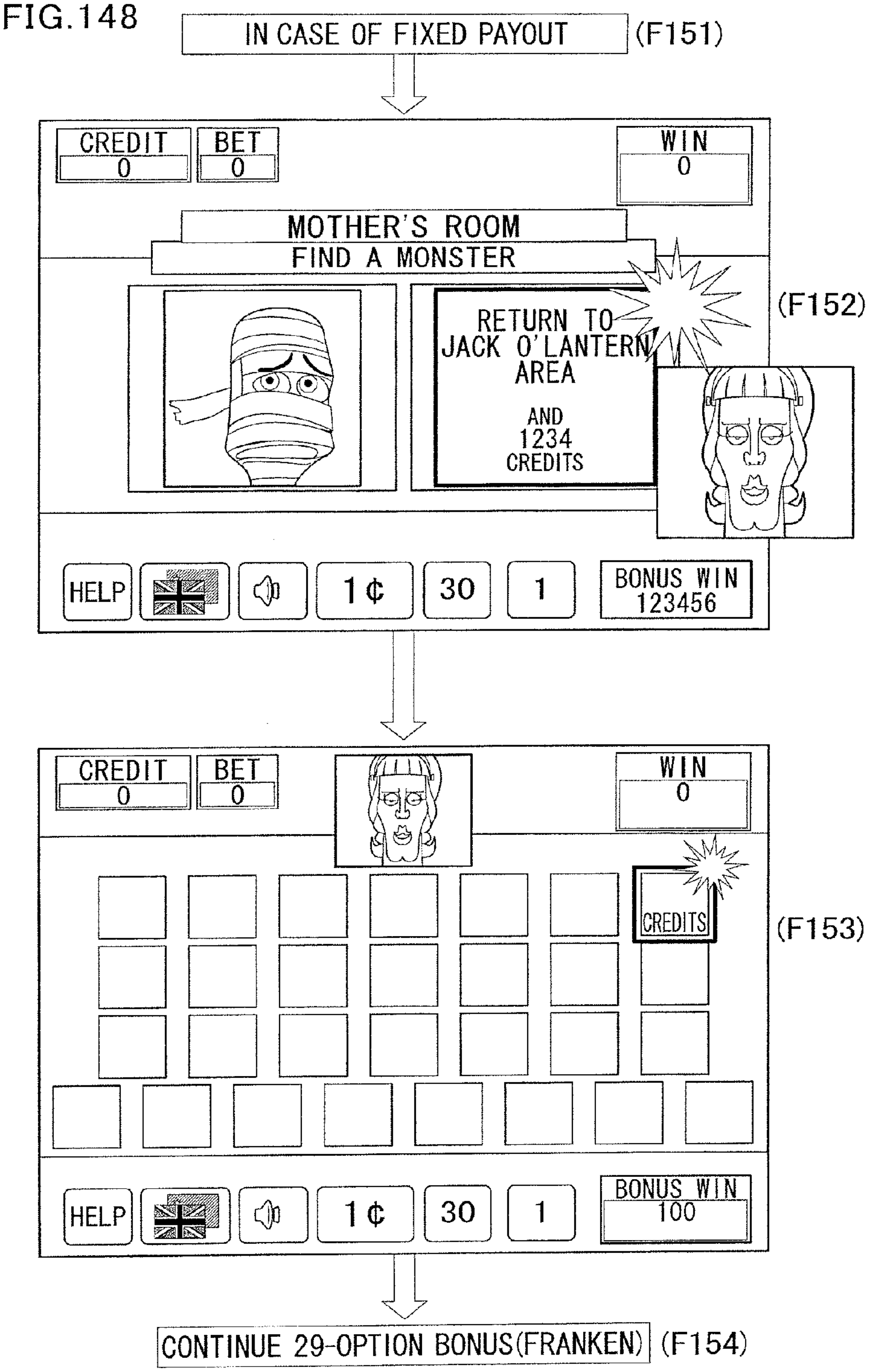

FIG. 148 illustrates operation steps of the door 2 options bonus.

Figure 149:
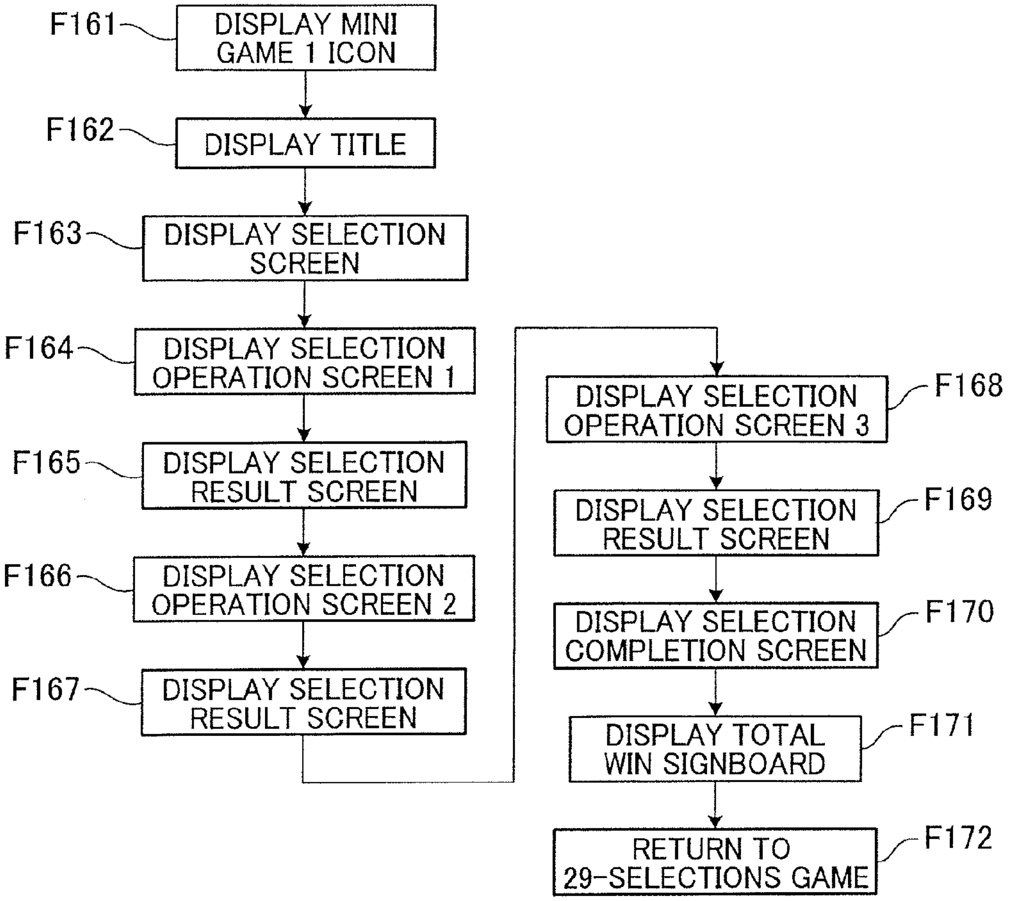

FIG. 149 is a flowchart of a mini game 1.

FIG. 150 illustrates operation steps of the mini game 1.

Figure 151:
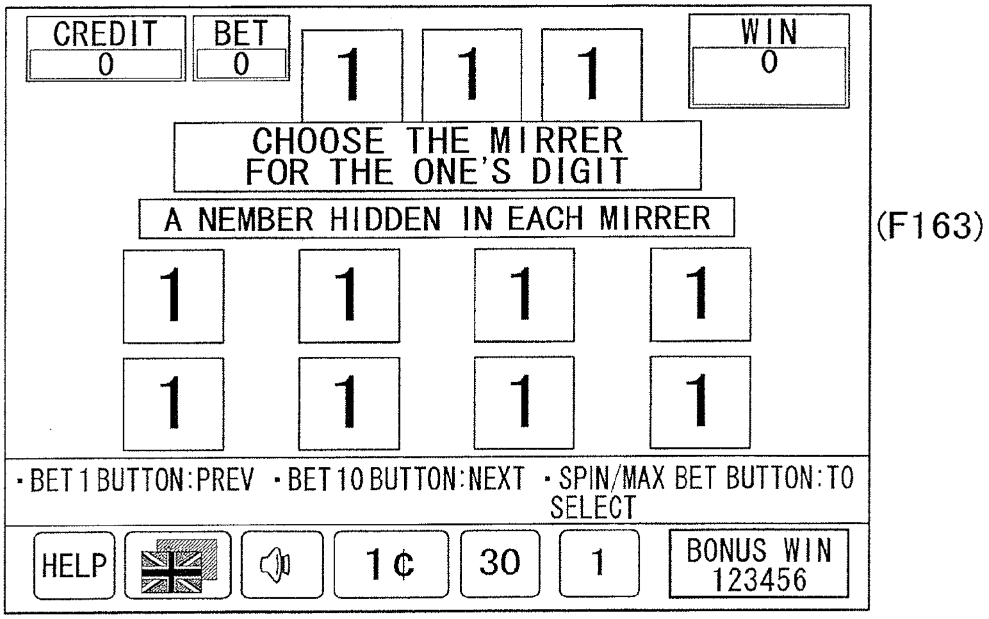

FIG. 151 illustrates operation steps of the mini game 1.

FIG. 152 illustrates operation steps of the mini game 1.

Figure 153:
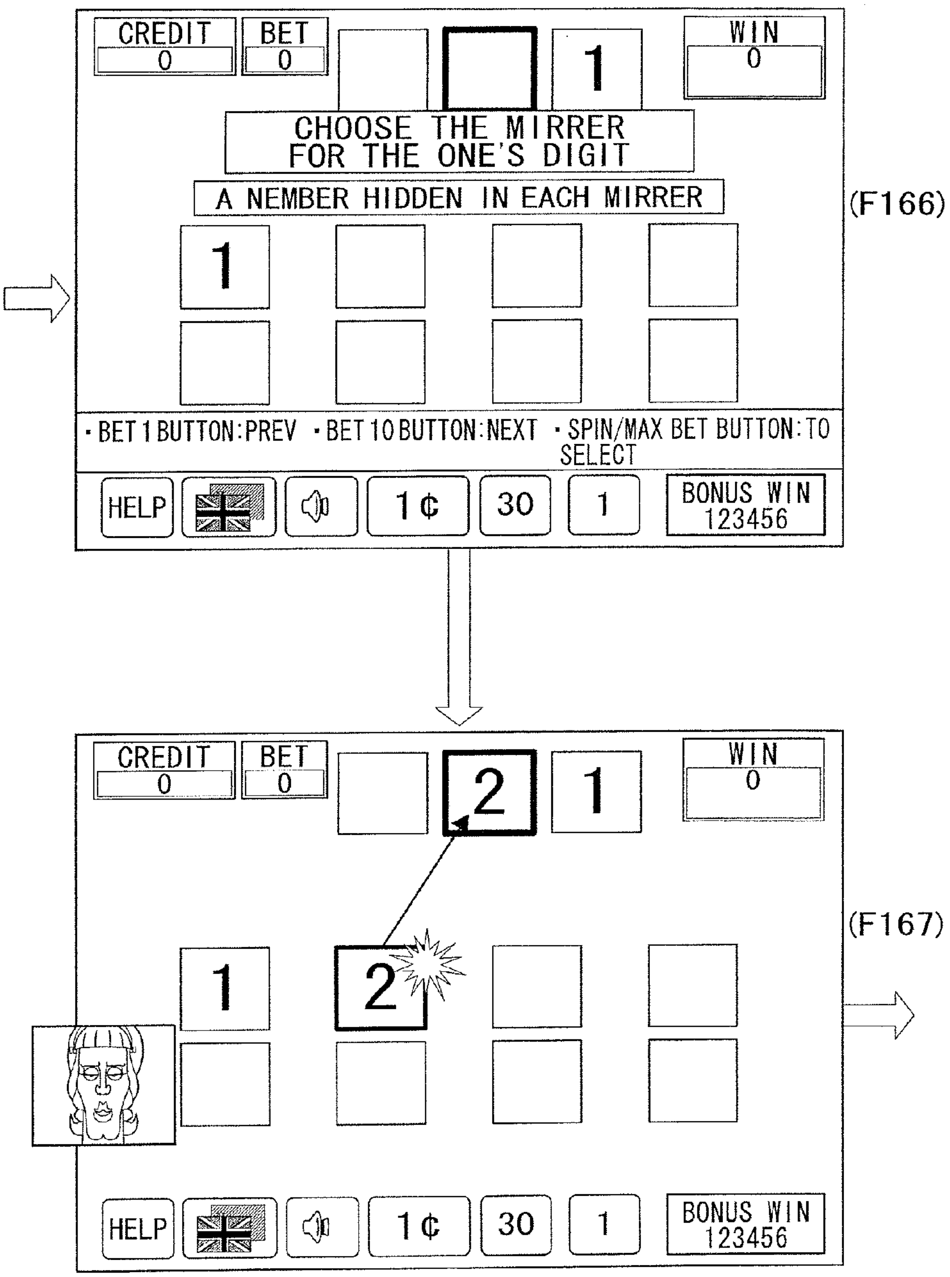

FIG. 153 illustrates operation steps of the mini game 1.

Figure 154:
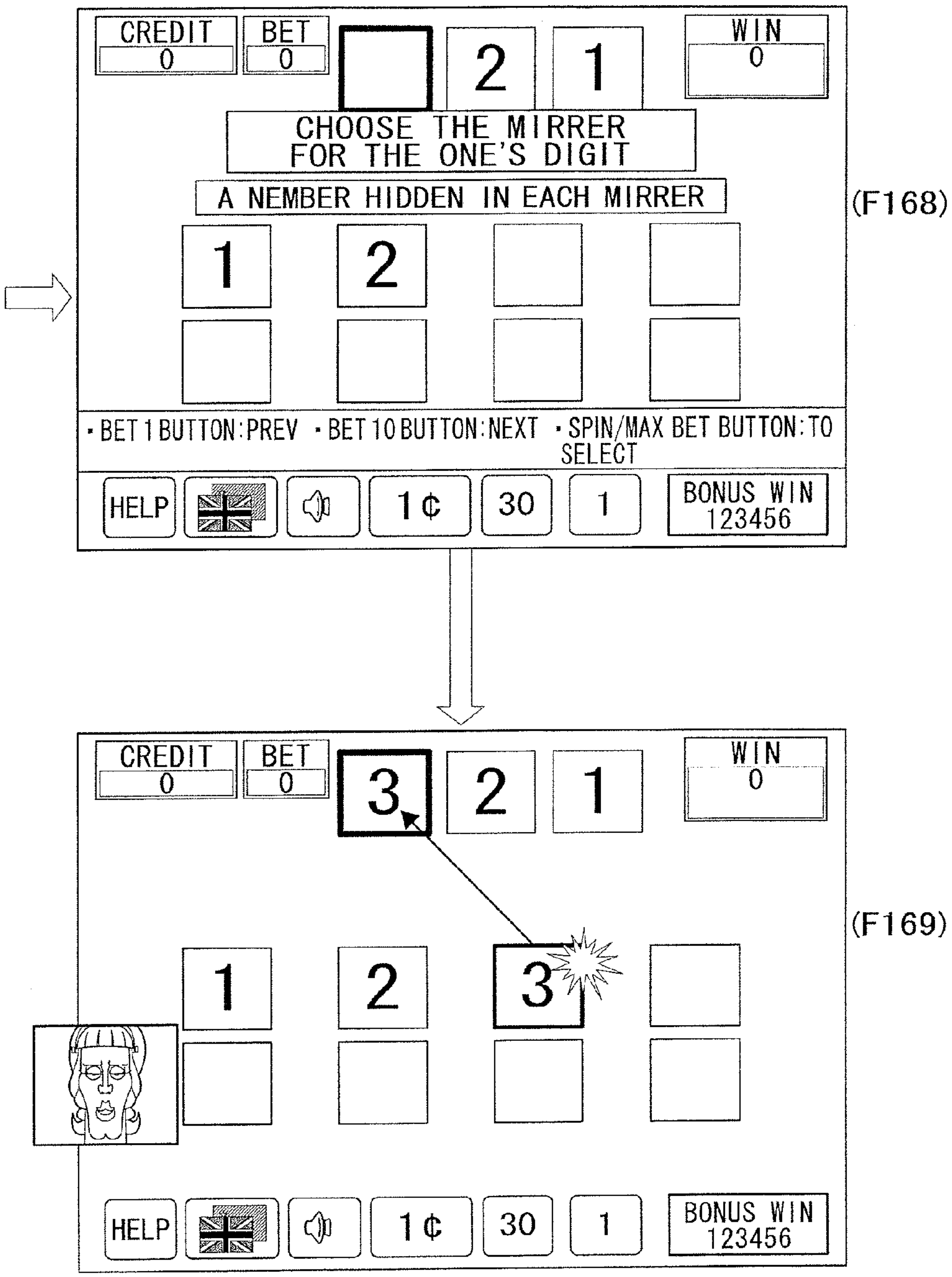

FIG. 154 illustrates operation steps of the mini game 1.

FIG. 155 illustrates operation steps of the mini game 1.

Figure 156:
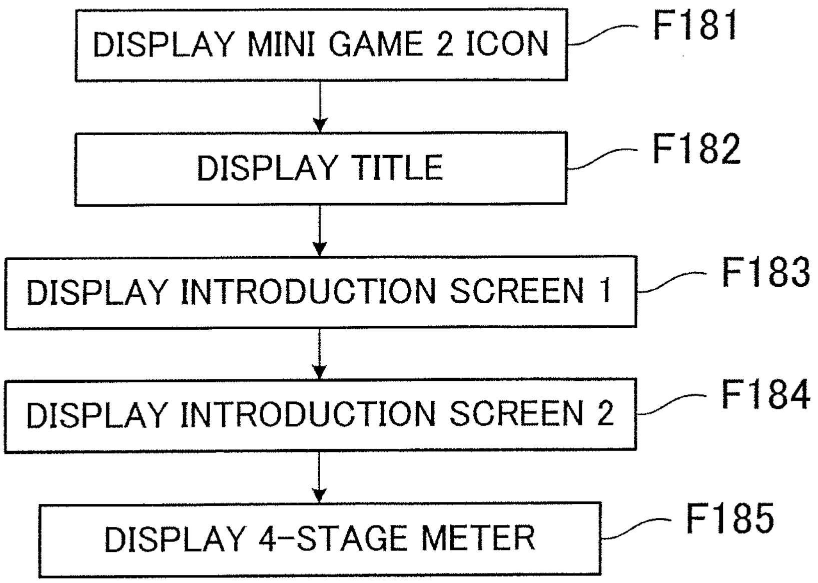

FIG. 156 is a flowchart of a mini game 2.

FIG. 157 illustrates operation steps of the mini game 2.

Figure 158:
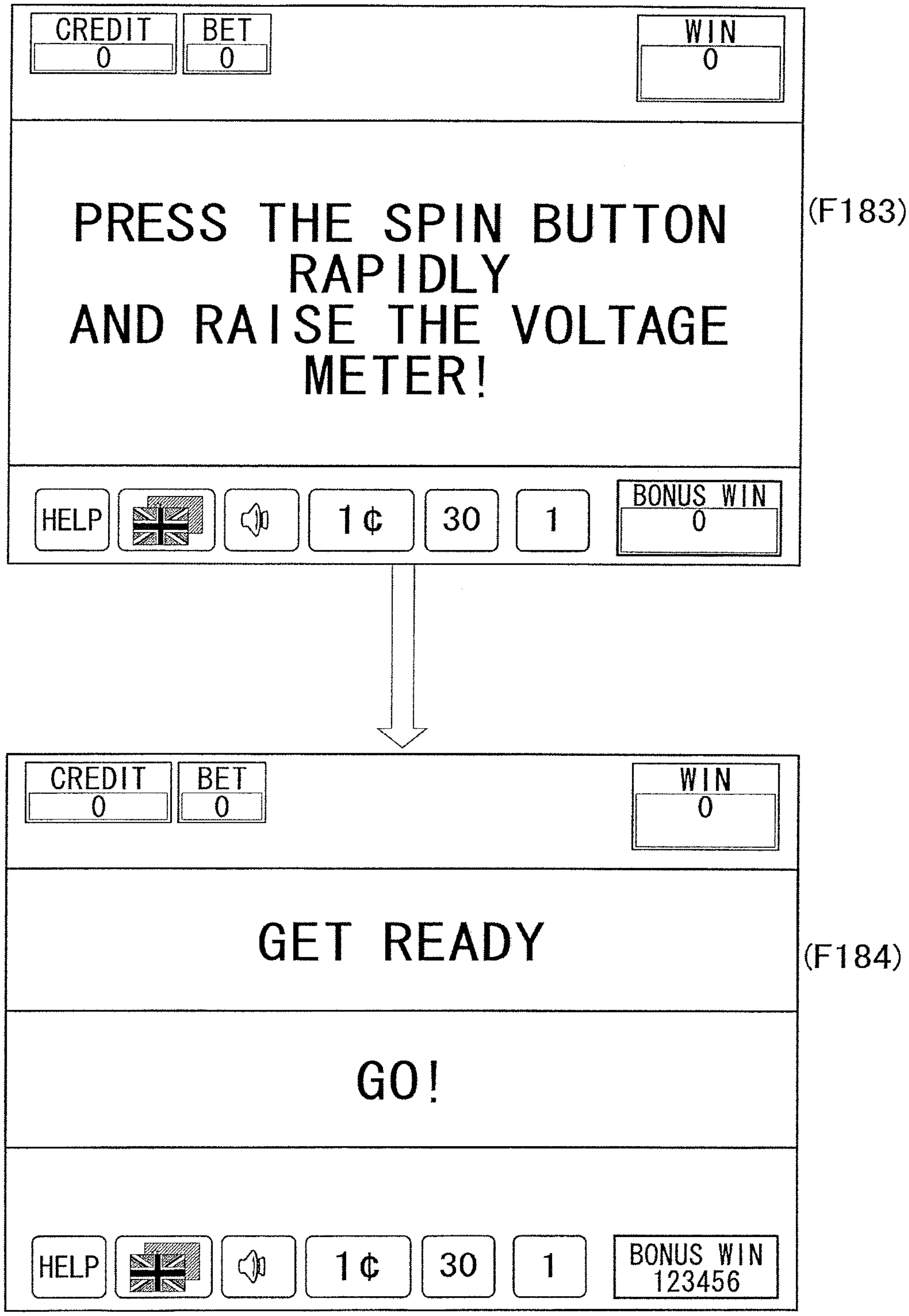

FIG. 158 illustrates operation steps of the mini game 2.

Figure 159:
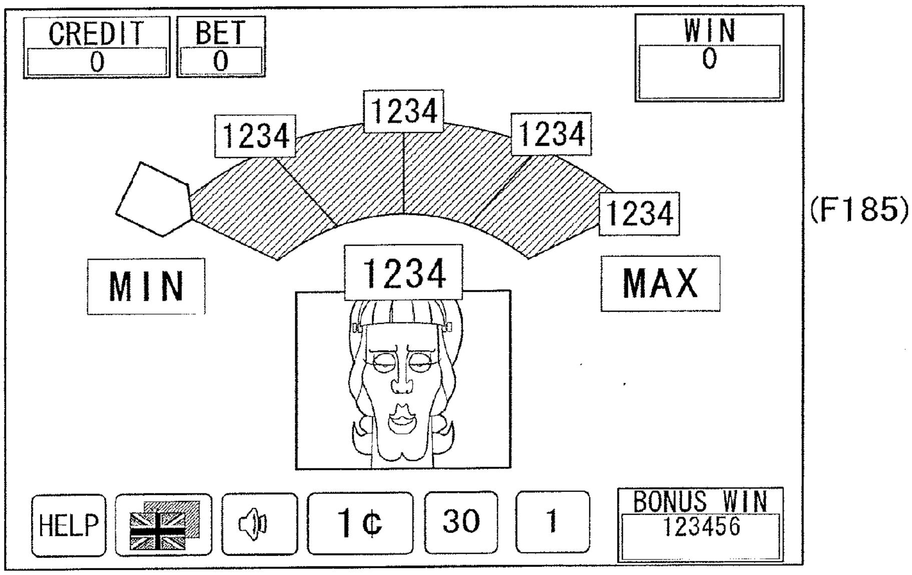

FIG. 159 illustrates an operation state of a 4-stage meter.

Figure 160:
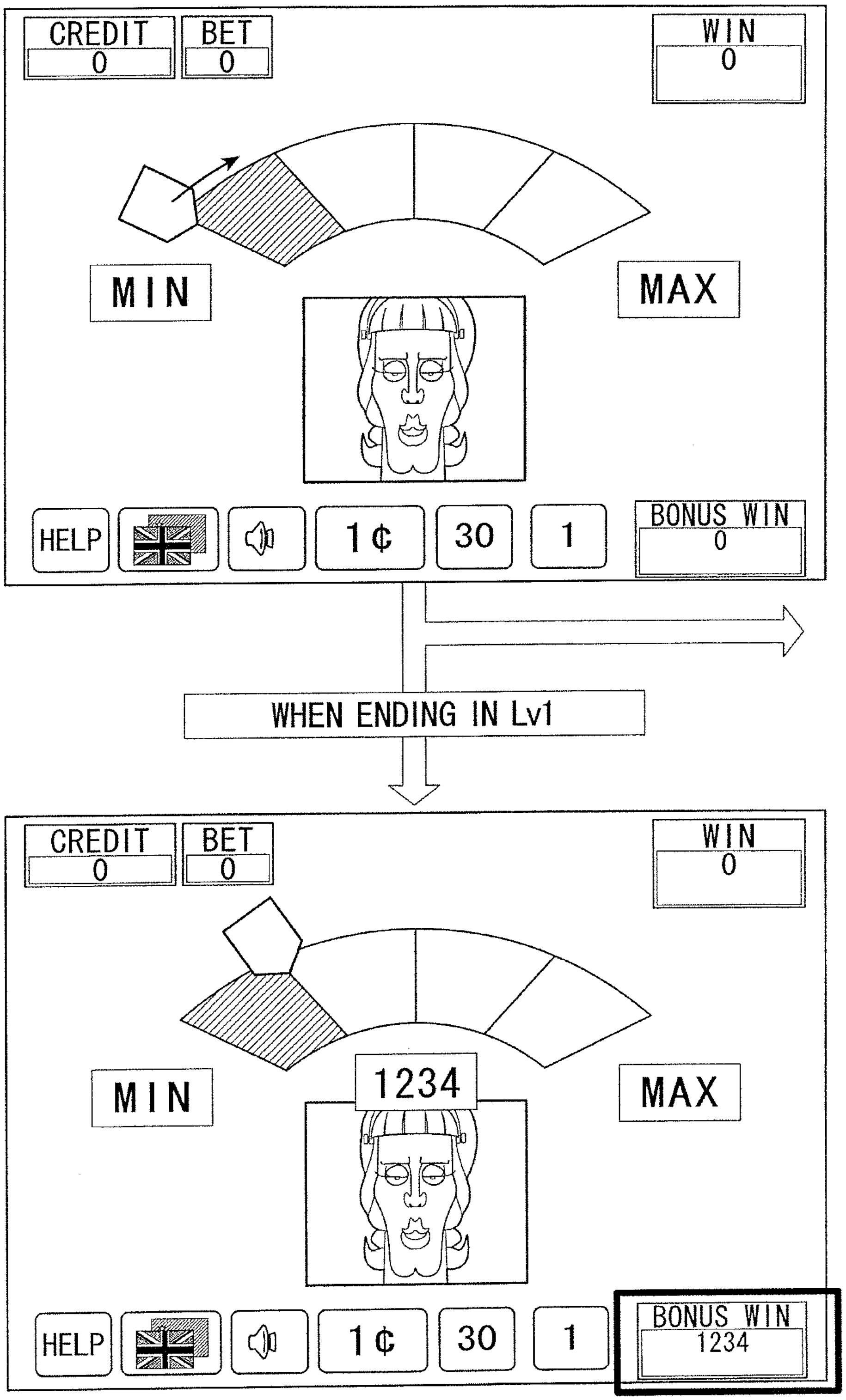

FIG. 160 illustrates an operation state of the 4-stage meter.

Figure 161:
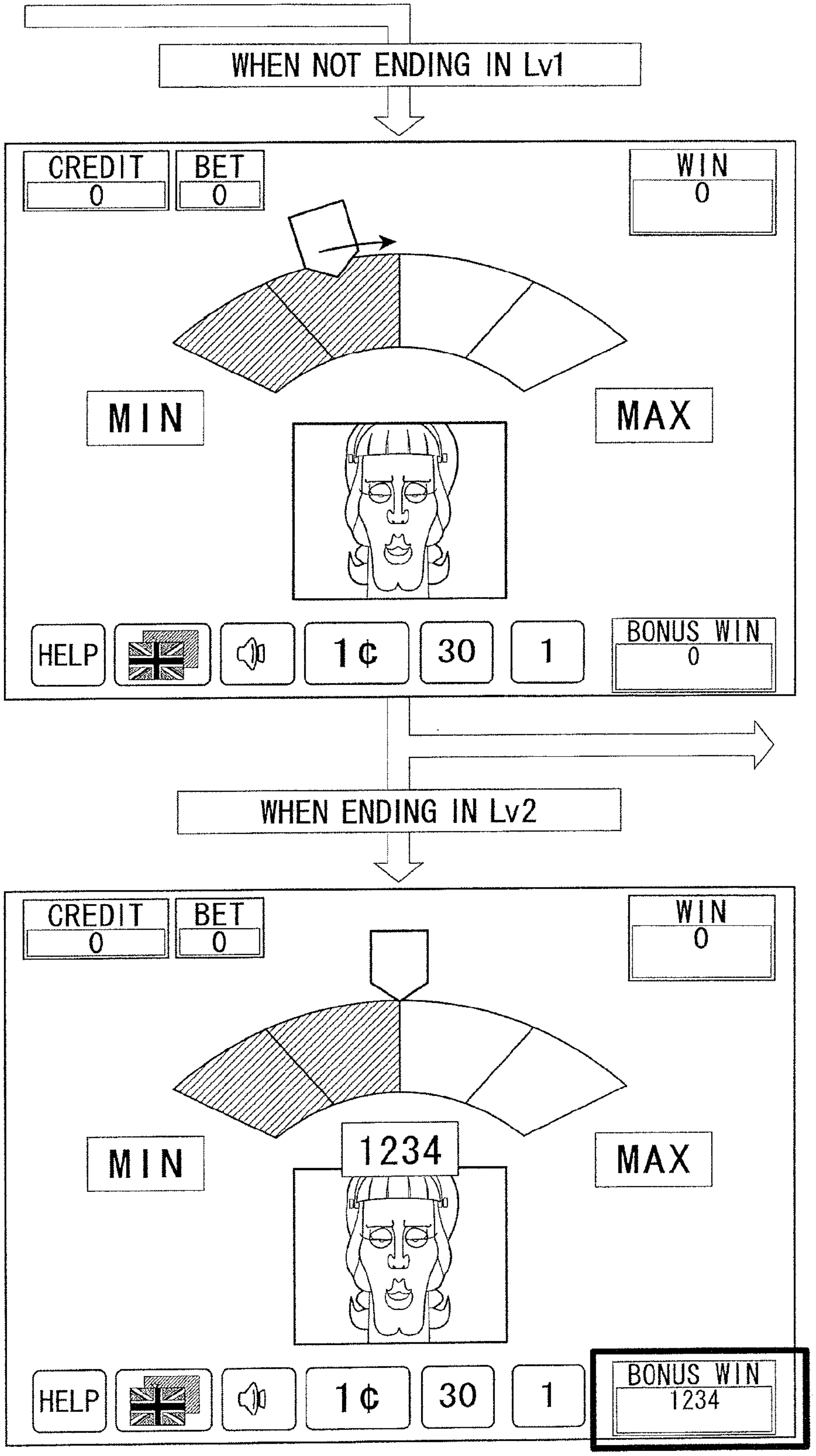

FIG. 161 illustrates an operation state of the 4-stage meter.

Figure 162:
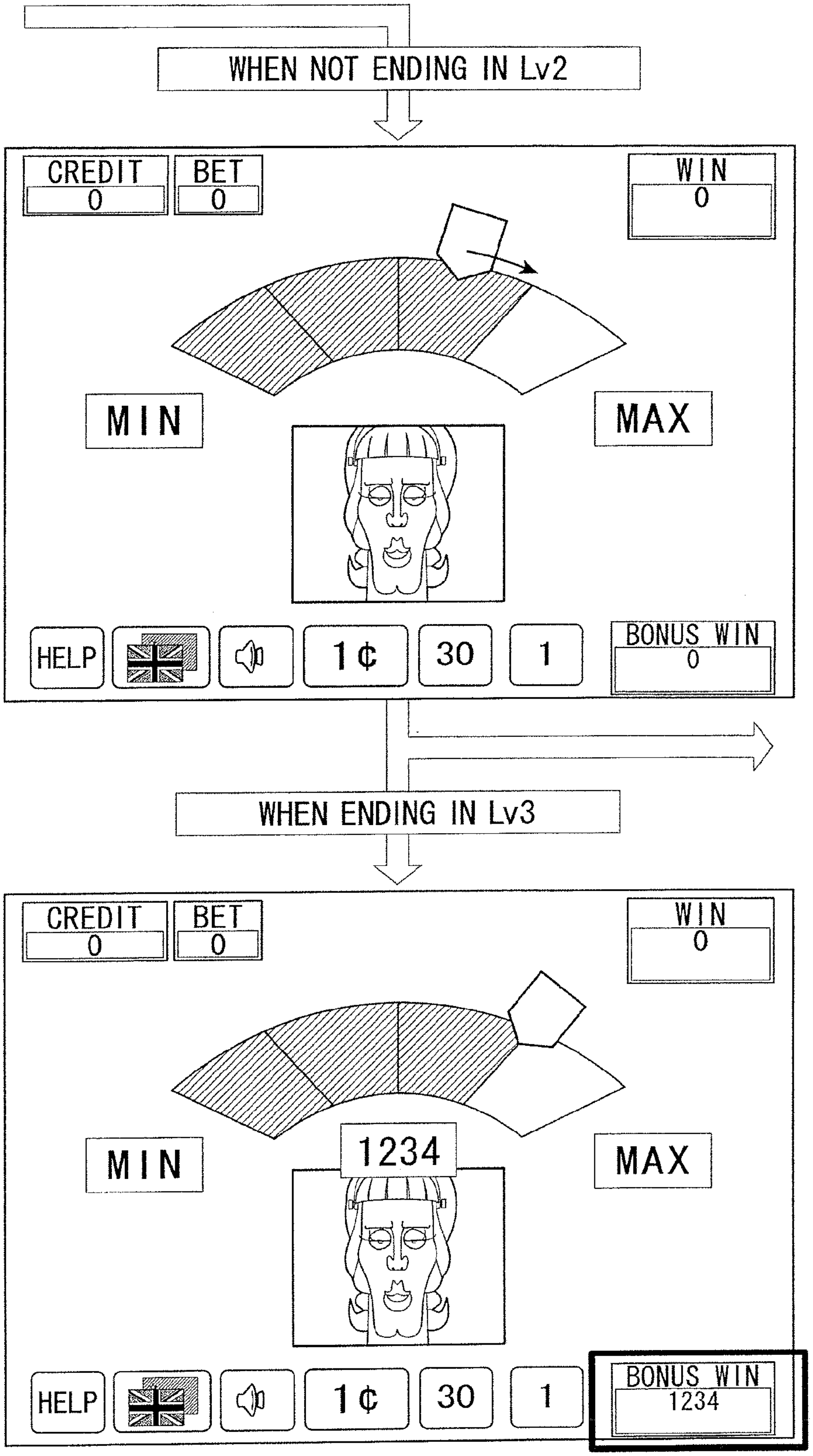

FIG. 162 illustrates an operation state of the 4-stage meter.

Figure 163:
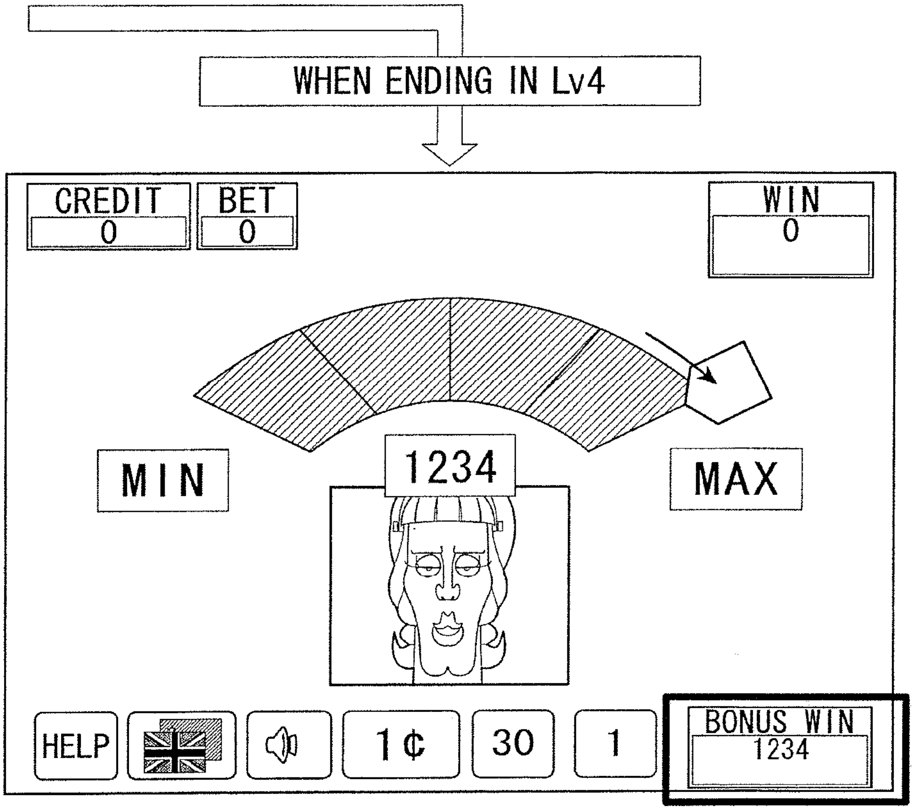

FIG. 163 illustrates an operation state of the 4-stage meter.

Figure 164:
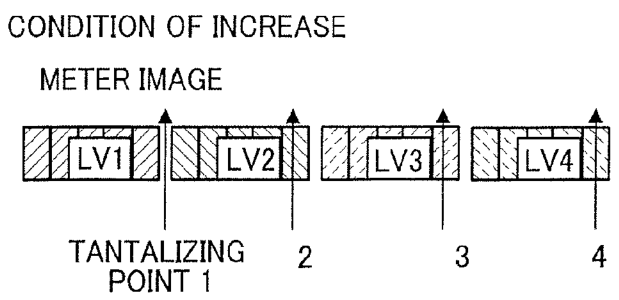

FIG. 164 illustrates an operation state of the 4-stage meter.

Figure 165:
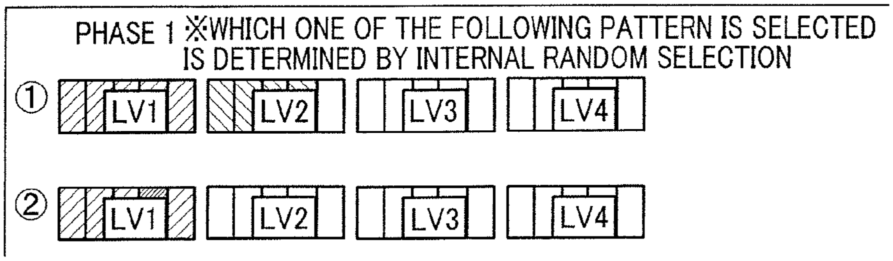

FIG. 165 illustrates an operation state of the 4-stage meter.

Figure 166:
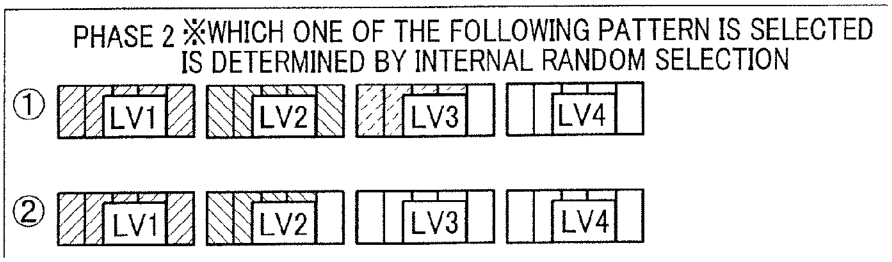

FIG. 166 illustrates an operation state of the 4-stage meter.

Figure 167:
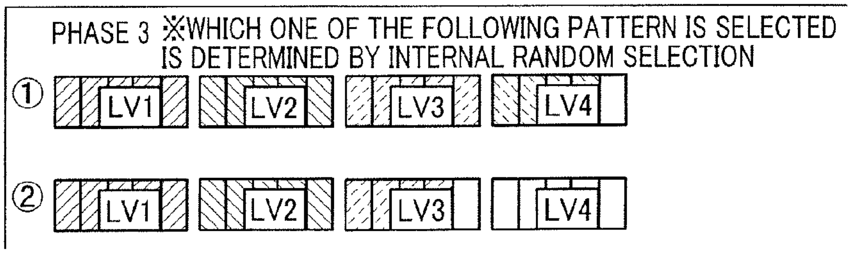

FIG. 167 illustrates an operation state of the 4-stage meter.

Figure 168:
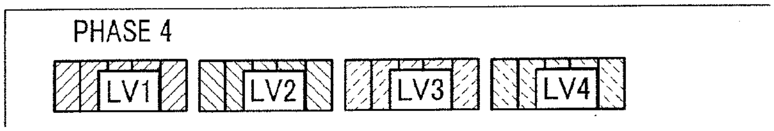

FIG. 168 illustrates an operation state of the 4-stage meter.

Figure 169:
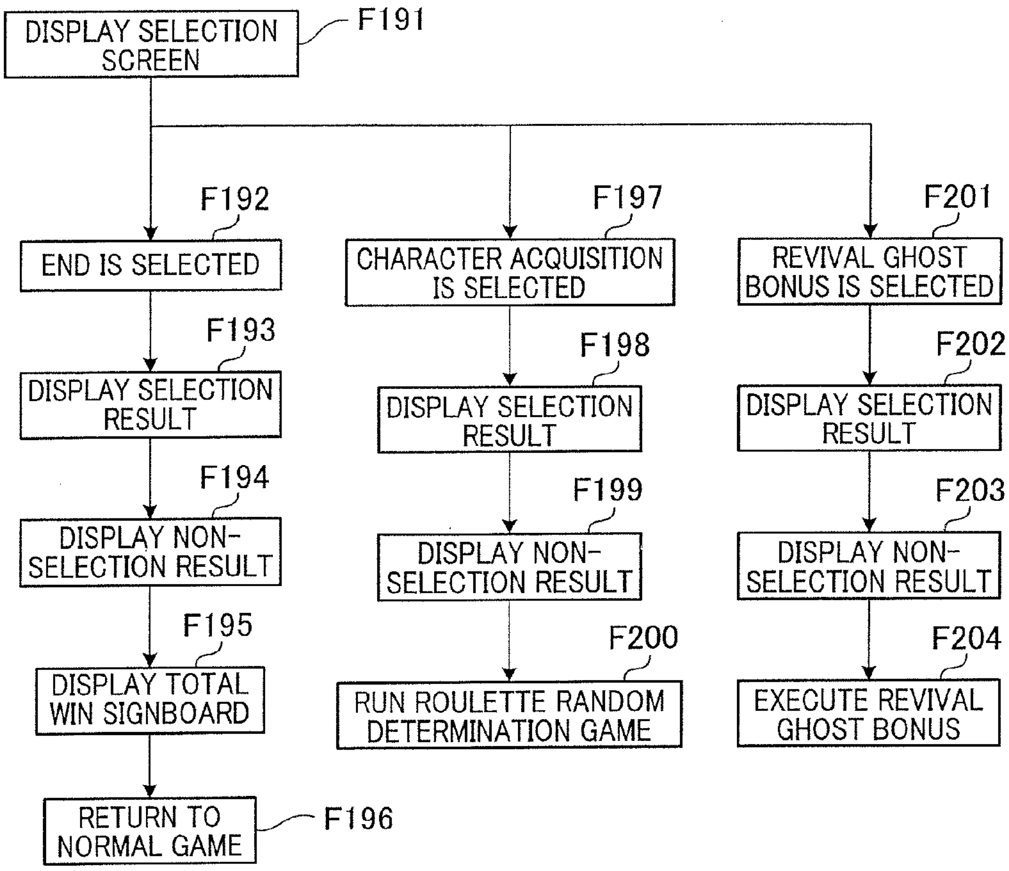

FIG. 169 is a flowchart of a 4-option game.

Figure 170:
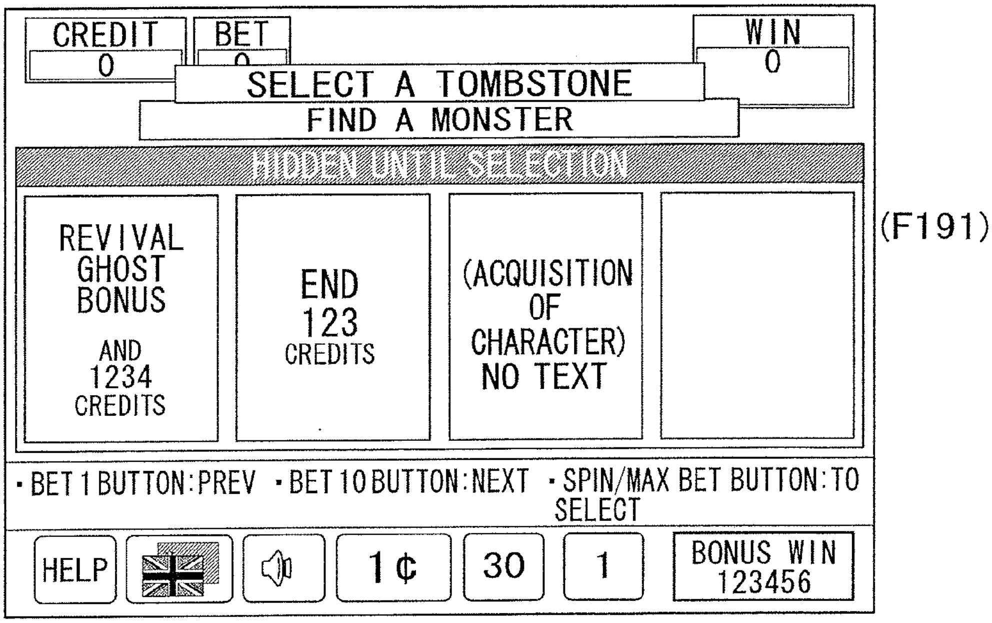

FIG. 170 illustrates the operation steps of the 4-option game.

Figure 171:
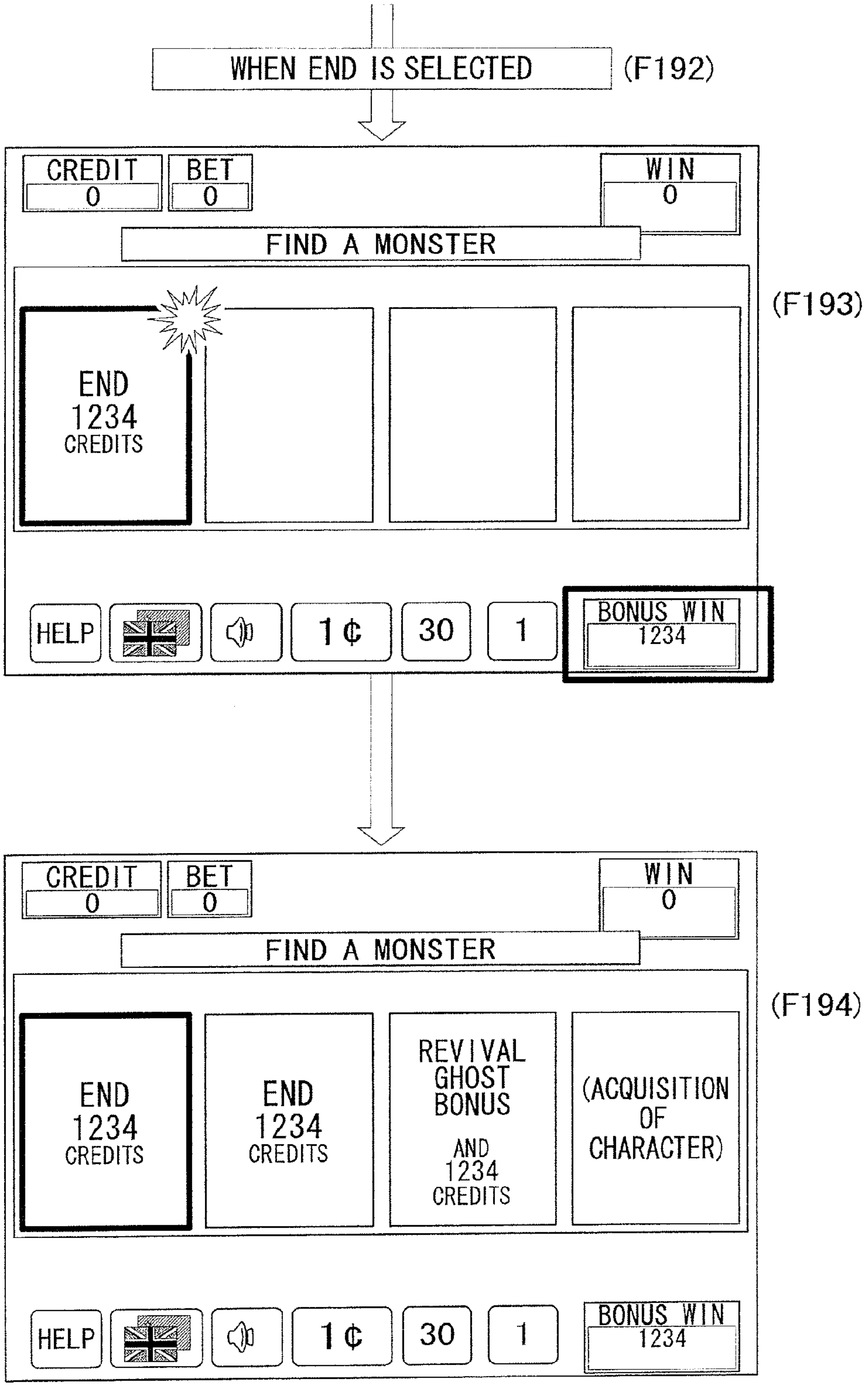

FIG. 171 illustrates the operation steps of the 4-option game.

FIG. 172 illustrates the operation steps of the 4-option game.

Figure 173:
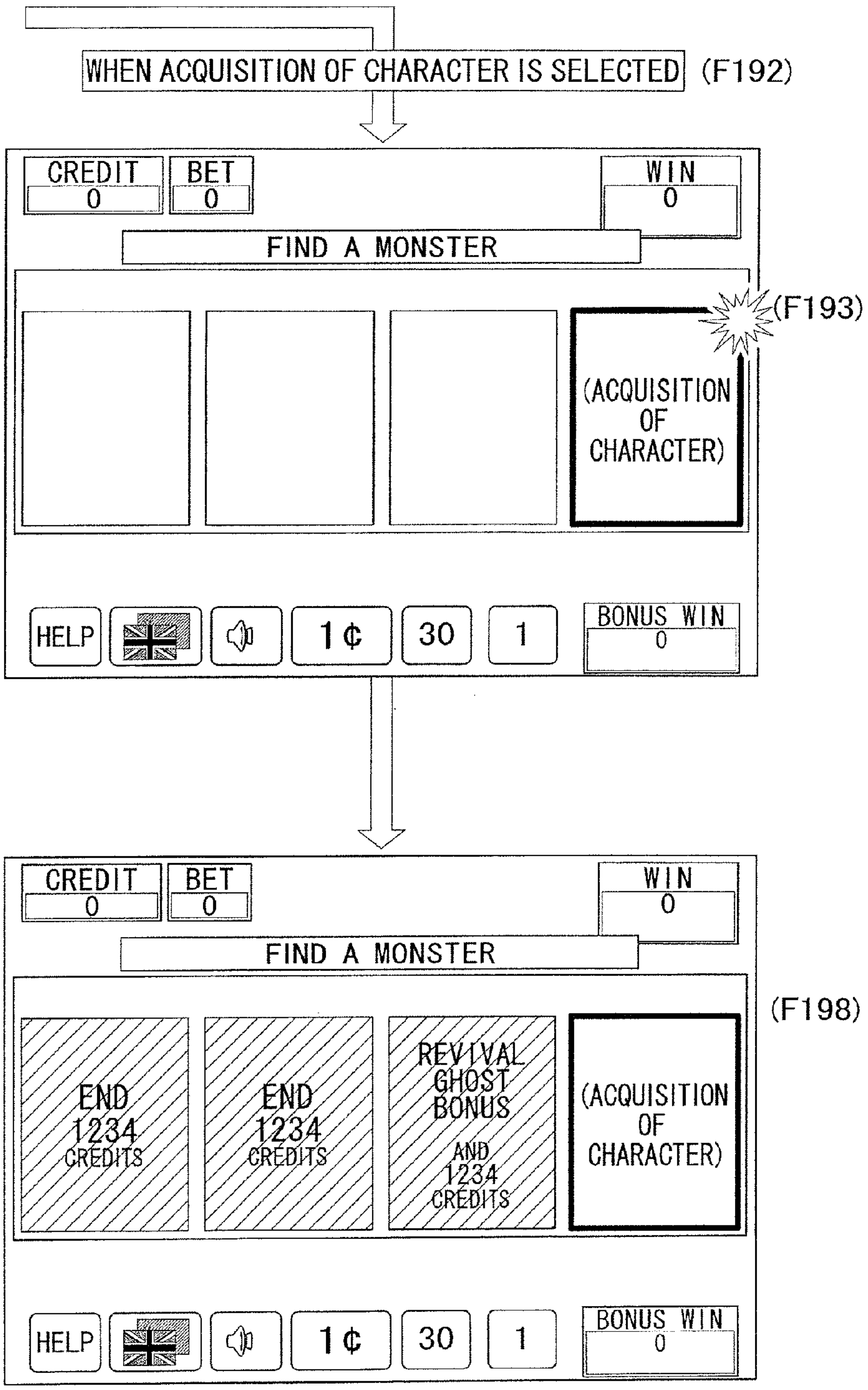

FIG. 173 illustrates the operation steps of the 4-option game.

Figure 174:
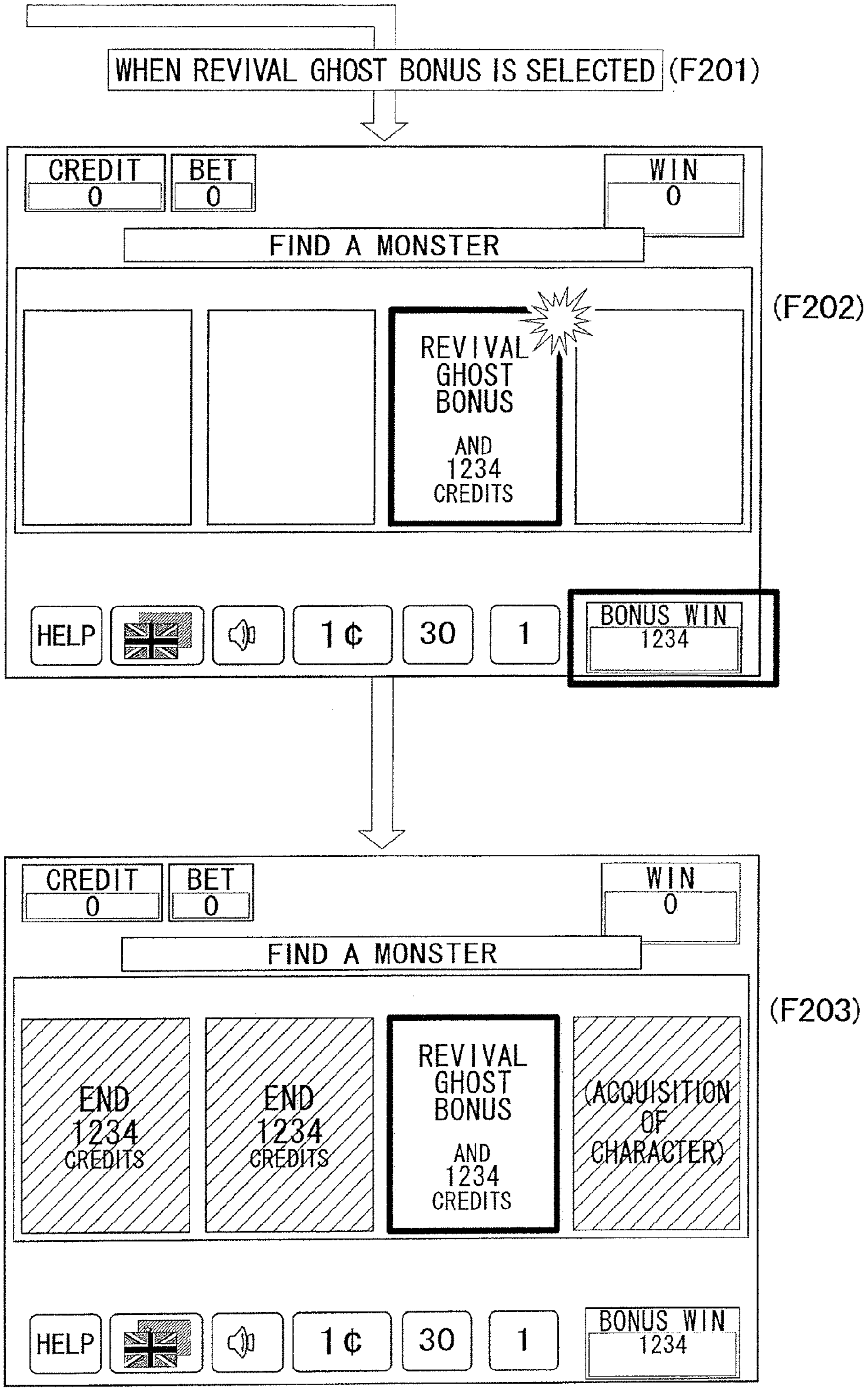

FIG. 174 illustrates the operation steps of the 4-option game.

Figure 175:
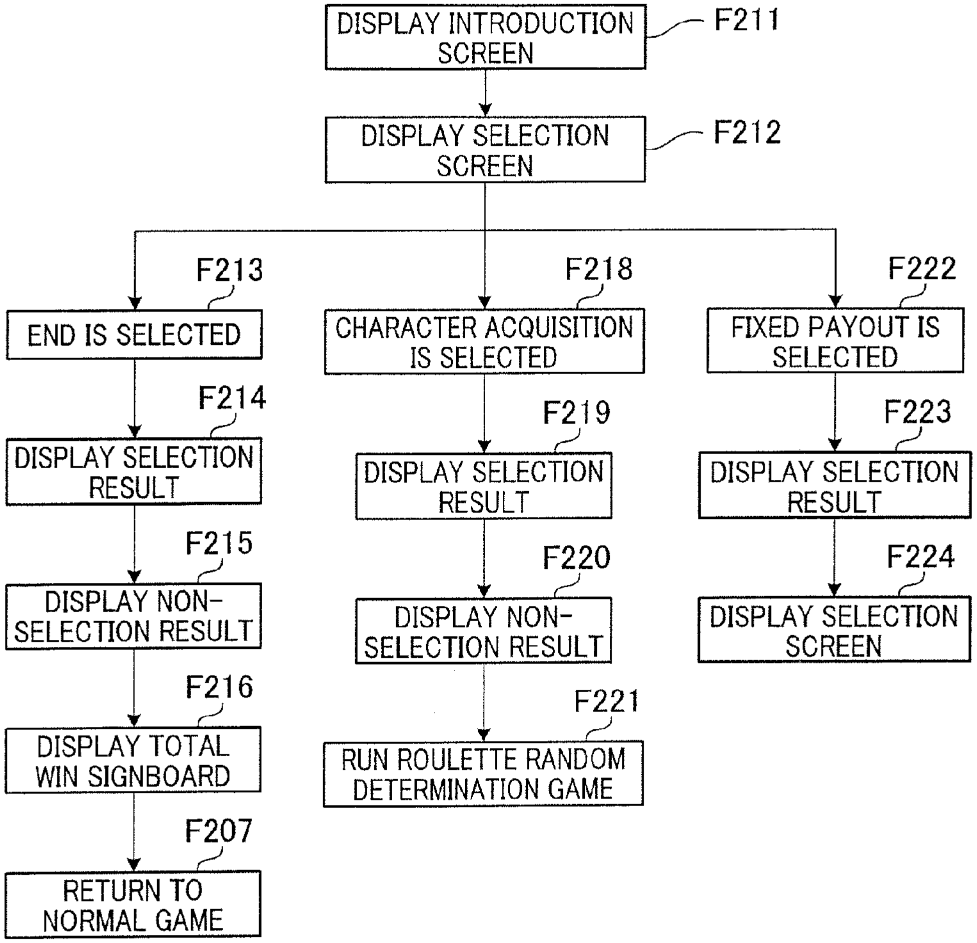

FIG. 175 is a flowchart of a revival ghost bonus.

Figure 176:
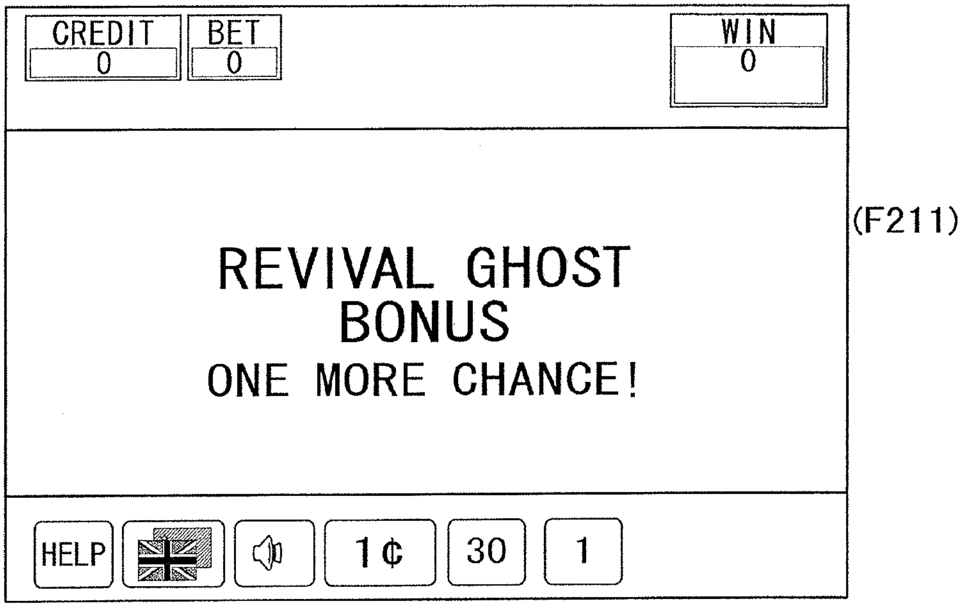

FIG. 176 illustrates operation steps of the revival ghost bonus.

Figure 177:
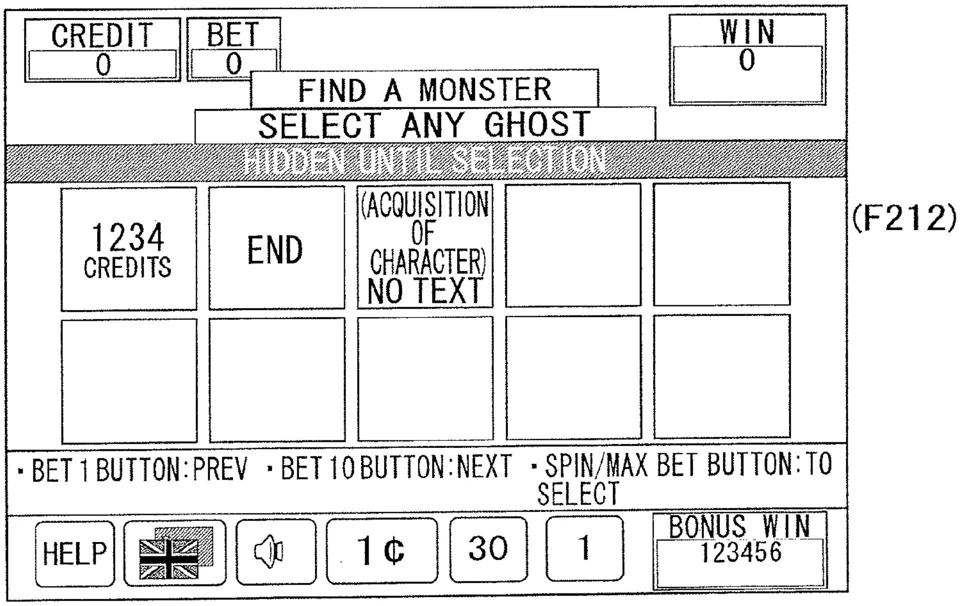

FIG. 177 illustrates operation steps of the revival ghost bonus.

Figure 178:
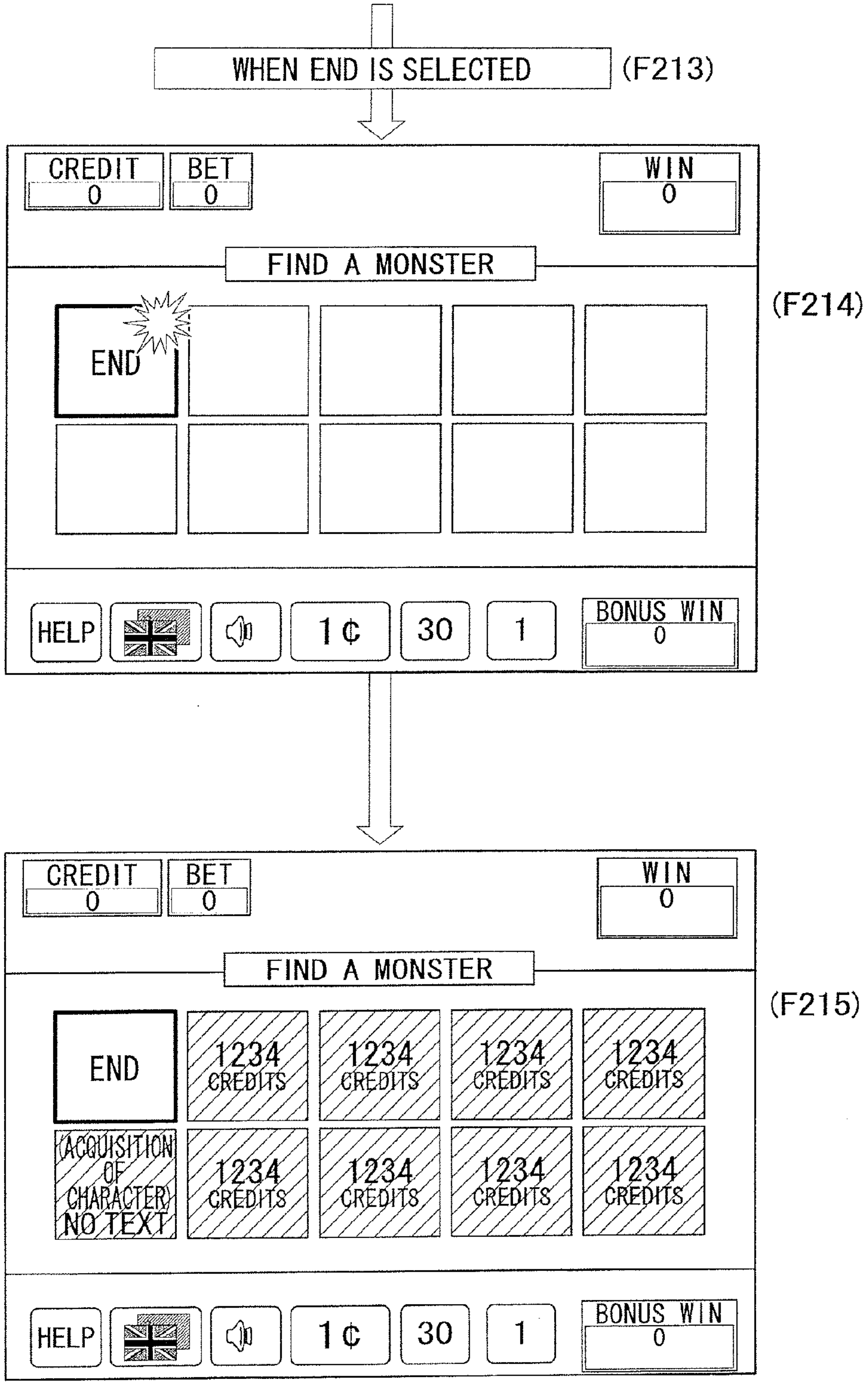

FIG. 178 illustrates operation steps of the revival ghost bonus.

Figure 179:
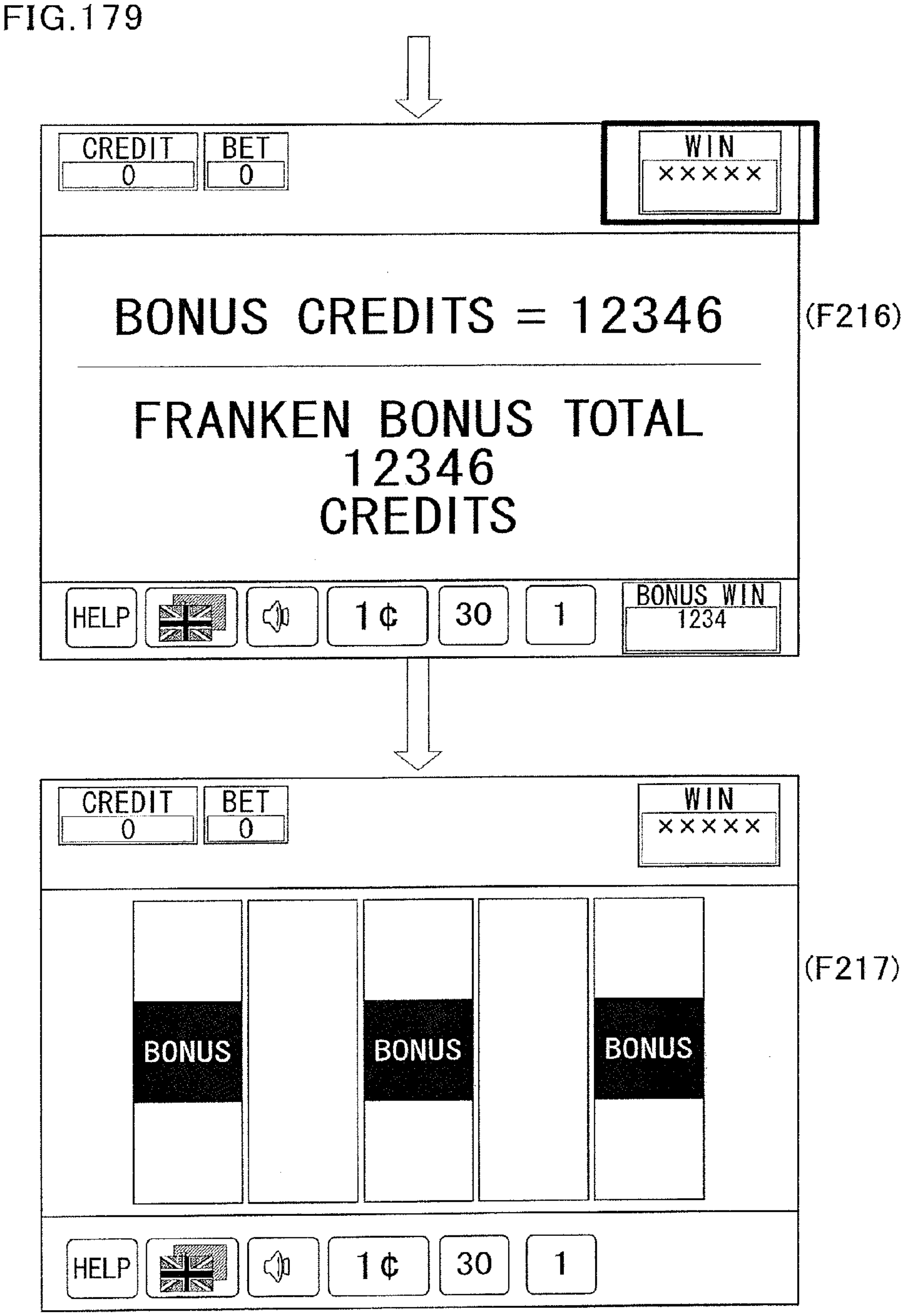

FIG. 179 illustrates operation steps of the revival ghost bonus.

Figure 180:
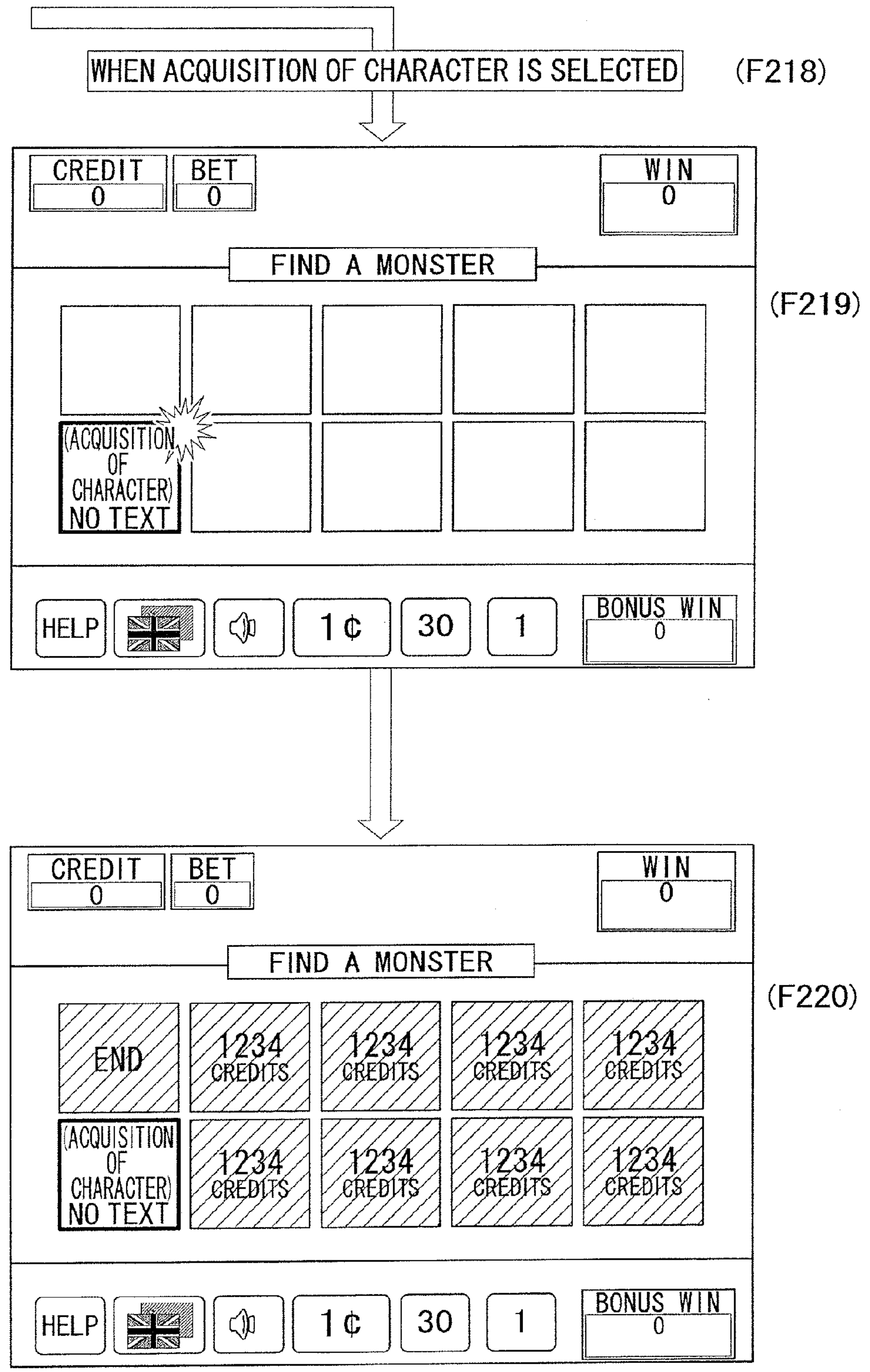

FIG. 180 illustrates operation steps of the revival ghost bonus.

Figure 181:
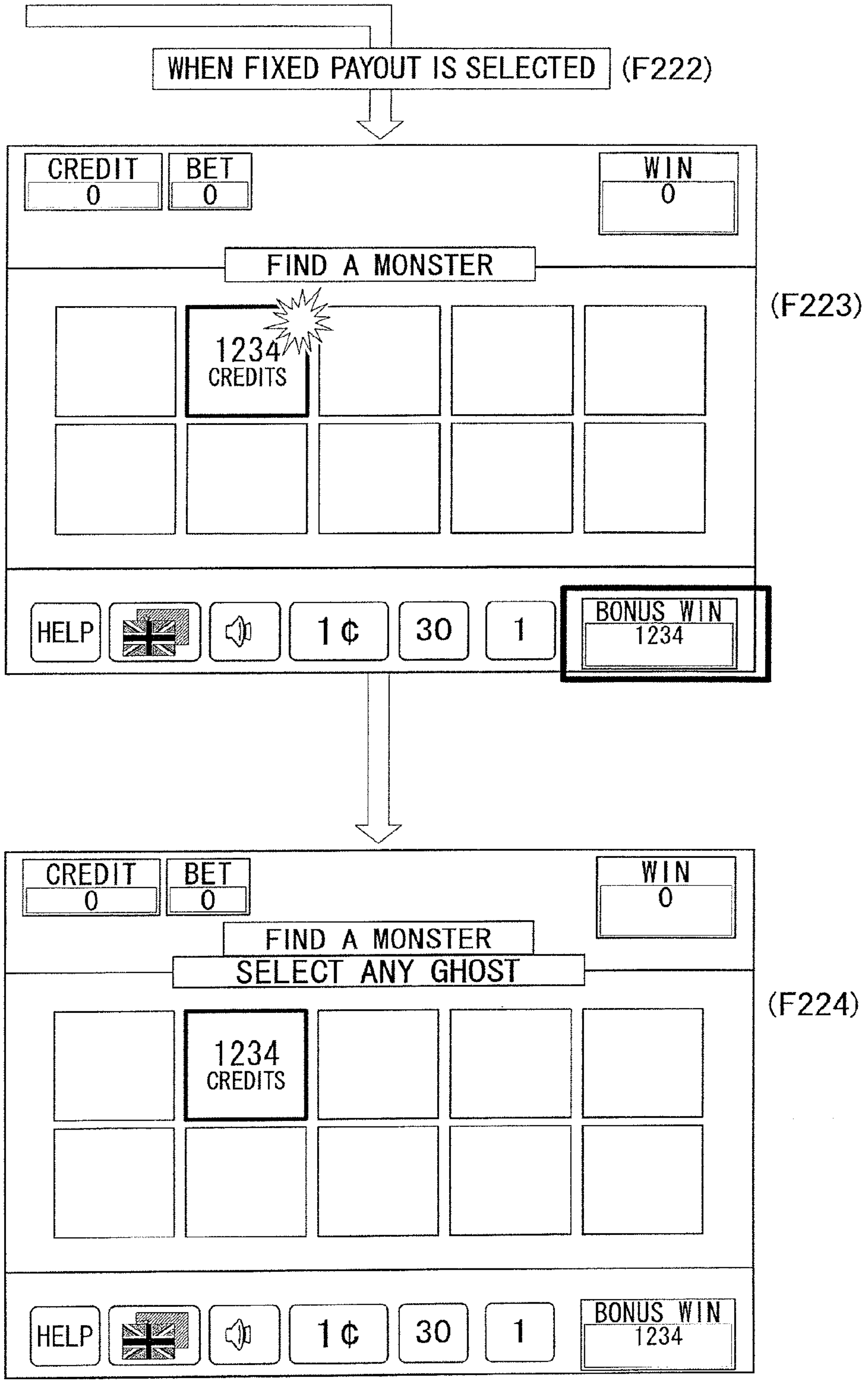

FIG. 181 illustrates operation steps of the revival ghost bonus.

Figure 182:
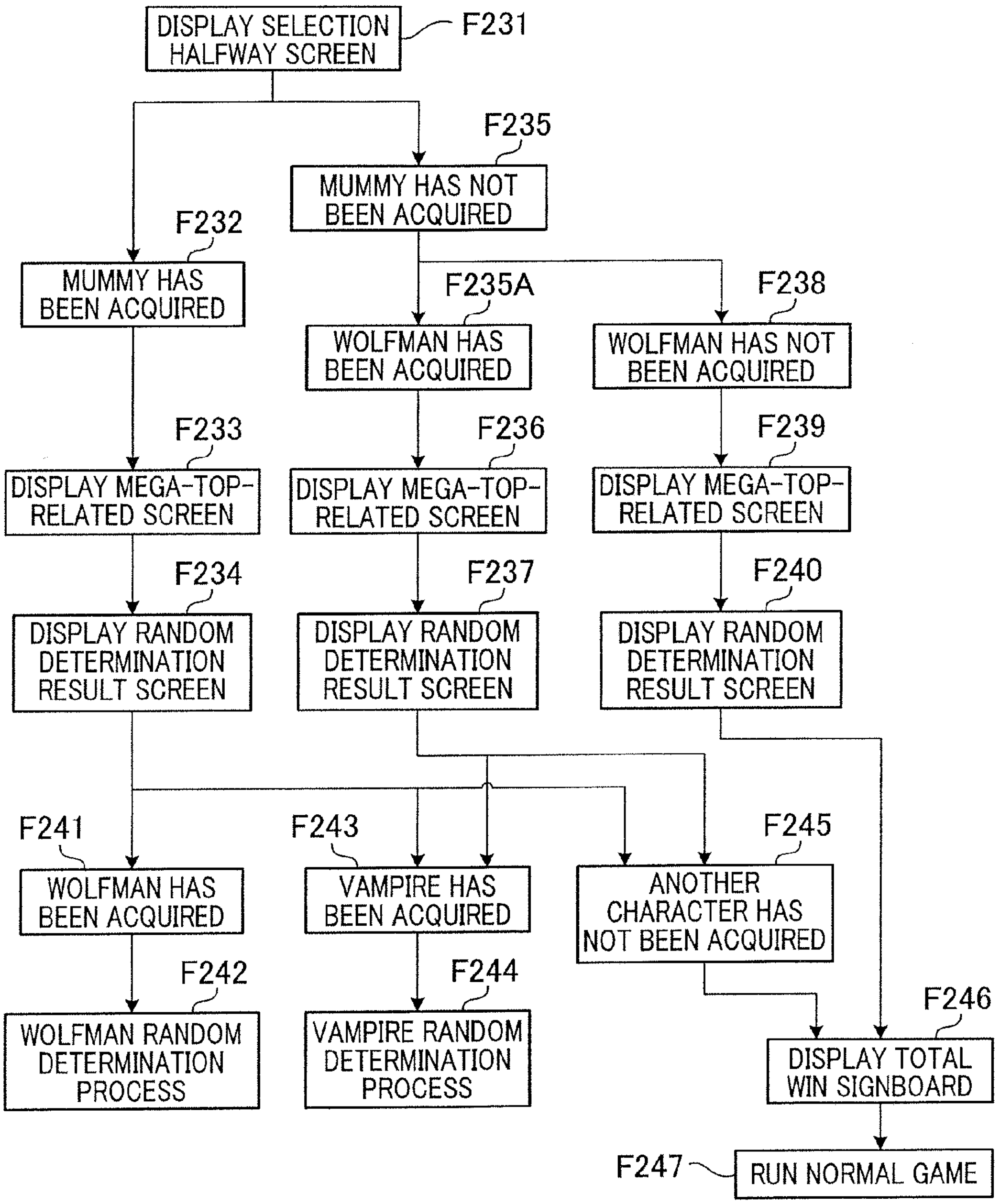

FIG. 182 is a flowchart of a roulette random determination game.

Figure 183:
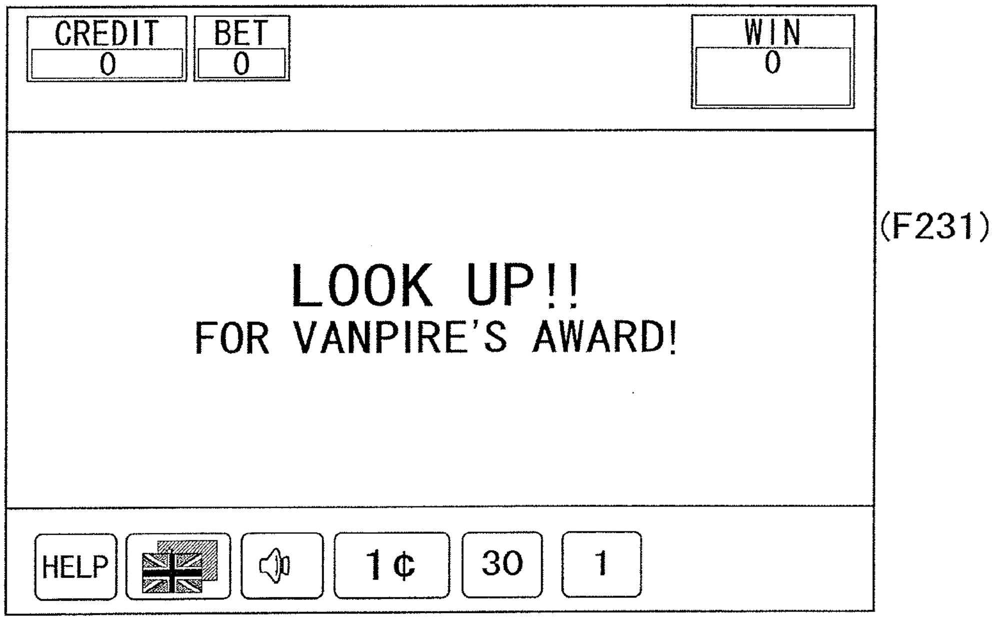

FIG. 183 illustrates operation steps of the roulette random determination game.

Figure 184:
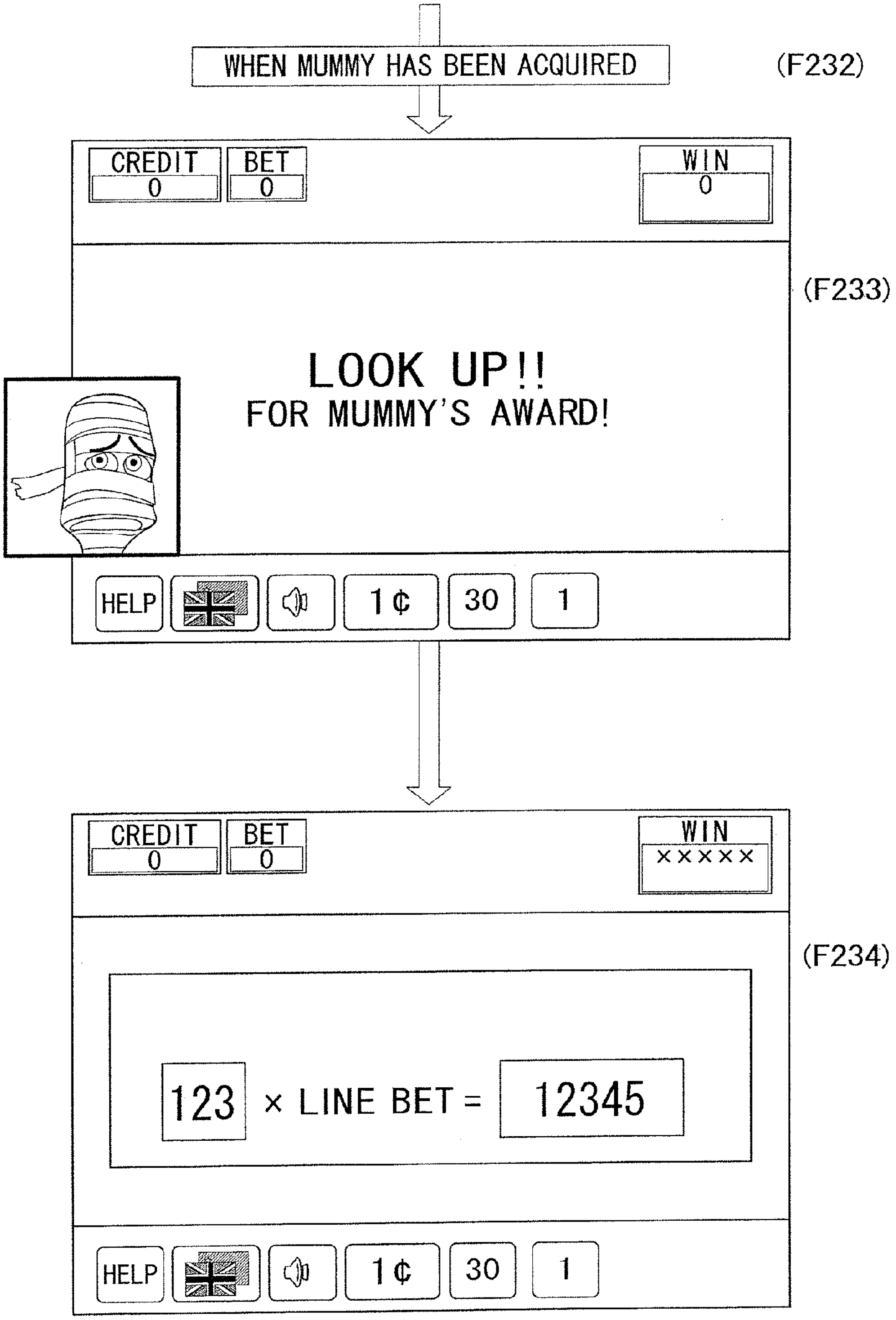

FIG. 184 illustrates operation steps of the roulette random determination game.

Figure 185:
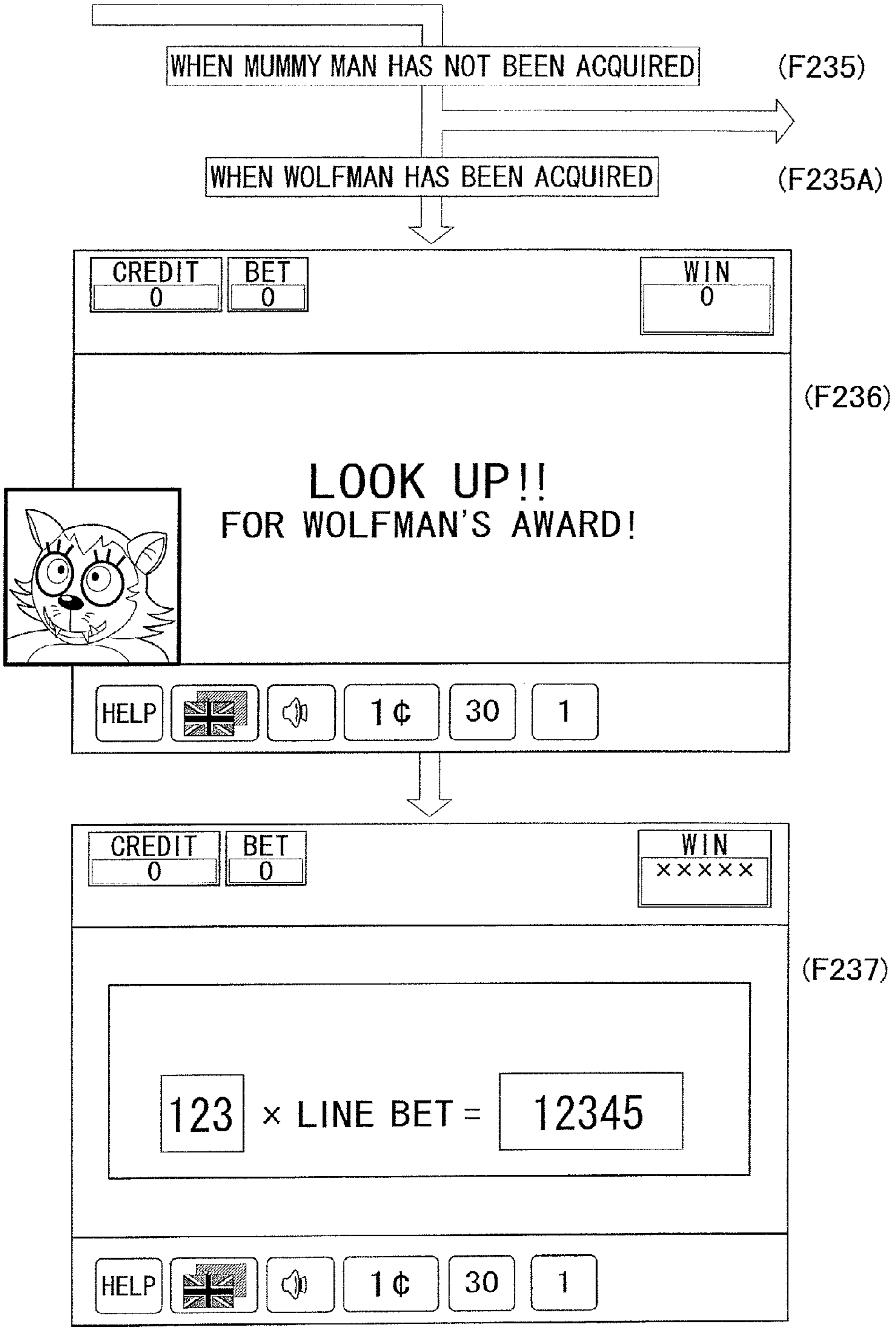

FIG. 185 illustrates operation steps of the roulette random determination game.

Figure 186:
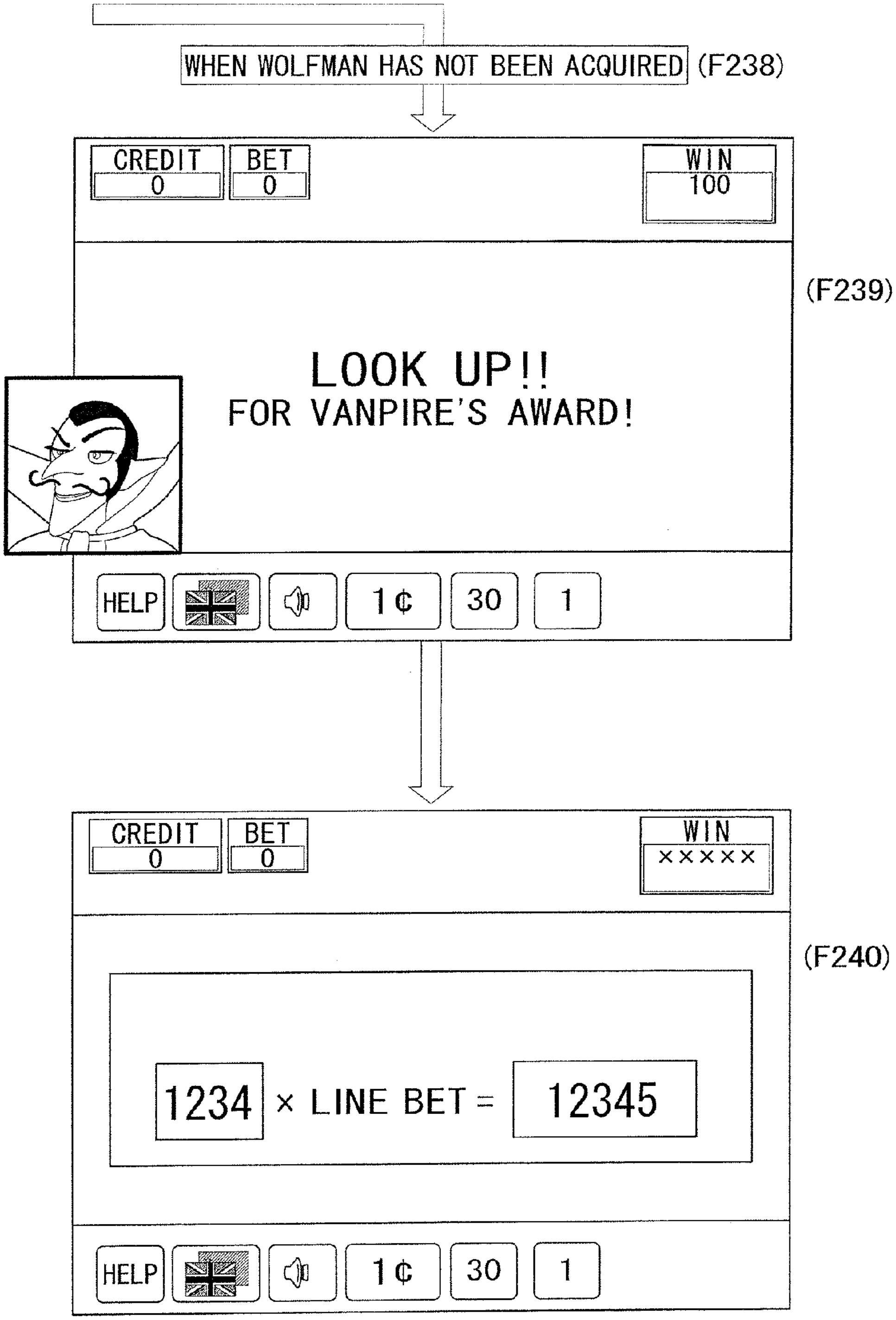

FIG. 186 illustrates operation steps of the roulette random determination game.

Figure 187:
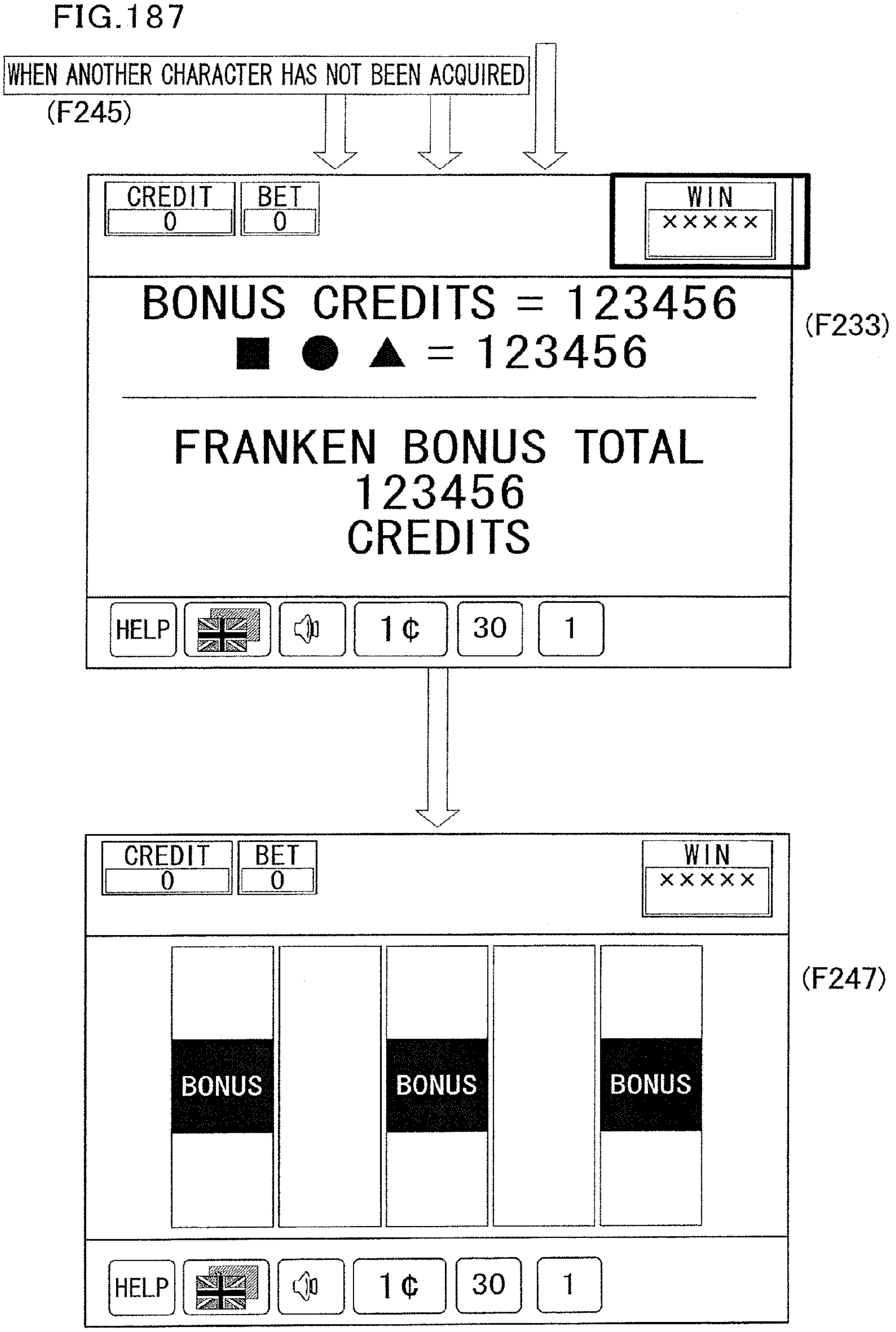

FIG. 187 illustrates operation steps of the roulette random determination game.

FIG. 188 illustrates a character state table in a top box in the roulette random determination game.

Figure 189:
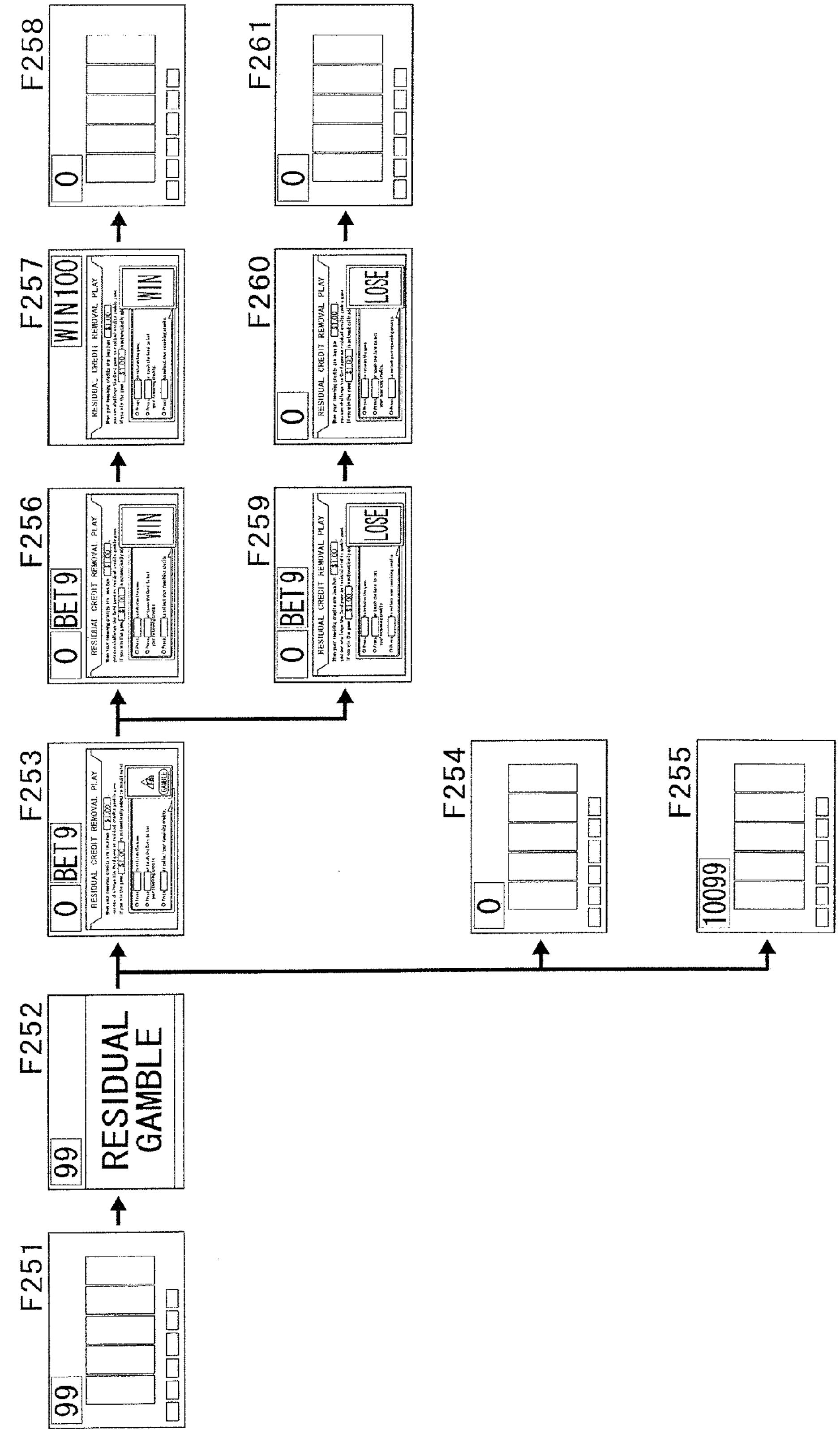

FIG. 189 is a flowchart of a gamble game.

Figure 190:
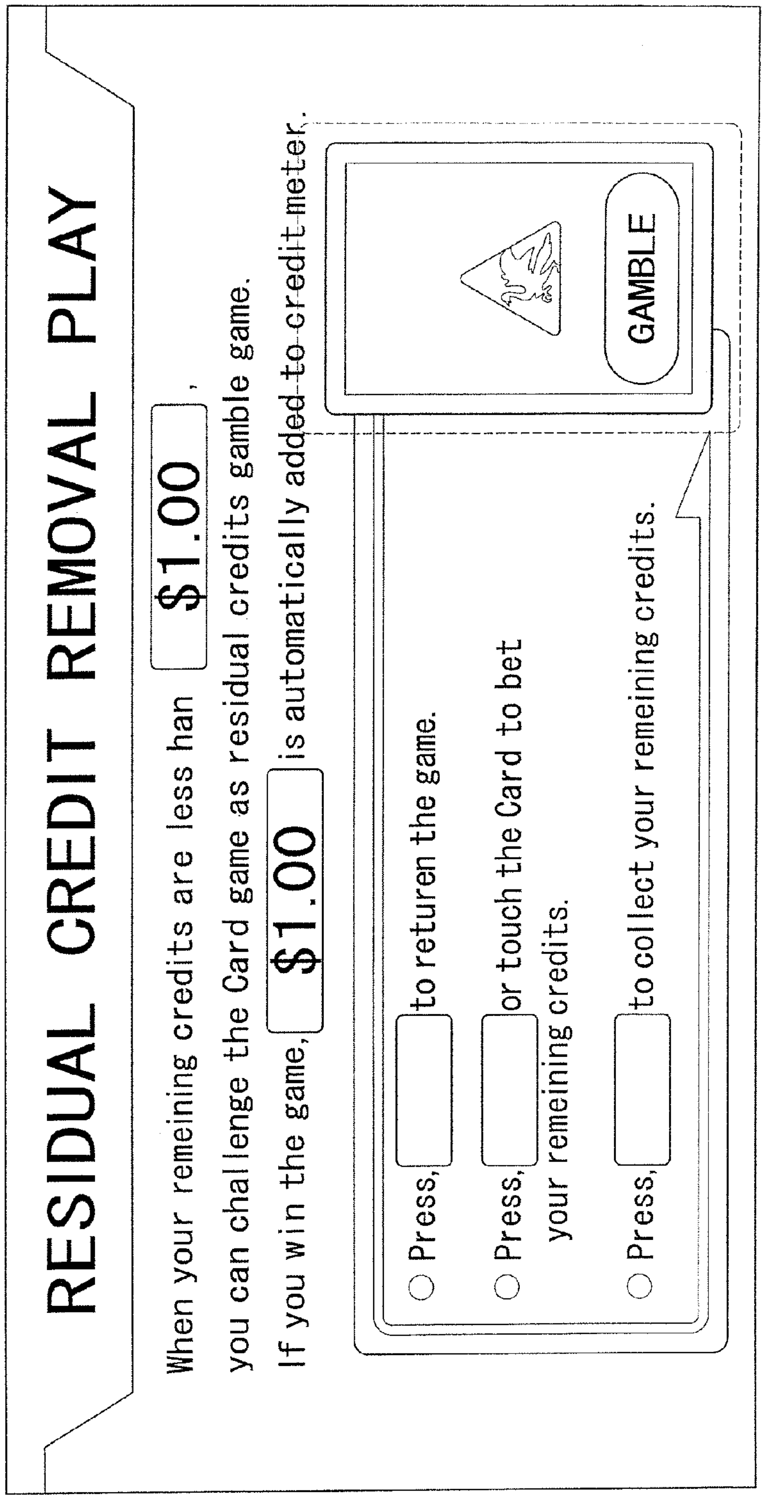

FIG. 190 illustrates a screen in a gamble game.

Figure 191:
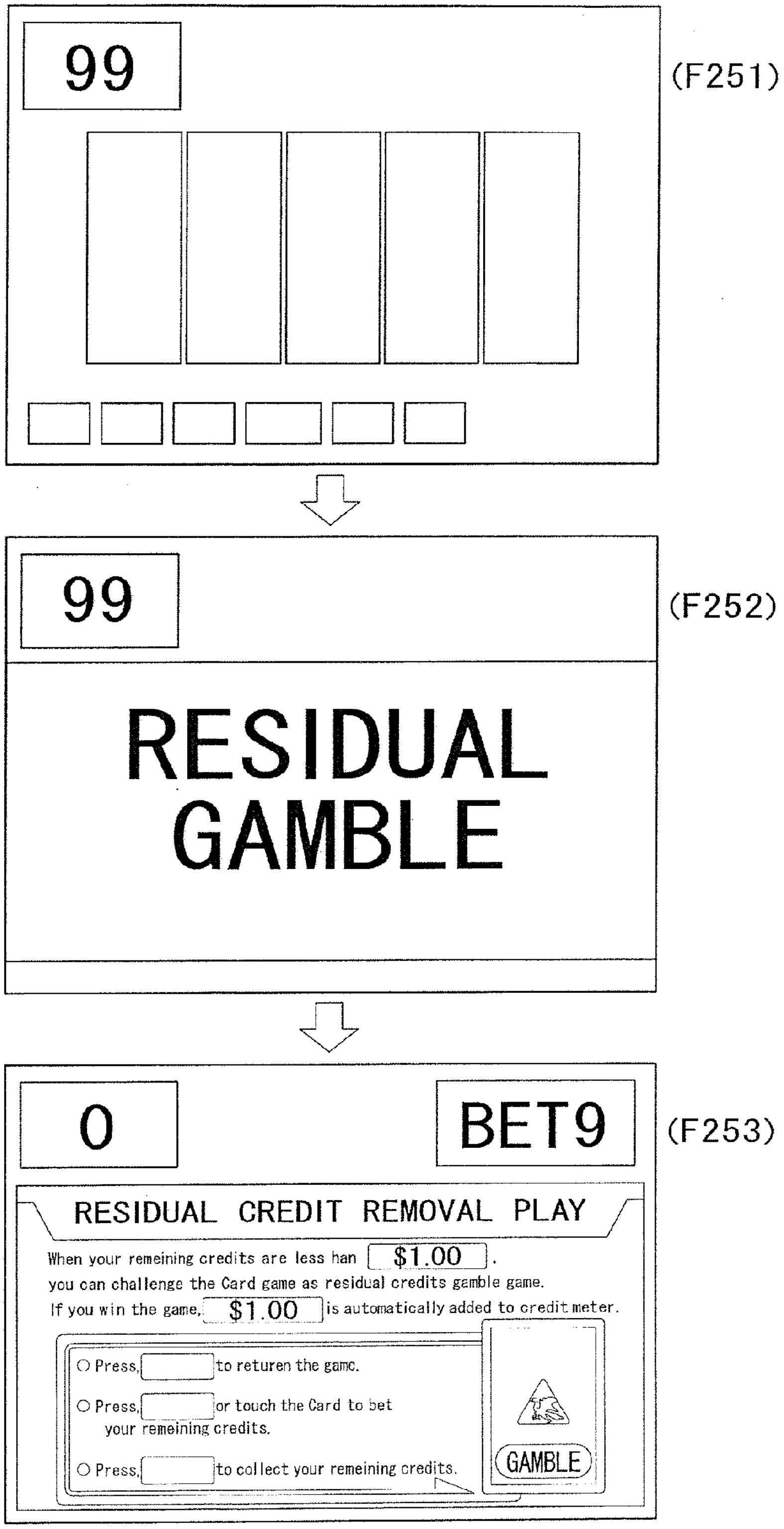

FIG. 191 illustrates operation steps of the gamble game.

Figure 192:
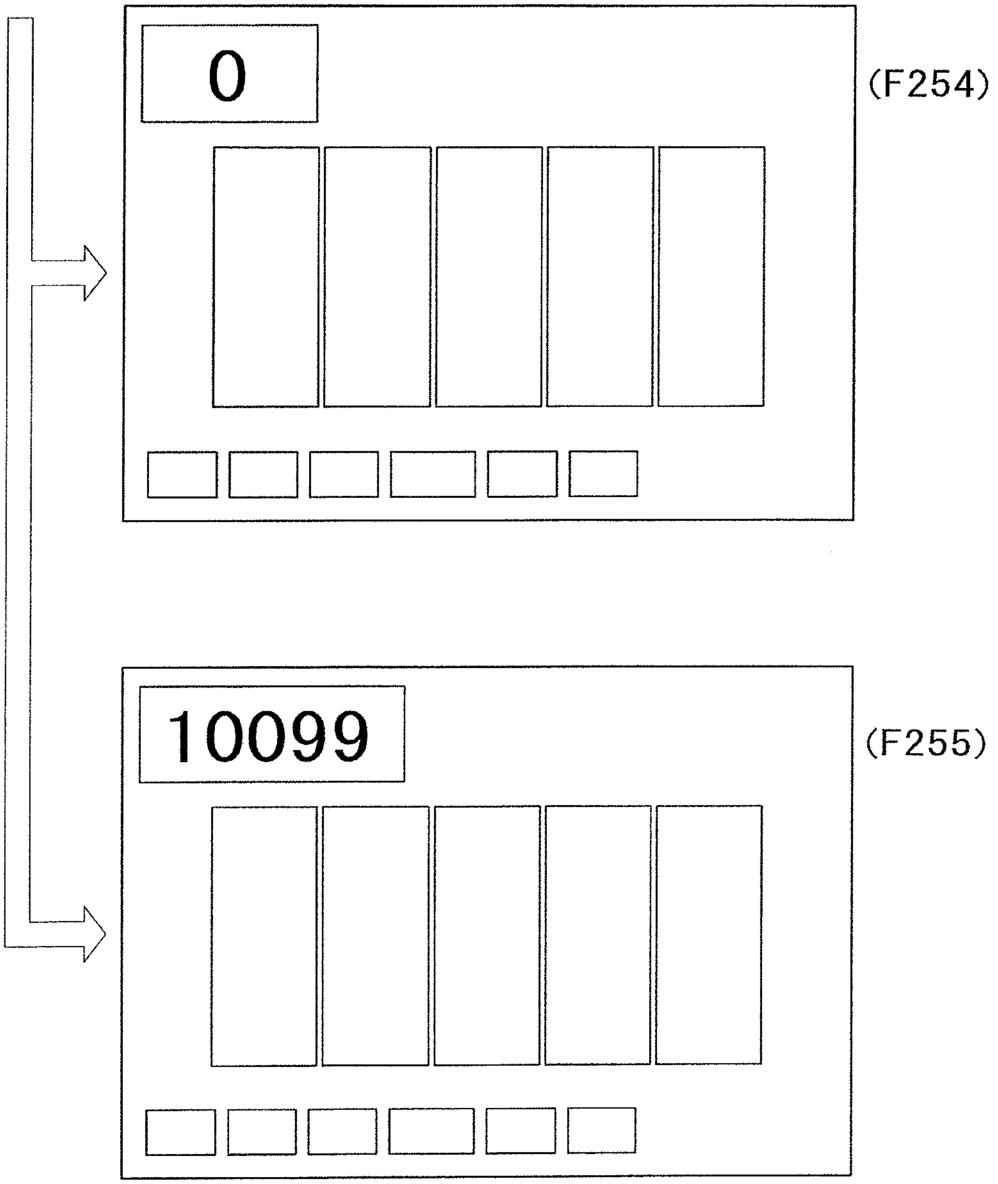

FIG. 192 illustrates operation steps of the gamble game.

FIG. 193 illustrates operation steps of the gamble game.

Figure 194:
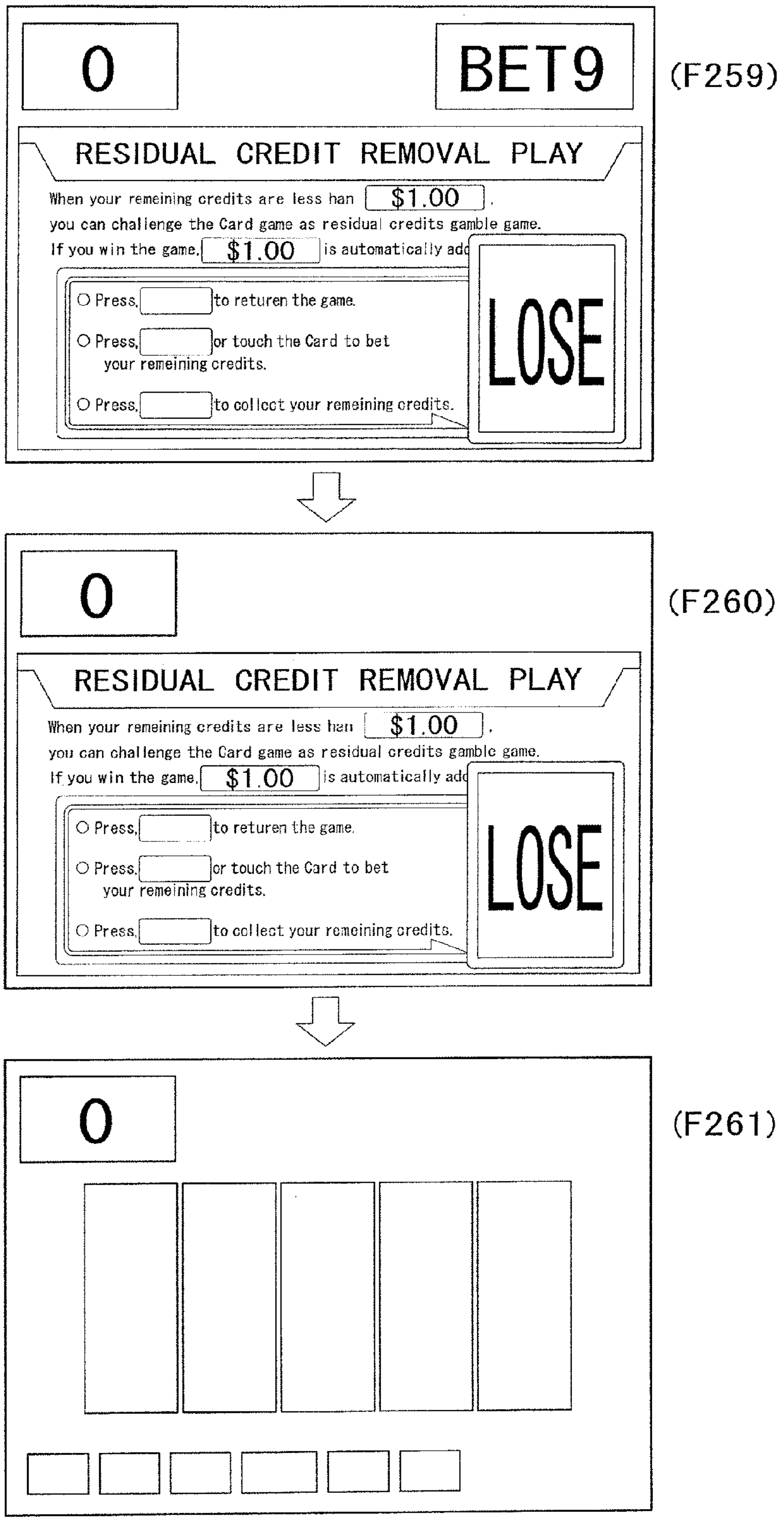

FIG. 194 illustrates operation steps of the gamble game.

DESCRIPTION OF THE EMBODIMENTS

The following will describe a gaming machine of the present invention with reference to figures.

(Outline of Gaming Machine)

Figure 1:
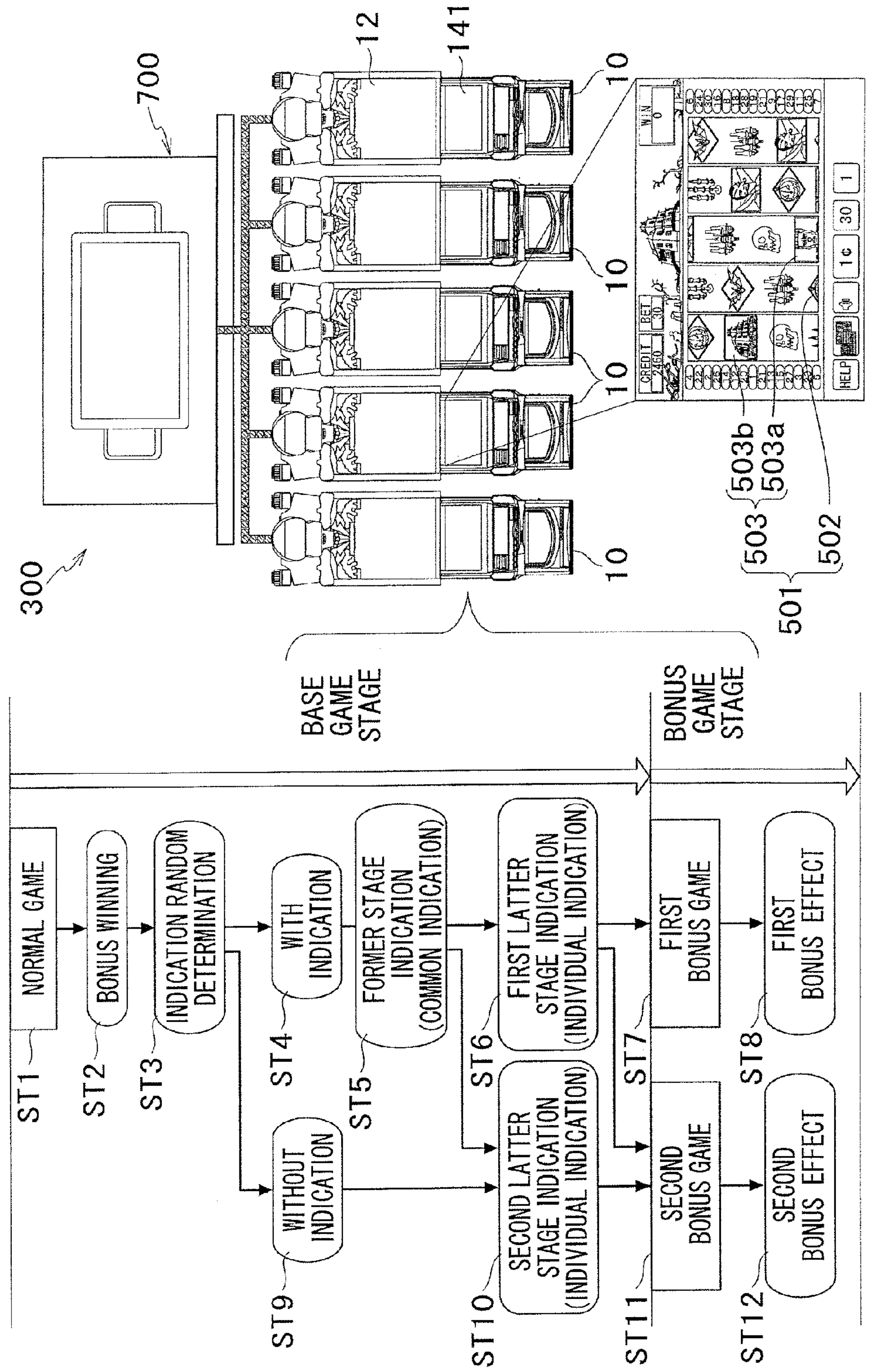
FIG. 1 illustrates an operation state of a gaming machine.

As shown in FIG. 1, a gaming machine has a first feature of executing an individual indication effect associated with the type of a bonus game, after the execution of a common indication effect associated with a plurality of types of the bonus game is started during an execution time of a base game (normal game). In other words, the gaming machine has a first feature of executing a common indication effect for a plurality of types of individual indication effects by executing indication effects for a plurality of types of bonus game in more than one stages. The common indication effect and the individual indication effect will be detailed later.

To more specifically describe the first feature, as shown in FIG. 1, a gaming machine 300 is a multi-player gaming machine in which a plurality of slot machines 10 that are gaming terminals are connected to a center controller 200 (FIG. 2 and FIG. 3) to be able to communicate with one another. The gaming machine 300 is able to run a base game such as a slot game at each slot machine 10 and run a common game at a common display device 700 or the like while synchronizing the slot machines 10. The slot machines 10 and the center controller 200 are connected wireless, by wires, or by both of them. A unit of bet amount may be a currency of a country or area such as dollar, yen, euro, or the like, or may be a game point used exclusively in a hole having the gaming machine 300 or in the industry.

Figure 2:
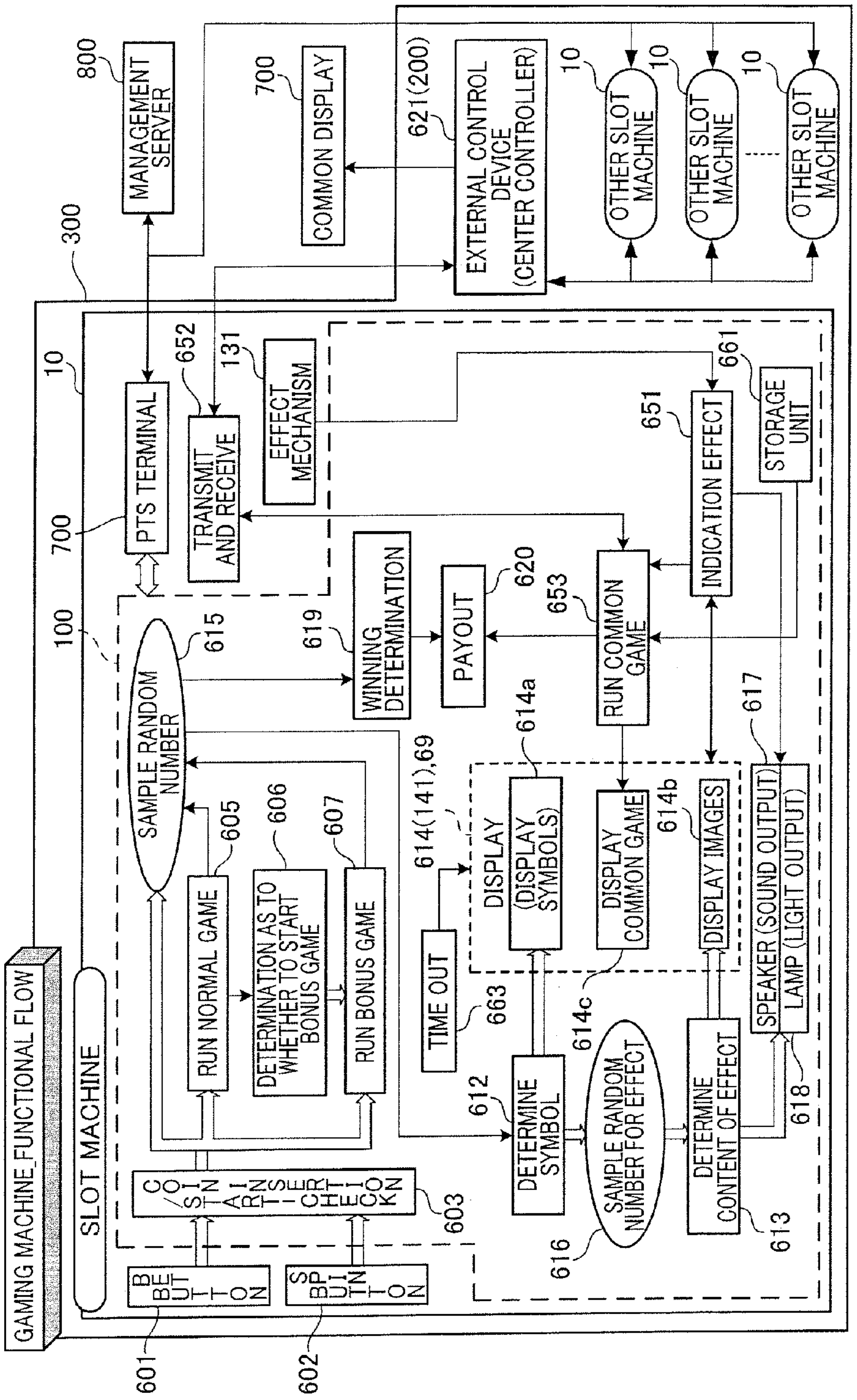
FIG. 2 illustrates a functional flow of the gaming machine.

To further specifically describe the first feature, as shown in FIG. 2, the gaming machine 300 includes a lower image display panel 141 (symbol display device) on which symbol are variably displayed and then rearranged, a storage unit 661 (indication data storage device) that stores individual indication data associated with each type of the bonus game and common indication data associated with a plurality of types of the bonus game, an indication effect device configured to execute an indication effect by using the individual indication data and the common indication data, and a controller programmed to execute the steps (a1) to (a3) below. Examples of the indication effect devices include the lower image display panel 141 and an effect mechanism 131.

In regard to the steps (a1) to (a3) executed by the terminal controller of the slot machine 10, the step (a1) is a step for randomly determining a game result of the rearrangement of the symbols on the lower image display panel 141. The step (a2) is a step for specifying which individual indication data and common indication data are associated with the type of the bonus game, when the game result is a winning of the bonus game. The step (a3) is a step for executing an indication effect based on the individual indication data, after an indication effect is started based on the common indication data specified in the step (a2) during a period in which the symbols are variably displayed on the lower image display panel 141.

Figure 6:
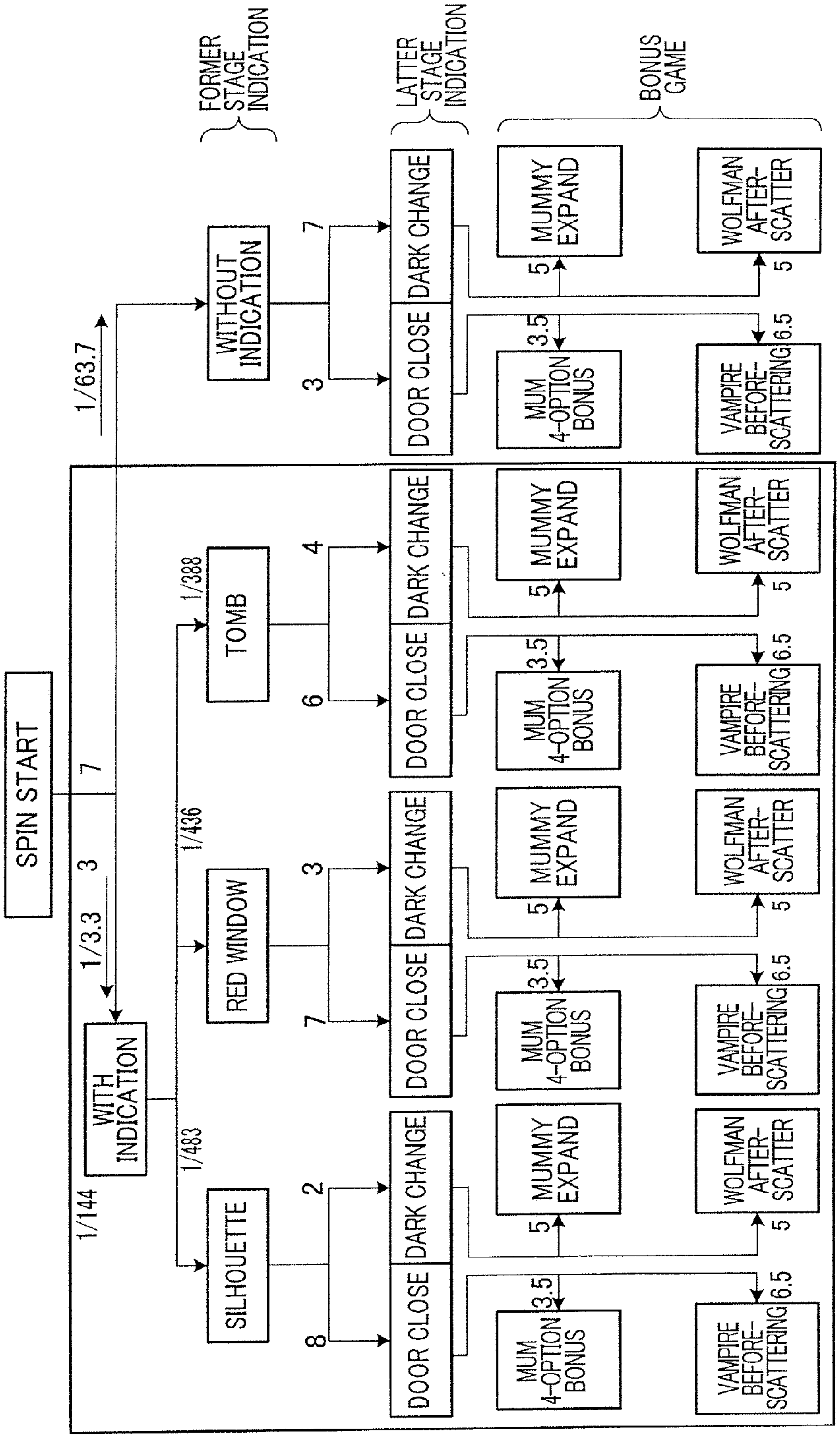
FIG. 6 is a flowchart of an indication effect.

It is noted that the common indication effect based on the common indication data and the individual indication effect based on the individual indication data may be serially executed, may be executed to be independent from each other, or may be executed to partially overlap each other, in time series from the start of the game. That is to say, the relationship between the common indication effect and the individual indication effect is summarized such that the common indication effect starts before the start of the individual indication effect, and the timings to end the effects are determined at will. Furthermore, to put it differently, as shown in FIG. 6, the common indication effect is former stage indication whereas the individual indication effect is latter stage indication.

Figure 3:
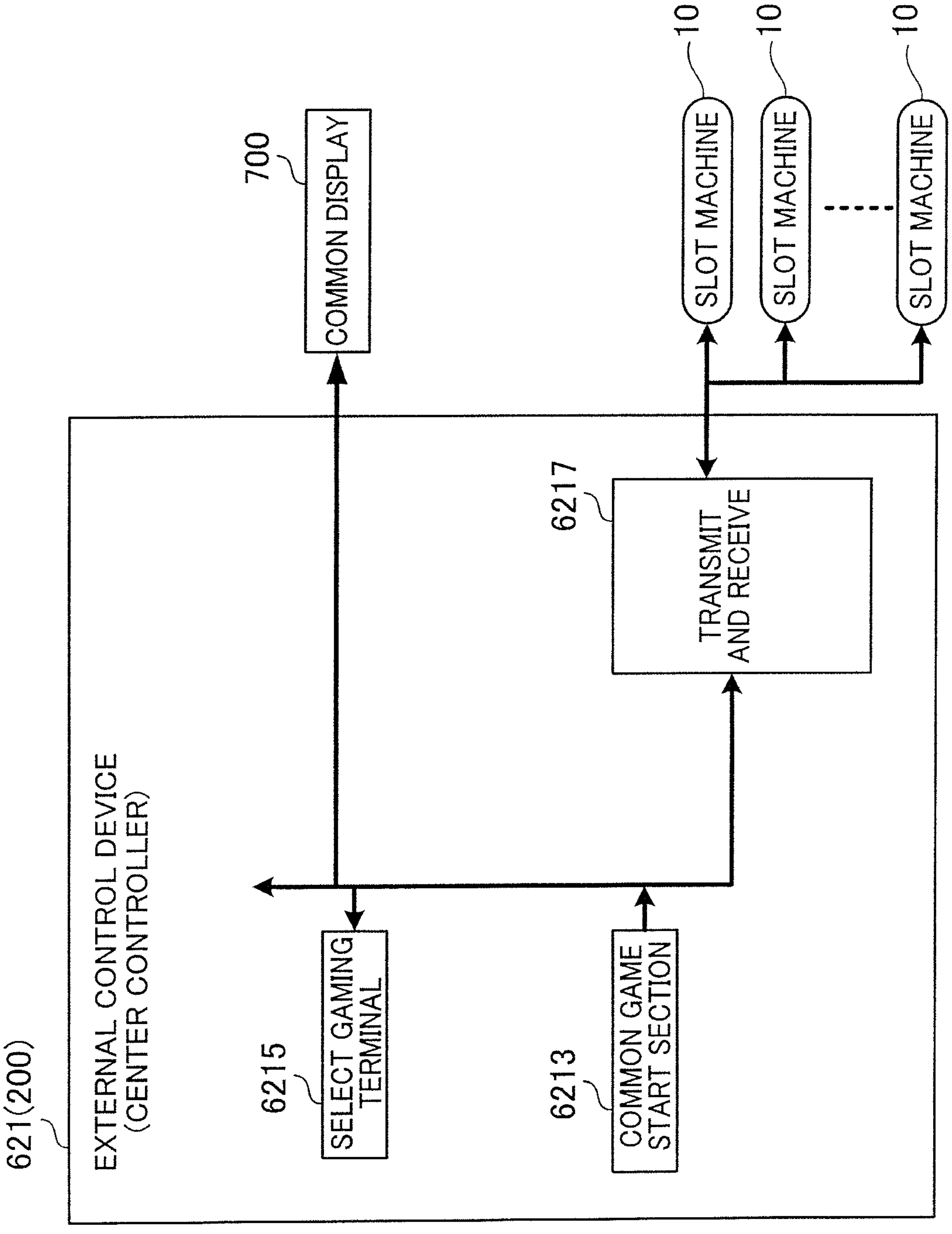
FIG. 3 illustrates a functional flow of the gaming machine.

In addition to the above, as shown in FIG. 1 to FIG. 3, the common game may be run in place of the base game, or the base game and the common game may be simultaneously run. Furthermore, while in the present embodiment the gaming machine 300 includes the center controller 200 in addition to the slot machines 10, the disclosure is not limited to this arrangement. The gaming machine 300 may be arranged such that one or more slot machine 10 has the function of the center controller 200 and the slot machines 10 are connected to be able to communicate with one another. Alternatively, the gaming machine may be a single slot machine 10.

(Outline of Gaming Machine: Definitions)

The slot machine 10 above is a kind of the gaming terminals in the gaming machine 300. Although the present embodiment deals with the slot machine 10 as an example of the gaming terminal, the disclosure is not limited to this and any type of device having a terminal controller that is able to independently run a base game may be used as the gaming terminal.

The base game in the present embodiment is run by the slot machine 10. The base game is a slot game of rearranging a plurality of symbols 501. The base game is not limited to the slot game but is any type of games capable of being independently run at a gaming terminal such as the slot machine 10. In other words, the base game is a game in contrast to the common game. For example, a normal game and a bonus game that are described later are types of the base game.

The rearrangement of the symbols in the slot game is performed on the lower image display panel 141. The slot game includes a process of running a normal game of rearranging symbols on the lower image display panel 141 on condition that a gaming value is bet and awarding a normal payout based on the rearranged symbols, a process of running a bonus game of rearranging symbols with the assumption that the payout rate is higher than that of the normal game when the rearranged symbols achieve a predetermined condition and awarding a bonus payout based on the rearranged symbols, and a process of executing a rescue process when a rescue start condition is established.

Symbols 501 are constituted by a specific symbol 503 and a normal symbol 502. In other words, the symbol 501 is a superordinate concept to the specific symbol 503 and the normal symbol 502. The specific symbol 503 includes a wild symbol 503*a* and a trigger symbol 503*b*. The wild symbol 503*a* can be used as a substitute for any type of the symbol 501. The trigger symbol 503*b* is a symbol that triggers at least the execution of the bonus game. For example, the trigger symbol 503*b* functions as a trigger to shift the normal game to various types of the bonus game.

The trigger symbol 503*b* may function as a trigger of increase in the number of the specific symbols 503 in the bonus game, i.e., increase in the number of the specific symbols 503 of at least one of the trigger symbol 503*b* and the wild symbol 503*a*. Furthermore, the trigger symbol 503*b* may function as a trigger of increase in the number of times to run the bonus game.

A coin, a bill, or electrically valuable information corresponding to these is used as a gaming value. The gaming value may be a game point not related to any monetary value. The coin may be a medal used exclusively for games. It is to be noted that the gaming value in the disclosure is not limited to these, and for example a medal, a token, electric money or the like can be adopted. Further, a later-described ticket with a barcode is also used.

Figure 4:
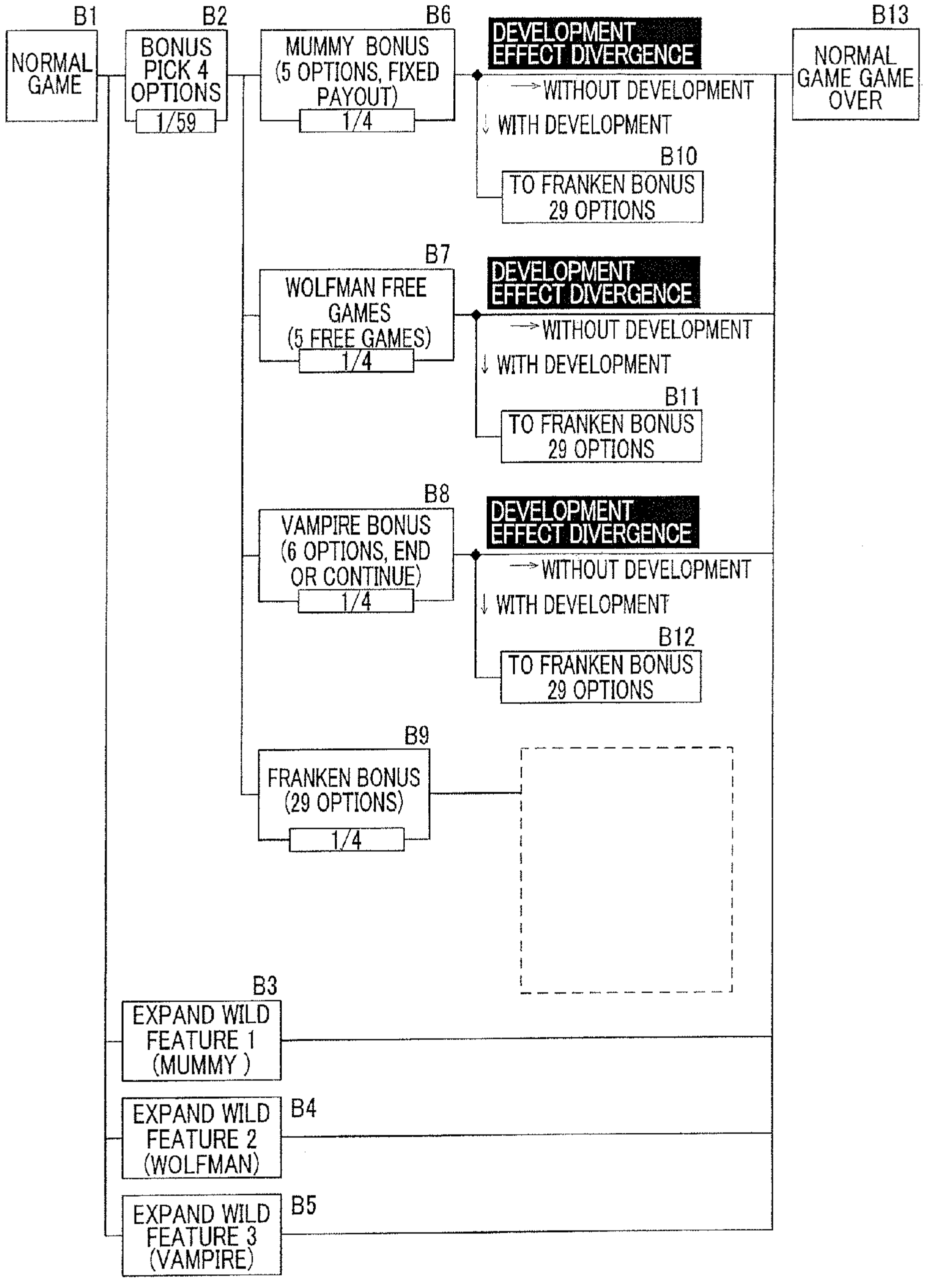
FIG. 4 is a flowchart showing the outline of a bonus game.

The bonus game is equivalent to a feature game. In the present embodiment, there are at least four types of the bonus games. More specifically, as shown in FIG. 4, there are four types of the bonus game, namely, “Franken BONUS”, “Mummy BONUS”, “Wolfman BONUS”, and “Vampire BONUS”. These types of the bonus games are selectable in a 4-option pickup bonus game, and the shifting to each type is performed by the selection by the player. The 4-option pickup bonus game is run when three trigger symbol 503*b* appear (are rearranged) in a normal game.

Figure 5:
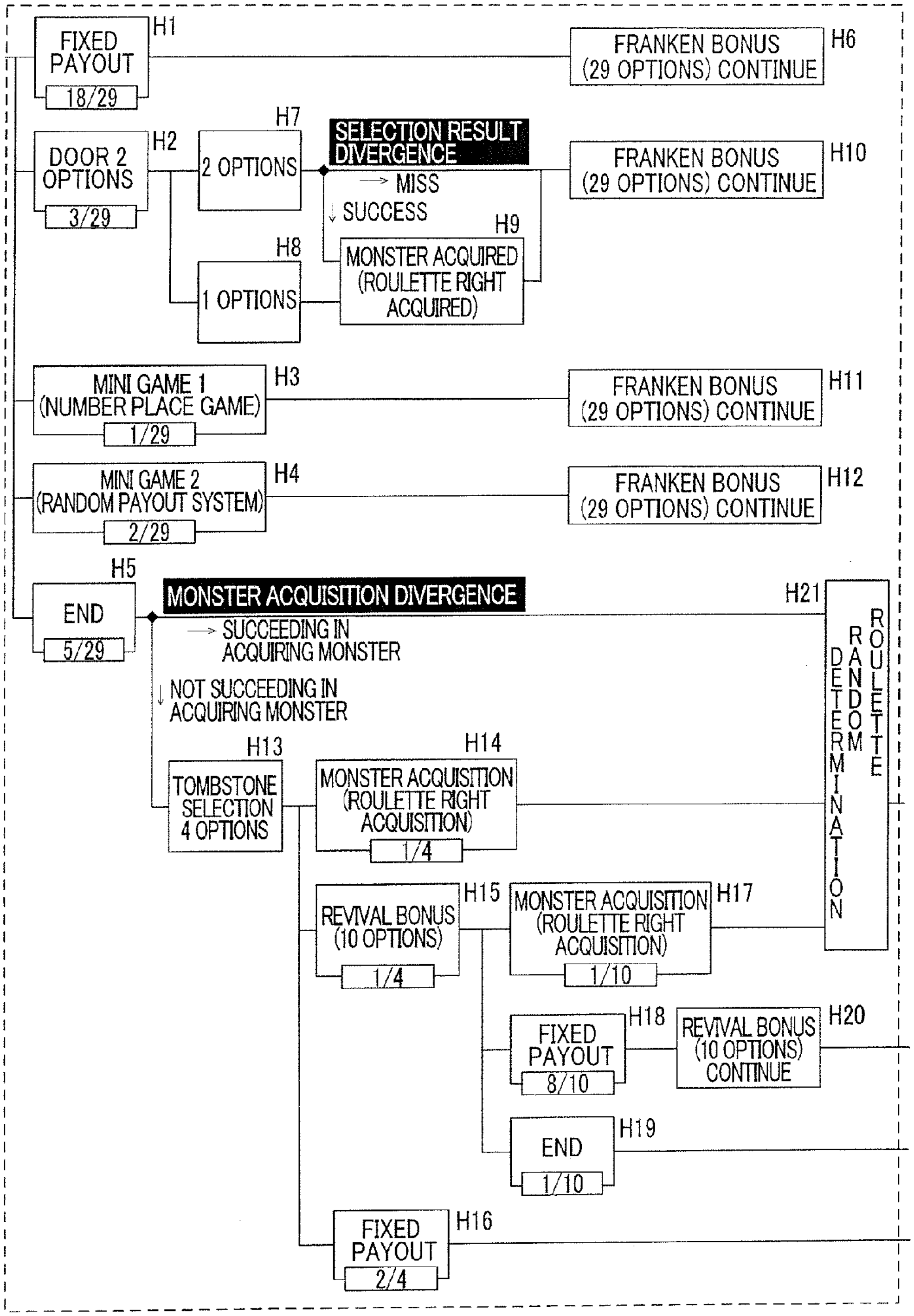
FIG. 5 is a flowchart showing the outline of the bonus game.

The Franken BONUS is a 29-option bonus using the top box 12, the lower image display panel 141 or the like of the slot machine 10. In the Franken BONUS, as shown in FIG. 5, one of a fixed payout, a door 2 options game, a mini game 1, a mini game 2, and END is selectable. Details will be given later.

As shown in FIG. 4, the Mummy BONUS is a 5-option-pick bonus. The Mummy BONUS is a fixed-credit bonus and occurs only once. Furthermore, the Mummy BONUS may develop into the Franken BONUS at the end of the bonus. The Wolfman BONUS is a free game and develops into the Franken BONUS at the end of the bonus. The Vampire BONUS is a 6-option pickup bonus and a fixed-credit bonus. The Vampire BONUS ends when the END occurs and is repeated eight times at the maximum. The Vampire BONUS may develop into the Franken BONUS. Furthermore, the Vampire BONUS may develop into the Franken BONUS at the end of the bonus.

In addition to the above, another type of the bonus game is an expand wild feature. This bonus game occurs in a mystery effect (i.e., no bonus symbol appears on the reel 3), and shifts to various types of wild bonus. The types of the wild bonus are a mummy wild feature (expand wild feature 1), a wolfman wild feature (expand wild feature 2), and a vampire wild feature (expand wild feature 3). The mummy wild feature is a bonus game of changing symbols on one row or plural rows to Wild. The wolfman wild feature is a bonus game of changing one or more symbol to the Wild and executing an after-scattering process. The vampire wild feature is a bonus game of changing one or more symbol to the Wild and executing a before-scattering process. Details of the various types of the bonus game above will be described later.

While the bonus game in the present embodiment is described as games with the names described above, the bonus game is not limited to them but is any type of game as long as the gaming state is more advantageous than that of the normal game. Other types of the bonus game may be employed as long as the gaming state is advantageous for the player, i.e., the gaming state is more advantageous than that of the normal game. For example, in the bonus game, various states such as a state in which more gaming values can be achieved as compared to the normal game, a state in which the probability of obtaining a gaming value is higher than the probability in the normal game, and a state in which the number of consumed gaming values is smaller than in the normal game are achieved independently or in combination.

A free game is a game which is executable with a smaller amount of gaming values bet than in the normal game. The expression “executable with a smaller amount of gaming value bet” includes a case where an amount of gaming values bet is zero. Therefore, the free game may be a game which is run without betting a gaming value and the gaming value is paid out for an amount corresponding to rearranged symbols 501. In other words, the free game may be a game that starts even if no gaming value is consumed. On the other hand, the normal game is run on condition that a gaming value is bet, and is a game of paying out gaming value for an amount corresponding to rearranged symbols 501. In other words, the normal game is a game that starts with the consumption of the gaming value.

The term “rearrangement” indicates that the a symbols 501 are rearranged after the arrangement of the symbols 501 is dismissed. The term “arrangement” indicates a state in which the symbols 501 are visually recognizable by an external player.

The phrase “normal payout based on the rearranged symbols 501” indicates a normal payout corresponding to a winning combination resulting from the rearrangement. The phrase “bonus payout based on the rearranged symbols 501” indicates a bonus payout corresponding to a winning combination resulting from the rearrangement. It is noted that the term “winning combination” indicates that a prize is established. Details of the winning combination will be given later.

Examples of “a condition in which the payout rate is higher than in the normal game” include the execution of a free game, increase in the number of the wild symbol 503*a* and the trigger symbol 503*b*, and the execution of a game using a symbol table. Examples of "rescue start condition" includes a case where the normal game is excessively repeated, i.e., the normal game is repeated for a predetermined number or more of times and a case where the total amount of obtained payout is excessively small, i.e., the obtained normal payout and bonus payout is smaller than a predetermined amount after a single player repeats the game for a predetermined number or more of times. The rescue process is a process to relieve players. Examples of the rescue process include the execution of a free game, the increase in the number of the wild symbol 503*a* and the trigger symbol 503*b*, the execution of a game using a substituted symbol table, and the awarding of an insurance payout.

(Outline of Gaming Machine: Other Arrangements)

As shown in FIG. 1, in addition to the first feature, the gaming machine 300 may have a second feature of executing a process of specifying, in the step (a2), individual indication data not associated with any type of the bonus game, with a predetermined probability. This provides the player with amazement of not winning an assumed bonus game, in addition to the pleasure of assuming which bonus game is to be won.

In addition to the above, the gaming machine 300 may have a feature of randomly determining whether to execute an indication effect. More specifically, the gaming machine 300 may have a third feature in which a controller executes steps of (a1) in the lower image display panel 141 (symbol display device), randomly determining a game result of the rearrangement of the symbols 501, (a1-1) randomly determining whether to execute an indication effect, (a2) when the game result is to obtain the bonus game and the random determination indicates that the indication effect is to be executed, specifying the individual indication data and the common indication data associated with the type of the bonus game, and (a3) while the symbols 501 are variably displayed on the lower image display panel 141, executing the indication effect based on the individual indication data after the start of the indication effect based on the common indication data specified in the step (a2).

In the case above, the indication effect is executed or not executed as a result of the random determination as to whether the indication effect is to be executed, there is a case where a bonus game is obtained as a result of the rearrangement of the symbols 501 with no indication. This makes it possible to suddenly provide the player with pleasure of winning a bonus game.

The gaming machine 300 may have a feature of executing the individual indication effect without executing the common indication effect, when the result of the random determination of the indication indicates that no indication effect is to be executed. More specifically, the gaming machine 300 may have a fourth feature in which a controller executes the steps of (a1) randomly determining a game result of the rearrangement of the symbols on the symbol display device, (a1-1) randomly determining whether to execute the indication effect, (a2) when the game result is the acquisition of a bonus game and the random determination indicates that the indication effect is to be executed, specifying the individual indication data and the common indication data associated with the type of the bonus game, (a3) during a period in which the symbols are variably displayed on the symbol display device, executing the indication effect based on the individual indication data after the start of the indication effect based on the common indication data specified in the (a2), (a4) when the game result is the acquisition of the bonus game and the random determination indicates that the indication effect is not to be executed, specifying the individual indication data associated with the type of the bonus game, and (a5) during a period in which the symbols are variably displayed on the symbol display device, executing the indication effect based on the individual indication data specified in the step (a4).

In the case above, as the individual indication effect is executed, the player is allowed to assume that the bonus game of the type associated with the individual indication effect is to be obtained. This provides the player with the indication effect which is different from the indication effect executed in multiple stages.

In addition to the above, the gaming machine 300 may have a feature that the slot machine 10 further includes a symbol display device as a terminal display device, and the slot machine 10 executes a process of displaying a movie related to the common game during a period between the output of a common game start command to the center controller 200 and the receiving of game result information from the center controller 200. With the gaming machine 300 having the feature above, the attention of each player is turned to the common game because the movie related to the common game is displayed during a period of waiting for the game result information.

In addition to the above, the gaming machine 300 may include a common display device 700 which is provided to be viewable from operation positions of all slot machines 10, and the center controller 200 may display a state until the establishment of a common game start condition on the common display device 700. It is noted that the operation position is the eye level position of the player operating each slot machine 10. With the gaming machine 300 having the feature above, it is possible to allow each player to estimate the waiting time until the common game starts, as the state until the establishment of the common game start condition is displayed on the common display device 700.

(Outline of Gaming Machine: Game Control Operation)

The gaming machine 300 having the feature above realizes a gaming method of executing the individual indication effect associated with the type of the bonus game, after the common indication effect associated with a plurality of types of the bonus game starts, during a period in which the symbols are variably displayed in the normal game. In other words, the gaming machine 300 can be operated at least by a game control method of executing the individual indication effect associated with the type of the bonus game, after the common indication effect associated with a plurality of types of the bonus game starts, during a period in which the symbols are variably displayed in the normal game.

More specifically, according to the game method and the game control method of the gaming machine 300, the following steps are executed: randomly determining a game result of the rearrangement of the symbols on the lower image display panel 141, when the game result indicates the acquisition of the bonus game, specifying the individual indication data and the common indication data associated with the type of the bonus game, and executing the indication effect based on the individual indication data after the indication effect based on the common indication data specified in the step above during a period in which the symbols are variably displayed on the lower image display panel 141.

Details of the control operation are given with reference to the flowchart of FIG. 1. During the execution of the base game (ST1), whether to win a bonus is determined. When winning the bonus (ST2), whether to execute the indication effect associated with the type of the bonus having functioned as a bonus trigger is randomly determined (ST3). When it is determined that the indication is to be executed (ST4), a former stage indication effect (common indication effect) is executed (ST6). Then a first latter stage indication effect (individual indication effect) is executed with a predetermined probability, a first bonus game associated with the first latter stage indication effect is executed (ST7), and a first bonus effect is executed (ST8).

On the other hand, when it is determined that no indication effect is to be executed (ST9), a second latter stage indication effect (individual indication effect) is executed (ST10). Then a second bonus game associated with the second latter stage indication effect is run (ST11) and a second bonus effect is executed (ST12).

As such, according to the game method and the game control method having the steps above, the player is notified in advance of which type of the bonus game among a plurality of types is won as a result of the execution of the common indication effect, and also the player is notified in advance of winning a specific bonus game as a result of the individual indication effect executed after the common indication effect. With this, the pleasure of assuming which bonus game is to be won is provided in multiple stages during the variably display of the symbols.

(Indication Effect)

Figure 7:
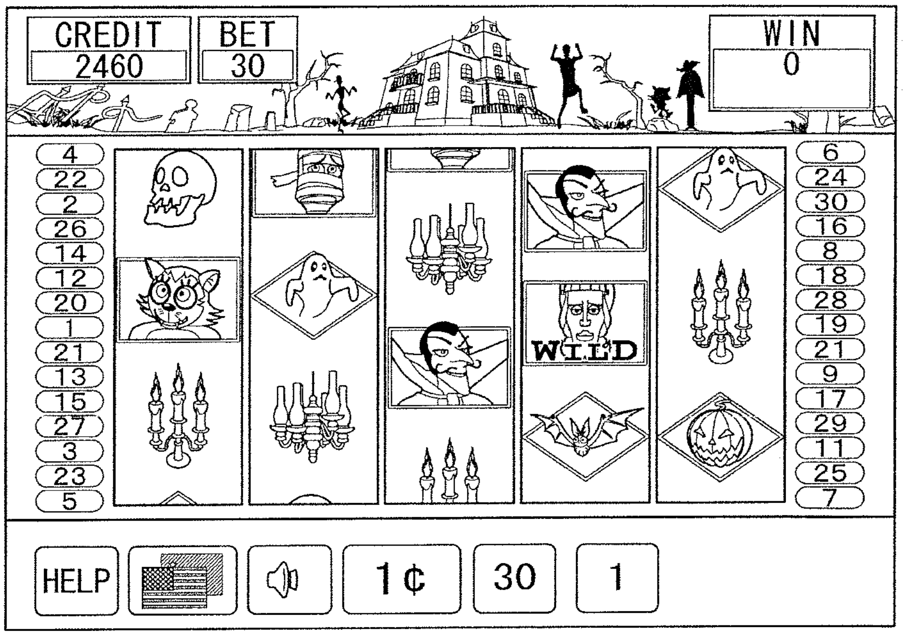
FIG. 7 illustrates a display screen of an indication effect.
Figure 8:
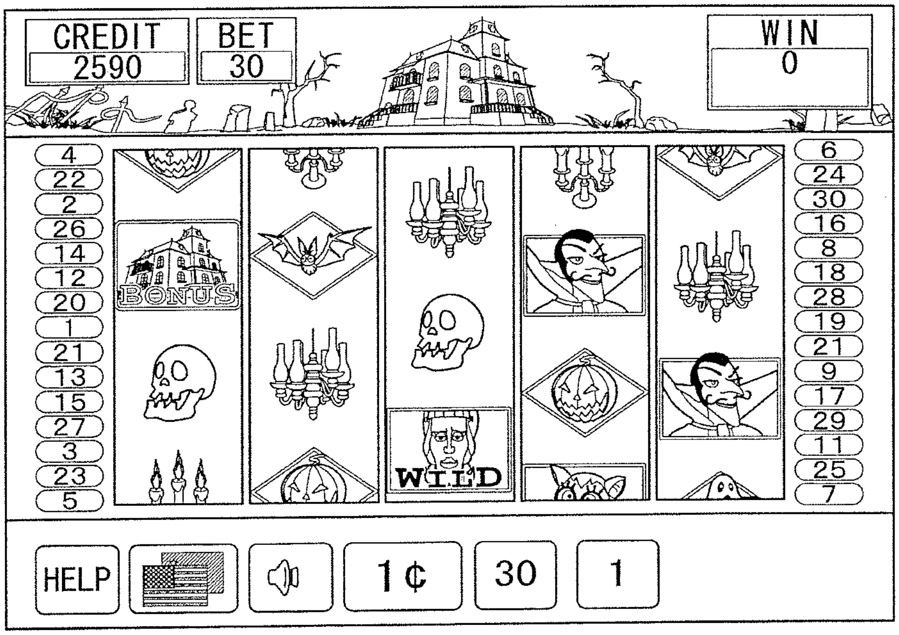
FIG. 8 illustrates a display screen of an indication effect.
Figure 9:
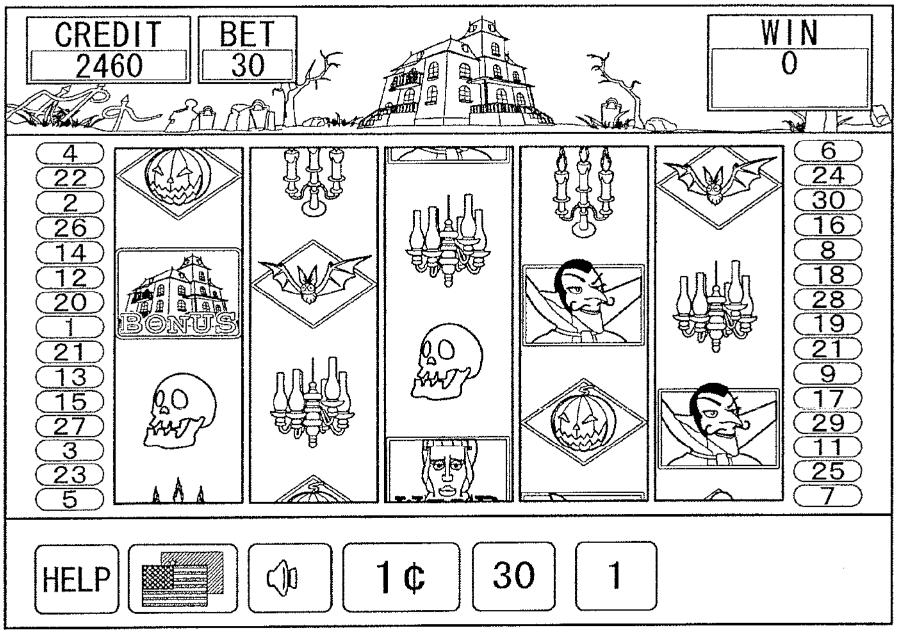
FIG. 9 illustrates a display screen of an indication effect.

The details of the indication effects of the bonus of the gaming machine 300 will be given. As shown in FIG. 6, the indication effects of the bonus includes a common indication effect and an individual indication effect. The common indication effect is a former stage indication effect that appears first after the start of the variable display of the symbols 501, i.e., after the start of the rotation of the reels. The common indication effects include three types of the indication effects, namely a silhouette indication effect (FIG. 7), a red window indication effect (FIG. 8), a tomb indication effect (FIG. 9). These types of the common indication effect are executed when it is randomly determined that the indication is to be executed, at the start of the rotation of the reels. Furthermore, when an indication is to be executed, the type of the common indication effect is randomly determined. For example, a probability of being judged that there is an indication is 1/144, a probability that the silhouette indication effect is to be executed is 1/483, a probability that the red window indication effect is to be executed is 1/436, and a probability that a tomb indication effect is to be executed is 1/388.

After the start of the common indication effect above, the individual indication effect is executed. The individual indication effect is a latter stage indication effect that appears after the start of the common indication effect. The individual indication effect includes two types of indication effects, namely, a door close indication effect and a dark change indication effect. The door close indication effect is an effect of closing a door, whereas the dark change indication effect is an effect of closing a door and changing the screen to dark before and after the closure of the door. The appearance probabilities of the latter-stage door close indication effect and the dark change indication effect as compared to the former-stage silhouette indication effect are 8:2. The appearance probabilities of the latter-stage door close indication effect and the dark change indication effect as compared to the former-stage red window indication effect are 7:3. The appearance probabilities of the latter-stage door close indication effect and the dark change indication effect as compared to the former-stage tomb indication effect are 6:4.

The door close indication effect is an individual indication effect is an indication effect of the 4-option pickup bonus game and is an indication effect of the vampire wild feature. The 4-option pickup bonus game and the vampire wild feature are executed at the appearance probabilities of 3.5:6.5 after the door close indication effect. On the other hand, the dark change indication effect is an indication effect of the mummy wild feature and also is an indication effect of the wolfman wild feature. The mummy wild feature and the wolfman wild feature are executed at the appearance probabilities of 5:5 after the dark change indication effect.

When it is determined that no indication is to be performed at the start of the rotation of the reels, a common indication effect which is the former stage indication effect is not executed, and an individual indication effect which is the latter stage indication effect is immediately executed. In other words, the door close indication effect or the dark change indication effect is executed. After the door close indication effect, the 4-option pickup bonus game or the vampire wild feature is executed at the appearance probabilities of 3.5:6.5. In the meanwhile, after the dark change indication effect, the mummy wild feature or the wolfman wild feature is executed at the appearance probabilities of 5:5.

Figure 10:
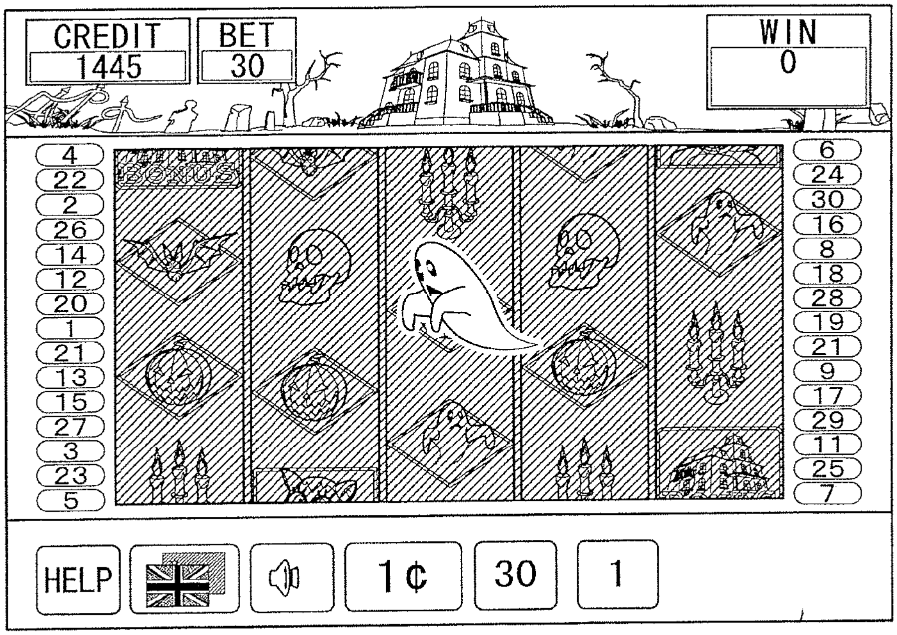
FIG. 10 illustrates a display screen of an indication effect.
Figure 11:
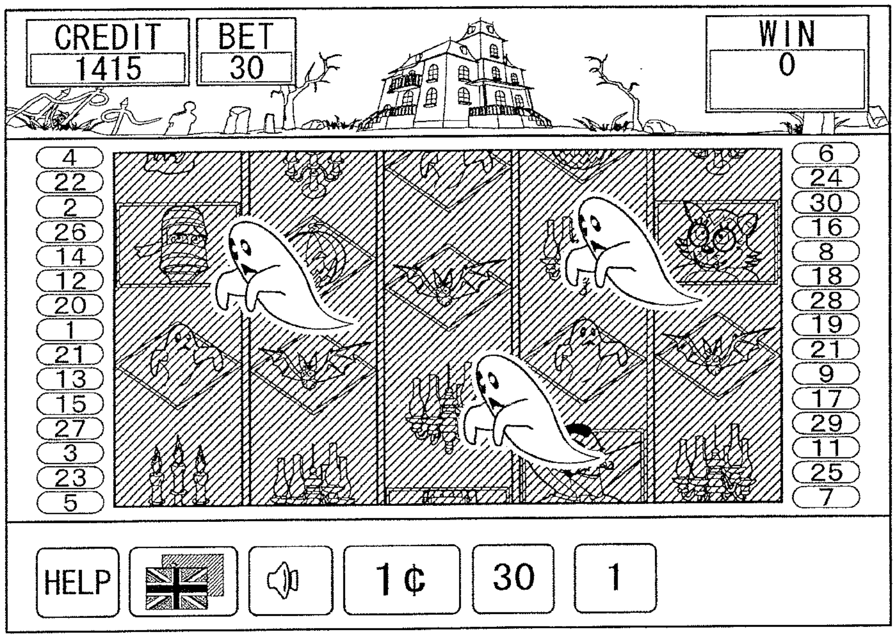
FIG. 11 illustrates a display screen of an indication effect.
Figure 12:
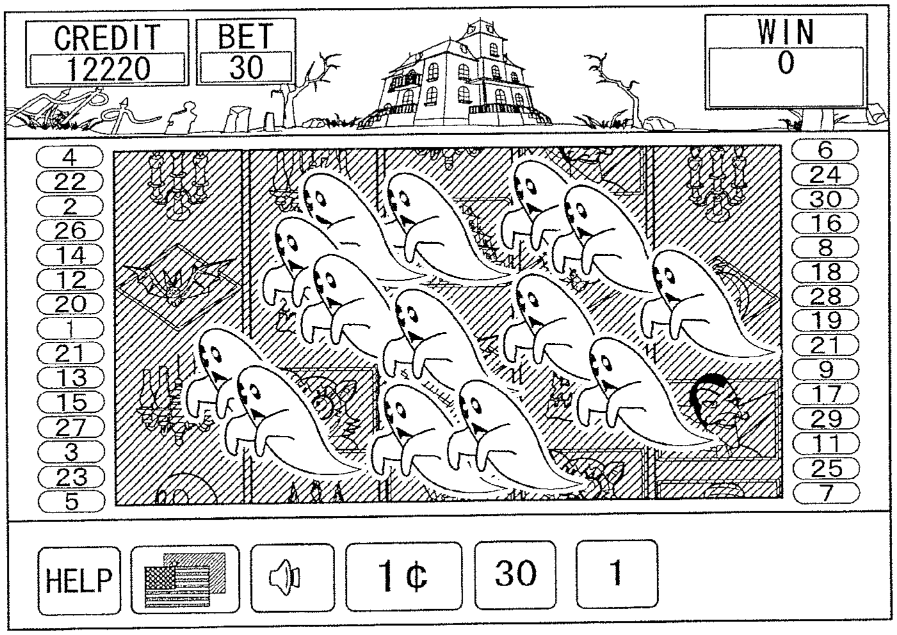
FIG. 12 illustrates a display screen of an indication effect.
Figure 13:
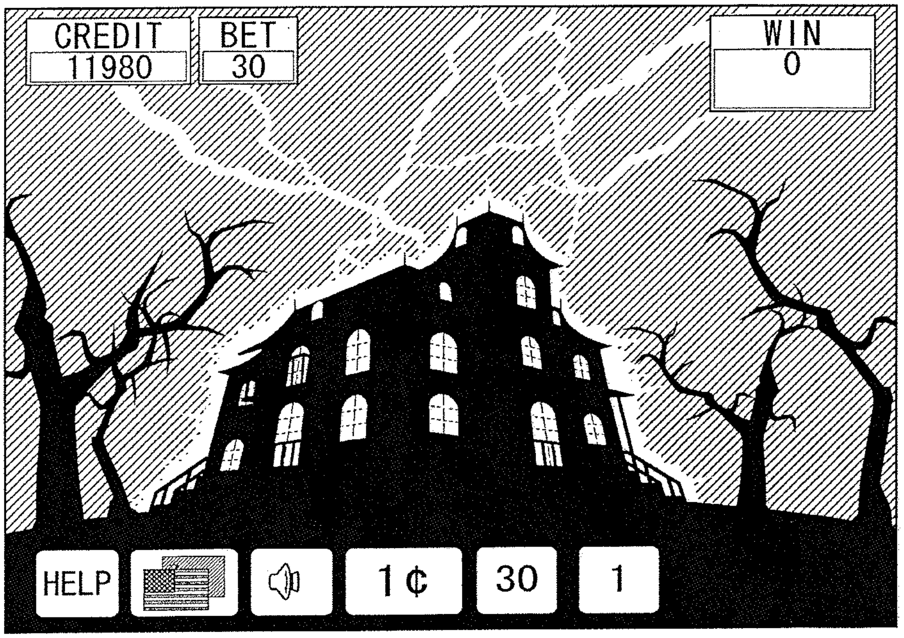
FIG. 13 illustrates a display screen of an indication effect.
Figure 14:
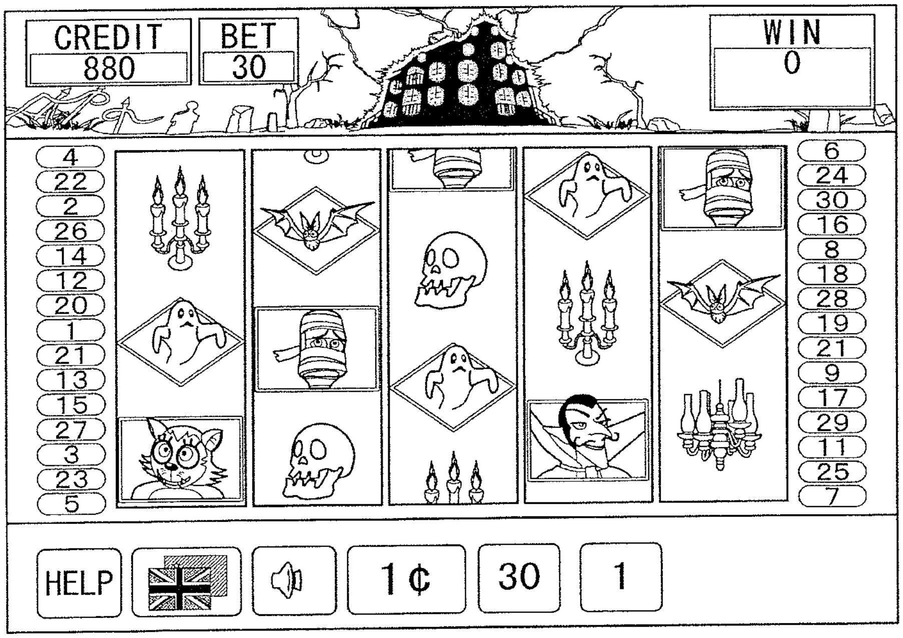
FIG. 14 illustrates a display screen of an indication effect.
Figure 15:
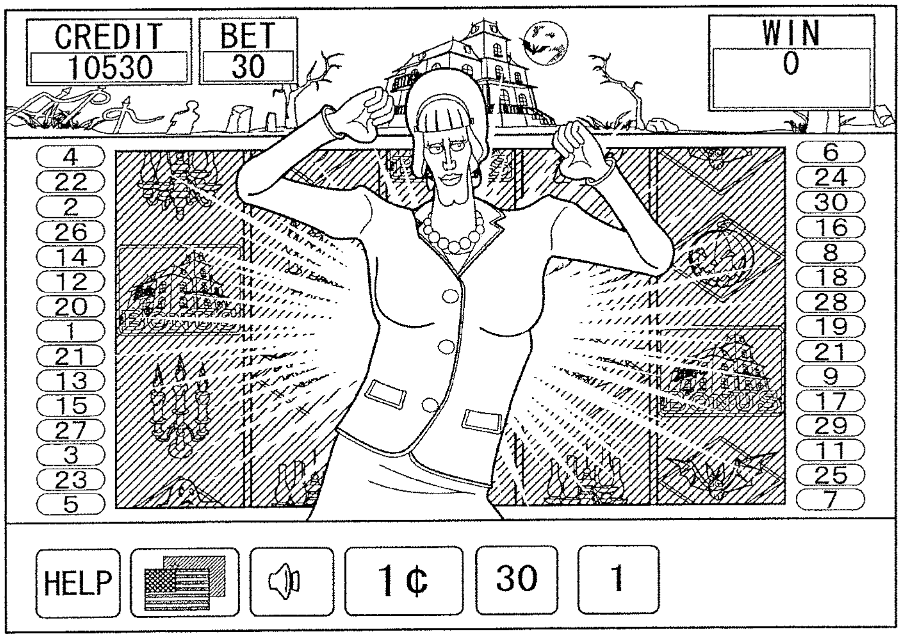
FIG. 15 illustrates a display screen of an indication effect.

In addition to the above, the individual indication effect includes a 1 ghost passing effect (FIG. 10), a 3 ghost passing effect (FIG. 11), a ghost group passing effect (FIG. 12), a thunder and castle effect (FIG. 13), a thunder effect (FIG. 14), and a Franken mum effect (FIG. 15). These individual indication effects are exclusive for the 4-option pickup bonus game. It is noted that the thunder and castle effect (FIG. 13), the thunder effect (FIG. 14), and the Franken mum effect (FIG. 15) are displayed across the entire width of the lower image display panel 141. The other effects may be displayed across the entire width of the lower image display panel 141, or all effects may be executed inside the display window 150.

(Details of Indication Effects: Individual Indication Effects of 4-Option Pickup Bonus Game)

Figure 16:
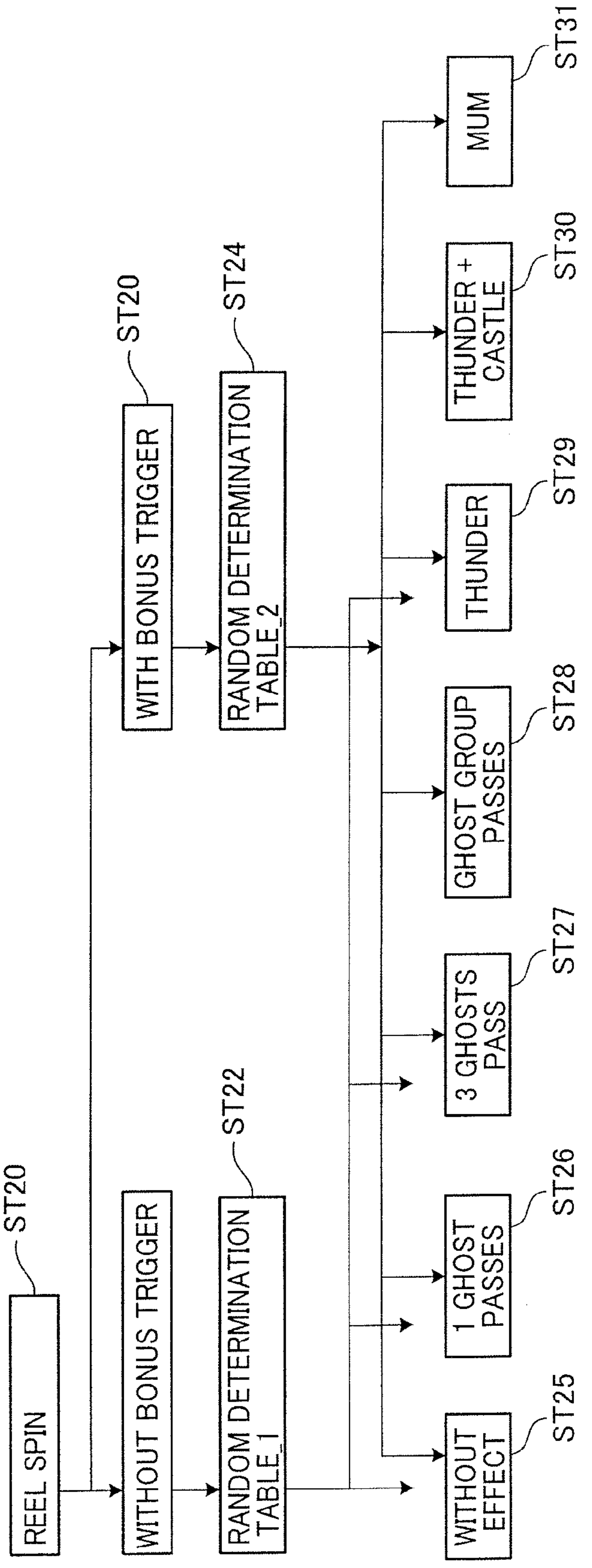
FIG. 16 is a flowchart of an indication effect.

As shown in FIG. 16, after the reel spin at which the symbols 501 starts the variable display (ST20), whether a bonus trigger is established is randomly determined with reference to a stop table. When the bonus trigger is not established (ST21), a random determination table 1 is referred to (ST22). Thereafter, one of the no effect (ST25), the 1 ghost passing effect (ST26), the 3 ghost passing effect (ST27), and the thunder effect (ST29) is executed.

On the other hand, when the bonus trigger is established (ST23), a random determination table 2 is referred to (ST24). Then one of the no effect (ST25), the 1 ghost passing effect (ST26), the 3 ghost passing effect (ST27), the ghost group passing effect (ST28), the thunder effect (ST29), the thunder and castle effect (ST30), and the Franken mum effect (ST31) is executed.

More specifically, when the bonus trigger is not established (ST21), an indication is randomly determined with reference to the table 1 shown in FIG. 18. The table 1 is referred to when two bonus symbols are stopped (rearranged). This condition is “Bonus Tenpai” with which a bonus will be established when one more bonus symbol stops, and is “blank”. In the rearrangement state with which the condition above is established, the bonus symbols each functioning as a trigger stop at the reel 1 and the reel 3 whereas no bonus symbol stops at the reel 2.

When the table 1 is referred to, as shown in FIG. 19, the probabilities of the random determination of the indication are: 85% for the indication 0, 6% for the indication 1, 3% for the indication 2, 0% for the indication 3, 6% for the indication 4, 0% for the indication 5, and 0% for the indication 6. In this connection, as shown in FIG. 17, the indication 0 corresponds to the no effect, the indication 1 corresponds to the 1 ghost passing effect, the indication 2 corresponds to the 3 ghost passing effect, the indication corresponds to the ghost group passing effect, the indication 4 corresponds to the thunder and castle effect, the indication 5 corresponds to the thunder effect, and the indication 6 corresponds to the Franken mum effect.

In the meanwhile, when the bonus trigger is established (ST23), the random determination of the indication is carried out with reference to a table 2 shown in FIG. 18. The table 2 is referred to when three bonus symbols stop. When this condition is established, the 4-option pickup bonus game is run. In the rearrangement state with which the condition above is established, the bonus symbol each functions as a trigger stops at the reel 1, the reel 3, and the reel 5. When the table 2 is referred to, as shown in FIG. 19, the probabilities of the random determination of the indication are: 33% for the indication 0, 10% for the indication 1, 10% for the indication 2, 4% for the indication 3, 10% for the indication 4, 13% for the indication 5, and 20% for the indication 6.

Figure 21:
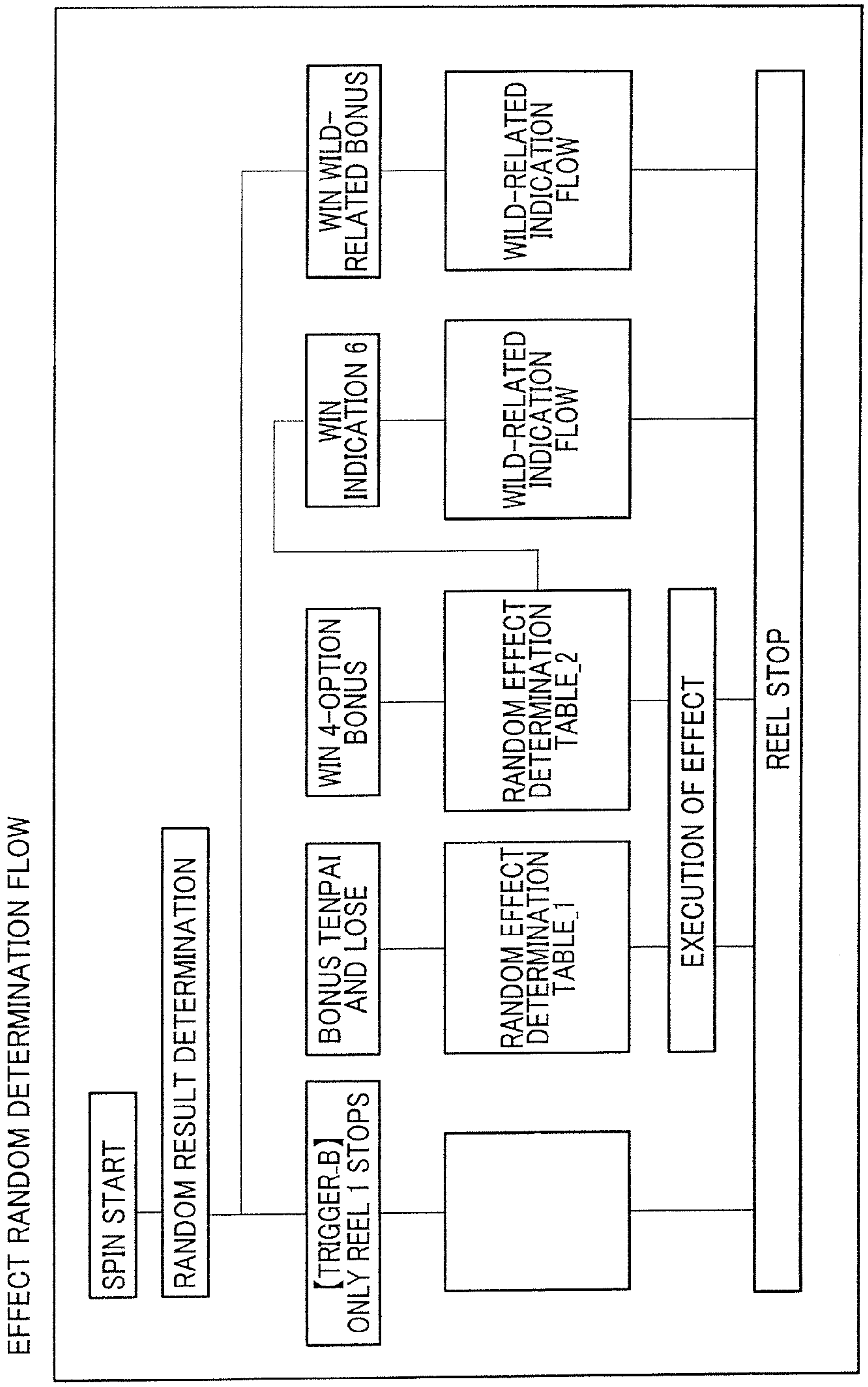
FIG. 21 illustrates an effect random determination flow.

The relationship among the occurrence probabilities (%) of the indication 0 to the indication 6 randomly determined as above, the occurrence probability (1/N) of each effect, the reliability of each effect, and the share of each effect in the winning is shown in a table of FIG. 20. For example, the occurrence probability (%) of the indication 1 which is the 1 ghost passing effect is 0.52%, the occurrence probability (1/N) of each effect is 193.24%, the reliability of each effect is 32.61%, and the share of each effect in the winning is 10.00%. With this, the indication is executed in accordance with a flow shown in FIG. 21.

(Details of Indication Effect: Common Indication Effect)

Figure 22:
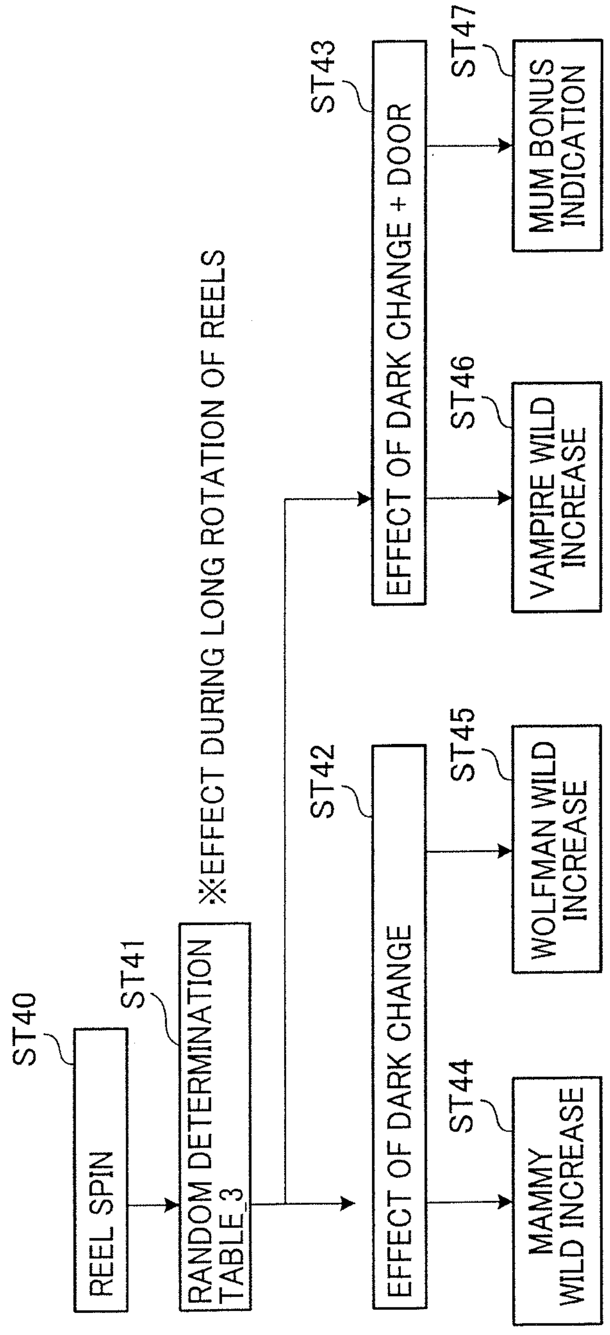
FIG. 22 is a flowchart of an indication effect.

As shown in FIG. 22, after the reel spin of stating the variable display of the symbols 501 (ST40), when a bonus trigger is established as a result of the random determination based on a stop table, the type of the bonus trigger is specified. After the execution of the common indication effect corresponding to the specified type of the bonus starts, the random determination table 3 shown in FIG. 24 is referred to and the type of the individual indication effect is randomly determined (ST41). When the individual indication effect is the dark change effect (ST42), then either the mummy wild feature (ST44) or the wolfman wild feature (ST45) is executed. In the meanwhile, when the individual indication effect is the door close effect (ST43), either the vampire wild feature (ST46) or the 4-option pickup bonus game (ST47) is executed. As such, because the common indication effect is executed as an indication of the individual indication effect, the indication effects are the same partway, even in different types of the bonus.

Figure 23:
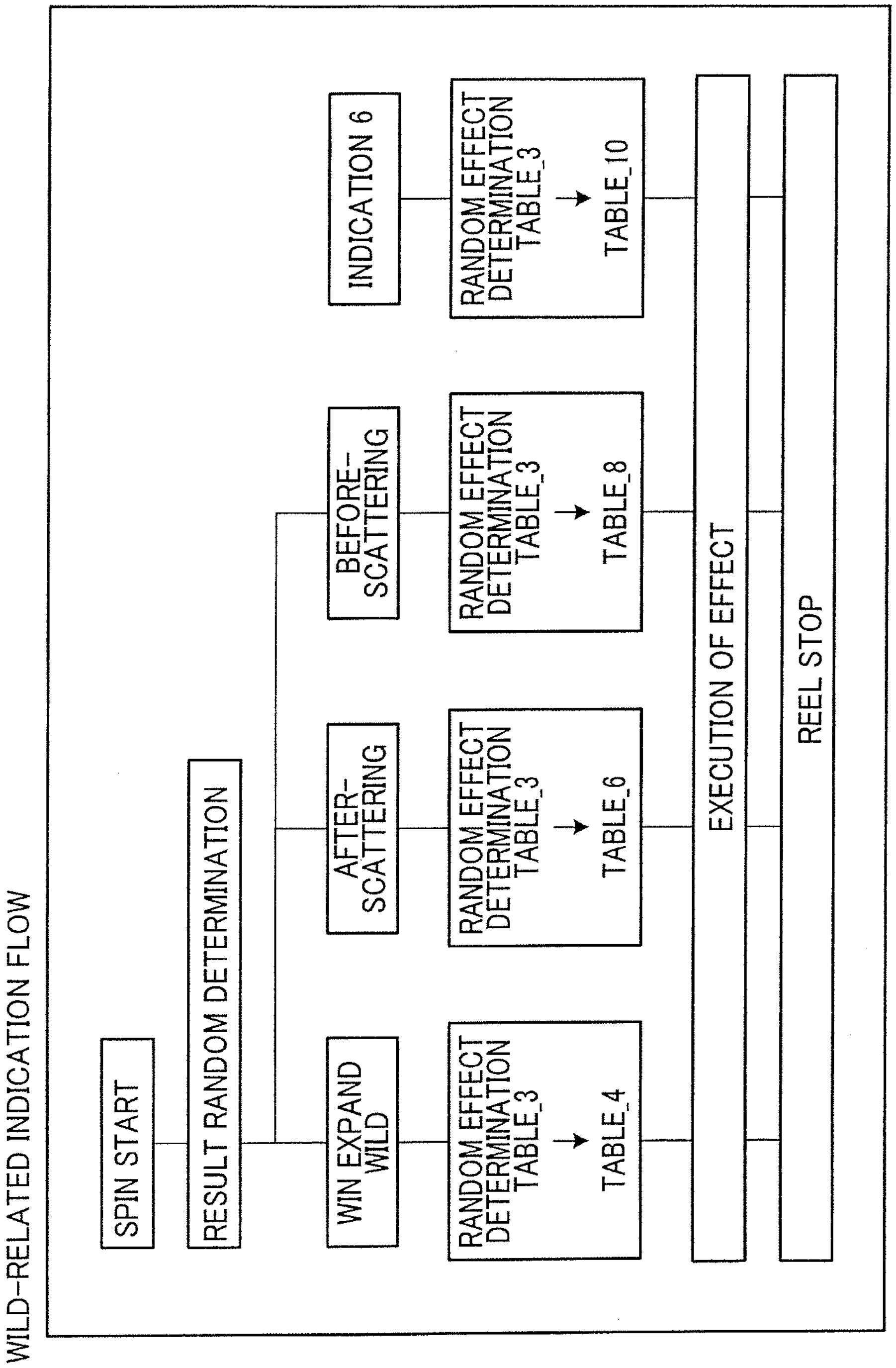
FIG. 23 illustrates a WILD-related indication flow.

More specifically, as shown in FIG. 23, when a bonus trigger is established as a result of the start of the spin and the random determination of the rearrangement, a table shown in FIG. 23 is referred to and whether to execute the common indication effect is randomly determined. For example, when the bonus trigger of the mummy wild feature is established, the probability of executing the indication is 16% whereas the probability of not executing the indication is 84%.

When the indication is executed, a data table associated with each type of the bonus is referred to. More specifically, when the bonus trigger of the mummy wild feature is established, a data table 4 shown in FIGS. 26A, 26B, and 26C is referred to. When the bonus trigger of the wolfman wild feature is established, a data table 6 shown in FIGS. 28A, 28B, and 28C is referred to. When the bonus trigger of the Vampire BONUS is established, a data table 8 shown in FIGS. 30A, 30B, and 30C is referred to. When the bonus trigger of the 4-option pickup bonus game is established, a data table 10 shown in FIGS. 32A, 32B, and 32C is referred to.

For example, when the bonus trigger of the mummy wild feature is established, as shown in a table 4 of FIGS. 26A, 26B, and 26C, the random determination is executed with the probabilities of 47% for the indication 0, 33% for the indication 1, and 20% for the indication 2. The indication 0, the indication 1, and the indication 2 in the table 4 are a tomb indication effect, a red window indication effect, and a silhouette indication effect, respectively. As such, the incidences and the reliabilities of the indications are as shown in the data table of FIG. 27.

When the bonus trigger of the wolfman wild feature is established, as shown in a table 6 of FIGS. 28A, 28B, and 28C, the random determination is executed with the probabilities of 47% of the indication 0, 33% for the indication 1, and 20% for the indication 2. The indication 0, the indication 1, and the indication 2 of the table 6 corresponds to the tomb indication effect, the red window indication effect, and the silhouette indication effect, respectively. As such, the incidences and the reliabilities of the indications are as shown in the data table of FIG. 29.

In the meanwhile, when the bonus trigger of the vampire wild feature is established, as shown in a table 8 of FIGS. 30A, 30B, and 30C, the random determination is executed with the probabilities of 33% for the indication 0, 33% for the indication 1, and 34% for the indication 2. The indication 0, the indication 1, and the indication 2 in the table 8 are the tomb indication effect, the red window indication effect, and the silhouette indication effect, respectively. As such, the incidences and the reliabilities of the indications are as shown in the data table of FIG. 31.

When the bonus trigger of the 4-option pickup bonus game is established, as shown in the table 10 of FIGS. 32A, 32B, and 32C, the random determination is executed with the probabilities of 33% for the indication 0, 33% for the indication 1, and 34% for the indication 2. The indication 0, the indication 1, and the indication 2 in the table 10 are the tomb indication effect, the red window indication effect, and the silhouette indication effect, respectively. With this, the incidences and the reliabilities of the indication are as shown in the data table of FIG. 33.

(Function Flow of Gaming Machine 300: Slot Machine)

The gaming machine 300 arranged as above includes, as shown in FIG. 2, slot machines 10 and an external controller 621 (center controller 200) connected to the slot machines 10 to be able to communicate therewith. The external controller 621 is able to communicate with the slot machines 10 provided in a hall.

Each slot machine 10 includes a BET button 601, a spin button 602, and a display 614 (such as a lower image display panel 141 shown in FIG. 1), and further includes a game controller 100 configured to control these units. The BET button 601 and the spin button 602 are kinds of input devices. The slot machine 10 further includes a transceiver unit 652 that makes it possible to perform data communication with the external controller 621.

The BET button 601 above has a function of receiving a bet amount input by the player. The spin button 602 has a function of receiving an instruction to start a game such as a normal game in response to an operation by the player, i.e., a start operation. The display 614 has a function of displaying still image information such as various symbols 501, numbers, and characters and moving image information such as effect movies. Furthermore, the display 614 has a touch panel 69 as an input device, and has a function of receiving various instructions input by a pressing operation by the player. The display 614 has a symbol display region 614*a*, an image display region 614*b*, and a common game display region

614*c*. The symbol display region 614*a* displays a reel screen including the symbols 501 shown in FIG. 1. The image display region 614*b* displays various types of effect image information (including the common indication effect and the individual indication effect) executed during a game, by means of moving images and still images. The common game display region 614*c* displays a common game.

Although in the present embodiment the symbol display region 614*a*, the image display region 614*b*, and the lower image display panel 141 are provided on the same screen, the disclosure is not limited to this arrangement. The common game display region 614*c* may be formed together with the symbol display region 614*a* and the image display region 614*b*, or may appear as a substitute only when a common game is run.

The game controller 100 includes a coin insertion/start-check unit 603, a normal game running unit 605, a bonus game start determining unit 606, a bonus game execution unit 607, a random number sampling unit 615, a symbol determining unit 612, an effect-use random number sampling unit 616, an effect determining unit 613, a speaker unit 617, a lamp unit 618, a winning determining unit 619, a payout unit 620, and an indication effect unit 651.

The normal game running unit 605 has a function of running a normal game when an operation of the BET button 601 is made. The bonus game start determining unit 606 determines whether to run a bonus game, based on a combination of the symbols 501 rearranged in the normal game. That is to say, the bonus game start determining unit 606 has a function of determining that a bonus game is obtained when a trigger symbol 503*b* or the like is rearranged in a predetermined condition, and shifting the process to the bonus game execution unit 607 so that a bonus game is run from the next unit game.

It is noted that "unit game" is a series of operations from the start of the receiving of a bet to a state in which an award can be established. For example, a unit game in the normal game includes a single bet time for receiving a bet, a single game time of rearranging stopped symbols 501, and a single payout time of a payout process of awarding a payout. A unit game in the normal game is termed unit normal game.

The bonus game execution unit 607 has a function of running a bonus game in which a free game is repeated only by an operation of the spin button 602.

The symbol determining unit 612 has functions of: determining symbols 501 to be rearranged with reference to a random number from the random number sampling unit 615; rearranging the determined symbols 501 on the symbol display region 614*a* of the display 614; outputting rearrangement information of the symbols 501 to the winning determining unit 619 and the indication effect unit 651; adding an increased specific symbol 503 to the symbols 501 that are used for symbol determination; replacing at least one of the symbols 501 used for the symbol determination with at least one of the increased specific symbols 503; and outputting an effect specifying signal to the effect-use random number sampling unit 616 based on the state of the rearrangement of the symbols 501.

The effect-use random number sampling unit 616 has a function of sampling an effect random number when receiving an effect instruction signal from the symbol determining unit 612 and a function of outputting the effect random number to the effect determining unit 613. The effect determining unit 613 has a function of determining the effect content by using the effect random number, an effect of outputting the image information of the determined effect content to the image display region 614*b* of the display 614, and a function of outputting audio/light information of the determined effect content to the speaker unit 617 and the lamp unit 618.

The winning determining unit 619 has a function of determining the presence of winning when obtaining rearrangement information of the symbols 501, which is a display state of rearrangement on the display 614, a function of calculating a payout amount based on the winning combination when it is determined that winning is achieved, and a function of outputting a payout signal to the payout unit 620 based on the payout amount. The payout unit 620 has a function of paying out a gaming value to the player, in the form of a coin, a medal, a credit, or the like. Furthermore, the payout unit 620 has a function of adding credit data corresponding to the credit to be paid out to credit data stored in an IC card inserted into the later-described PTS terminal 700.

The indication effect unit 651 has a function of determining or randomly determining whether to execute the common indication effect and the individual indication effect based on the rearrangement information of the symbols 501, when such rearrangement information is obtained, and a function of executing the common indication effect and the individual indication effect by the display 614 and the speaker 617 and the lamp 618 of the top box 12.

In addition to the above, the game controller 100 includes a storage unit 661 that stores various types of bet amount data. The storage unit 661 stores data in a rewritable manner, e.g., a hard disc device and a memory.

In addition to the above, the game controller 100 has a common game running unit 653. The common game running unit 653 has functions of: outputting bet amount information based on a bet amount bet on a normal game to the external controller 621 in each unit base game; executing a common game in response to a game start command from the external controller 621; and receiving a bet input through the BET button 601 for a bet amount corresponding to bet amount data for a common game, which is stored in the storage unit 661 and is bettable on a common game.

In addition to the above, the game controller 100 is connected to the PTS terminal 700. The PTS terminal 700 is a unit in which an LCD, a microphone, a human body detection camera, etc. are integrated, and has, for example, a function of executing an effect for a game by mutual communications with the game controller 100. In particular, the PTS terminal 700 has a card slot to which an IC card can be inserted. With this, the player is able to insert a IC card into the card slot and use the credits stored in the IC card in the slot machine 10. The mechanical structure of the PTS terminal 700 will be described later.

In addition to the above, when receiving credit data from the PTS terminal 700, the game controller 100 updates the credit display on the display 614. Furthermore, the game controller 100 outputs settled credit data too the PTS terminal 700 when the credits on a game are settled.

Furthermore, the PTS terminal 700 of each of the slot machines 10 constituting the gaming machine 300 is connected to the management server 800 to be able to communicate each other, and centrally manages the download of images, IC cards and credits.

(Function Flow of Gaming Machine 300: External Controller)

The slot machine 10 arranged as above is, as shown in FIG. 3, connected to the external controller 621. The external controller 621 has a function of remotely operating and monitoring the operation state of each slot machine 10 and processes such as changes in game setting values. Furthermore, the external controller 621 has a function of determining a common game start condition for each gaming terminal which is the slot machine 10, and executing a common game at a plurality of slot machines 10 when a determination result at any gaming terminal satisfies the common game start condition.

More specifically, the external controller 621 includes a common game start unit 6213, a gaming terminal selection unit 6215, and a transceiver unit 6217. The common game start determining unit 6213 has functions of: determining whether the common game start condition is established based on the accumulated bet amount information sent from the slot machine 10 in each unit base game; outputting a game start command to a plurality of slot machines 10; and displaying on the common display device 700 states until the common game start condition is established.

The determination as to whether the common game start condition is established is based on the accumulated bet amount information or based on all accumulated values that increase as the unit base game is repeated. For example, the number of times of running the base game and the game time of the base game may be used as the accumulated values.

In addition to the above, the common game start unit 6213 has a function of outputting a game start command to the slot machine 10 in which an accumulated value that increases as a result of the repetition of the base game satisfies a game running condition. With this, because the right to participate in the common game is not awarded to a slot machine 10 in which the accumulated value is lower than the minimum setting value, the common game start unit 6213 motivates the player to actively repeat the base game.

In addition to the above, the common game start unit 6213 has a function of monitoring a non-input time in which no start operation is performed, and outputting the game start command to the slot machines 10 except to the slot machine 10 in which the non-input time is equal to or longer than a timeout time. With this, the common game start unit 6213 is able to determine that no player is at a slot machine 10 where the base game has not been played at least for the timeout time, and able to avoid the execution of the common game at such a slot machine 10.

The gaming terminal selection unit 6215 has a function of selecting a specific slot machine 10 from the slot machines 10 and outputting a common game start command signal to that specific slot machine 10. The common game start command signal provides the specific slot machine 10 with the right to start the common game. The transceiver unit 6217 has a function of exchanging data with the slot machines 10.

(Operations of Gaming Machine 300)

The operations of the gaming machine 300 having the functional blocks above will be described. While in the present embodiment the "gaming terminal" shown in the flowcharts indicates a slot machine 10 executing a slot game, the disclosure is not limited to this arrangement.

(Operations of Slot Machine 10)

A slot machine 10 which is a gaming terminal executes terminal-side processes (A1) to (A7). More specifically, to begin with, a base game process (e.g., normal game) is executed (A1). That is, a series of operations below are executed.

(Coin-Insertion/Start-Check)

First, the slot machine 10 checks whether or not a BET button 601 has been pressed by a player, and subsequently checks whether or not a spin button 602 has been pressed by the player.

(Symbol Determination)

Next, when a spin button unit 602 has been pressed by the player, the slot machine 10 extracts a random number for symbol determination, and determines symbols 501 to be displayed for the player at the time of stopping the scroll of the symbol array, for respective video reels displayed on a display unit 614.

(Symbol Display)

Then the slot machine 10 starts the scroll of the symbol array of each video reel, and stops the scroll so that the determined symbols 501 are displayed for the player.

(Winning Determination)

Subsequently, as the rotation of the symbol array of each video reel is stopped, the slot machine 10 determines whether the combination of the symbols 501 displayed for the player is a combination related to winning.

(Payout)

When the combination of the symbols 501 displayed for the player is a combination related to winning, the slot machine 10 offers, to the player, benefit according to the combination.

For example, when a combination of symbols 501 related to a payout of coins has been displayed, the slot machine 10 pays out coins of the number corresponding to the combination of symbols 501 to the player.

Subsequently, whether to win a bonus combination is determined. When winning the bonus combination, a bonus game process is executed. On the other hand, when not winning the bonus combination, the normal game is run again. During a period in which the base game including such a normal game and bonus game is being run, execution state information indicating the start and end of the unit game such as the normal game and the bet amount on the unit game is transmitted to the external controller 621. With this, the external controller 621 centrally manages the execution state information of each slot machine 10.

(Operation of External Controller 621)

When the slot machines 10 operate as above, the external controller 621 executes the following center-side processes in synchronization with the slot machines 10.

To begin with, the external controller 621 receives the execution state information from each slot machine 10 and obtains the execution state of the base game. Thereafter, based on the number of the repetition of the base game, the accumulated bet amount, or the like, whether the common game start condition is established at any slot machine 10 is determined. When the common game start condition is not established, the acquisition of the execution state of the base game at each slot machine 10 is continued.

In the meanwhile, when the common game start condition is established, the game start command is simultaneously output to the slot machines 10 that satisfy the game running condition. Thereafter, a specific slot machine 10 is selected from the slot machines 10 satisfying the game running condition, and a common game start right instruction is output to the specific slot machine 10 (B4).

Thereafter, the external controller 621 waits for the common game start command to be supplied from the specific slot machine 10. Upon receiving the common game start command, the result of the common game is determined as a game result. The game result is, for example, win, lose, or draw. When the game result is not draw, at least a part of a draw game result is skipped among a series of temporarily-stored game results, and the remaining game results are serially output to the slot machines 10, as game result information.

Thereafter, based on the winning or losing game result, whether to win in the common game is determined. When lost, the execution state of the base game at each slot machine 10 is newly obtained. On the other hand, when won, a payout amount is calculated based on the bet amount bet on the common game at each slot machine 10, and the payout amount is sent to each slot machine 10 as payout information.

(Overall Structure of Game System)

A game system 350 including the gaming machine 300 having the functions above will be described.

As shown in FIG. 34, the game system 350 includes the slot machines 10 and the external controller 621 connected to the slot machines 10 over a communication line 301.

The external controller 621 is configured to control the slot machines 10. In the present embodiment, the external controller 621 is a so-called hall server provided in a gaming facility where a plurality of slot machines 10 are provided. Each slot machine 10 has a unique identification number, and the external controller 621 determines the source of data sent from the slot machines 10 based on the identification number. Furthermore, the identification number is used to specify the transmission target, when data is sent from the external controller 621 to a slot machine 10.

The game system 350 may be constructed in a single gaming facility where various games such as casino games are playable or constructed for a plurality of gaming facilities. When constructed in a single gaming facility, the game system 350 may be constructed in each floor or section of the gaming facility. The communication line 301 may be wires or wireless, and is constructed by a dedicated line, a switched line, or the like.

As shown in FIG. 35, the game system is roughly divided into a management server block, a customer terminal block, and a stuff terminal block. The management server block includes a casino hall server 850, an exchange server 860, a casino/hotel stuff management server 870, and a download server 880.

The casino hall server 850 is a server for managing the entire casino hall where the slot machines 10 are provided. The exchange server 860 is a server for generating exchange rate data based on exchange rate information or the like. The casino/hotel stuff management server 870 is a server for managing the staff members of the casino hall or a hotel related to the casino hall. The download server 880 is a server for, for example, downloading latest information such as game-related information and news and forwarding the information to players via the PTS terminal 700 of each slot machine 10.

The management server block includes a member management server 810, an IC card & money management server 820, a megabucks server 830, and an image server 840.

The member management server 810 is a server for managing member information or the like of the players of the slot machines 10. The IC card & money management server 820 is a server for managing IC cards used in the slot machines 10. More specifically, the IC card & money management server 820 is a server that stores fractional money data in association with an identification code and outputs the fractional money data to the PTS terminal 700. Furthermore, the IC card & money management server 820 generates and manages denomination rate data or the like. The megabucks server 830 is a server for, for example, managing Mega bucks which is a game in which the sum total of amounts bet on a plurality of slot machines 10 in a plurality of casino halls is dealt with as a payout. The image server 840 is, for example, a server that downloads latest images such as game-related images and news images and forwards the images to the player via the PTS terminal 700 of each slot machine 10.

The customer terminal block includes the slot machine 10, a PTS terminal 700, and a settlement machine 750. The PTS terminal 700 is attachable to the slot machine 10 and capable of mutually communicating with the management server 800. The settlement machine 750 exchanges money data stored in a player's IC card to real money and stores coins and bills in an IC card as money data.

The stuff terminal block includes a stuff management terminal 900 and a member card issuance terminal 950. The stuff management terminal 900 is a terminal by which the staff of the casino hall manages the slot machines 10. In particular, in the present embodiment, the staff of the casino hall checks if the number of IC cards in the PTS terminal 700 is too large or too small. The member card issuance terminal 950 is a terminal by which a player obtains a member card to play games in the casino hall.

(PTS Terminal 700)

The PTS terminal 700 is incorporated in a PTS system as shown in FIG. 36. The PTS terminal 700 attached to the slot machine 10 is arranged to be able to communicate with the game controller 100 of the slot machine 10 and the bill validation controller 890.

The PTS terminal 700 conducts sound and image effects in games and updates the credit data, based on the communications with the game controller 100. Furthermore, the PTS terminal 700 sends credit data to the bill validation controller 890, which is required at the time of the settlement.

In addition to the above, the PTS terminal 700 is connected to the management server 800 to be able to communicate therewith. The PTS terminal 700 and the management server 800 are connected with each other by two lines, namely, a normal communication line and an additional function communication line.

The PTS terminal 700 exchanges, by the normal communication line, data such as money data, identification code data, member information of a player. On the other hand, by the additional function communication line, the PTS terminal 700 conducts communications concerning newly-added functions. In the present embodiment, the PTS terminal 700 conducts, by the additional function communication line, communications concerning an exchange function, an IC card function, a biometric identification function, a camera function, and an RFID (Radio Frequency IDentification) function of individual identification by radio waves.

(Mechanical Structure of Slot Machine)

Referring to FIG. 37, the overall structure of the slot machine 10 will be described.

A coin, a bill, or electrically valuable information corresponding to these is used as a game medium in the slot machine 10. In the present embodiment, in particular, credit-related data such as money data stored in an IC card is used.

The slot machine 10 includes a cabinet 11, a top box 12 installed on the upper side of the cabinet 11, and a main door 13 provided at the front surface of the cabinet 11.

On the main door 13, a symbol display device termed lower image display panel 141 is provided. The symbol display device is formed by a transparent liquid crystal panel. The screen displayed on the lower image display panel 141 has a display window 150 at the central portion. The display window 150 is constituted by 15 display blocks 28 forming a matrix of 5 columns and 3 rows. The three display blocks 28 of each column form pseudo reels 151 to 155. On each of the pseudo reels 151 to 155, three display blocks 28 move downward with changes in speed, so that the symbols 501 on the display blocks 28 are vertically rotated (variably displayed) and then stopped, in other words, the symbols are rearranged. The details of the display screen on the lower image display panel 141 will be given later.

While the present embodiment the slot machines 10 are so-called video slot machines, some mechanical reels in the slot machines 10 of the present invention may be replaced by the pseudo reels 151 to 155.

On the front surface of the symbol display device is provided a touch panel 69. The touch panel 69 allows a player to input various instructions by touching the display screen of the lower image display panel 141. The input signal is transmitted from the touch panel 69 to the main CPU 71.

Below the lower image display panel 141 is provided a control panel 30. The control panel 30 is provided with buttons, a coin entry 21 for inserting coins into the cabinet 11, and a bill entry 22. Details of the control panel 30 will be given later.

On the lower front surface of the main door 13, i.e., below the control panel 30, a belly glass 132 on which a character of the slot machine 10 or the like is depicted are provided. Between the lower image display panel 141 and the control panel 30, the PTS terminal 700 is attached. In the PTS terminal 700, devices having a microphone function, a camera function, a speaker function, a display function and the like form a single unit. More specifically, the PTS terminal 700 includes an LCD, a human detection camera, a microphone, a bass reflex speaker, or the like. The human detection camera makes it possible to detect the presence of a player by the camera function. The microphone is used for the player's participation in a game by voice and the authentication of a player by voice recognition. The speaker produces sound effects in games and outputs notification sound when an IC card is left inserted. Furthermore, the speaker outputs notification sound when an inserted IC card is not authenticated.

In addition to the above, the PTS terminal is provided with an LED and a card insertion slot. The LED emits light with plural colors to notify the remaining number of IC cards in a card stacker. The card insertion slot has a mechanism of allowing IC cards to be inserted and ejected. The IC card has a display region. The IC card is completely inside the machine when the player is playing games, and is ejected to expose the display region at the time of the settlement. This allows the player to recognize the credit-related data such as updated money data. Alternatively, the IC card may be arranged to expose the display region not to be completely inserted, even when the player is playing games. This allows the player to always recognize the update of the credits during games.

When it is confirmed by the human detection camera that no player is present at the time of the settlement of the credits, the IC card is drawn into and stored in the card stacker. With this arrangement, the IC card is not left inserted for a long time, even if the player left the machine without taking the IC card after recognizing that the remaining credits on the display region are small.

(Slot Machine: Mechanical Structure of Top Box 12)

On the upper part of the slot machine 10 is provided the top box 12. The top box 12 has a three-dimensional form representing the appearance of Franken mum. The top box 12 is provided with an effect mechanism 131 (output mechanism). The effect mechanism 131 is used for the common indication effect, the individual indication effect, and game effects executed in games. The effect mechanism 131 has, at the forefront, a transparent liquid crystal panel or semi-transparent protection panel. In the present embodiment, an upper image display panel 142 having the same functions as the lower image display panel 141 is provided.

In addition to the above, the effect mechanism 131 includes a light effect unit 1311 having LEDs emitting light with changing colors, a mechanically-operating mechanical effect unit 1312, and a light display unit 1313 having plural LEDs.

These effect units 1311, 1312, and 1313 are provided on the back side of the upper image display panel 142. The LEDs of the light effect unit 1311 are provided, for example, at around the chin of the Franken mum and at the matrix parts below the chin. The mechanical effect unit 1312 is provided below the light display unit 1313 to allow the shadow of each character to be swung.

The LEDs of the effect mechanism 131 are, as shown in FIG. 38, divided into 6 categories to be controlled (i.e., controlled based on different csv files). In regard to the LEDs of the effect mechanism 131, a scene where the lighting pattern is changed during the progress of a game is defined as "event". A folder is provided for each event, and four csv files are provided in each folder for the respective categories. More specifically, the category 1 corresponds to the face and the surrounding of the face of the Franken mum, the category 2 corresponds to payouts, the category 3 corresponds to the door, and the category 4 corresponds to always-on.

In addition to the above, the top box 12 is provided with speakers 112 and 112 (output mechanisms) that are symmetrical crosswise. The slot machine 10 executes the effect by outputting images, sound, and light, by means of the speakers 112 and the effect mechanism 131. For example, the speakers 112 and the effect mechanism 131 execute an effect by outputting light, sound or the like in sync with an effect of images displayed on the lower image display panel 141 in the common indication effect and the individual indication effect. For example, these units are used for the effects in Franken BONUS: a roulette random determination game. Furthermore, an effect by the top box 12 is executed in sync with a thunder and castle effect (FIG. 13) and a Franken mum effect (FIG. 15).

As such, the slot machine 10 is able to execute, as an indication effect by displaying an image on the symbol display device, at least one of indication effects including the thunder and castle effect and the Franken mum effect, and uses the effect mechanism 131 such as the LEDs of the top box 12 for the effect, in sync with the indication effect by the image. In other words, the slot machine 10 executes an image indication effect and a mechanical indication effect. More specifically, in the indication effect of the thunder and castle effect, the light emitted from the LEDs of the top box 12 moves in vertical directions. That is to say, as the operation of turning on an upper LED and turning off a lower LED and then turning off the upper LED and turning on the lower LED is repeated, the effect representing thunder is executed. Furthermore, in the indication effect of the Franken mum effect, the LEDs provided at the mouth of the Franken mum turn on and off in sync with the lines uttered by the Franken mum.

(Electrical Configuration of Slot Machine)

Now, referring to FIG. 39 the configuration of a circuit in the slot machine 10 will be described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression and a program for producing effects by images and sounds the game program further includes a symbol determination program. The symbol determination program is a program for determining symbols to be rearranged on the display block 28.

The game program further includes sets of data such as: normal game symbol table data indicating a normal game symbol table that shows the relationship of each symbol in each symbol array of the display block, a code number, and a random number; bonus game symbol table data indicating a bonus game symbol table that shows the relationship of each symbol of each symbol array of the display block, a code number, and a random number; symbol number determination table data indicating a symbol column determination table; code number determination table data indicating a code number determination table; wild symbol increase amount determination table data indicating a wild symbol increase amount determination table; trigger symbol increase number determination table data indicating a trigger symbol increase number determination table; odds data indicating the relationship between the types and the number of symbols rearranged on a payline L and a payout amount.

Further, the card slot 55 is configured so that the memory card 54 can be inserted thereinto and removed therefrom, and is connected to a motherboard 70 by an IDE bus. The type and contents of the game to be played on the slot machine 10 can be changed by drawing out the memory card 54 from the card slot 53S, writing another game program into the memory card 54, and inserting the memory card 54 into the card slot 53S.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is constituted by a commercial general-purpose mother board (printed writing board on which basic components for personal computers are mounted) and is provided with a main CPU 71, a ROM (Read Only Memory) 72, a RAM (Random Access Memory) 73, and a communication interface 82. This motherboard 70 is equivalent to the game controller 100 of the present embodiment.

The ROM 72 includes a memory device such as a flash memory, and stores a program such as BIOS (Basic Input/Output System) to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started. In the present invention, the ROM 72 may be or may not be rewritable.

The RAM 73 stores data used for the operation of the main CPU 71 and programs such as the symbol determination program. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of bets, the number of payouts, the number of credits and the like; and an area that stores symbols (code numbers) randomly determined.

The communication interface 82 is for communicating with the external controller 621 such as a server, through the communication line 301. Further, the motherboard 70 is connected with a later-described door PCB (Printed Circuit Board) 90 and a body PCB 110 by respective USBs. The motherboard 70 is also connected with a power supply unit 81. Furthermore, the motherboard 70 is connected with the PTS terminal 700 by USB.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a play-2-lines switch 40S, a play-5-lines switch 41S, a play-10-lines switch 42S, a play-20-lines switch 43S, a MAX BET switch 44S, a gamble switch 45S, and a start switch 46S, which correspond to the above-described buttons. Each of the switches outputs a signal to the main CPU 71 upon detection of press of the button corresponding thereto by the player.

Inside the coin entry 36 are provided a reverter 91 and a coin counter 92C. The reverter 91 verifies validates a coin inserted into the coin entry 36, and discharges coins other than genuine coins through a coin payout exit. The coin counter 92C detects the received genuine coins and counts the number of the coins.

The reverter 91 operates based on a control signal output from the main CPU 71, and distributes valid coins validated by the coin counter 92C into a hopper 113 or a cash box. That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the effect mechanism 131 and the lower image display panel 141, and lights up based on a control signal output from the main CPU 71.

The body PCB 110 is connected with the effect mechanism 131, the speakers 112, the hopper 113, a coin detecting portion 113S, the touch panel 69, the bill entry 22, a graphic board 130, a key switch 173S, and the data displayer 174. The speakers 112 output BGM sound or the like in accordance with a control signal output from the main CPU 71.

The hopper 113 operates based on a control signal output from the main CPU 71, and pays out coins of the specified number of payouts from the coin payout exit to an unillustrated coin tray. The coin detecting portion 113S outputs a signal to the main CPU 71 upon detection of coins paid out by the hopper 113.

The touch panel 69 detects a position on the lower image display panel 141 touched by a finger or the like of the player, and outputs a signal corresponding to the detected position to the main CPU 71.

The bill entry 22 authenticates the bills and receives genuine bills into the cabinet 11. The bills received by the cabinet 11 are converted onto the number of coins, and the credits equivalent to the converted coins are added as the credits owned by the player.

The graphic board 130 controls display of images conducted by the effect mechanism 131 and lower image display panel 141, based on a control signal output from the main CPU 71. The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The key switch 173S is provided in the keypad 173, and outputs a predetermined signal to the main CPU 71 when the keypad 173 has been operated by the player. The data displayer 174 displays data read by the card reader 172 and data inputted by the player through the keypad 173, based on a control signal outputted from the main CPU 71.

(Symbols, Combinations, or the Like)

The symbols 501, which are displayed on pseudo reels 151 to 155 of the slot machine 10, form a symbol array. Each symbol 501 constituting the symbol array has, as shown in FIG. 40, one of the code numbers 0 to 19 or more. Each symbol array is a combination of the symbols 501 such as "WILD", "BONUS", "CANDLE", "BAT", and "GHOST".

The three successive symbols 501 in the symbol array are, as shown in FIG. 37, displayed (provided) at the upper stage, the central stage, and the lower stage of the display region of each of the pseudo reels 151 to 155, so that a symbol matrix of 5 columns and 3 rows is formed on the display window 150. The symbols 501 forming the symbol matrix start to scroll at least when a game starts in response to the pressing of the spin button 46. After a predetermined time elapses from the start of the scroll, the scroll of the symbols 501 stops (rearrangement).

In addition to the above, for the symbols 501, various winning combinations are set in advance. A winning combination indicates that an award is established. A winning combination is a combination in which symbols 501 having stopped on a payline L is advantageous for the player. The advantageous state indicates states such as a state that coins corresponding to the winning combination are paid out, a state that the number of coins to be paid out is added to the credits, and a state that a bonus game starts.

The winning combination in the present embodiment is a combination in which a predetermined number or more of symbols 501 of at least one type are rearranged on an activated payline L. When a particular type of symbols 501 is set as a scatter symbol, a winning combination is established when a predetermined number or more of such scatter symbols are rearranged, no matter whether a payline L is activated or not.

FIG. 37 shows a table that relates to the normal game and is used for determining which symbols 501 are the targets of rearrangement. In the normal game symbol table, symbols 501 on the display blocks 28 in each symbol array are associated with code numbers, and 20 numerical ranges defined by dividing a numerical range of 0 to 65535 by 20 are associated with the respective code numbers.

The numerical range of 0 to 65535 may be equally or unequally divided. When unequally divided, it is possible to adjust the probabilities of wining for the respective types of the symbols 501 by determining the ranges of the random numbers. In this regard, the ranges corresponding to the "BONUS" of the trigger symbol 503*b* of the specific symbol 503 and the "WILD" of the wild symbol 503*a* may be arranged to be narrower than the ranges of the other types of the symbols 501. In this case, results of games can be easily adjusted in accordance of the progress of the games, by arranging valuable types of the symbols 501 to be less likely to be won.

For example, when a random number randomly selected for the first column is "10000", the symbol 501 having the code number associated with the random number range including the selected random number is chosen as the target of rearrangement on the pseudo reel 151 of the first column. On the other hand, when, for example, a random number for the fourth column is "40000", the symbol 501 having the code number associated with the random number range including the selected random number is chosen as the target of rearrangement on the pseudo reel 151 of the fourth column.

(Gaming Terminal Management Table)

FIG. 41 shows a gaming terminal management table by which the state of the base game at each slot machine 10 is managed in the center controller 200. This management table has a gaming terminal field, a game type field, a game state field, and an accumulated number of games field. The gaming terminal field stores a machine number unique to each slot machine 10. For example, when 5 slot machines 10 are connected, the machine numbers "001" to "005" are stored.

The game type field stores the type of the base game being run by each slot machine 10, in association with the machine number. Examples of the types of the base game include "normal game" and "bonus game". For example, at the slot machine 10 having the machine number "001", the unit game of the normal game is repeated because the game type field indicates "normal game".

The game state field stores the state of the base game being run by each slot machine 10, i.e., the gaming state of the unit game in association with the machine number. The gaming states are "execution" and "stop". For example, because the game type is "normal game" and the game state is "stop", the slot machine 10 having the machine number of "002" is in a state in which the result of the unit game of the normal game has been determined and the next unit game has not started. In the meanwhile, because the game type is "bonus game" and the game state is "execution", the slot machine 10 having the machine number "004" is in a state in which the unit game of the bonus game is being run.

The accumulated number of games field stores, as an initial value, a time at which the slot game restarts after the end of the common game, and stores, as an accumulated number of games, the accumulated number of times of running the unit game in the normal game. The accumulated number of games of each slot machine 10 is used for calculating the total accumulated number of games by which a common game feasible condition is determined, such that the accumulated numbers of games of all slot machines 10 are added up.

(Display Screen of Lower Image Display Panel 141)

An example of the display screen of the lower image display panel 141 in the operation process of the slot machine 10 above will be specifically described.

(Display Screen: Normal Game Screen)

FIG. 42 shows an example of a normal game screen which is the display screen of the normal game.

More specifically, the normal game screen has a display window 150 which is provided at the central portion and has five columns of video reels 151 to 155 and payline occurrence parts 65L and 65R which is symmetrically provided to the left and right of the display window 150.

Above the display window 150, as shown in FIG. 1, a credit meter 400, a bet meter 401, and a win meter 402. The credit amount display unit 400 and the bet-number display unit 401 are displayed at the left edge part when viewed from the player. In the meanwhile, the win meter 402 is provided at the right edge part when viewed from the player. Between the bet meter 401 and the win meter 402, a system font area 403*c* is provided. The system font area 403*c* has, in an upper stage and a lower stage, a bet information display region 403*a* and a game state display region 403*b*, respectively.

The credit meter 400 displays the total number of credits. The default value is 0. The value is increased and decreased as follows: When "take WIN", which indicates winning in a game, is achieved, the credit won in the game is added to the credit meter. When a game is played, the bet number is subtracted from the credit meter. The bet number is also subtracted when the collect ends.

The bet meter 401 displays "Total Bets (=Bets×Lines)". The value is re-calculated in each game play. The win meter 402 displays the total obtained credits in an increment manner. The default value is 0. The win meter 402 switchably displays "Line XX Win XX" or "Total Win XX". The display is switched in sync with the display of payline at the time of the occurrence of winning. The content above is displayed after the occurrence of winning. The values are determined based on the payline at the occurrence of winning and the number of credits. Details of the win meter 402 will be given later.

The bet information display region 403*a* displays the bet information of a game (or the last game). In the first line, the number of bets per line is displayed. The display content is either singular or plural in line with the number of bets. More specifically, in case of one credit per line in the first line, "CREDIT" is displayed when the number of bets per line is 1. In the meanwhile, in case of two credits per line, "CREDITS" is displayed when the number of bets per line is 1. This content is displayed at the time of button selection by the player.

The game state display region 403*b* displays a current state of the game. A state display message is not displayed during the game, and the message "GAME OVER" is displayed when the game is over. When Gamble is waited for, "PLAY ON, GAMBLE or TAKE WIN" is displayed. The message is displayed until a button operation instructing Play-on or Gamble is conducted during the idle state or after the occurrence of winning.

In the meanwhile, below the display window 150 are provided a help touch button 410, a language switching touch button 411, a sound volume switching touch button 412, a denomination button 413, a number of lines selection touch button 414, and a bet per line selection touch button 415. These buttons 410, 411, 412, 413, 414, and 415 are provided left to right when viewed from the player.

The help touch button 410 displays the first page of the help screen 4101 when touched. The help touch button 410 is darkened when it is inactivated, e.g., during the rotation of the reels. The button is displayed when the normal screen is displayed. The button disappears in the help screen 4101, the free game screen and the double-up screen.

As the language switching touch button 411 is touched, the language is switched between English and Chinese. The language switching touch button 411 is activated only during the advertisement, and is darkened when it is invalidated, e.g., during the rotation of the reels.

The sound volume switching touch button 412 is used for switching the game sound volume at three stages. Each time the button is touched, the game sound volume is switched such that, for example, low→middle→high→small→middle. The button is displayed when the normal screen is displayed. The button disappears when the help screen 4101 is displayed.

The denomination button 413 displays the current denomination set in the AUDIT. This button is displayed when screens other than the AUDIT are displayed.

The number of lines selection touch button 414 is used for increasing or decreasing the number of paylines L. In the present embodiment, this button is arranged not to be touchable because the number of lines is fixed to 30.

The bet per line selection touch button 415 makes it possible to conduct bet per line. When the button is touched, five selection buttons corresponding to the current bet configuration appear.

(Details of Display Screen: Payline Box)

The lower image display panel 141 described above forms, as shown in FIG. 43, payline boxes in the display window 150. As the payline boxes forming three rows and five columns are combined, 30 paylines L are formed. Furthermore, as shown in FIG. 44, at the left and right edges of the display window 150, payline occurrence columns are provided in a symmetrical manner on the left and right. The left payline occurrence column on the left side when viewed from the player has 15 payline occurrence parts 65L. The right payline occurrence column on the right side when viewed from the player has 15 payline occurrence parts 65R.

The left payline occurrence parts 65L form pairs with the respective right payline occurrence parts 65R. From the left payline occurrence parts 65L to the right payline occurrence parts paired with the left payline occurrence parts 65L, paylines L are defined in advance. The paylines L are associated with the above-described payline boxes.

A payline L is activated when left and right payline occurrence parts 65L and 65R are connected with each other. In other cases, the paylines are inactive. The number of activated paylines L is determined based on a bet amount. When the bet amount is maximum, i.e., MAXBET, the upper limit of, i.e. 30 paylines are activated. An activated payline L allows the symbols 501 to establish various types of winning combinations.

(Details of Display Screen: Displaying Line)

Displaying of the lines at the occurrence of winning is carried out in the following cases: (1) during the normal game, (2) during the free game, (3) in the normal game when the free game is obtained (with a trigger), (4) in the normal game when a mystery bonus is obtained (non-trigger), (5) and when re-trigger is obtained.

(Details of Display Screen: Displaying Line: When Winning is Achieved at a Single Line)

As an example of cases where a wining is achieved at a single line, when, as shown in FIG. 45, a winning is achieved at the line 2 in a 3-line game, the following two single line processes 1 and 2 are executed. That is to say, in the single line process 1, the line where the winning is achieved and the frame enclosing the target symbol are illuminated (but not flicker). In the single line process 2, the animation of the symbol which is the target of winning starts. In a winning involving a scatter symbol such as the bonus symbol, only the frame enclosing the symbol is displayed. The line display is continued until the next game starts. In the gray display region in the figure, the symbol display is below the payline L.

In the free game, each of the single line processes 1 and 2 is executed at least once. After the end of these processes, whether the WIN increment has been finished and whether the waiting time has been elapsed are checked, and the shifting to the next game is conducted when both of these conditions are satisfied. In case of a minor WIN (in a single line or the like), since the execution of each of the single line processes 1 and 2 once finishes promptly and the next game starts, the state at the occurrence of winning is maintained for five seconds, and the shifting to the next game starts after five seconds elapse. The instructions "Skip" and "Cancellation of WIN Increment" by the player while the winning line is illuminated (WIN increment) are accepted and the corresponding operations are performed. This, however, is carried out only when these functions are available.

(Details of Display Screen: Displaying Lines: When Winning is Achieved at Plural Lines)

As an example of cases where winning is achieved at plural lines, as shown in FIG. 46, when in the 3-line game winning is achieved at the lines 1 and 2, plural line processes 1, 2, and 3 are executed. In the plural line process 1, the lines where the winning is achieved are illuminated for one second one by one. Furthermore, the animations of all symbols that are the target of winning are continued. The line WIN is serially performed from the line having the smallest line number. When a bonus WIN not related to the lines occurs, the effect of this bonus WIN is executed first. In so doing, the win meter 402 displays "bonus WIN=XXXXX". In the gray display region, the symbol display is provided below the payline L.

In the plural line process 2, as shown in FIG. 47, the next target line is illuminated for one second. Furthermore, the animations of all symbols that are the target of winning are continued. In the gray display region, the symbol display is provided below the payline L.

In the plural line process 3, the plural line process 1 which is the first line display is carried out again after the display of all lines finishes. The line display in accordance with the plural line processes 1, 2, and 3 is repeated until the next game starts.

Each winning line is illuminated during the free game, and whether the WIN increment has finished and where the waiting time has been elapsed are checked after the illumination of all winning lines finishes. The shifting to the next game is conducted when both of these conditions are satisfied. The instructions "Skip" and "Cancellation of WIN Increment" by the player while the winning line is illuminated (WIN increment) are accepted and the corresponding operation is performed. This, however, is carried out only when these functions are available.

(Details of Display Screen: Displaying Lines: When 5-of-a-Kind WIN Occurs)

Irrespective of the grade of the combination, video and sound effects are executed when the symbols 501 form 5 of a kind. The sound volume is changed in accordance with the type of the combination. For example, as shown in FIG. 48, a 5 of a kind is achieved when the reel stops. Thereafter, the image and sound of the 5 of a kind are output. More specifically, "5 OF A KIND" is displayed and, the voice pronouncing "5 OF A KIND" is reproduced. This process cannot be skipped. Furthermore, the increment display and the line display are not executed at this stage. Then a payout occurs. More specifically, the increment of the payout is carried out and the line WIN is displayed. This process can be skipped.

(Details of Display Screen: Displaying Lines: When Big WIN Occurs)

The following effect is executed in accordance with the payout rate of the winning. One of these types of texts is displayed. The animation operates in the same manner in both cases. Winning with the payout ratio of 10/1 to 25/1 is termed "High Payout". In the meanwhile, winning with the payout rate of 1/25 or higher is termed "Great".

The following will described a case where 5 of a kind is not achieved. For example, as shown in FIG. 49, winning with 10/1 or higher and smaller than 25/1 occurs when the reel stops. Then the increment display starts and "Big WIN", a Big WIN dedicated meter (large meter), and the line WIN are displayed. Displaying them can be skipped. The speed of the increment display in the Big WIN dedicated meter is carried out in accordance with the increment operation in the win meter 402. Details of the increment operation will be given later. When three seconds have elapsed after the end of the increment, the Big WIN and the large meter disappear. The line WIN is displayed continuously.

The following will describe a case where a 5 of a kind is achieved. For example, as shown in FIG. 50, winning with 10/1 or higher and smaller than 25/1 occurs when the reel stops. Then, an image and sound for the 5 of a kind are output. More specifically, "5 OF A KIND" is displayed and, the voice pronouncing "5 OF A KIND" is reproduced. This process cannot be skipped. the increment display and the line display are not executed at this stage.

Subsequently, the increment display starts and the Big WIN and the large meter are displayed. More specifically, the increment display starts. The speed of the increment is in conformity with the increment in the win meter 402. "Big WIN" and the line WIN are displayed. This process can be skipped. When three seconds have elapsed after the end of the increment, the Big WIN and the large meter disappear. The line WIN is continuously displayed.

(Details of Display Screen: Win Meter 402)

As shown in FIG. 51, the win meter 402 displays a obtained credit and the details thereof in an integrated meter, when a winning is achieved. The win meter 402 includes a WIN totally amount display region 4021, a detail display region 4022, and a total display region 4023.

(Details of Display Screen: Win Meter 402: WIN Totally Amount Display Region 4021)

The WIN totally amount display region 4021 displays the obtained credit and money. Details of the display screen will be given below. In the idle state, the total amount of winning displayed is "0" immediately after the winning, and "0" is continuously displayed thereafter. When the spin button 46 is pressed, "0" is displayed. The increment display is executed during the WIN increment. "0" is displayed during a bonus pick trigger (because no winning is achieved during the trigger).

At the introduction of the free game, the total amount of immediately preceding winning is displayed. The total amount of immediately preceding winning is displayed during the rotation of the reels in the free game. At the moment immediately after the rotation of the reels and immediately after the winning in the free game, the winning achieved in the free game is added to the total amount of the preceding winning, and the increment display is carried out. In other cases, the total amount of the winning in the immediately preceding game is displayed. At the introduction of a bonus, the total amount of the immediately preceding winning is displayed. Immediately after the end of the bonus, the credits obtained in a bonus or jackpot are added to the total amount of immediately preceding winning, and the increment display is carried out.

For example, credit display such as "12345678" is displayed on the upper stage, and money display such as "$123, 456, 78" is displayed in the lower stage.

(Details of Display Screen: Win Meter 402: Detail Display Region 4022)

The detail display region 4022 displays the number of the winning line and the WIN credit after the stop of the fifth reel, when winning is achieved in the normal game or the free game. When more than one line payout simultaneously occurs, the line payouts are displayed one by one at intervals of 0.5 second. The line payouts are serially displayed from the one having the smallest number, and the one having the smallest number is displayed again after the one having the largest number is displayed. The detail display region 4022 displays a text string "bonus WIN" and WIN credits in case of winning with a bonus and credit payout. Furthermore, the detail display region 4022 displays a text string "jackpot WIN" and WIN credits in case of obtaining a bonus in the jackpot.

Details of the image displays will be described below. In case of immediately after a normal winning in the idle state, the detail of the payout is displayed. When there are more than one payout, the details of the payouts are switched at intervals of 0.5 second. Nothing is displayed in other cases. Furthermore, nothing is displayed when the spin button 46 is pressed. Detail of the payout is displayed during the WIN increment. When there are more than one WIN increment, the WIN increments are switched at intervals of 0.5 second. Furthermore, nothing is displayed at the time of a bonus pick trigger. Furthermore, nothing is displayed at the time of the introduction of a free game. Furthermore, nothing is displayed during the rotation of the reels in a free game. When a line winning exists immediately after the stop of the reels in a free game, the detail of the payout is displayed. When there are more than one payout, the details of the payouts are switched at intervals of 0.5 second. Nothing is displayed in other cases.

Nothing is displayed at the time of the introduction of a bonus. When a bonus (excluding jackpot) exists immediately after the end of the bonus, a bonus WIN is displayed, and a jackpot WIN is displayed when the jackpot is achieved. The bonus WIN is displayed immediately after achieving a credit payout. Nothing is displayed at the end of a bonus game (i.e., when returning to the game screen).

An example of the displayed image is "line xx WIN=12345678". This image display indicates a winning in a normal game or in a free game. Another example of the displayed image is "bonus WIN=12345678". This image display indicates a winning of a bonus or a credit payout. Another example of the displayed image is "jackpot WIN=12345678". This image display indicates a winning at the time of obtaining jackpot in a bonus.

(Details of Display Screen: Win Meter 402: Total Display Region 4023)

The total display region 4023 displays the sum total of the amounts in the detail display region. Details of the image displays will be given below. The total winning is displayed in case of immediately after a normal winning in the idle state. Nothing is displayed in other cases. Nothing is displayed when the spin button 46 is pressed. The total winning is displayed during the WIN increment. Nothing is displayed at the time of a bonus pick trigger. Nothing is displayed at the introduction of a free game. Nothing is displayed during the rotation of the reels in a free game. When a line winning exists immediately after the stop of the rotation of the reels in a free game, the total winning is displayed. Nothing is displayed in other cases. Nothing is displayed at the introduction of a bonus. The total winning is displayed immediately after the end of a bonus. The total winning is displayed immediately after winning a credit payout. Nothing is displayed at the end of a bonus game (i.e., returning to the game screen). An example of the displayed image is "total WIN=12345678".

(Details of Display Screen: WIN Meter 402: Increment)

(Basic Setting)

The count up is smoothly carried out upward. The control is executed in consideration of a difference between an actual amount of money (real amount of money) and an amount of money displayed at that time (displayed amount of money). The operation of the carry of a digit is done at the same time as the operation for lower digits. When a displayed amount of money is larger than a real amount of money (e.g., at the time of resetting in response to a winning), rewriting is immediately carried out.

(Details of Increment Operation)

The speed of the increment is determined in accordance with a remaining count number. When the remaining count number is increased during the operation, the speed of the increment is immediately changed to correspond to the increased remaining count number. The rewriting is performed when the remaining count number exceeds "101". More specifically, as shown in FIG. 52, the increment operation is carried out at a speed of increment (seconds) corresponding to each remaining count number.

(Details of Rewriting)

When the remaining count number exceeds "101", the rewriting is carried out with the value (remaining count number −60), and the count up is carried out based on a data table for the remaining 60 counts. For example, when the remaining count number is 110 counts, the target amount is rewritten so that 50 counts calculated by subtracting 60 from 110 are added to the target amount. At the same time as the rewriting, the remaining 60 counts are counted up. In the meanwhile, when the display amount becomes larger than the real amount due to resetting on account of progressive winning or the like, rewriting is immediately carried out. It is noted that the numbers above such as "101" and "60" are mere examples, and "101" may be any predetermined number and "60" may be any number to be subtracted.

When a progressive winning occurs, the increment is interrupted, the rewriting to the amount of money having been won is carried out, and a flickering effect starts. The flickering is not performed while the increment is being interrupted.

The speed of increment may be managed based on the ratio between the bet and the amount won. For example, when an amount won by winning is four times larger than a bet, the speed of the increment is set at four seconds with reference to the relationship between control thresholds and seconds defined in, for example, a data table shown in FIG. 53. Furthermore, after the speed of the increment is determined based on the data table of FIG. 53, the data table of FIG. 53 may be rewritten based on the determined value. For example, when the speed of the increment is determined to be four seconds in the case where an amount won by winning is four times larger than the bet as above, the second for the remaining count number (1 to 2) in the data table of FIG. 53 is set at four seconds, and the other remaining count numbers are changed to values calculated based on a predetermined ratio.

(Details of Display Screen: Sound Volume Switching Touch Button 412)

As shown in FIG. 54, the sound volume switching touch button 412 has a function of allowing the player to switch the sound volume at will. The volume is switchable in, for example, three stages. The volume may be linearly changeable. The first stage corresponds to the minimum volume. The second stage corresponds to the medium volume. The third stage corresponds to the maximum volume. The volume stages are switched such that the first stage second stage→third stage→first stage.

The default volume stage is the first stage. The default bonus stage is set when (1) a game is activated and (2) at the return from the AUDIT (regardless of whether the volume in the AUDIT is changed). The coefficients of volume changes are 30% in the first stage, 70% in the second stage, and 100% in the third stage. The sound volume switching touch button 412 is always activated unless the button is hidden. The button is activated when GUI (Graphical User Interface) such as the help touch button 410 is displayed. However, when a help screen is displayed, the sound volume switching touch button 412 disappears from the GUI (i.e., is covered with the NEXT button), the button is not operable. The operation invalidation time of the sound volume switching touch button 412 after the touch, i.e., the minimum interval between serial touching is 0.15 second (150 msec). The default sound volume setting value in the AUDIT is 12. The default value is 5 when no sound volume adjustment touch panel function is provided. The reproduction sound volume of the volume setting change sound in the AUDIT is identical with the default volume of the sound volume switching touch button 412 (i.e., the volume reflecting the coefficient in the default stage).

(Details of Display Screen: Details of Screen Touch Buttons)

The positions and operations of the help touch button 410, the language switching touch button 411, the sound volume switching touch button 412, and the denomination button 413 are based on the positions in the operation states shown in FIGS. 55A to 55H, a lighting table shown in FIG. 56, and the language setting shown in FIG. 57. For example, the buttons are operable only in the idle state (game over state) regardless of the presence of credits. The switching is impossible during the help, during games, during an error, and during the AUDIT. (The buttons are not illuminated and invalidated, or are replaced with other buttons). The switching is impossible during the help, during games, during an error, and during the AUDIT. (The buttons are not illuminated and invalidated, or are replaced with other buttons). The national flag associated with the currently used language is displayed on the top. The states of the previous game are maintained even after the switching. The default language in English-speaking countries is English. The default language in Chinese-speaking countries is Chinese.

(Details of Display Screen: System Font Area 403*c*)

As shown in FIG. 58, the system font area 403*c* has a bet information display region 403*a* and a game state display region 403*b*. The system font area 403*c* shows the bet information of a game (or the last game) to the player. In the system font area 403*c*, a display region for the bet per line is provided in the bet information display region 403*a* and a display region for the game stage is provided in the game state display region 403*b*.

The display contents on the bet information display region 403*a* of the system font area 403*c* are as follows. Immediately after the RAM is cleared, 1 Credit Per Line or XX CREDITS PER LINE (XX is the minimum value of the set betting patterns) is displayed. As the BET buttons 34 to 39 are pressed, the 1 Credit Per Line or the XX CREDITS PER LINE (indicating different values in accordance with the BET buttons) is displayed. In other cases, the immediately preceding display content is kept displayed.

The display contents on the game state display region 403*b* of the system font area 403*c* are as follows. Immediately after the RAM is cleared, GAME OVER is displayed. When the spin button 46 is pressed, nothing is displayed if the reel is rotating, and GAME OVER is displayed in other cases. When Gamble is possible immediately if winning is achieved after the reel stop (without trigger), "PLAY ON, GAMBLE or TAKE WIN" is displayed. GAME OVER is displayed in other cases.

Nothing is displayed at the time of bonus trigger. Immediately after the bonus, if Gamble is possible on condition that winning is achieved, "PLAY ON, GAMBLE or TAKE WIN" is displayed. GAME OVER is displayed in other cases. Immediately after the end of the jackpot, GAME OVER is displayed. When the help button 33 is pressed (to display the help screen 4101), nothing is displayed if Gamble is possible on condition that winning is achieved. GAME OVER is displayed in other cases.

When the help button 33 is pressed (the return to the game screen), the state before the help screen 4101 is displayed comes back. When the gamble button 44 is pressed (to display the gamble screen), nothing is displayed if Gamble is possible on condition that winning is achieved. GAME OVER is displayed when the BET buttons 34 to 39 are pressed. GAME OVER is displayed when Take Win is selected. The previous states come back when returning from the AUFIT and power failure.

(Details of Display Screen: Help Screen 4101)

As shown in FIG. 59, the lower image display panel 141 displays a help screen 4101 as the help touch button 410 is operated. Below the help screen 4101 are provided text display regions 4105, 4106, and 4107. On the text display regions 4105, 4106, and 4107, texts are displayed with the system font. The help touch button 410 is switched to an EXIT button 4102, the language switching touch button 411 is switched to a PREV button 4103, and the sound volume switching touch button 412 is switched to a NEXT button 4104. When the EXIT button 4102 is touched, the help is terminated and the normal game screen comes back. As the PREV button 4103 is touched, the previous help page is displayed. As the NEXT button 4104 is touched, the next help page is displayed.

An example of the text displayed on the text display region 4105 is PRESS HELP TO EXIT. The maximum number of characters is 25. An example of the text displayed on the text display region 4106 is PRESS BET 1 FOR PREVIOUS PAGE. The maximum number of characters is 36. An example of the text displayed on the text display region 4107 is PRESS BET 2 FOR NEXT PAGE. The maximum number of characters is 33.

As shown in FIG. 60 and FIG. 61, these buttons 4102, 4103, and 4104 and the text display regions 4105, 4106, and 4107 are linked to the control panel 30. Even if the patterns are altered and the values are changed, the text display regions 4105, 4106, and 4107 display correct contents in accordance with the changes.

(Details of Display Screen: Help Screen 4101: Operations)

Operation when entering the help screen 4101: When the help touch button 410 is pressed in the idle state, only the 1st screen is changed to the help screen 4101 while the 2nd screen is kept displaying the basic screen of the idle state. The help screen 4101 is displayed only on the 1st screen. During an error or AUDIT, the help touch button 410 LED is not illuminated so as not to allow the player to enter the help screen 4101. Whether it is possible to enter the help screen 4101 during games is different in each game. Basically, at the destinations of shipment, it is possible to enter the help screen 4101 only in the idle state. The help screen 4101 must be displayed from the first page.

Operation in the help screen 4101: When an error or door open occurs, the help screen 4101 is terminated (i.e., the game screen is reinstated and ERROR/DOOR OPEN is displayed. When a bill or a coin is inserted, the help screen 4101 is terminated and the credit is received. When an AUDIT key is turned, the help screen 4101 is terminated and the AUDIT is displayed. After the end of the AUDIT, the idle state comes back. When power interruption occurs, the help screen 4101 is not displayed when the power is turned on and the machine becomes in the idle state. When no input is made for three minutes while the help screen 4101 is being displayed, the help screen 4101 disappears and the machine becomes in the idle state.

(Details of Display Screen: Help Screen 4101: Page Structure)

The required items, i.e., a payout table item, a basic rule item, a winning line item, a feature item, a unique benefit feature item, and a bet-number item are structured into pages in this order. Some items are described over plural pages.

The payout table item describes all winning combinations. The winning combinations are listed from the highest one to the lowest one. For example, picture symbol→royal symbol. The basic rule item describes how to play games and the basic play of the gamble game. The winning line item describes the paylines. In the feature item, each feature is described in a different page when there are plural features. When a payout table different from that of the normal game is used, such a table is described after the feature rules. The unique benefit feature item describes feature rules unique to the games, such as High Power, MAX BET Special, and RESCUE. The bet-number item describes the range of money playable in a game. For example, the item shows the minimum and the maximum of the BET buttons.

The basic rule item includes the following contents as display data. "This game must be played with all lines.", "Select credits bet on each line.", "All wins are displayed as credits.", "Winning is determined on successive reels from the leftmost except bonus symbol (bonus symbol in free game).", "Winning is determined on illuminated line except bonus symbol (bonus symbol in free game).", "Target is the highest winning on each line.", "Winning on different line is also added.", "Winning on line is multiplied by credits bet on each line.", "All payouts and game play become invalidated when malfunction occurs.", and "Player should check whether correct credits are registered before game starts."

The winning line item includes, as display data, 39 patterns of the payout lines. The payout table item has, as display data, the illustrations in FIG. 62 and FIG. 63. The bet-number item includes, as display data, "PLAY 0000 TO 0000 CREDITS" and "ALL WINS PAID BY MACHINE OR ATTENDANT".

The feature item and the unique benefit feature item include the illustrations in FIG. 64 and FIG. 65 as display data. The feature item and the unique benefit feature item include the following contents as display data.

In the bonus selection, "If bonus symbol stops at reel 1, 3, or 5, a bonus pick is triggered", "Four doors are displayed on screen.", "In the four doors, Franken BONUS, Mummy bonus, Wolfman bonus, and Vampire bonus are hidden.", and "Select one of the four doors. Game shifts to bonus in the door or to free game."

In the Mummy BONUS, "Five King's coffins are displayed on screen.", "Prize appears as one of the five coffins is selected.", "Credit payout or Franken BONUS is hidden in the five King's coffins.", "If the credit payout appears from the selected King's coffin, the displayed credit is obtained and Mummy BONUS ends.", "When Franken BONUS appears from the selected King's coffin, the displayed credit is obtained and Mummy BONUS ends, and Franken BONUS is triggered.", "Credit payouts of Mummy BONUS: 120, 150, 180, 200, 240, 250, 260, 300 or 350 times as much as bet per line."

In the Wolfman BONUS, "Wolfman bonus is 5-game free game.", "Different reel is used in Wolfman BONUS.", "Number of play lines and number of bets in Wolfman BONUS are identical with those when bonus pick is triggered.", "(Before-wolf-transform wild symbol) appearing on reel is changed to (after-wolf-transform wild symbol), and stops at his position until free game ends.", "(In-free-game bonus symbol) having appeared below (after-wolf-transform wild symbol) is active and alternately displayed when re-trigger occurs.", "Re-trigger occurs once only when three (in-free-game bonus symbols) appear, and five free games are added.", "After Wolfman BONUS ends, Franken BONUS is randomly triggered."

In the Vampire BONUS, "Select one of six windows.", "In six windows, (Beauty Girl A Symbol), (Beauty Girl B Symbol), (Beauty Girl C Symbol), (Beauty Girl D Symbol), (Beauty Girl E Symbol), and (END symbol) are hidden.", "When one of (Beauty Girl A Symbol), (Beauty Girl B Symbol), (Beauty Girl C Symbol), (Beauty Girl D Symbol), and (Beauty Girl E Symbol) appears from the selected window, the displayed payout is obtained and six windows appear again.", "As long as (Beauty Girl A Symbol), (Beauty Girl B Symbol), (Beauty Girl C Symbol), (Beauty Girl D Symbol), or (Beauty Girl E Symbol) appears from the selected window, the Vampire BONUS is repeated eight times at the maximum.", "If (END symbol) appears from the selected window, the displayed credit is obtained and Vampire BONUS ends.", "If one of (Beauty Girl A Symbol), (Beauty Girl B Symbol), (Beauty Girl C Symbol), (Beauty Girl D Symbol), and (Beauty Girl E Symbol) appears in the eighth selection, Vampire BONUS ends and Franken BONUS is triggered."

In Franken BONUS, "Franken BONUS starts from pumpkin selection area. some pumpkins are selected from 29 pumpkins.", "Behind each of the 29 pumpkins, Credit payout, (Mummy symbol), (Wolfman symbol), (Vampire symbol), (Door 2 options mummy symbol), (Door 2 options wolfman symbol), (Door 2 options vampire symbol), (Mirror bonus symbol), (Electric chair bonus symbol), or (END symbol) is hidden.", "The following icons do not appear at the same time. (Mummy symbol) and (Door 2 options mummy symbol), (Wolfman symbol) and (Door 2 options wolfman symbol), and (Vampire symbol) and (Door 2 options vampire symbol)", "A pumpkin is selectable until (END symbol) appears.", "If the credit payout appears from the selected pumpkin, the credit is obtained.", "When a character appears from the pumpkin, the displayed character is obtained.", "When (Door 2 options mummy symbol), (Door 2 options wolfman symbol), or (Door 2 options vampire symbol) appears from the pumpkin, shift to MONSTER'S ROOM screen.". "In MONSTER'S ROOM stage, select one of two doors.", "If credit payout appears from the selected door, the credit is obtained return to pumpkin selection area.", "If character appears from the selected door, the character is obtained and return to pumpkin selection area.", "Obtained character sits down on seat at dining table on screen.", "When (Mirror bonus symbol) appears from pumpkin, (Mirror bonus) is triggered.", "When (Electric chair bonus symbol) appears from pumpkin, (Electric chair bonus) is triggered.", "The credit payout of (Door 2 options mummy symbol), (Door 2 options wolfman symbol), and (Door 2 options vampire symbol) is 60 times as much as the bet per line. This payout, however, is obtained only when no character is obtained."

In Franken BONUS, "When character has been obtained before drawing "END", random determination of character payout is conducted at top box.", "Random determination is conducted for each of obtained characters, and payout calculated by multiplying illuminated payout by bet/line is paid out.", "Franken BONUS ends when random determinations of all payouts for obtained characters end.", "When the credit payout displayed at top box is different from the credit payout displayed on game screen, the credit payout displayed on game screen is preferred.", "VAMPIRE'S award: CREDITs BET PER LINE multiplied by 250, 300, 500, 750, 900 or 1200", "WOLFMAN'S award: CREDITS BET PER LIN multiplied by 200, 250, 450, 500, 650 or 1000", and "MUMMY'S award: CREDITS BET PER LIN multiplied by 150, 200, 250, 300, 500 or 750".

In Franken BONUS, "When no character has been obtained before drawing "END", shift to stage with tombstones.", "Select one of four tombstones.", "Behind four tombstones, one of arbitrarily selected (Mummy symbol), (Wolfman symbol), and (Vampire symbol) or one of (END symbol) and (REVIVAL GHOST bonus symbol) is hidden.", "When character appears from selected tombstone, random determination of payout corresponding to obtained character is conducted at top box, payout calculated by multiplying illuminated payout by bet/line is awarded, and Franken BONUS ends.", "when (END symbol) appears from selected tombstone, obtain displayed credit and Franken BONUS ends.", "When REVIVAL GHOST bonus appears from selected tombstone, displayed credit is obtained and REVIVAL GHOST bonus is triggered.", "(END symbol), REVIVAL GHOST bonus credit award: CREDITS bet per line multiplied by 30, 60, or 150".

In the revival ghost bonus of Franken BONUS, "Select one of 10 ghosts.", "Behind ghosts, one of arbitrarily selected (Mummy symbol), (Wolfman symbol), and (Vampire symbol), or one of (END symbol) and fixed payout is hidden.", "Ghost is selectable until character or (END symbol) appears.", "When character appears from selected ghost, random determination of payout corresponding to obtained character is conducted at top box, payout calculated by multiplying illuminated payout by bet/line is awarded, and REVIVAL GHOST bonus ends.", "When (END symbol) appears from selected ghost, REVIVAL GHOST bonus ends.", "When REVIVAL GHOST bonus ends Franken BONUS also ends.", "(GHOST) credit award: CREDITS bet per line multiplied by 30, 60, 90, 120 or 150."

In mirror bonus of Franken BONUS, "Select three mirrors out of eight mirrors.", "Payout is awarded based on combination of numbers displayed on mirrors.", "In each mirror, one of numbers, 1, 2, 3, and 4 is hidden.", "Mirrors are serially selected for the first digit, the second digit, and the third digit, the numbers on the respective mirrors are input to the respective digits, and payout is determined by multiplying the number indicated by the three digits by bet/line.", "After payout is awarded, mirror bonus ends and return to pumpkin selection area."

In Electric chair bonus of Franken BONUS, "Credit of payout is randomly determined.", "Press SPIN button or MAX BET button to elongate meter in game screen. This, however, does not influence of credit to be paid out.", "After payout displayed on screen is awarded, Electric chair bonus ends and return to pumpkin selection area.", "Credit payout of Electric chair bonus: 30, 60, 90, 100, 120, 150, 200, 250, 300, or 350 times as much as bet per line".

In mummy wild feature, "Only when no bonus symbol appears on third reel in normal game, mummy randomly appears.", "When mummy appears, all symbols on randomly selected four reels at the maximum are changed to wild symbols.", "Mummy wild feature, wolfman wild feature, and vampire wild feature do not occur at the same time."

In the wolfman wild feature, "Only when no bonus symbol appears on third reel during normal game and no wild symbol has appeared, wolfman randomly appears.", "When wolfman appears, randomly selected three to seven symbols are changed to wild symbols.", "Mummy wild feature, wolfman wild feature, and vampire wild feature do not occur at the same time."

In the vampire wild feature, "only when no bonus symbol appears on third reel in normal game, vampire randomly appears.", "When vampire appears, randomly selected three to seven symbols are changed to wild symbols.", "Mummy wild feature, wolfman wild feature, and vampire wild feature do not occur at the same time."

(Details of Display Screen: AUDIT Screen)

As shown in FIG. 66, the AUDIT screen allows the switching of the national flag on an AUDIT menu. In the switching of the national flag on the AUDIT menu, "national flag" displayed on the touch button at the switching of the language can be set on the AUDIT menu. For example, the operator enters the "AUDIT menu". Then "SETTING" is pressed, and "SOFTWARE SETTING" is pressed as shown in FIG. 67, a screen shown in FIG. 68 appears. It is noted that the operations by the control panel 30 or the like are not changed from the current settings.

In the screen shown in FIG. 68, the item "LANGUAGE SELECT BUTTON DISPLAY" is added. In regard to the language switching button, the display content in this later is one of the followings. That is, "LANGUAGE SELECT BUTTON DISPLAY" is one of "DISABLED", "UK/CHN", and "US/CHN".

In addition to the above, the initial display at the clearance of the RAM is shown in FIG. 69. That is to say, in North America, the display language is English, the national flags are U.S./China, and the U.S. flag is on the front on the function touch button. In the Macau area, the display language is English, the national flags are U.K./China, and the U.K. flag is on the front on the function touch button. In the other areas, the display language is English, the national flags are U.K./China, and the U.K. flag is on the front on the function touch button.

When the item "LANGUAGE SELECT BUTTON DISPLAY" is selected, a screen shown in FIG. 70 is displayed. It is noted that the selected item is enclosed by a red frame. It is noted that the operations by the control panel 30 or the like are not changed from the current settings. "DISABLED" is setting with which the switching function is disabled (only English). The language switching touch button is switched to "PAYTABLE touch button. After the touch (i.e., the determination by the button), the screen of the immediately above layer is displayed and the determination is confirmed. "UK/CHN" indicates that the U.K. flag is set. "USA/CHN" indicates that the U.S. flag is set. The button also functions as the activation of the switching function (i.e., the switching touch button is displayed). After the touch (i.e., the determination by the button), the screen of the immediately above layer is displayed and the determination is confirmed. The selected national flag is on the front of the touch button (Chinese flag is on the behind). By "CANCEL", the screen is canceled and the screen of the immediately above layer comes back. The contents that were previously set remain the same.

(Control Panel 30)

Below the lower image display panel 141 that displays the AUDIT screen above or the like, as shown in FIG. 71, a control panel 30 is provided. The control panel 30 is provided not only with buttons but also units such as a coin entry 21 that allows coins to enter the cabinet 11 and a bill entry 22.

More specifically, on the control panel 30, a change button 31, a cashout button 32, and a help button 33 are provided on the upper stage of the left area in front elevation, a 1-BET button 34, a 2-BET button 35, a 3-BET button 37, and a 5-BET button 38 are provided in the middle stage of the left area. Furthermore, on the control panel 30, a play-2-lines button 40, a play-5-lines button 41, a play-10-lines button 42, a play-20-lines button 43, and a gamble button 44 are provided in the lower stage of the left area. It is noted that, as shown in FIG. 72 to FIG. 75, the control panel 30 may have a different design of buttons in accordance with the type of the game.

The control panel 30 makes it possible to conduct selections in the same manner as those by the touch panel, on various types of selection screens. For example, the cursor is moved leftward as the 1-BET button 34 is touched, and the cursor is moved rightward as the 10-BET button 39 is touched. When the operation is carried out, the light source in each button is preferably turned on.

In addition to the above, as shown in FIG. 71, on the control panel 30, the coin entry 21 and the bill entry are provided on the upper stage of the right area, whereas a maximum BET button 45 and a spin button 46 are provided on the lower stage of the right area.

The change button 31 is used when a player leaves the machine or when the player asks a staff person of the gaming facility to exchange money. The cashout button 32 is a so-called settlement button by which credit data concerning credits obtained in games is added to the credit data stored in an IC card inserted into the PTS terminal 700. The help button 33 is pressed when, for example, it is unclear how to play a game. As the help button 33 is pressed, various help information is displayed on a later-described effect mechanism 131 and lower image display panel 141.

Each time the 1-BET button 34 is pressed, one of the credits currently owned by the player is bet on each active payline L. The 2-BET button 35 is used to start a game with two credits bet on each active payline L. The 3-BET button 37 is used to start a game with three credits bet on each active payline L. The 5-BET button 38 is used to start a game with five credits bet on each active payline L. The 10-BET button 39 is used to start a game with ten credits bet on each active payline L. The maximum BET button 45 is used to activate the maximum number of paylines L, i.e., 20 paylines L. With this, the number of activated paylines L becomes the maximum, i.e., 20. As such, the number of credits bet on each active payline L determined by pressing the 1-BET button 34, the 2-BET button 35, the 3-BET button 37, the 5-BET button 38, the 10-BET button 39, and the maximum BET button 45.

The play-2-lines button 40 is pressed for activating two paylines L. As a result, the number of active paylines L becomes two. The play-5-lines button 41 is pressed for activating five paylines L. As a result, the number of active paylines L becomes five. The play 10-lines button 42 is pressed for activating ten paylines L. As a result, the number of active paylines L becomes ten. The play 20-lines button 43 is pressed for activating 20 paylines L. As a result, the number of active paylines L becomes 20.

The gamble button 45 is an operation button used for, for example, shifting to the gamble game after the end of the bonus game or the like. The gamble game is a game played with the consumption of an obtained credit.

The spin button 46 is a button used for starting the scroll of the symbols 501. This spin button 46 also functions as a button for starting a bonus game and for adding a payout awarded in a bonus game to the credits. The coin entry 21 is used for receiving coins into the cabinet 11. The bill entry 22 validate bills and receives genuine bills into the cabinet 11.

(Details of Operation of Control Panel 30)

The operations of the control panel 30 are changed or restricted in accordance with the content of the display screen and the operations on the lower image display panel 141.

(Details of Operation of Control Panel 30: Immediately after Clearance of RAM)

As shown in FIG. 76, the change button 31 is in the off state and disabled, and is turned on/off as pressed. The cashout button 32 is in the off state and disabled. The help button 33 is in the on state and active. The 1-BET button 34 to 10-BET button 39 are in the off state but active. The gamble button 44 is turned off and disabled. The maximum BET button 45 is in the off state and disabled. The spin button 46 is in the off state and disabled.

The gamble button 44 appears only when GAMBLE ENABLE is set. The gamble button 44 is basically in the on state and active only when "PLAY ON, GAMBLE OR TAKE WIN" is displayed. The button is in the off state and disabled in other cases.

(Details of Operation of Control Panel 30: Idle State (without Credits))

As shown in FIG. 77, the change button 31 is in the off state but active. The button is turned on/off as pressed. The cashout button 32 is in the off state but active. The help button 33 is in the on state and active. The 1-BET button 34 to 10-BET button 39 are in the off state or are in the on state and active. In other words, these buttons retain the state of the previous game play. The gamble button 44 is in the off state but active. The maximum BET button 45 is in the off state but active. The spin button 46 is in the off state but active.

(Details of Operation of Control Panel 30: Idle State (with Credits))

As shown in FIG. 78, the change button 31 is in the off state but active. The button is turned on/off as pressed. The cashout button 32 is in the on state and active. The help button 33 is in the on state and active. The 1-BET button 34 to 10-BET button 39 are in the off state or are in the on state and active. In other words, these buttons retain the state of the previous game play. The gamble button 44 is in the off state and disabled. The maximum BET button 45 is turned on when MAX BET is possible, and a game starts with "MAX BET" when the button pressed. When the credits are less than MAX BET, the button is turned on, and the maximum credits bettable are selected when the button is pressed. When the credits are less than the amount for one bet, the button is in the off state and disabled. The spin button 46 is in the on state and active in a bet pattern in which the remaining credits are selected. When the remaining credits are smaller than the selected bet pattern, the button is in the off state and disabled.

(Details of Operation of Control Panel 30: Continuous Pressing of Spin Button 46)

As shown in FIG. 79, auto bet starts as the spin button 46 is continuously pressed. The maximum BET button 45 is in the off state and disabled. The other buttons are in the off state and disabled. The auto bet function (button) is the operation identical with those during the reel spin and the WIN increment. However, during the WIN increment, the next game starts rather than the GAME OVER, when the illuminated button is pressed. The button operation when a payout occurs is identical with that of the WIN increment. The button operation when losing in the game is identical with the operation during the reel spin. When the feature is waited for, it is necessary to press the bottom at the time of the pressing of the spin button 46.

(Details of Operation of Control Panel 30: During Help Screen)

As shown in FIG. 80, the change button 31 is in the off state but active. The button is turned on/off as pressed. The cashout button 32 is in the off state and disabled. The help button 33 is in the on state and active. The help ends when the button is pressed. The 1-BET button 34 is in the on state and active. The next page of the help screen is displayed when the button is pressed. The 2-BET button 35 is in the on state and active. The previous page of the help screen is displayed when the button is pressed. The maximum BET button 45 is in the on state and active. The help ends when the button is pressed. The spin button 46 is in the on state and active. The help ends when the button is pressed. The other buttons are in the off state and disabled.

(Details of Operation of Control Panel 30: During Reel Spin (the Same Applies During Free Game))

As shown in FIG. 81, the change button 31 is in the off state but active. The button is turned on/off as pressed. The cashout button 32 is in the off state and disabled. The help button 33 is in the off state and disabled. The maximum BET button 45 is in the on state and active. Quick stop is executed when the button is pressed. The spin button 46 is in the on state and active. Quick stop is executed when the button is pressed. The other buttons are in the off state and disabled.

(Details of Operation of Control Panel 30: During Cancelable Effect Screen)

As shown in FIG. 82, the change button 31 is in the off state but active. The button is turned on/off as pressed. The cashout button 32 is in the off state and disabled. The help button 33 is in the off state and disabled. The maximum BET button 45 is in the on state and active. The effect is canceled when the button is pressed. The spin button 46 is in the on state and active. The effect is canceled when the button is pressed. The other buttons are in the off state and disabled.

(Details of Operation of Control Panel 30: In WIN Increment—During Normal Game)

As shown in FIG. 83, the change button 31 is in the off state but active. The button is turned on/off as pressed. The cashout button 32 is in the on state and active. The increment is canceled when the button is pressed. The help button 33 is in the off state but active. The 1-BET button 34 to the 10-BET button 39 are in the off state or are in the on state and active. The increment is canceled when one of the buttons is pressed, and the GAME OVER is executed and the selected bet is set and the button is turned on. In other words, these buttons retain the state of the previous game play. Alternatively, the buttons are in the off state or are in the on state and active, and the increment is canceled and the GAME OVER is executed when the button is pressed. The maximum BET button 45 is in the on state and active. The increment is canceled when the button is pressed, and the processes from Take WIN to GAME OVER are executed. The spin button 46 is in the on state and active. The increment is canceled when the button is pressed, and the processes from Take WIN to GAME OVER are executed. When credits allowing repeat bet are retained, the next game starts. The spin button 46 may be in the on state and active, and the increment may be canceled when pressed and the GAME OVER may be executed. The gamble button 44 is in the on state and active when Gamble is active. The increment is canceled when the button is pressed, and a gamble screen is displayed. The button is in the off state and disabled when Gamble is disabled.

(Details of Operation of Control Panel 30: In WIN Increment—During Free Game)

As shown in FIG. 84, the change button 31 is in the off state but active. The button is turned on/off as pressed. The cashout button 32 is in the on state and active. The next game starts when the number of remaining games is not zero. When the number of remaining games is zero, the shifting to a total WIN signboard is executed. The help button 33 is in the off state and disabled. The 1-BET button 34 to the 10-BET button 39 are in the off state or are in the on state and active. Each button is turned on only at the time of betting with the triggering of a free game. The next game starts when the number of remaining games is not zero. When the number of remaining games is zero, the shifting to a total WIN signboard is executed. The maximum BET button 45 is in the on state and active. The next game starts when the number of remaining games is not zero. When the number of remaining games is zero, the shifting to a total WIN signboard is executed. The spin button 46 is in the on state and active. The next game starts when the number of remaining games is not zero. When the number of remaining games is zero, the shifting to a total WIN signboard is executed. The gamble button 44 is in the off state and disabled.

(Details of Operation of Control Panel 30: In Trigger Payout Increment after Winning Free Game)

As shown in FIG. 85, the change button 31 is in the off state but active. The button is turned on/off as pressed. The cashout button 32 is in the on state and active. The increment is canceled when the button is pressed, and the shifting to the next step is executed. The help button 33 is in the off state and disabled. The 1-BET button 34 to the 10-BET button 39 are in the off state or are in the on state and active. Each button is turned on only at the time of betting with the triggering of a free game. The increment is canceled when the button is pressed, and the shifting to the next step is executed. The maximum BET button 45 is in the on state and active. The increment is canceled when the button is pressed, and the shifting to the next step is executed. The spin button 46 is in the on state and active. The increment is canceled when the button is pressed, and the shifting to the next step is executed. The gamble button 44 is in the off state and disabled.

(Details of Operation of Control Panel 30: Waiting for Selection—Direct Selection of Control Panel 30)

As shown in FIG. 86, the change button 31 is in the off state but active. The button is turned on/off as pressed. The cashout button 32 is in the off state and disabled. The help button 33 is in the off state and disabled. The 1-BET button 34 to the 10-BET button 39 are in the on state and active when allocated to selection buttons. The buttons are in the off state and disabled when not allocated to selection buttons. The maximum BET button 45 is in the off state and disabled. The spin button 46 is in the off state and disabled. The gamble button 44 is in the off state and disabled.

(Details of Operation of Control Panel 30: Waiting for Selection—Selection by Moving Cursor)

As shown in FIG. 87, the change button 31 is in the off state but active. The button is turned on/off as pressed. The cashout button 32 is in the off state and disabled. The help button 33 is in the off state and disabled. The 1-BET button 34 is in the on state and active. The cursor is moved to the next option when the button is pressed. The 10-BET button 39 is in the on state and active. The cursor is moved to the next option when the button is pressed. The maximum BET button 45 is in the on state and active when an icon is selected by the cursor. When no icon is selected by the cursor, the button is in the off state and disabled. The spin button 46 is in the on state and active when an icon is selected by the cursor. When no icon is selected by the cursor, the button is in the off state and disabled. The gamble button 44 is in the off state and disabled.

(Details of Operation of Control Panel 30: When Total WIN Signboard is Displayed after Free Game)

As shown in FIG. 88, the change button 31 is in the off state but active. The button is turned on/off as pressed. The cashout button 32 is in the off state and disabled. The help button 33 is in the off state and disabled. The maximum BET button 45 is in the off state and disabled until four seconds elapse. The button is in the on state and active after four seconds elapses. The spin button 46 is in the off state and disabled until four seconds elapse. The determination is confirmed when the button is pressed. The button is in the on state and active after four seconds elapses. The increment is canceled when the button is pressed. The gamble button 44 is in the off state and disabled.

(Details of Operation of Control Panel 30: When PLAYON, GAMBLE or TAKEWIN is Displayed)

As shown in FIG. 89, the change button 31 is in the off state but active. The button is turned on/off as pressed. The cashout button 32 is in the on state and active. Take WIN and GAME OVER are conducted when the button is pressed. The help button 33 is in the on state and active. The help is displayed when the button is pressed. The 1-BET button 34 to the 10-BET button 39 are in the off state or are in the on state and active. In other words, these buttons retain the state of the previous game play. Take WIN and GAME OVER are conducted when the button is pressed. The maximum BET button 45 is in the on state and active. The increment is canceled when the button is pressed and the GAME OVER is executed. The spin button 46 is in the on state and active. Take WIN and GAME OVER are conducted when the button is pressed. Then the next game starts. The increment may be canceled and the GAME OVER may be executed when the spin button 46 is pressed. The gamble button 44 is in the on state and active. Gamble is executed when the button is pressed.

(Details of Operation of Control Panel 30: in Gamble)

As shown in FIG. 90, the change button 31 is in the off state but active. The button is turned on/off as pressed. The cashout button 32 is in the on state and active. Take WIN and GAME OVER are conducted when the button is pressed. The help button 33 is in the on state and active. The help is displayed when the button is pressed. The 1-BET button 34 is in the on state and active. Red is selected when the button is pressed. The 2-BET button 35 is in the on state and active. Black is selected when the button is pressed. The maximum BET button 45 is in the on state and active. Take WIN and GAME OVER are conducted when the button is pressed. The spin button 46 is in the on state and active. Take WIN is conducted when the button is pressed, and the next game starts. Take WIN and GAME OVER may be conducted when the spin button 46 is pressed. The other buttons are in the off state and disabled.

(Details of Operation of Control Panel 30: in RESIDUAL GAMBLE)

As shown in FIG. 91, the change button 31 is in the off state but active. The button is turned on/off as pressed. The cashout button 32 is in the on state and active in case of GAMBLE-ODD SUM. ATTENDANT PAY is conducted when the button is pressed. The button is in the off state and disabled in case of GAMBLE-NONE. The help button 33 is in the off state and disabled. The maximum BET button 45 is in the off state and disabled. The spin button 46 is in the on state and active. The normal game comes back when the button is pressed. The gamble button 44 is in the on state and active. A RESIDUAL GAMBLE starts when the button is pressed. The other buttons are in the off state and disabled.

(Details of Operation of Control Panel 30: When Error Occurs)

As shown in FIG. 92, the change button 31 is in the off state but active. The button is turned on/off as pressed. The cashout button 32 is in the off state and disabled. The other buttons are in the off state and disabled.

(Details of Operation of Control Panel 30: After Return from Error)

As shown in FIG. 93, the change button 31 is in the off state and disabled. The button remains in the off state but active after 120 seconds elapses. The cashout button 32 is in the on state and active. The help button 33 is in the on state and active. The 1-BET button 34 to the 10-BET button 39 are in the off state or are in the on state and active. In other words, these buttons retain the state of the previous game play. The gamble button 44 is in the off state and disabled. The maximum BET button 45 is turned on when MAX BET is possible. A game starts with "MAX BET" when the button is pressed. When the credits are smaller than MAX BET, the button is turned on and the maximum bettable bet is selected when the button is pressed. The button is in the off state and disabled when the credits are not sufficient for one bet. The spin button 46 is in the on state and active when the remaining credits>selected bet pattern. The button is in the off state and disabled when the remaining credits<selected bet pattern.

(Operations of Slot Machine 10: Normal Game Execution Process)

The operation of the slot machine 10 arranged as above will be described. The normal game execution process shown in FIG. 94 is executed by the main CPU 71 of the slot machine 10. The slot machine 10 has been activated in advance.

To begin with, the main CPU 71 executes a credit request process (S10). In this process, the player determines how many credits are used from the credits stored in the IC card.

Then whether a coin is bet is determined (S11). In this process, the main CPU 71 determines whether an input signal output from the 1-BET switch 34S when the 1-BET button 34 is pressed and an input signal output from the 10-BET switch 39S when the 10-BET button 39 is pressed are received. When it is determined that no coin is bet, the process goes back to S10.

In the meanwhile, if it is determined in S11 that a coin is bet, the main CPU 71 executes a process of decreasing the number of credits stored in the RAM 73 in accordance with the number of coins bet (S12). When the number of coins bet is larger than the number of credits stored in the RAM 73, the step of decreasing the number of credits stored in the RAM 73 is not carried out and the process goes back to S11. When the number of coins bet is larger than the maximum number (maximum bet amount in the present embodiment) of coins on one game, the step of decreasing the number of credits stored in the RAM 73 is not carried out and the process proceeds to S13.

Then the main CPU 71 determines whether the spin button 46 is pressed (S13). In this step, the main CPU 71 determines whether an input signal output from the start switch 46S when the spin button 46 is pressed is received. When it is determined that the spin button 46 is not pressed, the process goes back to S11. It is noted that, when the spin button 46 is not pressed (e.g., when an instruction to end a game is input while the spin button 46 is not pressed), the main CPU 71 cancels the reduction result in S12.

In the meanwhile, if it is determined in S13 that the spin button 46 is pressed, the main CPU 71 sends terminal-side game information to the center controller 200 (S14), and then executes a normal game symbol determination process (S15). In the normal game symbol determination process, code numbers when the symbols are stopped are determined. More specifically, a random number is sampled, and the code number when each symbol array of the display block 28 stops is determined based on the sampled random number and a normal game symbol table shown in FIG. 37.

Thereafter, in S16, the main CPU 71 executes a scroll-display control process. In this process, the display control is conducted so that, after the start of the scroll of the symbols 501, the symbols 501 are rearranged in accordance with S15.

Thereafter, the main CPU 71 determines whether a prize is established (S17). In S17, the main CPU 71 counts, regarding the symbols 501 rearranged in accordance with S16, the number of symbols 501 of each type rearranged on each payline L. Then the main CPU 71 determines whether the number of the symbols of each type is at least two.

When it is determined that a prize is established, the main CPU 71 executes a step concerning the payout of coins (S18). In this step, the main CPU 71 determines a payout rate with reference to odds data stored in the RAM 73 and based on the number of symbols 501 rearranged on a payline L. The odds data indicates the relationship between the number of symbols 501 rearranged on a payline L and a payout rate. Each time one "Wild" is displayed on a payline L where winning is established, the payout is doubled. That is to say, when three "Wild" are displayed on a payline L where winning is established, the payout is multiplied eight times.

The present embodiment assumes that a prize is established when at least one type of two or more symbols 501 are rearranged on a payline L. Alternatively, the present invention may be arranged so that no payline L is provided and a prize is established when at least one type of two or more symbols 501 are rearranged in the display blocks 28.

When it is determined in S17 that no prize is established or after S18, the main CPU 71 executes a rescue process to relieve the player if a predetermined rescue execution condition has been established (S22). After S22, the main CPU 71 sends game end information as information to cause all slot machines 10 to simultaneously start the common game (S23). Thereafter, a terminal-side common game process is executed (S24). The sub routine ends with this.

(Operations of Slot Machine: Bonus Game Execution Process)

As shown in FIG. 4, in the normal game (B1), the execution of the mummy wild feature (B2) is triggered by a randomly-appearing mummy, on condition that no bonus symbol appears on the third reel. When the mummy appears, all symbols on a randomly selected reel, the number of which is four at the maximum, are changed to the wild symbols. It is noted that the mummy wild feature (B3), the wolfman wild feature (B4), and the vampire wild feature (B5) do not simultaneously occur.

In the normal game (B1), the execution of the wolfman wild feature (B4) is triggered by a randomly-appearing wolfman, on condition that no bonus symbol appears on the third reel and no wild symbol has not appeared. When the wolfman appears, the after-scattering process is executed so that three to seven randomly-selected symbols are changed to the wild symbols.

In addition to the above, in the normal game (B1), the execution of the vampire wild feature (B5) is triggered by a randomly-appearing vampire, on condition that no bonus symbol appears on the third reel. When the vampire appears, the before-scattering process is executed so that three to seven randomly-selected symbols are changed to the wild symbols.

In addition to the above, when in the normal game (B1) a bonus symbol stops at reel 1, 3, or 5, a 4-option pickup bonus (B2) is triggered and four doors are displayed on the display screen. Behind the four doors, a Franken BONUS (B6), a Mummy BONUS (B7), a Wolfman BONUS (B8), and a Vampire BONUS (B9) are hidden. One of the four doors is selected and the shifting to the bonus game appearing at the selected door is conducted.

The Mummy BONUS (B6) is a 5-option fixed payout. The bonus shifts to the Franken BONUS (B10) when developed, or shifts to the normal game (B13) when not developed. The Wolfman BONUS (B7) is a five-time free game. The bonus shifts to the Franken BONUS (B11) when developed, or shifts to the normal game (B13) when not developed. The Vampire BONUS (B8) is a 6-option selection game, and END (game end) or continue occurs. The bonus shifts to the Franken BONUS (B12) when developed, or shifts to the normal game (B13) when not developed.

The Franken BONUS (B9) is, as shown in FIG. 5, 29-option selection game. The 29-option selection game results in a fixed payout (H1) at the probability of 18/29. The 29-option selection game results in a door 2 options game (H2) at the probability of 3/29. In a 2-option game in the door 2 options game (H2), the shifting to the Franken BONUS (H10) is conducted when unsuccessful, whereas a monster is obtained, i.e., the right to play a roulette random determination game (H9) is obtained when successful. On the other hand, in a 1-option game (H8) in the door 2 options game (H2), a monster is always obtained, i.e., the right to play the roulette random determination game (H9) is always obtained. After the roulette random determination game (H9), the shifting to the Franken BONUS (H10) is conducted.

The 29-option selection game results in a mini game 1 (H3) at the probability of 1/29. The mini game 1 (H3) is a number place game and the shifting to the Franken BONUS (H11) is conducted after the game ends. The 29-option selection game results in a mini game 2 (H4) at the probability of 2/29. The mini game 2 (H4) is a random payout system and the shifting to the Franken BONUS (H12) is conducted after the game ends.

The 29-option selection game results in END (game end) at the probability of 5/29. If a monster has been obtained, a roulette random determination game (H21) is executed. On the other hand, when no monster has been obtained, a 4-option tombstone selection game (H13) is executed. In the tombstone selection game (H13), a monster is obtained at the probability of 1/4 and a roulette random determination game (H14) is executed. In addition to the above, in the tombstone selection game (H13) a 10-option revival bonus game (H15) is executed at the probability of 1/4, a fixed payout (H16) is executed at the probability of 2/4, and the shifting to the normal game is conducted.

In the revival bonus game (H15) a monster is obtained at the probability of 1/10 and a roulette random determination game (H17) is executed. In the revival bonus game (H15) a fixed payout (H18) is executed at the probability of 8/10, and the revival bonus game (H20) is continued. In the revival bonus game (H15), END (H19) is executed at the probability of 1/10, and the bonus game end and the shifting to the normal game is executed.

(Operations of Slot Machine 10: Mummy Wild Feature)

When in the normal game no bonus symbol appears on the third reel and the mummy appears, a mummy wild feature is executed. That is to say, as shown in FIG. 95, the steps are executed in the following order: reel spin (F1)→the indication effect (F2)→the appearance of mummy (F3)→Wild arrangement (F4)→reel stop (F5)→WIN process (F6).

More specifically, the mummy wild feature occurs when no bonus symbol stops at the third reel and winning is achieved in Wild EXPAND occurrence random determination. When winning in the occurrence random determination, as a process 1, which reel is to be changed to Wild when a feature occurs is randomly determined. In a process 2, a character appears during the reel rotation, and a randomly-selected reel is changed to Wild reel. Then the reel stops. When a plurality of reels are changed to Wild, the order of the execution of the effects is randomly determined.

The normal effect in the mummy wild feature is executed with the steps (a) to (f) shown in FIG. 96. (a) The reel is rotating normally. (b) A mummy appears from below the reel. (c) The mummy wraps the reel by a bandage. (d) As the bandage is unwrapped, a tentative wild symbol appears. (e) After the effect, it is changed to a wild symbol (Mum). (f) The reels stop and WIN process is executed.

In addition to the above, effects utilizing plural reels are conducted by the steps (a) to (e) shown in FIG. 97. (a) The reels are rotating normally. (b) The mummy appears from below of the reel. (c) The mummy wraps up the reel. (d) As the bandage is unwound, a tentative wild symbol appears. In addition to the above, when the first bandage is almost unwound, the second Wild starts to change. (e) The steps above are repeated.

(Operations of Slot Machine 10: Wolfman Wild Feature)

In the normal game, a wolfman wild feature is executed on condition that no bonus symbol appears on the third reel and no wild symbol has not appeared. When the wolfman appears, the after-scattering process is executed so that three to seven randomly-selected symbols are changed to the wild symbols. That is to say, as shown in FIG. 98, the processes are executed in the following order: reel spin (F11)→indication effect (F12)→appearance of wolfman (F13)→reel stop (F14)→Wild arrangement (F15)→WIN process (F16).

More specifically, the wolfman wild feature occurs when no bonus symbol stops at the third reel, winning is achieved in Wild EXPAND occurrence random determination, and Wild does not stop on any reel. When a wild symbol stops, the feature does not occur even if the table indicates the occurrence. When winning is achieved in the occurrence random determination, as a process 1, the number and positions of the symbols to be changed to Wild are randomly determined when the feature occurs. As a process 2, a character appears during the reel rotation, and a wild symbol is provided at the randomly-determined position after the reel stop.

The effects in the wolfman wild feature are executed by the steps (a) to (f) shown in FIG. 99. (a) The reels are rotating normally. (b) A wolfman appears. (c) When the fifth reel stops, the wolfman starts to run on the reels. (d) While the wolfman is running, the target symbol is changed to a tentative Wild. As an effect, a mark resulting from a scratch is formed on the symbol and the symbol is gradually changed to the tentative Wild. (e) After the effect, the symbol is changed to a wild symbol (Mum). (f) The WIN process is executed.

(Operations of Slot Machine 10: Vampire Wild Feature)

In the normal game, the execution of the vampire wild feature is triggered by a randomly-appearing vampire, on condition that no bonus symbol appears on the third reel. When the vampire appears, the before-scattering process is executed so that three to seven randomly-selected symbols are changed to the wild symbols. That is to say, as shown in FIG. 100, the processes are conducted in the following order: reel spin (F21)→indication effect (F22)→appearance of vampire (F23)→Wild arrangement (F24)→reel stop (F25)→WIN process (F26).

More specifically, the mummy wild feature occurs when no bonus symbol stops at the third reel and winning is achieved in the Wild EXPAND occurrence random determination. When winning is achieved in the occurrence random determination, as a process 1, the number and positions of the symbols to be changed to Wild are randomly determined when the feature occurs. As a process 2, a character appears during the reel rotation, and a wild symbol is provided at the randomly-determined position after the reel stop. Then the reels stop.

The effects in the vampire wild feature are executed by the steps (a) to (f) shown in FIG. 101. (a) The reels are rotating normally. (b) A vampire appears. (c) A bat appears from the vampire. (d) The bat changes the target symbol to a tentative Wild. (e) After the end of the effect, the tentative Wild is maintained. (f) The reels stop, the symbol is changed to the wild symbol (Mum), and the WIN process is executed.

(Operations of Slot machine 10: 4-Option Pickup Bonus Game)

The 4-option pickup bonus game occurs when three bonus symbols stop in the normal game. When the 4-option pickup bonus game occurs, four options appear on the screen. The layout of the options is randomly determined in each game. The options are picked only once. The development to the bonus game associated with the character having appeared as a result of the pick of the option is conducted.

The 4-option pickup bonus game is executed by the process 1 to the process 4. In the process 1, six selectable icons (doors in the house) are displayed on the screen. In the process 2, a text instructing the player to select an icon is displayed. In the process 3, a cursor for the selection of the control panel is not shown until the BET button of the control panel 30 is pressed. On the control panel 30, only the 1-BET button 34 and four neighboring buttons are in the on state. In other words, only the BET buttons 34 to 39 are in the on state. The cursor appears at the upper left corner as one of the BET buttons 34 to 39 is pressed, and the SPIN button is turned on and the determination becomes available. In the process 4, after the selection by the player, a result of the selected icon is displayed and then a result of a non-selected icon is displayed (in gray). The results are displayed for four seconds. This may be skipped by pressing the SPIN button or the like.

In the 4-option pickup bonus game, as shown in FIG. 102, in the normal game (F31) a bonus title is displayed (F32), and the screen of the 4-option pickup bonus game is displayed (F33). Thereafter, when it is determined that the Franken BONUS is selected (F34), a Franken mum selection screen is displayed (F35) and 29-option pickup bonus game is executed (F36).

In addition to the above, when it is determined that the Mummy BONUS is selected (F37), a mummy selection screen is displayed (F38) and the Mummy BONUS game is executed (F39). When it is determined that the Vampire BONUS is selected (F40), a vampire selection screen is displayed (F41) and the Vampire BONUS game is executed (F42). When it is determined that the Wolfman BONUS is selected (F43), a wolfman selection screen is displayed (F44) and the Wolfman BONUS game is executed.

More specifically, the image display in the 4-option pickup bonus game is divided into an introduction stage, a selection screen stage, and a selection operation and selection result display stage. In the introduction stage, as shown in FIG. 103, three bonus symbols stop in the normal game. Then the screen "BONUS PICK" is displayed. Thereafter, in the selection screen stage, as shown in FIG. 105, the title of the "BONUS PICK", and the navigation text "Select a DOOR" are displayed. Furthermore, the icons and texts of "MUMMY BONUS", "VAMPIRE BONUS", "WOLFMAN FREE GAMES", and "FRANKEN BONUS" become displayable as being hidden behind the doors in the 4-option region. Furthermore, below the 4-option region, navigation texts are displayed. More specifically, "BET 1 BUTTON•PREV", "BET 10 BUTTON•NEXT", and "SPIN/MAX BET button•TO" are displayed.

In the selection operation and selection result display stage, as shown in FIG. 106, when the "Franken" door is selected, the navigation text instructing the player to make a selection disappears after the selection operation. The door opens and the selection result is displayed. Furthermore, non-selected icons are displayed in gray. Thereafter, an introduction screen showing the icon and title of "FRANKEN BONUS" is displayed and the Franken BONUS is executed.

In addition to the above, as shown in FIG. 107, when the "Mummy" door is selected, the navigation text instructing the player to make a selection disappears after the selection operation. The door opens and the selection result is displayed. Furthermore, non-selected icons are displayed in gray. Thereafter, an introduction screen showing the icon and title of "MUMMY BONUS" is displayed and the Mummy BONUS is executed.

In addition to the above, as shown in FIG. 108, when the "Vampire" door is selected, the navigation text instructing the player to make a selection disappears after the selection operation. The door opens and the selection result is displayed. Furthermore, non-selected icons are displayed in gray. Thereafter, an introduction screen showing the icon and title of "VAMPIRE BONUS" is displayed and the Vampire BONUS is executed.

In addition to the above, as shown in FIG. 109, when the "wolfman" door is selected, the navigation text instructing the player to make a selection disappears after the selection operation. The door opens and the selection result is displayed. Furthermore, non-selected icons are displayed in gray. Thereafter, an introduction screen showing the icon and title of "WOLFMAN FREE GAMES" is displayed and the Wolfman BONUS is executed.

(Operations of Slot Machine 10: 4-Option Pickup Bonus Game→Mummy Bonus)

The Mummy BONUS is a 5-option pickup bonus game that occurs when the mummy is selected in the 4-option pickup bonus game. In the Mummy BONUS, five options appear in the screen as the bonus occurs. The layout of the options is randomly determined each time. The selection of the options is conducted only once. When the Franken mum appears as a result of the selection, the development to the Franken BONUS is conducted. A credit payout is awarded no matter which option is selected.

The Mummy BONUS is executed by the process 1 to process 5. In the process 1, five selectable icons (stone coffin icons) are displayed on the screen. In the process 2, a text instructing the player to select an icon is displayed. In the process 3, a cursor for the selection of the control panel is not shown until the BET button of the control panel 30 is pressed. On the control panel 30, only the 1-BET button 34 and four neighboring buttons are in the on state. In other words, only the BET buttons 34 to 39 are in the on state. The cursor for the control panel selection appears at the upper left corner as one of the BET buttons 34 to 39 is pressed, and the SPIN button is turned on and the determination becomes available.

In the process 4, after the selection by the player, the result of the selected icon is displayed and then the result of non-selected icons is displayed in gray. The results are displayed for four seconds at least. When the WIN increment is not shorter than four seconds, the results are displayed until the increment finishes. The display of the results may be skipped by pressing SPIN buttons such as the spin button 46. The obtained credits are directly added to the win meter in the increment manner. In the process 5, the result screen is displayed at the end of the bonus.

In the Mummy BONUS game, as shown in FIG. 110, the bonus title is displayed (F51) and the selection is received (F52). The result of the selection by the player is determined (F53), and the mummy effect is conducted if the player selects a credit (F54). Thereafter, the total WIN signboard is displayed (F55) and the normal game is run (F56). On the other hand, if the Franken BONUS development is selected, the Franken mum effect is executed (F57). The mummy is evacuated (F58) and a with-mum total WIN signboard is displayed (F59). Thereafter, the title of the Franken BONUS is displayed (F60) and the Franken BONUS is executed (F61).

More specifically, the Mummy BONUS game is divided into an introduction stage, a selection screen stage, and a selection operation and selection result display stage. In the introduction stage, as shown in FIG. 111, the screen of "MUMMY BONUS" is displayed. Thereafter, in the selection screen stage, as shown in FIG. 112, the navigation text "select stone coffin" is displayed in an upper part of the screen whereas the navigation text instructing input to the control panel is displayed in a lower part of the screen. In addition to the above, on the touch buttons, the display screen indicating the Franken BONUS development and the credit payout and the payout display screen after the selection by the player are provided. These display screens are hidden until selected.

When the credit payout is selected, as shown in FIG. 113, the text requesting the selection disappears after the selection from five selectable icons (stone coffin icons) is conducted. The selected stone coffin is opened and the number of credits or the mummy is displayed as the selection result. The mummy takes action in accordance with result. After one second, non-selected icons are displayed in gray. Thereafter, the bonus name of the "MUMMY BONUS" is displayed and the dedicated total WIN signboard is displayed. The accumulative increment is executed on the win meter. The result is displayed for at least four seconds. This may be skipped. Then the shifting to the normal game is conducted. The figure shows the state in which a bonus is triggered.

When the Franken BONUS development is selected as shown in FIG. 114, after the selection from the five selectable icons (stone coffin icons), the text requesting the selection disappears. The selected stone coffin is opened and the number of credits or mummy is displayed as the selection result, and the Franken mum is also displayed. The Franken mum appears from the stone coffin. Then the mummy runs away. After one second, non-selected icons are displayed in gray. Thereafter, the bonus name of the "MUMMY BONUS" is displayed and the dedicated with-mum total WIN signboard is displayed. The with-mum total WIN signboard indicates a screen in which the Franken mum stands behind. The accumulative increment is executed on the win meter. The result is displayed for at least four seconds. This may be skipped. The title of the Franken BONUS is displayed and then the shifting to the Franken BONUS game is conducted.

(Operations of Slot Machine 10: 4-Option Pickup Bonus Game→Wolfman Bonus)

The Wolfman BONUS is a free game that occurs when the wolfman is selected in the 4-option pickup bonus game. The initial number of times of the game is five. The number of lines and the bet per line (active line) are identical with those at the start of the free game. The bonus is played with reel strips different from those in the normal game. The re-trigger is accepted only once. The number of free games as a result of the re-trigger is five. A prize by the free game symbol is established only by payout, in the second and subsequent games. A stopped wild symbol is fixed until the end of the free game. The reel rotation in the normal game may be different from the reel rotation in the free game.

The Wolfman BONUS is executed by the following processes 1 to 6. In the process 1, the reel strip and the screen image are changed to those for the free game. In the process 2, as shown in FIG. 115, after the introduction effect, a free game counter is displayed in the lower right part of the 1st screen. The free game counter has a first free game region 1*a*, a second free game region 1*b*, a third free game region 1*c*, and a fourth free game region 1*d*. The first free game region 1*a* is enlarged at the same time of the spinning, to notify the player of the consumption of one game.

The second free game region 1*b* displays the current number of free games. Before the start of the free game, the region displays “0”. For example, “0° F. 5” is displayed. At the same time as the start of the rotation of the reels, the counter is incremented by one. The enlargement is conducted at the same timing as the enlargement of the first free game region 1*a*, and also the counting is conducted by voice. The voice counting ends when the counter reaches “100”. After this, the counting is conducted by a sound effect. The maximum value of the counter is “999”.

The fourth free game region 1*d* displays the total number of free games. The initial value is “5”. The counter is incremented by five at the re-trigger, and the enlargement effect is carried out. At the same time as the enlargement effect, an effect of illuminating the first free game region 1*a* is conducted. The maximum value is “999”. Alternatively, the maximum value is 10. When the re-trigger occurs and the total number of free games is larger than “999”, the number exceeding 999 is truncated and the count-up process is not conducted any more.

In the process 3, “BONUS REELS IN PLAY” is always displayed in the lower right part of the screen. This may be covered on account of the enlargement of the free game counter 1 or symbol animation. The text above is preferably displayed on the free game counter 1. When reel strips different from those in the free game are used, such different is clearly shown in the help and the notice is noticeably displayed during the free game.

In the process 4, the reel variation may be different from that of the normal game. In the process 5, the re-trigger is conducted only once. No payout occurs with a free game symbol of the second and subsequent times. In the process 6, an WIN effect is conducted at the occurrence of winning, in the same manner as the normal game. In addition to the above, an increment process and a line effect are conducted. The lines and bet in the free game are identical with those at the occurrence of the free game.

In the Wolfman BONUS game, as shown in FIG. 116, the bonus title is displayed (F71) and the start screen is displayed (F72). A free game screen is displayed (F73) and the game result is determined (F74). Whether the development to the Franken BONUS occurs is determined (F75). If the development does not occur (F75: NO), then whether the end with no credit has occurred is determined (F76). When the end with no credit has not occurred (F76: NO), a total WIN signboard is displayed (F77) and then the shifting to the normal game is conducted (F79).

In the meanwhile, when the end with no credit has occurred (F76: YES), then the shifting to the normal game is conducted (F80). In addition to the above, when the development to the Franken BONUS occurs (F75: YES), whether the end with no credit has occurred is determined (F81). When the end with no credit has not occurred (F81: NO), a WIN process screen is displayed (F82) and a total WIN signboard is displayed (F83). Then the title of the Franken BONUS is displayed (F84) and the Franken BONUS is executed (F85). On the other hand, when the end with no credit has occurred (F81: YES), a WIN process screen is displayed (F86) and a total WIN signboard is displayed (F87). Thereafter, the title of the Franken BONUS is displayed (F88) and the shifting to the Franken BONUS is conducted.

More specifically, as shown in FIG. 117, the Wolfman BONUS game is divided into an introduction stage, a during free game stage, a result screen stage, and a re-trigger stage. In the introduction stage, as shown in FIG. 118, the screen “WOLFMAN FREE GAMES 5 FREE GAMES” is displayed and then the screen “FREE GAMES START” is displayed. Thereafter, in the during free game stage, as shown in FIG. 119, the reels are changed to those with symbols and arrangement dedicated to the free game. Then the “BONUS REELS IN PLAY” is displayed and a text explaining that special reels different from those in the normal game are used is displayed. Below the text, a free game counter showing “FREE GAME xx OF xx” is displayed. The maximum digits of the free game counter are two (the maximum number is 10).

In the result screen stage, as shown in FIG. 120, when the development to the Franken BONUS does not occur and the end with one or more credit occurs, a “common total WIN signboard” is displayed and then the normal game screen comes back. On the other hand, when the development to the Franken BONUS does not occur and the end with no credit occurs, the text “No WIN signboard display” is displayed after the fifth reel which is the last reel stops the rotation. After a predetermined waiting time (with dedicated background music), the normal game screen comes back.

In addition to the above, as shown in FIG. 121, when the development to the Franken BONUS occurs and the end with one or more credit occurs, a WIN process is executed after the fifth reel which is the last reel stops the rotation. Thereafter, an effect in which the Franken mum chases the running wolfman is executed. Subsequently, a dedicated with-mum total WIN signboard is displayed and the shifting to the Franken BONUS is conducted.

In the meanwhile, as shown in FIG. 122, when the development to the Franken BONUS occurs and the end with no credit occurs, a WIN process is executed after the fifth reel which is the last reel stops the rotation. Thereafter, an effect in which the Franken mum chases the running wolfman is executed. Subsequently, a dedicated with-mum total WIN signboard is displayed and the shifting to the Franken BONUS is conducted.

As shown in FIG. 123, when in the re-trigger stage three bonus symbols stop in the free game, the re-trigger display is conducted. However, the re-trigger is conducted only once. Then the number of free games is increased by five (10 in total). For a bonus symbol that stops after the re-trigger, bonus stop sound is not output (i.e., normal sound is output).

(Operations of Slot Machine 10: 4-Option Pickup Bonus Game→Wolfman Bonus: Fixation of Wild and Related Process)

AS shown in FIG. 124, when in the free game a Wild stops on the screen at the stop of each reel, the fixation of Wild and related process are executed. More specifically, when a wild symbol stops on the screen, the Wild design is changed from the symbol design “before transformation to wolfman” to the symbol design “wolfman”. That is to say, to begin with, the reels up to the fifth reel stop and animation showing a change of the wild symbol with the wild animal design is changed to the wild symbol with the prince design. After the animation showing the change, an WIN effect (or the start of the next game) is conducted after a predetermined second of waiting time. The waiting time is preferably adjustable. The next game starts while the Wild stops at the same position and the wolfman design is fixed. Note that, because the layout of the reels remains the same, only the wolfman symbol is fixed and the before-transformation symbol continues to exist. The symbol with the wolfman design is kept fixed until the end of the free game.

For example, as shown in FIG. 124(*a*), when the reels up to the fifth reel completely stop, as shown in FIG. 124(*b*), the before-transformation design is changed to the wolfman design. Thereafter, as shown in FIG. 124(*c*), WIN animation is executed if there is a winning. Subsequently, as shown in FIG. 124(*d*), the next game starts while the wolfman design symbol is kept fixed. The wolfman design symbol is kept fixed until the end of the free game.

In addition to the above, when a wild symbol has already been fixed on a reel, the fixed wild symbol is preferentially displayed. The reel passes through the position below the fixed wild symbol. Until all reels stop, even 3-of-a-kind bonus symbols pass under the Wild.

In addition to the above, when a bonus symbol stops below a fixed wild symbol, the fixed Wild is preferentially displayed if both of the fixed Wild and the bonus symbol do not relate to winning. If the bonus symbol relates to winning or both of the fixed Wild and the bonus symbol relate to winning, the bonus symbol winning is preferentially displayed at the time of displaying the winning line, and then the symbol rotates and the wild symbol is displayed. This operation is repeated while the winning line is displayed. In this regard, with the bonus symbol, the re-trigger is conducted only once and no payout is awarded. The effect is therefore executed only once in the free game. Assuming that three free game symbols are rearranged, as shown in FIG. 125(*a*) for example, a free game symbol stops below a fixed wild symbol when the reels up to the fifth reel completely stop. Thereafter, as shown in FIG. 125(*b*), the WIN animation of the bonus symbol is reproduced for once. Thereafter, as shown in FIG. 125 (*c*), the symbol rotates (is turned inside out) and a fixed wild symbol is displayed. When the wild symbol relates to a winning, the WIN animation of the Wild is reproduced and repeated until the next game starts. When the "free game" is won and a payout is awarded as a result of "Wild", the rotational display is conducted. On the other hand, when "free game" is won but no payout is awarded by the "Wild", the operation of fading in and fading out each symbol is repeated.

(Operations of Slot Machine 10: 4-Option Pickup Bonus Game→Wolfman Bonus: Development Indication)

When the development to the Franken BONUS has been internally confirmed, the development indication occurs at the probability of 50%. In the development indication, when the occurrence of the indication is confirmed, a process 1 where in which one of five games an effect is conducted is randomly determined and a process 2 where an effect (the wolfman is chased by the Franken mum) is executed in upper parts of the reels while the reels are rotating in the game determined in the process 1 are conducted. In the development indication, the data tables shown in FIGS. 126A to 126C are referred to, for example.

(Operations of Slot Machine 10: 4-Option Pickup Bonus Game→Vampire Bonus)

When the vampire is selected in the 4-option pickup bonus game, a Vampire BONUS occurs. The Vampire BONUS is a 6-option pickup bonus game in which 6 options appear on the screen (the layout of the options is randomly determined each time). Once the selection finishes, 6 options appear again (the layout of the options is randomly determined each time). It is noted that this arrangement is different from the selection from the remaining five options. The bonus ends either when END is selected or when the selection is serially done eight times. At the end of the bonus, the development to the Franken BONUS is always conducted. All of the six options involve the credit payout, including the END.

To be more specific, the Vampire BONUS is performed by executing the processes 1 to 6. In the process 1, six selectable icons (window icons) are displayed. In the process 2, the text "HOW MANY TIMES GAME IS PLAYED" is displayed on the screen. For example, (THE 1st GAME). Furthermore, the texts explaining the game rules and requesting the selection of an icon are displayed. In the process 3, the cursor for the selection of the control panel is hidden until the BET button on the control panel 30 is pressed. On the control panel 30, only the 1-BET button 34 and four neighboring buttons are in the on state. The cursor appears at the upper left corner as the BET button is pressed, and the SPIN button is turned on and the determination becomes available. The cursor for the selection is always hidden at the start of the selection.

When in the process 4 the selection by the player is conducted, a result of the selected icon is displayed and then a result of a non-selected icon is displayed (in gray). The results are displayed for four seconds at least. When the WIN increment is not shorter than four seconds, the results are displayed until the increment finishes. The display of the results may be skipped by pressing SPIN buttons. The obtained credits are added to the bonus win meter. The processes 1 to 4 are repeated until either the END is selected in the process 5 or the selection is succeeded eight times. When the bonus ends in the process 6, a result screen is displayed. In case of continue, the "HOW MANY TIMES GAME IS PLAYED" is updated, and the selection by the player is waited for again.

In the Vampire BONUS game, as shown in FIG. 127, the bonus title is displayed (F91) and 6-option selection screen is displayed (F92). Thereafter, when the credit payout is selected (F93), the selection result is displayed (F94), and the 6-option selection screen comes back. In addition to the above, when the credit payout is selected (F96), the selection result is displayed (F97), and the result of the selection end is displayed (F98). Thereafter, the WIN process is executed (F99) and the with-mum total WIN signboard is displayed (F100). Then the Franken BONUS screen is displayed (F101) and the 29-option bonus (Franken) comes back (F102). In the meanwhile, when the END is selected (F103), the total WIN signboard is displayed (F104) and the shifting to the normal game occurs (F105).

To be more specific, the Vampire BONUS is divided into an introduction stage, a selection screen stage, and a selection operation and selection result display stage. In the introduction stage, as shown in FIG. 128, the introduction screen of the Vampire BONUS is displayed. In the selection screen stage, as shown in FIG. 129, the selection screen is displayed. The selection screen shows the navigation text of "Select a WINDOW" and a game count. The maximum number of the game count is eight. Furthermore, the selection screen displays the continue and the end conditions of the game, the payout which is four digits at the maximum, and the explanations on the button operations.

As a selection is made through the selection screen, the shifting to the selection screen stage occurs. That is to say, as shown in FIG. 130, when in the selection screen the credit payout is selected less than eight times, the navigation text "Select a WINDOW" requesting the selection disappears. The window opens and the selection result is displayed. The vampire takes an action in accordance with the result. After one second, non-selected icons are displayed in gray. The accumulative addition to the bonus win meter is conducted. The result is displayed for four seconds at least. The display of the result may be skipped. Subsequently, after the WIN process is conducted, all options are rearranged while the windows are closed. The state of waiting for the selection comes back. The display of the number of times is updated. In the eighth selection, LAST GAME is displayed. The bonus win meter is not reset. That is to say, the display of the accumulative values is continued.

As shown in FIG. 131, when the eighth selection of the credit payout is conducted on the selection screen, the navigation text "Select a WINDOW" requesting the selection disappears and "THE LAST GAME" is displayed. The window opens and the selection result is displayed. The vampire takes an action in accordance with the result. After one second, non-selected icons are displayed in gray. The accumulative addition to the bonus win meter is conducted. The result is displayed for four seconds at least. The display of the result may be skipped. Thereafter, a text indicating the selection of the bonus eight times is completed is displayed.

Subsequently, as shown in FIG. 132, the development to the Franken BONUS is conducted. That is to say, an effect in which the Franken mum appears on the screen and chases the vampire who is running way is conducted. Thereafter, the dedicated with-mum total WIN signboard is displayed. The signboard shows the text "VAMPIRE BONUS Completed!" and the total number of credits which is five digits at the maximum is displayed. Thereafter, as shown in FIG. 133, the introduction screen of the Franken BONUS is displayed and the Franken BONUS starts.

In the meanwhile, as shown in FIG. 134, when the "END" is selected on the selection screen, the navigation texts "Select a WINDOW" requesting the selection disappears and "THE LAST GAME" are displayed. The window opens and the selection result is displayed. The vampire takes an action in accordance with the result. After one second, non-selected icons are displayed in gray. The accumulative addition to the bonus win meter is conducted. The result is displayed for four seconds at least. The display of the result may be skipped. Thereafter, a dedicated total win meter is displayed. This meter shows a text "VAMPIRE BONUS" and the total number of credits which is five digits at the maximum. Thereafter, the shifting to the screen of the normal game occurs.

In the Franken BONUS, an eighth game indication effect in which the Franken mum shows her face before the selection in the eighth game by the player. That is to say, the eighth game indication effect is an effect executed only in the eighth game. In the eighth game indication effect, the Franken mum always turns up from the side of the screen.

(Operations of Slot Machine 10: Franken BONUS)

When any one of the conditions 1 to 4 below is satisfied, the Franken BONUS which is 29-option pickup bonus game (29-option game) occurs. The condition 1 is a case where the Franken mum is selected in a bonus pick. The condition 2 is a case (development) where the Franken mum is selected in the Mummy BONUS. The condition 3 is a case (development) where the Franken mum appears in the Wolfman BONUS. The condition 4 is a case (development) where the Franken mum appears in the Vampire BONUS.

In the Franken BONUS, 29 options appear on the screen. The options are represented by stone coffin icons. The layout of the options is randomly determined each time. The options are "Fixed Payout•Door 2 Options (with Probability of 1 Option)", "Mini Game 1 (Mirror)", "Mini Game 2 (Electric chair)", and "END". When the END icon is selected, the Franken BONUS ends. When an icon different from the fixed payout icon, and the END icon is selected, the shifting to the dedicated mini game occurs, and the 29-option game is continued after the end of the mini game.

In the Franken BONUS, the following processes 1 to 4 are executed. In the process 1, 29 selectable icons (stone coffin icons) are displayed on the screen. In the process 2, a text requesting the selection of an icon is displayed. In the process 3, the cursor for the selection of the control panel is hidden until the BET button on the control panel 30 is pressed. (Only the BET buttons 34 to 39 are in the on state.) The cursor appears at the upper left corner as one of the BET buttons 34 to 39 is pressed, and the SPIN button is turned on and the determination becomes available. After the selection, the cursor for the selection is automatically moved to the next icon.

In the process 4, after the selection by the player, the result of the selected icon is displayed. BY the respective icons, a fixed payout process (credit payout process), a door 2 options process, a mini game 1 (mirror) process, a mini game 2 (electric chair) 9 process, and an END process are executed. In the fixed payout process, a payout is displayed and the obtained credits are added to the bonus win meter in an increment manner. The 29-option game is continued. In the door 2 options process, the shifting to the dedicated 2-option game occurs. In the door 2 options process, however, no selection may occur at a predetermined probability. In such a case, an "obtained character icon" is directly displayed and the character sits at table. After the door 2 options process, the 29-option game is continued.

In the Franken BONUS, 29 options appear on the screen. The options are represented by stone coffin icons. The layout of the options is randomly determined each time. The options are "Fixed Payout•Door 2 Options Game", "mini game 1 (Mirror)", "mini game 2 (Electric Chair)", and "END". When the END icon is selected, the Franken BONUS ends. When an icon different from the fixed payout icon and the END icon is selected, the shifting to the dedicated mini game occurs, and the 29-option game is continued after the end of the mini game.

In the 29-option game, as shown in FIG. 135, the introduction screen is displayed (F111) and the 29 options selection screen is displayed (F112). When the END is selected (F113), after the selected option is highlighted (F114), non-selection gray display is executed (F115). Thereafter, if a character is obtained (F116), a roulette random determination process is executed (F117). On the other hand, when no character is obtained (F121), a tombstone 4-option process is executed (F122).

In addition to the above, when the credit payout is selected (F118), after the selected option is highlighted (F119), the 29 options selection screen is displayed to execute the 29-option game (F120). When the door 2 options (1 option) is selected (F123), after the selected option is highlighted (F124), a door 2 options (1 option) bonus process is executed (F125) and the credits are displayed (F126).

When the mini game 1 is selected (F127), the selected option is highlighted (F128). Then a mini game 1 process is executed (F129) and the credits are displayed (F130). When the mini game 2 is selected (F131), the selected option is highlighted (F132). Then a mini game 2 process is executed (F133) and the credits are displayed (F134).

To be more specific, the Franken BONUS is divided into an introduction stage, a selection screen stage, and a selection operation and selection result display stage. In the introduction stage, as shown in FIG. 136, and introduction screen showing the title of "FRANKEN BONUS" is displayed. Then the stage shifts to the selection screen stage and, as shown in FIG. 137, a selection screen is displayed. In the selection screen, a message "Select Stone Coffin" is displayed in an upper part of the screen, and a control panel operation navigation text is displayed on the touch buttons in a lower part of the screen. The stone coffin icons are kept in the non-display state until one of then is selected. The options are "Number of Payout" that is four digits at the maximum, "Vampire Bonus", "Mummy Bonus", "Wolfman Bonus", "Vampire Bonus+ Number of Payout", "Mummy Bonus+Payout Number of Credits", "Wolfman Bonus+Payout Number of Credits", "Mini Game 1", "Mini Game 2", "Mini Game 1+Payout Number of Credits", "Mini Game 2+Payout Number of Credits", and "END".

As shown in FIG. 138, when the "END" is selected on the selection screen, the navigation text requesting the selection disappears. An effect is executed for the stone coffin icons and "END" is displayed. The non-selected icons are all displayed in gray. Thereafter, a roulette random determination process is executed if a character icon has been obtained. A tombstone 4-option process is executed if no character icon has been obtained.

As shown in FIG. 139, when the credit payout is selected on the selection screen, the navigation text requesting the selection disappears. An effect is executed for the stone coffin icons, and the payout is displayed. The accumulative increment is executed on the bonus win meter. Thereafter, after the WIN process, the state of waiting for the selection comes back. The bonus win meter is not reset. That is to say, the display of the accumulative values is continued.

As shown in FIG. 140, if the door 2 options game is selected on the selection screen, the navigation text requesting the selection disappears. An effect is executed for the stone coffin icons, and the door 2 options icon or the obtained character icon is displayed. Then a door 2 options (1 option) bonus process is executed. When the acquisition of a character is succeeded, the obtained character sits at the table. When the acquisition of a character is unsuccessful, the icon is displayed in gray and the obtained credits are displayed. The state of waiting for the selection comes back.

As shown in FIG. 141, when the mini game 1 is selected on the selection screen, the navigation text requesting the selection disappears. An effect is executed for the stone coffin icons, and the icon of the mini game 1 is displayed. Then a mini game 1 process is executed. After the WIN process, the state of waiting for the selection comes back.

As shown in FIG. 142, when the mini game 2 is selected o the selection screen, the navigation text requesting the selection disappears. An effect is executed for the stone coffin icons, and the icon of the mini game 2 is displayed. Then a mini game 2 process is executed. After the WIN process is executed, the state of waiting for the selection comes back.

(Operations of Slot Machine 10: Franken BONUS: 1-Option Indication Effect)

When there is s directly-obtained character (i.e., a character obtained without the execution of 2-option game) in the Franken BONUS, a 1-option indication effect is executed to notify the player of the existence of the directly-obtained character. The 1-option indication effect is conducted at the start of the 29-option game when any one of the following conditions 1 to 3 is established. The condition 1 is a case where the mummy is the directly-obtained character. The condition 2 is a case where the wolfman is the directly-obtained character. The condition 3 is a case where the vampire is the directly-obtained character. The conditions 1 to 3 may be combined.

The details of the 1-option indication effect will be given below. As shown in FIG. 143(*a*), before a character is obtained, a character to be directly obtained shows one's face at an upper part of the screen (i.e., above the selectable icon). The character shows one's face at predetermined intervals, and this operation is repeated until the character is selected and obtained. The figure shows a case where all three characters are directly obtained. Thereafter, as shown in FIG. 143(*b*), the character no longer shows one's face and sits at the table after the acquisition of the character. As shown in FIG. 143(*c*), when plural characters show their faces, the character which has not been obtained continues the showing of the face. The face showing continues until the acquisition of all characters is completed.

(Operations of Slot Machine 10: Franken Bonus→Door 2 Options Game)

The following will describe a case where the door 2 options game is selected in the 29-option game of the Franken BONUS. It is noted that in the Franken BONUS the 1-option game in which a character is directly obtained without conducting the 2-option game is executed at a predetermined probability.

In the 2-option game, two options appear on the screen. The layout of the options is randomly determined each time. The options are fixed payout and character acquisition. The selection is performed only once. After the bonus, the 29 option game is continued. In the case of the 1-option game, the character acquisition state starts while the 29-option screen is kept displayed.

In the 2-option game, the following processes 1 to 6 are executed. In the process 1, two selectable icons (door icons) are displayed on the screen. In the process 2, a text requesting the selection of an icon is displayed. In the process 3, the cursor for the selection of the control panel is hidden until the BET button on the control panel 30 is pressed. Only the BET buttons 34 to 39 are in the on state. The cursor appears at the upper left corner as one of the BET buttons 34 to 39 is pressed, and the SPIN button is turned on and the determination becomes available.

In the process 4, after the selection by the player, the result of the selected icon is conducted. The non-selected icons are displayed in gray. By the icons, a fixed payout process and a character acquisition process are executed. In the fixed payout process, a payout is displayed and the obtained credits are added to the bonus win meter in an increment manner. In the character acquisition process, the animation of the character acquisition is reproduced.

In the process 5, the 29-option game is continued at the end of the bonus. When a character is obtained, the obtained character sits at the table in the 29 options screen. In the process 6, the state of character acquisition (i.e., the state in which the selected icon is changed to a character and the character sits at the table) while the 29 options screen is being displayed, in case of 1-option game.

In the door 2 options game, as shown in FIG. 144, a door 2 options game icon is displayed (F141). When the 1-option game is selected (F142), the start screen of the 29-option game is displayed (F143) and the 29-option game is executed (F144). In the meanwhile, if the 2-option game is selected (F145), the 2-option game screen is displayed (F146). When a character is obtained (F147), the obtained character is displayed (F148). After the start screen of the 29-option game is displayed (F149), a 29-option game is executed (F150). On the other hand, in case of fixed payout (F151), the payout is displayed (F152), and after the start screen of the 29-option game is displayed (F153), the 29-option game is executed (F154).

More specifically, in a door 1 option bonus, as shown in FIG. 145, an effect is executed for the stone coffin icons and an obtained character icon is displayed. Then the 29 options screen comes back and the obtained character sits at the table. Then the 29-option game is continued.

In the 2-option game, as shown in FIG. 146, an effect is executed for the stone coffin icons and two door icons are displayed. Then a door 2 options screen is displayed. The door 2 options screen shows the title of "MONSTER'S ROOM", the sub title of "FIND A MONSTER", the navigation text of "Select a DOOR", and the button operations. The door 2 options screen further includes a character display region and a payout display region. These display regions are hidden until each of which is selected.

When a character is obtained in the door 2 options screen, as shown in FIG. 147, the navigation text requesting the selection disappears. An effect is executed for the door icon and the obtained character is displayed. Then the Franken mum opens the door and wake the character up. The non-selected icons are displayed in gray. Thereafter, the 29-option game comes back and the obtained character sits at the table. In addition to the above, the obtained character icon is displayed. Then the 29-option game is continued.

When the fixed payout is selected in the door 2 options screen, as shown in FIG. 148, the navigation text requesting the selection disappears. An effect is executed for the door icon and a payout is displayed. The accumulative increment is executed on the bonus win meter. In addition to the above, the Franken mum opens the door and the non-selected icons are displayed in gray. Subsequently, after the execution of the WIN process, the state of waiting in the 29-option game comes back. In addition to the above, the character acquisition icon is displayed in gray. Then the 29-option game is continued.

(Operations of Slot Machine 10: Franken BONUS→Mini Game 1)

The following will describe a case where the mini game 1 is selected in the 29-option game of the Franken BONUS. In the mini game 1, eight options are displayed in the screen. The layout of the options is randomly determined each time. The options are all numbers, that is, "1", "2", "3", and "4". The selection is permitted three times in total. The option which is selected once cannot be selected again. The three-digit number resulting from three selections 3 (×LINE BET) indicates the credits to be obtained. After the end of the bonus, the 29-option game is continued.

In the door 2 options game, the following processes 1 to 7 are executed. In the process 1, eight selectable icons (mirror icons) are displayed on the screen. In the process 2, a text requesting the selection of an icon is displayed. In the process 3, the cursor for the selection of the control panel is hidden until the BET button on the control panel 30 is pressed. Only the BET buttons 34 to 39 are in the on state. The cursor appears at the upper left corner as one of the BET buttons 34 to 39 is pressed, and the SPIN button is turned on and the determination becomes available. The cursor for the selection automatically moves to the next icon, after the selection. In the process 4, after the selection by the player, the result of the selected icon is displayed. The numbers that are the selection results are inserted into the corresponding digits. In the process 5, after three selections, non-selected icons are displayed in gray. In the process 6, the three-digit number formed by the three selections (×LINE BET) is added to the bonus win meter in an increment manner. In the process 7, the 29-option game is continued at the end of the bonus.

In the mini game 1, as shown in FIG. 149, a mini game 1 icon is displayed (F161). Then the title is displayed (F162) and a selection screen is displayed (F163). Then a selection operation screen 1 is displayed (F164) and a selection result screen is displayed (F165). Then a selection operation screen 2 is displayed (F166) and a selection result screen is displayed (F167). A selection operation screen 3 is displayed (F168) and a selection result screen is displayed (F169). Then a selection completion screen is displayed (F170), a total WIN signboard is displayed (F171), and then the 29-option game comes back (F172).

To be more specific, in the mini game 1, as shown in FIG. 150, an effect is executed for the stone coffin icons, and the icon of the mini game 1 is displayed. Then the introduction screen of the mini game 1 is displayed. The introduction screen shows the title of "Mirror Bonus".

Thereafter, as shown in FIG. 151, a selection screen is displayed. In the selection screen, three boxes each being used for displaying one digit are provided. Three digits are represented by these three boxes. The types of the numbers are "1" to "4". In addition to the above, in the selection screen, one of three types of the navigation texts, "Choose the MIRROR for the one's digit", "Choose the MIRROR for the ten's digit.", and "Choose the MIRROR for the hundred's digit." is displayed in a switchable manner. Furthermore, the selection screen includes an explanation display region displaying the explanation "A number hidden in each MIRROR.", a selection result display region displaying a number selected from "1" to "4", and a button control panel.

Subsequently, as shown in FIG. 152, before the selection, the first digit of the three digits in an upper part of the screen flickers. The flickering notifies the player that the selection is reflected to the flickering digit. Until the selection is made, a navigation text requesting the selection is displayed. The navigation text disappears when the selection is made. An effect is conducted for the mirror and a number is displayed in the mirror. The selected number is put in the first digit of the three digits in the upper part of the screen. This operation is shown in animation.

Thereafter, as shown in FIG. 153, the state of waiting for the selection returns. Among the three digits in the upper part of the screen, the second digit flickers. The flickering notifies the player that the selection is reflected to the flickering digit. Until the selection is made, a navigation text requesting the selection is displayed. The navigation text disappears when the selection is made. An effect is conducted for the mirror and a number is displayed in the mirror. The selected number is put in the second digit of the three digits in the upper part of the screen. This operation is shown in animation.

Thereafter, as shown in FIG. 154, the state of waiting for the selection returns. Among the three digits in the upper part of the screen, the third digit flickers. The flickering notifies the player that the selection is reflected to the flickering digit. Until the selection is made, a navigation text requesting the selection is displayed. The navigation text disappears when the selection is made. An effect is conducted for the mirror and a number is displayed in the mirror. The selected number is put in the third digit of the three digits in the upper part of the screen. This operation is shown in animation.

Subsequently, as shown in FIG. 155, the three digits in the upper part of the screen flicker. The flickering notifies the player that the number has been determined. The non-selected icons are displayed in gray. Then a dedicated total WIN signboard is displayed. The value calculated by "three-digit number×LINE BET is added to the bonus win meter in an increment manner. It is noted that the "WIN" display region in the figure is a single-level region and displays only one type of text. The display region "123" shows a result and always display a three-digit number. The display region "×LINE BET" display a text for calculation. The display region "1234 CREDITS" displays the finally-obtained credits which is four digits at the maximum. Then the 29-option game comes back.

(Operations of Slot Machine 10: Franken Bonus→Mini Game 2)

The following will describe a case where the mini game 2 is selected in the 29-option game of the Franken BONUS. In the mini game 2 a meter (voltage meter) appears in the screen. The meter has four levels. As the level increases as Lv1→Lv2→Lv3→Lv4, the payout is changed in accordance with the achieved level. As the player presses the SPIN button, the level of the meter is increased. This, however, does not influence on the payout. After the end of the bonus, the 29-option game is continued.

In the mini game 2, the following processes 1 to 5 are executed. In the process 1, a 4-stage meter (voltage meter) is displayed in the screen. In the process 2, an effect of the voltage meter is executed in accordance with the internally-determined payout. That is, an effect of waking up the Franken sleeping on the electric chair is conducted. In the process 3, while the voltage meter is in operation, the voltage meter is increased or decreased in response to an input to the SPIN button by the player. In the process 4, a payout corresponding to the level indicated when the voltage meter stops is obtained. In the process 5, the 29-option game is continued at the end of the bonus.

In the mini game 2, as shown in FIG. 156, a mini game 2 icon is displayed (F181). Then the title is displayed (F182) and an introduction screen 1 is displayed (F183). Then an introduction screen 2 is displayed (F184) and a 4-stage meter is displayed (F185).

More specifically, in the mini game 2, as shown in FIG. 157, an effect is executed for the stone coffin and the icon of the mini game 2 is displayed. Then an introduction screen having the title "Electric chair bonus" is displayed. Subsequently, as shown in FIG. 158, a game explanation "Press the SPIN button rapidly and raise the voltage meter" is displayed. Then start declaration texts "GET READY" and "GO!" are displayed. These start declaration texts are continuously displayed in animation.

Subsequently, as shown in FIG. 159, a meter effect screen having a 4-stage meter is displayed. The 4-stage meter has a fan-shaped analog display region. This analog display region is arranged to indicate the state of progress from left to right in the figure, in analog. The analog display region is divided into four areas. These areas are, from left to right in the figure, a first area, a second area, a third area, and a fourth area. At each of the upper ends of the first to fourth areas, the number of payout is displayed. In addition to the above, on the upper edge side of the analog display region, a pointing unit is provided to indicate the state of progress. The pointing unit is arranged to be movable along the upper edge. Furthermore, on the left edge and right edge sides of the analog display region, "MIN" are "MAX" are displayed, respectively.

The operation of the meter effect screen with the arrangement above will be described. As shown in FIG. 160, the pointing unit of the voltage meter moves from the MIN to the border between Lv1 and Lv2. A teasing effect is executed around the border so that it is indeterminate whether the pointing unit goes to Lv2 or remains in Lv1. On the screen, an electric current corresponding to the voltage meter is applied to the Franken mum sleeping on the electric chair. When the pointing unit remains in Lv1, The voltage meter stops in the Lv1. The result corresponding to Lv1 is displayed. The Franken mum sleeping on the electric chair wakes up. The number of payout is added to the bonus win meter in an increment manner. Then the 29-option game comes back.

On the other hand, when the pointing unit does not remain in Lv1, as shown in FIG. 161, the voltage meter moves from Lv1 to the border between Lv2 and Lv3. A teasing effect is executed around the border so that it is indeterminate whether the pointing unit goes to Lv3 or remains in Lv2. On the screen, an electric current corresponding to the voltage meter is applied to the Franken mum sleeping on the electric chair. When the pointing unit remains in Lv2, the voltage meter stops in Lv2. The result corresponding to Lv2 is displayed. The Franken mum sleeping on the electric chair wakes up. The number of payout is added to the bonus win meter in an increment manner. Then the 29-option game comes back.

On the other hand, when the pointing unit does not remain in Lv2, as shown in FIG. 162, the voltage meter moves from Lv2 to the border between Lv3 and Lv4. A teasing effect is executed around the border so that it is indeterminate whether the pointing unit goes to Lv4 or remains in Lv3. On the screen, an electric current corresponding to the voltage meter is applied to the Franken mum sleeping on the electric chair. When the pointing unit remains in Lv3, the voltage meter stops in Lv3. The result corresponding to Lv3 is displayed. The Franken mum sleeping on the electric chair wakes up. The number of payout is added to the bonus win meter in an increment manner. Then the 29-option game comes back. When the pointing unit remains in Lv4, as shown in FIG. 163, the voltage meter moves from Lv3 to MAX. The result corresponding to Lv4 is displayed. The Franken mum sleeping on the electric chair wakes up. The number of payout is added to the bonus win meter in an increment manner. Then the 29-option game comes back.

When the voltage meter operates as above, it is possible to change the operation of the voltage meter by making an input to the spin button 46. As the spin button 46 is pressed during a bonus, the voltage meter is increased. This, however, does not influence on the WIN credit which has internally been determined at the start of the bonus.

Details of how the voltage meter increases will be given. The voltage meter automatically increases over time, and also increases in response to an input from the player. The upper limit of the increase in the voltage meter is determined in advance for each phase. There are two patterns of the increase in the voltage meter. In a pattern 1, no input is made to the button and the meter automatically increases over predetermined time. In a pattern 2, the meter increases when the input to the button is made for a predetermined number of times. When an input to the button is made in the state of the pattern 1, the time is reset. The predetermined time and the predetermined number of times of the input are not uniform in the pattern 2. Basically, the time and the number increase at the each teasing point and as the meter gets close to Lv4.

The upper limit of the increase in the voltage meter will be detailed. As shown in FIG. 164, assume that the first area, the second area, the third area, and the fourth area of the voltage meter are provided along a linear line. In this case, the upper limit exists around the right edge part of each area, and the teasing point exists around this upper limit. The pattern of the increase in the voltage meter is divided into phases 1 to 4. As shown in FIG. 165, the phase 1 includes an increase operation 1 in which the analog indicated amount reaches the middle of the second area and an increase operation 2 in which the analog indicated amount remains in the first area. One of these phases is randomly selected. When the payout is determined in Lv1, if the increase is being performed in the increase operation 1, the payout is determined after the analog indicated amount in the second area disappears. On the other hand, when the increase is being performed in the increase operation 2, the payout is immediately determined. In the meanwhile, when the payout is not determined, the process shifts to the phase 2.

As shown in FIG. 166, the phase 2 includes an increase operation 1 in which the analog indicated amount reaches the middle of the third area and an increase operation 2 in which the analog indicated amount remains in the second area. One of these phases is randomly selected. When the payout is determined in Lv2, if the increase is being performed in the increase operation 1, the payout is determined after the analog indicated amount in the third area disappears. On the other hand, when the increase is being performed in the increase operation 2, the payout is immediately determined. In the meanwhile, when the payout is not determined, the process shifts to the phase 3.

As shown in FIG. 167, the phase 3 includes an increase operation 1 in which the analog indicated amount reaches the middle of the fourth area and an increase operation 2 in which the analog indicated amount remains in the third area. One of these phases is randomly selected. When the payout is determined in Lv3, if the increase is being performed in the increase operation 1, the payout is determined after the analog indicated amount in the fourth area disappears. On the other hand, when the increase is being performed in the increase operation 3, the payout is immediately determined. In the meanwhile, when the payout is not determined, the process shifts to the phase 4. As shown in FIG. 168, in the phase 4, the analog indicated amount is continuously increased from the last state in the phase 3 to the fourth area.

(Operations of Slot Machine 10: Franken Bonus→4-Option Game)

At the end of the 29-option game in the Franken BONUS, a 4-option game occurs when no character has been obtained. When the 4-option game occurs, four options appear in the screen. The layout of the options is randomly determined each time. The selection is made only once. The options are “Acquisition of Character”, “Revival Ghost Bonus”, and “END”. When the “END” is selected, the Franken BONUS ends. When a symbol other than the “END” is selected, the shifting to the corresponding bonus occurs.

In the 4-option game, the following processes 1 to 5 are executed. In the process 1, four selectable icons (tombstones) appear on the screen. In the process 2, a text requesting the selection of an icon is displayed. In the process 3, the cursor for the selection of the control panel 30 is hidden until one of the BET buttons 34 to 39 on the control panel 30 is pressed. Only the BET buttons 34 to 39 are in the on state. The cursor appears at the upper left corner as one of the BET buttons 34 to 39 is pressed, and the SPIN button is turned on and the determination becomes available.

In the process 4, after the selection by the player, the result of the selected icon is displayed. By the respective icons, a character acquisition process, a revival ghost bonus process, and an END process are executed. In the character acquisition process, the shifting to the roulette random determination occurs. All non-selected icons are displayed in gray. In the revival ghost bonus process, a fixed credit is obtained and the shifting to the revival ghost bonus occurs. All non-selected icons are displayed in gray. In the END process, a fixed credit is obtained and the Franken BONUS ends. All non-selected icons are displayed in gray. In the process 5, the result screen is displayed when the “END” is selected.

In the 4-option game, as shown in FIG. 169, a selection screen is displayed (F191). When the END is selected (F192), after the selection result is displayed (F193), non-selected results are displayed (F194). Then a total WIN signboard is displayed (F195) and the normal game comes back (F196). In addition to the above, when the character acquisition is selected (F197), the selection result is displayed (F198) and non-selected results are displayed (F199), and then a roulette random determination game is executed (F200). In addition to the above, when the revival ghost bonus is selected (F201), the selection result is displayed (F202) and non-selected results are displayed (F203), and then a revival ghost bonus is executed (F204).

More specifically, in the 4-option game, to begin with, a selection screen is displayed as shown in FIG. 170. In the selection screen, a message “Select a TOMBSTONE” is displayed in an upper part of the screen, whereas a navigation text “FIND A MONSTER” is displayed on the touch buttons in a lower part of the screen. Below the navigation text, four tombstones showing “Revival Ghost Bonus+Number of Payout”, “END+Number of Payout”, and “Character” are provided to be hidden until the selection. The layout of these tombstones is randomly changed each time.

When the “END” is selected in the selection screen above, as shown in FIG. 171, the navigation text requesting the selection disappears. An effect is executed for the tombstone and “END” is displayed. The payout is accumulatively added to the bonus win meter in an increment manner. Thereafter, non-selected icons are all displayed in gray.

Subsequently, as shown in FIG. 172, a dedicated total WIN signboard is displayed. The value of the total WIN is added to the win meter in an increment manner. It is noted that the text “BONUS CREDITS=123456” indicates the total bonus WIN not including the roulette. The displayed number is six digits at the maximum. In addition to the above, “FRANKEN BONUS Total=123456 CREDITS” indicates the total bonus. The displayed number is six digits at the maximum. Then the normal game comes back.

As shown in FIG. 173, when “Character” is selected on the selection screen, the navigation text requesting the selection disappears. An effect is executed for the tombstone and the obtained character icon is displayed. Non-selected icons are all displayed in gray. Then the shifting to the roulette random determination process occurs.

As shown in FIG. 174, when the “revival ghost bonus” is selected on the selection screen, the navigation text requesting the selection disappears. An effect is executed for the tombstone and the icon of the revival ghost is displayed. The payout is accumulatively added to the bonus win meter in an increment manner. Non-selected icons are all displayed in gray. Then the shifting to the revival ghost bonus occurs.

(Operations of Slot Machine 10: Franken Bonus→4-Option Game→Revival Ghost Bonus)

In the 4-option game, the revival ghost bonus occurs when the revival ghost bonus is selected. When the bonus occurs, 10 options appear in the screen. The layout of the options is randomly determined each time. The options are “Fixed Payout”, “Character Acquisition”, and “END”. The bonus ends when the END icon is selected. When the character acquisition icon is selected, the shifting to the roulette random determination occurs.

In the revival ghost bonus, the process 1 to the process 5 are executed. In the process 1, 10 ghost icons that are selectable icons are displayed. In the process 2, a text requesting the selection of an icon is displayed. In the process 3, the cursor for the selection of the control panel 30 is hidden until one of the BET buttons 34 to 39 on the control panel 30 is pressed. Only the BET buttons 34 to 39 are in the on state. The cursor appears at the upper left corner as one of the BET buttons 34 to 39 is pressed, and the SPIN button is turned on and the determination becomes available. The cursor for the selection automatically moves to the next icon, after the selection.

In the process 4, after the selection by the player, the result of the selected icon is displayed. By the respective icons, a fixed payout process, a character acquisition process, and an END process are executed. In the fixed payout process, a payout is displayed and the obtained credits are added to the bonus win meter in an increment manner. The number of options is kept to be 10. In the character acquisition process, the shifting to the roulette random determination occurs. Non-selected icons are all displayed in gray. In the END process, non-selected icons are all displayed in gray. In the process 5, the result screen is displayed when the END is selected.

In the revival ghost bonus, as shown in FIG. 175, after an introduction screen is displayed (F211), a selection screen is displayed (F212). When the END is selected (F213), the selection result is displayed (F214) and non-selected results are displayed (F215). Then a total WIN signboard is displayed (F216) and the normal game comes back (F217). In addition to the above, when the character acquisition is selected (F218), the selection result is displayed (F219) and non-selected results are displayed (F220), and then a roulette random determination game is executed (F221). In addition to the above, when the fixed payout is selected (F222), the selection result is selected (F223) and non-selected result are displayed (F203), and then a selection screen is displayed (F224).

More specifically, in the revival ghost bonus, to begin with, an introduction screen is displayed as shown in FIG. 176. The introduction screen displays titles “REVIVAL GHOST” and “ONE MORE CHANCE!”. Thereafter, as shown in FIG. 177, a selection screen is displayed. In the selection screen, in an upper part thereof, a message “FIND A MONSTER” and a navigation text “Select any GHOST” are displayed. In addition to the above, 10 ghost icons including a ghost icon “1234 CREDITS”, a ghost icon “END”, and a ghost icon “Character Acquisition” are provided. The content of each ghost icon is hidden until the selection. In addition to the above, the layout of the ghost icons is randomly changed each time.

When “END” is selected on the selection screen, as shown in FIG. 178, the navigation text requesting the selection disappears. An effect is executed for the ghost icon and “END” is displayed. Non-selected icons are all displayed in gray.

Thereafter, as shown in FIG. 179, a dedicated total WIN signboard is displayed. The value of the total WIN is added to the win meter in an increment manner. It is noted that the text “BONUS CREDITS=123456” indicates the total bonus WIN not including the roulette. The displayed number is six digits at the maximum. In addition to the above, “FRANKEN BONUS Total=123456 CREDITS” indicates the total bonus. The displayed number is six digits at the maximum. Then the normal game comes back. Then the shifting to the normal game occurs.

As shown in FIG. 180, when the “Character Acquisition” is selected on the selection screen, the navigation text requesting the selection disappears. An effect is executed for the ghost icon and the obtained character icon is displayed. Non-selected icons are all displayed in gray. Then the shifting to the roulette random determination process occurs.

As shown in FIG. 181, when the “Fixed Payout” is selected on the selection screen, the navigation text requesting the selection disappears. An effect is executed for the ghost icon and a payout is displayed. The payout is accumulatively added to the bonus win meter in an increment manner. After the execution of the WIN process, the state of waiting for the selection comes back. Until the selection is made, a navigation text requesting the selection is displayed.

(Operations of Slot Machine 10: Franken Bonus: Roulette Random Determination Game)

The roulette random determination game is executed when a character is obtained at the end of the 29-option game, a character is obtained in the 4-option game, or when a character is obtained in the revival ghost bonus. In the roulette random determination game, a payout random determination using the effect mechanism 131 of the top box 12 is executed for each obtained character, during the Franken BONUS. The payout random determination using the effect mechanism 131 of the top box 12 is conducted based on the data table shown in FIG. 188. When a plurality of characters have been obtained, the payout random determination is carried out in the order of mummy→wolfman→vampire.

In the roulette random determination game, the process 1 to the process 3 are executed. In the process 1, for each obtainer character, payout random determination using the effect mechanism 131 of the top box 12 is conducted. When more than one character has been obtained the payout random determination is executed in the order of Mummy→Wolfman→Vampire. In the process 2, the payout result is displayed. The result is displayed for four seconds. This may be skipped by pressing SPIN buttons. In the process 3, after the random determinations are all completed, the result screen is displayed.

In the roulette random determination game, as shown in FIG. 182, a selection midway screen is displayed (F231). When Mummy is obtained (F232), a mega-top-related image is displayed (F233) and a random determination result screen is displayed (F234). When Wolfman is obtained (F241), a wolfman random determination process is executed (F242). When Vampire is obtained (F243), a vampire random determination process is executed. When any other character is obtained (F245), after a total WIN signboard is displayed (F246), the normal game is executed (F247).

In addition to the above, When Mummy has not been obtained (F235), whether Wolfman has been obtained is determined. When Wolfman has been obtained (F235A), after the mega-top-related screen is displayed (F236), the random determination result screen is displayed (F237). When Vampire has been obtained (F243), the vampire random determination process is executed. If any other character has been obtained (F245), a total WIN signboard is displayed (F246) and the normal game is executed (F247).

When Wolfman has not been obtained (F238), after the mega-top-related screen is displayed (F239), the random determination result screen is displayed (F2403). After the total WIN signboard is displayed (F246), the normal game is executed (F247).

More specifically, in the roulette random determination game, as shown in FIG. 183, the state of during random determination is set after an introduction effect. The bonus win meter disappears. In the during random determination screen, a navigation text is displayed. There are three types of navigation texts corresponding to the respective monsters, namely, “LOOK UP”, “for VAMPIRE’S award”, “for WOLFMAN’S award”, and “for MUMMY’S award”.

When Mummy has been obtained, as shown in FIG. 184, “LOOK UP” and “for MUMMY’S award” are displayed while the random determination is being conducted at the effect mechanism 131 of the top box 12. Then the random determination result of the four digits at the maximum such as “1234”, a text for the calculation “×LINE BET”, and the final obtained credits of the five digits at the maximum such as “12345” are displayed. Thereafter, if Wolfman has been obtained, the wolfman random determination process is executed, if Vampire has been obtained, the vampire random determination process is executed, and if any other character has not been obtained, a dedicated total WIN signboard is displayed.

In addition to the above, as shown in FIG. 185, when Mummy has not been obtained but Wolfman has been obtained, "LOOK UP" and "for WOLFMAN'S award" are displayed while the random determination is being executed at the effect mechanism 131 of the top box 12. Then the random determination result of the four digits at the maximum such as "1234", a text for the calculation "×LINE BET", and the final obtained credits of the five digits at the maximum such as "12345" are displayed. Thereafter, if Vampire has been obtained, the vampire random determination process is executed, and if any other character has not been obtained, a dedicated total WIN signboard is displayed.

In addition to the above, as shown in FIG. 186, when Mummy has not been obtained and Wolfman has not been obtained, "LOOK UP" and "for VAMPIRE'S award" are displayed while the random determination is being executed at the effect mechanism 131 of the top box 12. Then the random determination result of the four digits at the maximum such as "1234", a text for the calculation "×LINE BET", and the final obtained credits of the five digits at the maximum such as "12345" are displayed. Then a dedicated total WIN signboard is displayed.

The dedicated total WIN signboard displays the total bonus WIN not including the roulette, which is six digits at the maximum such as "BONUS CREDITS=123456" and the total bonus WIN including the roulette, which is six digits at the maximum such as "=123456". At the same time, the icon of the obtained character is displayed. Furthermore, the dedicated total WIN signboard displays the total bonus of six digits at the maximum such as "FRANKEN BONUS Total=123456 CREDITS". Then the shifting to the normal game occurs.

(Operations of Slot Machine 10: Gamble Game)

As shown in FIG. 189, when the money is lower than the processable value such as one dollar, a "RESIDUAL GAMBLE" screen is displayed if a gamble start condition such as the pressing of a collect button is satisfied (F253). When the gamble button is pressed, Gamble starts. On the other hand, when the collect button is pressed, Call Attendant is displayed (F254). When the spin button 46 is pressed, the screen of the normal game comes back (F255).

When "WIN" is achieved in Gamble (F256), a predetermined amount of money such as one cent is awarded and a token is paid out through the hopper. In addition to the above, the addition to the credit meter is executed (F257). Thereafter, after a predetermined time such as two seconds elapses, the screen of the normal game comes back (F258). On the other hand, when "LOSE" appears in Gamble (F259), a LOSE screen is displayed (F260). Thereafter, after a predetermined time such as two seconds elapses, the screen of the normal game comes back (F261).

The roles of the buttons in the progress of the gamble game will be described. In the cashout button 32, GAMBLE ON corresponds to "TAKE WIN" and GAMBLE OFF corresponds to "TAKE WIN". In the gamble button 44, GAMBLE ON corresponds to "Gamble Start" and GAMBLE OFF corresponds to "-" IN the maximum BET button 45, GAMBLE ON corresponds to "Invalidated" and GAMBLE OFF corresponds to "Gamble Start". In the spin button 46, GAMBLE ON corresponds to "To Normal Game" and GAMBLE OFF corresponds to "To Normal Game".

As shown in FIG. 190, the "RESIDUAL GAMBLE" screen has a card display area, a navigation area, and a meter area. In the card area is displayed a card image. The entirety of the card area has a touch sensor function. On the navigation area, various navigation texts are displayed.

The limit of the value winnable in Gamble is set in the AUDIT. The maximum number of times of Gamble is also set in the AUDIT. For example, the maximum number of times is set at five and the number of times of Gamble is set so as to be five or lower. Whether the touch panel can be used is switchable in some countries.

As shown in FIG. 191, when the shifting to the gamble game occurs, the message "PLAY ON, GAMBLE or TAKE WIN RED" disappears. Immediately after the clearance of the RAM, the card history is empty until the gamble game is played. A message "SELECT RED OR BLACK OR TAKE WIN" is displayed. In the gamble screen, a heart-shaped red button and a spade-shaped black button are turned on and a TAKE WIN button at the center is turned on. The other buttons are turned off.

Subsequently, as shown in FIG. 192, the amount bet on "GAMBLE AMOUNT" is displayed. Then one of the heart-shaped red button, the spade-shaped black button, and the TAKE WIN button at the center on the gamble screen is selected. When the TAKE WIN button is selected, the amount of WIN is added to the credits at once and the idle state comes back.

In case of Miss in Gamble, as shown in FIG. 193, non-selected options are darkened. At the left edge of the gamble history field, the card history is displayed at once. The preceding card history moves right. The trace of the movement is not illustrated in animation, and hence the history is rewritten at once. The central card result is displayed at once. At this stage, there are no changes in the win meter and the gamble meter. Sound indicating hard luck is output and the shifting to the normal game occurs after several seconds.

In case of Success in Gamble, as shown in FIG. 194, non-selected options are darkened. At the left edge of the gamble history field, the card history is displayed at once. The preceding card history moves right. The trace of the movement is not illustrated in animation, and hence the history is rewritten at once. On the central card, a normal card and a card with a WIN text are alternately displayed at intervals of one frame, and success sound is output for a predetermined time. To the win meter, the value increase as a result of Gamble is added at once. When the player plays the gamble game until reaching the maximum number to times, the value won is added to the credits at once and the idle state comes back. As shown in FIG. 194, when the player has not played the gamble game until reaching the maximum number to times, a card is turned inside out and the gamble game is continued.

While in the present embodiment the number of paylines L is 30, the number of paylines is not limited; the number of paylines may be a predetermined number such as 25.

Although in the present embodiment the bonus winning is a case where three or more trigger symbols are rearranged, the disclosure is not limited to this arrangement. For example, the bonus winning may indicate the state in which a predetermined time elapses after the end of the previous bonus game.

In addition to the above, according to the present embodiment, the free game is arranged so that, symbols are variably displayed in the display block 28 and the variation is stopped, and a payout amount is determined in accordance with the symbols having stopped or a combination thereof (i.e., a game usually run on a slot machine). The free game of the disclosure, however, is not limited to the arrangement above. The free game may be a game different from a slot game. For example, card games such as Poker, shooting games, fighting games may be run. As a result of the free game, a game medium may be paid out or may not be paid out.

In addition to the above, when a free game is run based on the fact that the number of times of the normal game counted in the insurance mode reaches a predetermined number and then the number of times of the normal game counted in the insurance mode reaches the predetermined number again, a free game different from the previous free game may be run. The free game of the present invention may be designed in various ways, as long as the game does not presuppose the betting of a game medium.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A wagering machine comprising:

a value-addition mechanism, including an insertion slot that receives at least one of a unit of currency, a token, a bill, a ticket, and a card, by which a gaming value to be wagered may be added to the gaming machine;

a symbol display device configured to variably display symbols and then rearrange the symbols in response to receipt of the value to be wagered;

an indication data storage device configured to store individual indication data associated with a game result of rearrangement of the symbols on the symbol display device and common indication data associated with game results of rearrangement of the symbols on the symbol display device;

an indication effect device configured to execute indication effects based on the individual indication data and based on the common indication data; and a controller programmed to execute the steps of (a1) in response to receipt of the value to be wagered, randomly determining a game result of rearrangement of the symbols on the symbol display device in a base game;

(a2) when the game result in the base game is a specific game result that awards at least one of a plurality of types of bonus games, specifying the common indication data associated with the at least one of the plurality of types of bonus games and individual indication data associated with a specific bonus game; and (a3) after specifying the common indication data and the individual indication data, and while the symbols are being variably displayed on the symbol display device in the base game, executing an indication effect based on the common indication data specified in the step (a2) and then subsequently executing an indication effect based on the individual indication data specified in the step (a2).

2. The wagering machine according to claim 1, wherein, in the step (a2), an individual indication data not associated with the specific game result is specified at a predetermined probability.

3. The wagering machine according to claim 1, wherein the indication effect device includes the symbol display device and an output mechanism of a top box provided above the symbol display device, and the controller executes indication effects by outputting an image on the symbol display device and an indication effect by an output from the output mechanism.

4. A wagering machine comprising:

a value-addition mechanism, including an insertion slot that receives at least one of a unit of currency, a token, a bill, a ticket, and a card, by which a gaming value to be wagered may be added to the gaming machine;

a symbol display device configured to variably display symbols and then rearrange the symbols in response to receipt of the value to be wagered;

an indication data storage device configured to store individual indication data associated with a game result of rearrangement of the symbols on the symbol display device and common indication data associated with game results of rearrangement of the symbols on the symbol display device;

an indication effect device configured to execute indication effects based on the individual indication data and based on the common indication data; and a controller programmed to execute the steps of (a1) in response to receipt of the value to be wagered, randomly determining a game result of rearrangement of the symbols on the symbol display device in a base game and randomly determining whether or not to execute an indication effect;

(a2) when the game result in the base game is a specific game result that awards at least one of a plurality of types of bonus games, and the random determination results in the execution of an indication effect, specifying the common indication data associated with the at least one of the plurality of types of bonus games and individual indication data associated with a specific bonus game and (a3) after specifying the common indication data and the individual indication data, and while the symbols are being variably displayed on the symbol display device in the base game, executing an indication effect based on the common indication data specified in the step (a2) and then subsequently executing an indication effect based on the individual indication data specified in the step (a2).

5. The wagering machine according to claim 4, wherein, in the step (a2), an individual indication data not associated with the specific game result is specified at a predetermined probability.

6. The wagering machine according to claim 4, wherein the controller is programmed to execute the further steps of:

when the game result is the specific game result and the random determination as to whether to execute an indication effect is negative, (a4) specifying the individual indication data associated with the specific game result; and (a5) while the symbols are being variably displayed on the symbol display device, executing an indication effect based on the individual indication data specified in step (a4) despite the random determination as to whether to execute an indication effect being negative.

7. The wagering machine according to claim 6, wherein, in the step (a2), an individual indication data not associated with the specific game result is specified at a predetermined probability.

8. A wagering machine comprising:

a display device;

a value-addition mechanism, including an insertion slot that receives at least one of a unit of currency, a token, a bill, a ticket, and a card, by which a gaming value to be wagered may be added to the gaming machine;

an indication data storage device configured to store individual indication data associated with a specific bonus game and common indication data associated with at least one of a plurality of types of bonus games; and a controller programmed to execute the processes of:

(A) in response to receipt of the value to be wagered, when a specific game result that awards at least one of a plurality of types of bonus games is randomly determined in a base game, specifying the individual indication data and the common indication data associated with the specific game result and reading the specified individual indication data and common indication data from the indication data storage device; and (B) before the specific game result is displayed on the display device, executing an indication effect based on the common indication data specified in the process (A) and then subsequently executing an indication effect based on the individual indication data specified in the process (A).

* * * * *